United States Patent
Nishi et al.

(10) Patent No.: US 9,672,859 B2
(45) Date of Patent: Jun. 6, 2017

(54) OPTICAL MEDIUM REPRODUCTION APPARATUS AND OPTICAL MEDIUM REPRODUCTION METHOD

(71) Applicant: Sony Corporation, Tokyo (JP)

(72) Inventors: Noriaki Nishi, Kanagawa (JP); Kimihiro Saito, Kanagawa (JP); Junya Shiraishi, Nagano (JP); Yutaka Tentaku, Kanagawa (JP); Nobuhiko Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/911,980

(22) PCT Filed: Jul. 30, 2014

(86) PCT No.: PCT/JP2014/003977
§ 371 (c)(1),
(2) Date: Feb. 12, 2016

(87) PCT Pub. No.: WO2015/022773
PCT Pub. Date: Feb. 19, 2015

(65) Prior Publication Data
US 2016/0196848 A1  Jul. 7, 2016

(30) Foreign Application Priority Data

Aug. 14, 2013  (JP) .................................. 2013-168484
Jan. 30, 2014  (JP) .................................. 2014-015151

(51) Int. Cl.
*G11B 7/00*     (2006.01)
*G11B 7/007*    (2006.01)
(Continued)

(52) U.S. Cl.
CPC .......... *G11B 7/00718* (2013.01); *G11B 7/005* (2013.01); *G11B 7/133* (2013.01);
(Continued)

(58) Field of Classification Search
None
See application file for complete search history.

(56) References Cited

U.S. PATENT DOCUMENTS 5,347,504 A  9/1994 Ito et al.
5,386,410 A  1/1995 Nagasaki et al.
(Continued)

FOREIGN PATENT DOCUMENTS

DE  41 19 384 A1  12/1991
EP  0 375 342 A2  6/1990
(Continued)

OTHER PUBLICATIONS

[No Author Listed], Trial Production of Magneto Optical Disk Device Whose Storage Density is Doubled by Decreasing Track Pitch. Nikkei Electronics. 1990; 495:98-9.

*Primary Examiner* — Peter Vincent Agustin
(74) *Attorney, Agent, or Firm* — Wolf, Greenfield & Sacks, P.C.

(57) ABSTRACT

The present disclosure relates to a reproduction apparatus. The reproduction apparatus may comprise an optical filter and electric filters. The optical filter may be configured to provide electrical signals corresponding to regions of an optical beam returning from an optical medium, the optical beam being incident on the optical filter, the regions of the optical beam corresponding to different bands in a line density direction and/or a track density direction. The electric filters may be configured to provide outputs based, at least in part, on the electrical signals provided by the optical filter, wherein the reproduction apparatus is configured to obtain a reproduced signal by combining the outputs of the electric filters.

7 Claims, 88 Drawing Sheets

(51) Int. Cl.
*G11B 20/10* (2006.01)
*G11B 7/005* (2006.01)
*G11B 7/133* (2012.01)

(52) U.S. Cl.
CPC .. *G11B 20/10027* (2013.01); *G11B 20/10037* (2013.01); *G11B 20/10046* (2013.01)

(56) References Cited

U.S. PATENT DOCUMENTS

| | | | | |
|---|---|---|---|---|
| 5,400,189 | A * | 3/1995 | Sato | G11B 5/035 360/32 |
| 5,416,766 | A | 5/1995 | Horimai | |
| 5,420,847 | A | 5/1995 | Maeda et al. | |
| 5,508,990 | A | 4/1996 | Nagasaki et al. | |
| 5,617,389 | A * | 4/1997 | Satoh | G11B 7/005 250/201.5 |
| 5,719,835 | A * | 2/1998 | Ishika | G11B 7/094 369/44.26 |
| 5,754,503 | A * | 5/1998 | Senba | G11B 7/0908 369/112.12 |
| 5,841,754 | A * | 11/1998 | Lee | G11B 7/131 369/112.13 |
| 5,907,530 | A * | 5/1999 | Cho | G02B 3/10 369/120 |
| 6,091,692 | A | 7/2000 | Morimoto | |
| 6,483,650 | B1 | 11/2002 | Imai | |
| 6,580,676 | B1 | 6/2003 | Yanagisawa et al. | |
| 6,584,049 | B1 * | 6/2003 | Ma | G11B 7/005 369/44.41 |
| 7,826,323 | B2 | 11/2010 | Hayashi | |
| 8,111,477 | B2 | 2/2012 | Nakagawa | |
| 8,369,201 | B2 | 2/2013 | Saito et al. | |
| 8,379,503 | B2 | 2/2013 | Yamatsu et al. | |
| 8,416,656 | B2 | 4/2013 | Nishi | |
| 8,582,402 | B2 | 11/2013 | Horigome | |
| 8,685,517 | B2 | 4/2014 | Miki et al. | |
| 8,867,324 | B2 | 10/2014 | Sekiguchi et al. | |
| 8,929,190 | B2 | 1/2015 | Saito et al. | |
| 9,111,555 | B2 | 8/2015 | Igari et al. | |
| 2001/0038592 | A1 | 11/2001 | Kobayashi | |
| 2002/0018420 | A1 | 2/2002 | Nishi | |
| 2002/0027843 | A1 | 3/2002 | Kim et al. | |
| 2002/0159378 | A1 * | 10/2002 | Lee | G11B 7/131 369/112.12 |
| 2003/0016606 | A1 * | 1/2003 | Urita | G11B 7/005 369/47.26 |
| 2003/0053393 | A1 * | 3/2003 | Shimano | G11B 7/09 369/112.02 |
| 2005/0068864 | A1 | 3/2005 | Ma et al. | |
| 2005/0199778 | A1 * | 9/2005 | Kadowaki | G11B 7/0903 250/201.5 |
| 2006/0104173 | A1 | 5/2006 | Shibuya et al. | |
| 2006/0285461 | A1 | 12/2006 | Ashizaki et al. | |
| 2007/0097834 | A1 | 5/2007 | Sakai | |
| 2007/0286048 | A1 | 12/2007 | Hayashi | |
| 2008/0056081 | A1 * | 3/2008 | Otsuka | G11B 7/0906 369/47.1 |
| 2008/0198730 | A1 * | 8/2008 | Mori | G11B 7/0908 369/112.23 |
| 2009/0028021 | A1 | 1/2009 | Yin et al. | |
| 2009/0238048 | A1 | 9/2009 | Feng et al. | |
| 2009/0290473 | A1 * | 11/2009 | Katayama | G11B 7/1353 369/109.01 |
| 2009/0303850 | A1 | 12/2009 | Nakai et al. | |
| 2009/0316561 | A1 * | 12/2009 | Nishimura | G11B 7/1267 369/112.01 |
| 2010/0007984 | A1 | 1/2010 | Nakagawa | |
| 2010/0157753 | A1 | 6/2010 | Iwanaga | |
| 2011/0242951 | A1 | 10/2011 | Saito et al. | |
| 2012/0008484 | A1 | 1/2012 | Yamatsu et al. | |
| 2012/0082201 | A1 | 4/2012 | Shiraishi | |
| 2012/0106308 | A1 | 5/2012 | Horigome | |
| 2012/0163152 | A1 | 6/2012 | Hosaka et al. | |
| 2012/0182851 | A1 | 7/2012 | Saito et al. | |
| 2012/0294131 | A1 | 11/2012 | Nishi | |
| 2013/0010583 | A1 | 1/2013 | Miyamoto et al. | |
| 2013/0052389 | A1 | 2/2013 | Miki et al. | |
| 2013/0235713 | A1 | 9/2013 | Suzuki | |
| 2013/0322228 | A1 | 12/2013 | Saito et al. | |
| 2014/0036651 | A1 | 2/2014 | Sekiguchi et al. | |
| 2014/0044940 | A1 | 2/2014 | Ikuta et al. | |
| 2014/0322476 | A1 | 10/2014 | Igari et al. | |
| 2016/0155468 | A1 | 6/2016 | Nishi et al. | |
| 2016/0218808 | A1 | 7/2016 | Nishi et al. | |
| 2016/0275983 | A1 | 9/2016 | Takahashi et al. | |

FOREIGN PATENT DOCUMENTS

| | | |
|---|---|---|
| EP | 1 178 484 A2 | 2/2002 |
| EP | 2 437 262 A1 | 4/2012 |
| JP | 03-156729 A | 7/1991 |
| JP | 05-242512 A | 9/1993 |
| JP | 07-093757 A | 4/1995 |
| JP | 08-249664 A | 9/1996 |
| JP | 2000-048488 A | 2/2000 |
| JP | 2000-315322 A | 11/2000 |
| JP | 2001-034969 A | 2/2001 |
| JP | 2001-357545 A | 12/2001 |
| JP | 2003-223761 A | 8/2003 |
| JP | 2005-332453 A | 12/2005 |
| JP | 2006-338782 A | 12/2006 |
| JP | 2007-058887 A | 3/2007 |
| JP | 4023365 B2 | 12/2007 |
| JP | 2010-225237 A | 10/2010 |
| JP | 2010-244672 A | 10/2010 |
| JP | 2012-079385 A | 4/2012 |
| WO | WO 2014/054246 A1 | 4/2014 |
| WO | WO 2014/057674 A1 | 4/2014 |

* cited by examiner

R2 (LS 0)

R2 (LS 0.2)

R3 (LS 0)

R3 (LS 0.2)

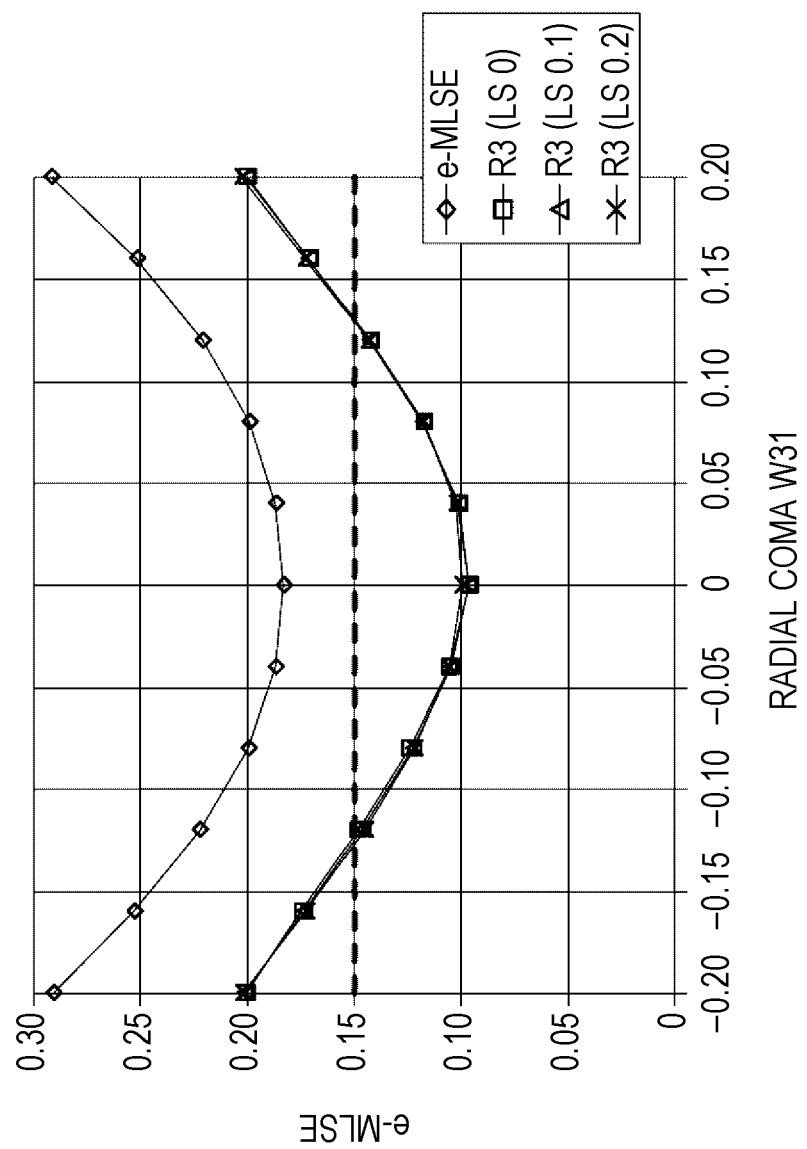
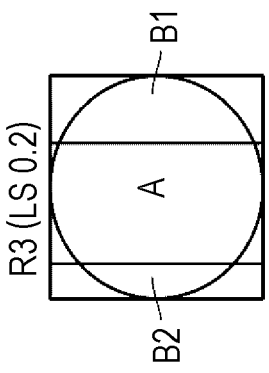
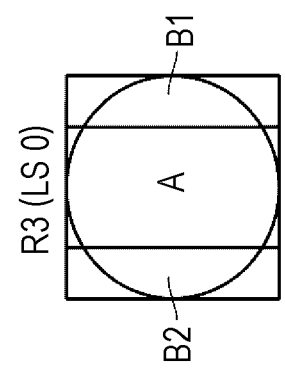
FIG. 26A
FIG. 26B
FIG. 26C

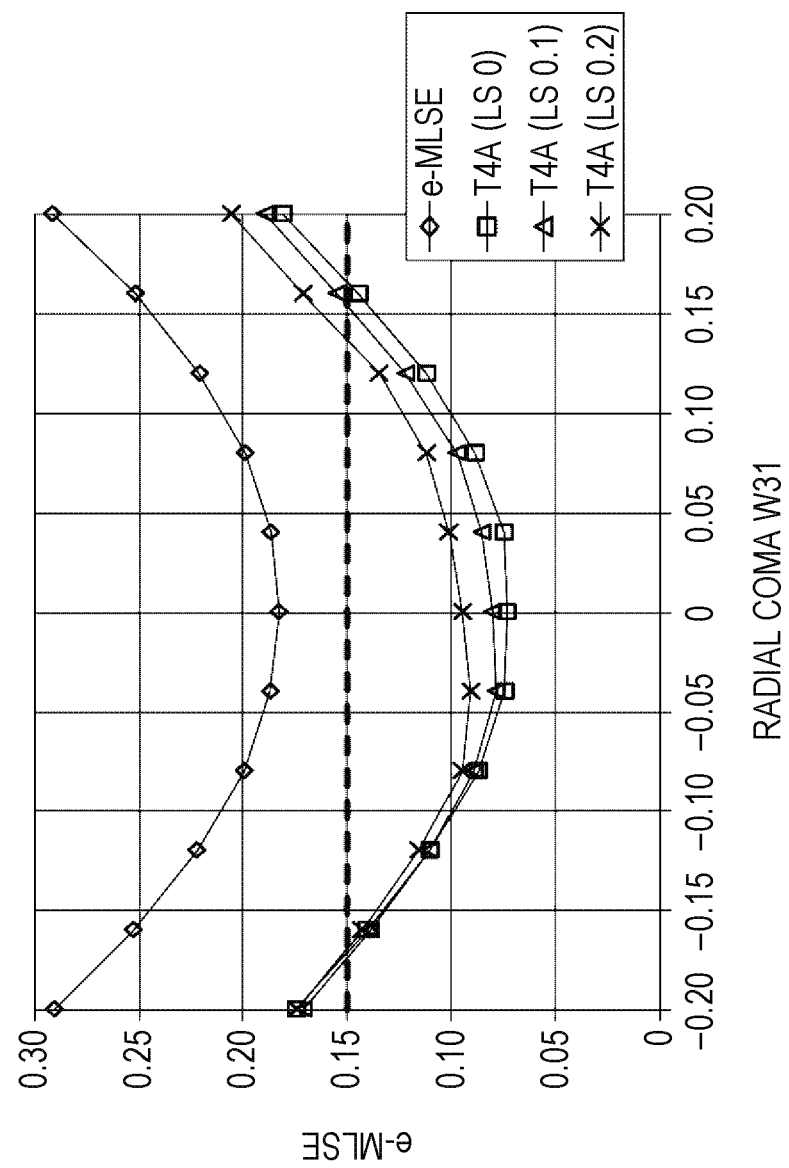
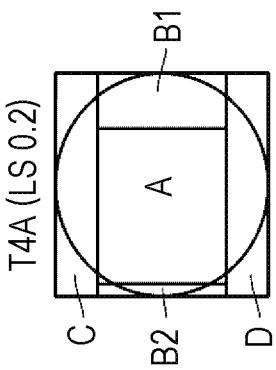
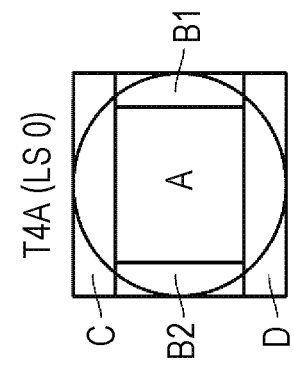
FIG. 27A
FIG. 27B
FIG. 27C

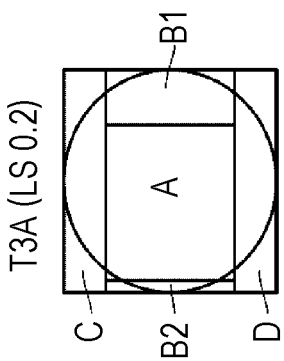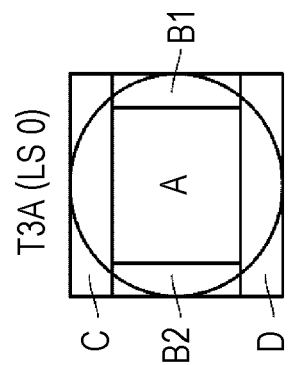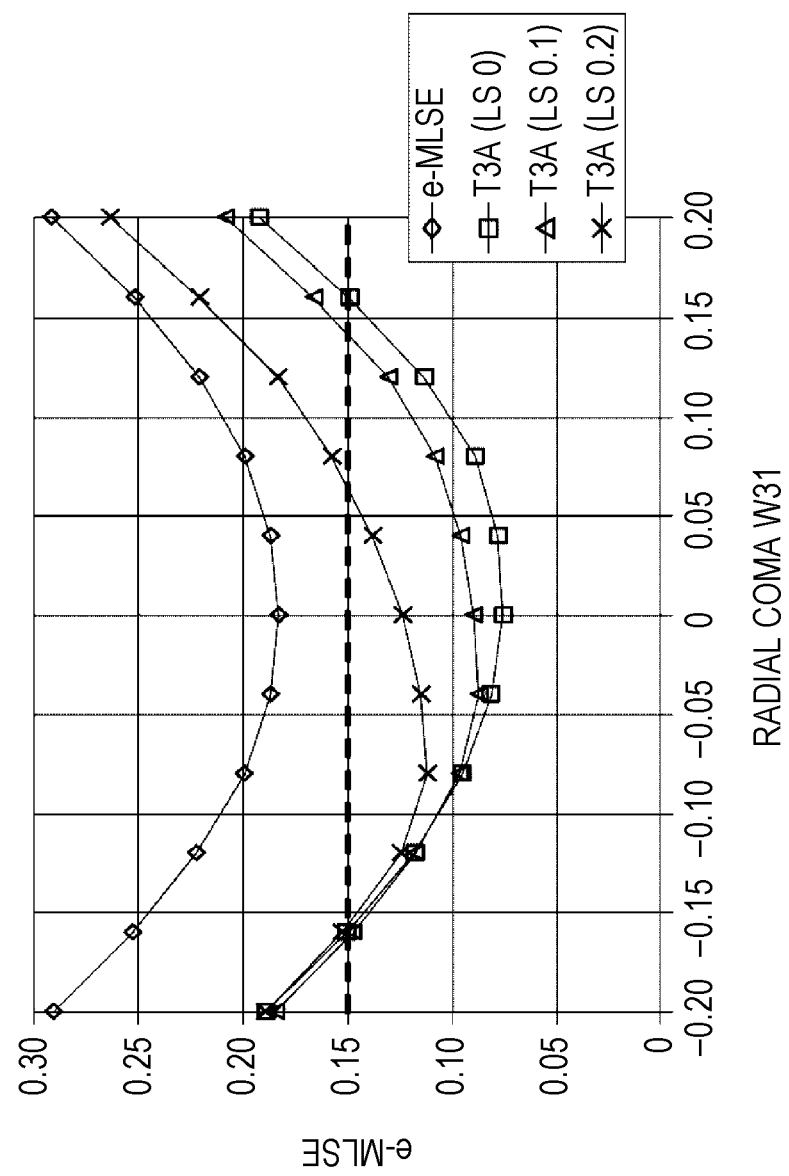
FIG. 28A
FIG. 28B
FIG. 28C

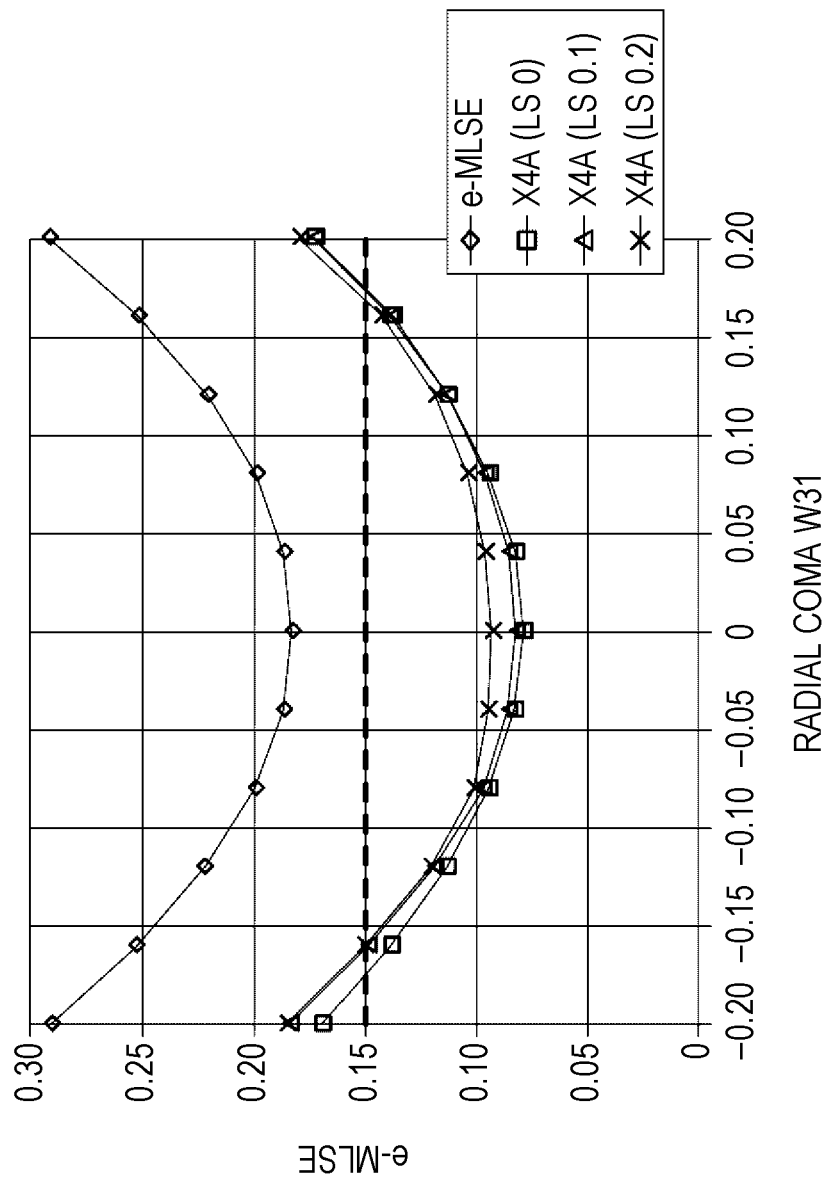
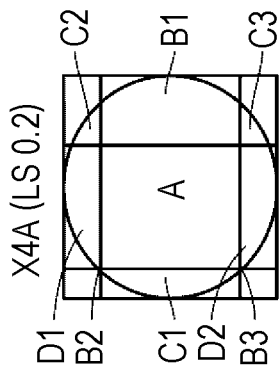
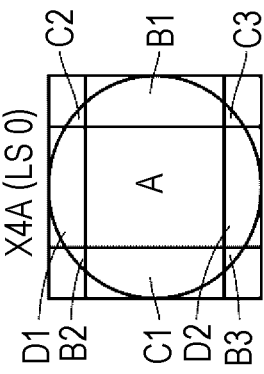
FIG. 34A
FIG. 34B
FIG. 34C

X4A (LS 0.2)

X4A (LS 0)

[IVT4]

n/(256T)

n/(256T)

n/(256T)

n/(256T)

n/(256T)

n/(256T)

n/(256T)

OPTICAL MEDIUM REPRODUCTION APPARATUS AND OPTICAL MEDIUM REPRODUCTION METHOD

CROSS REFERENCE TO RELATED APPLICATIONS

This is a U.S. National Stage Application under 35 U.S.C. §371, based on International Application No. PCT/JP2014/003977, filed Jul. 30, 2014, which claims priority to Japanese Patent Application JP 2013-168484, filed Aug. 14, 2013, and Japanese Patent Application JP 2014-015151, filed Jan. 30, 2014, the entire contents of which are incorporated herein by reference.

TECHNICAL FIELD

The present disclosure relates to an optical medium reproduction apparatus and an optical medium reproduction method for conducting reproduction from an optical medium such as an optical disc.

BACKGROUND ART

As a method for achieving a higher density on an optical disc, there is a method for achieving a higher density in a line density direction by shortening the channel bit length, i.e., the mark length. Another method is a method of making the track pitch narrower. If the density is made higher in the line density direction, however, a problem of increased inter-symbol interference occurs. Furthermore, if the track pitch is made narrower, a leak of information from an adjacent track (adjacent track crosstalk) increases. Methods for reducing the adjacent track crosstalk (hereafter referred to simply as crosstalk as occasion demands) are proposed.

For example, it is described in PTL 1 that crosstalk is canceled by supplying reproduced signals of a track that is a reproduction target and tracks located on both sides thereof to an adaptive equalizer unit and controlling tap coefficients in the adaptive equalizer unit.

CITATION LIST

Patent Literature

[PTL 1]
JP 2012-079385 A

SUMMARY

Technical Problem

According to the technique described in PTL 1, three beams are necessary to read data simultaneously from the track that is the reproduction target and tracks located on both sides thereof. It is necessary to align phases of reproduced signals read by the three beams. It is also possible to reproduce data from the three tracks successively with one beam and make the reproduced signals simultaneous. A memory for making the reproduced signals simultaneous becomes necessary. Therefore, the technique described in PTL 1 has a problem that the configuration of the optical pickup becomes complicated, phase alignment becomes complicated, and the circuit scale becomes large. In addition, as for the technique described in PTL 1, it is not mentioned to make the density higher in the line density direction.

Therefore, it is desirable to provide an optical medium reproduction apparatus and an optical reproduction method capable of canceling crosstalk and making the density higher in the line density direction by using a reproduced signal of one track.

Solution to Problem

The present disclosure is an optical medium reproduction apparatus that conducts optical reproduction from an optical medium having a plurality of tracks formed thereon, the optical medium reproduction apparatus including:

a detection unit configured to divide a section of a beam returning from the optical medium into at least one channel corresponding to outside regions in a radial direction, at least one channel corresponding to regions that differ in position in a tangential direction, and one channel corresponding to other regions, and form detected signals respectively of the channels;

a multi-input equalizer unit configured to include a plurality of equalizer units respectively supplied with the detected signals of the plurality of channels and conduct computing on outputs of the plurality of equalizer units and output a result as an equalized signal; and a binarization unit configured to conduct binarization processing on the equalized signal and obtain binary data.

The present disclosure is an optical medium reproduction apparatus that conducts optical reproduction from an optical medium having a plurality of tracks formed thereon, the optical medium reproduction apparatus including: an optical filter which a beam returning from the optical medium is incident on and which forms a plurality of signals having different bands in a line density direction and/or a track density direction in a spatially optical manner; and a plurality of electric filters which are respectively supplied with the plurality of signals formed by the optical filter, wherein the optical medium reproduction apparatus obtains a reproduced signal by combining outputs of the plurality of electric filters.

Advantageous Effects of Invention

According to an aspect of the present disclosure, a reproduction apparatus is provided, comprising: a detection unit configured to: divide a section of a beam returning from an optical medium into at least first and second regions corresponding, respectively, to first and second channels, wherein the first region includes an outer region in a radial direction of the beam, wherein the second region includes an outer region in a tangential direction of the beam, and form detected signals corresponding to the respective channels; a multi-input equalizer component comprising equalizer units supplied with the respective detected signals corresponding to the channels, and configured to perform computing on outputs of the equalizer units and to output an equalized signal based on the computing; and a binarization unit configured to perform binarization processing on the equalized signal to obtain binary data.

According to an aspect of the present disclosure, a method is provided, comprising: dividing a section of a beam returning from an optical medium into at least first and second regions corresponding, respectively, to first and second channels, wherein the first region includes an outer region in a radial direction of the beam, wherein the second region includes an outer region in a tangential direction of the beam; forming detected signals corresponding to the respective channels; supplying the detected signals corresponding to the channels to respective equalizer units; using a multi-input equalizer component comprising the equalizer units to perform computing on outputs of the equalizer units and to output an equalized signal based on the computing; and performing binarization processing on the equalized signal to obtain binary data.

According to an aspect of the present disclosure, a reproduction apparatus is provided, comprising: an optical filter configured to provide electrical signals corresponding to regions of an optical beam returning from an optical medium, the optical beam being incident on the optical filter, the regions of the optical beam corresponding to different bands in a line density direction and/or a track density direction; and electric filters configured to provide outputs based, at least in part, on the electrical signals provided by the optical filter, wherein the reproduction apparatus is configured to obtain a reproduced signal by combining the outputs of the electric filters.

BRIEF DESCRIPTION OF DRAWINGS

FIGS. 26A to 26C are graphs indicating an influence of a lens shift upon the radial coma aberration.

FIGS. 27A to 27C are graphs indicating an influence of a lens shift upon the radial coma aberration.

FIGS. 28A to 28C are graphs indicating an influence of a lens shift upon the radial coma aberration.

FIGS. 31A to 31C are graphs indicating an influence of a lens shift upon defocus characteristics.

FIGS. 33A to 33C are graphs indicating an influence of a lens shift upon defocus characteristics.

FIGS. 34A to 34C are graphs indicating an influence of a lens shift upon radial coma aberration characteristics.

FIG. 120 is a schematic diagram illustrating a pattern VHT4.

FIG. 121 is a schematic diagram illustrating a pattern VHi3.

FIG. 122 is a schematic diagram illustrating a pattern NST6.

FIG. 123 is a graph illustrating coefficients of taps of an electric filter concerning the pattern NST6 in a case of making the density much higher.

FIG. 124 is a graph illustrating frequency characteristics concerning the pattern NST6 in a case of making the density much higher.

FIG. 125 is a block diagram used to explain the present disclosure.

FIG. 126 is a schematic diagram illustrating an example of a reproduction optical system according to another embodiment of the present disclosure.

FIG. 127 is a graph illustrating reflection characteristics of a beam splitter.

FIG. 128 is a graph illustrating transmission characteristics of a beam splitter.

FIG. 129 is a schematic diagram illustrating an optical system including an additional beam splitter.

FIG. 130 is a graph illustrating an example of coefficients of taps of an electric filter according to another embodiment of the present disclosure.

FIG. 131 is a graph illustrating an example of frequency characteristics of an electric filter according to another embodiment of the present disclosure.

Figure 132:
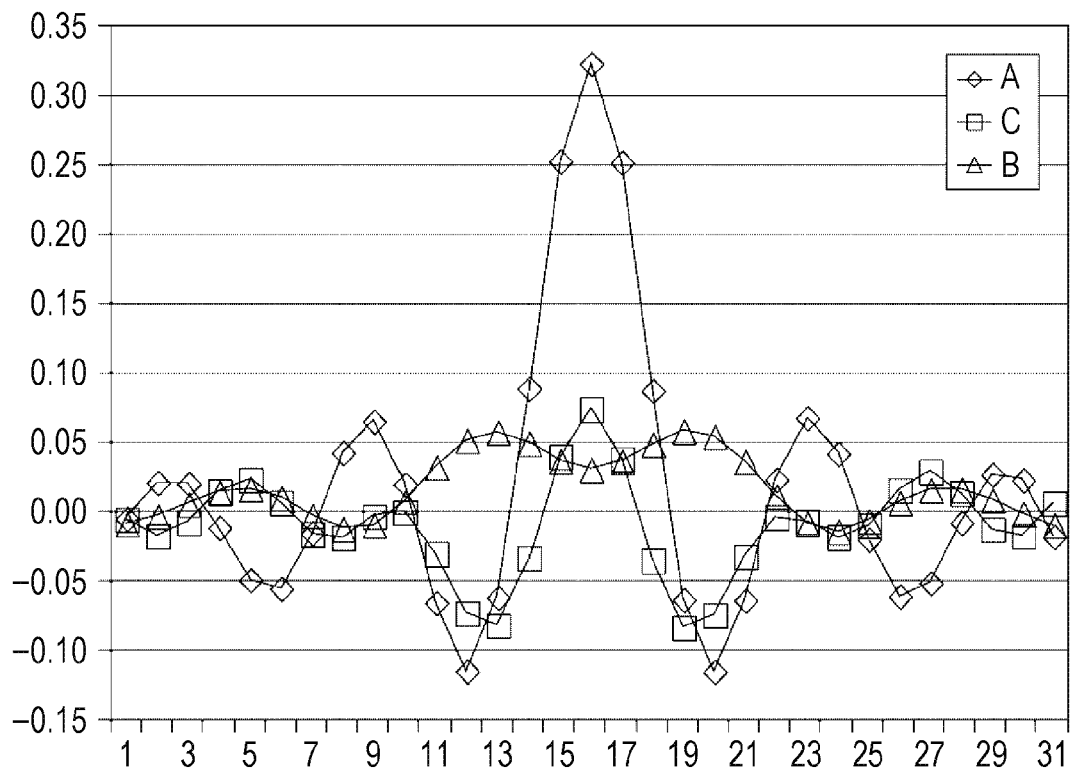

FIG. 132 is a graph illustrating another example of coefficients of taps of an electric filter according to another embodiment of the present disclosure.

Figure 133:
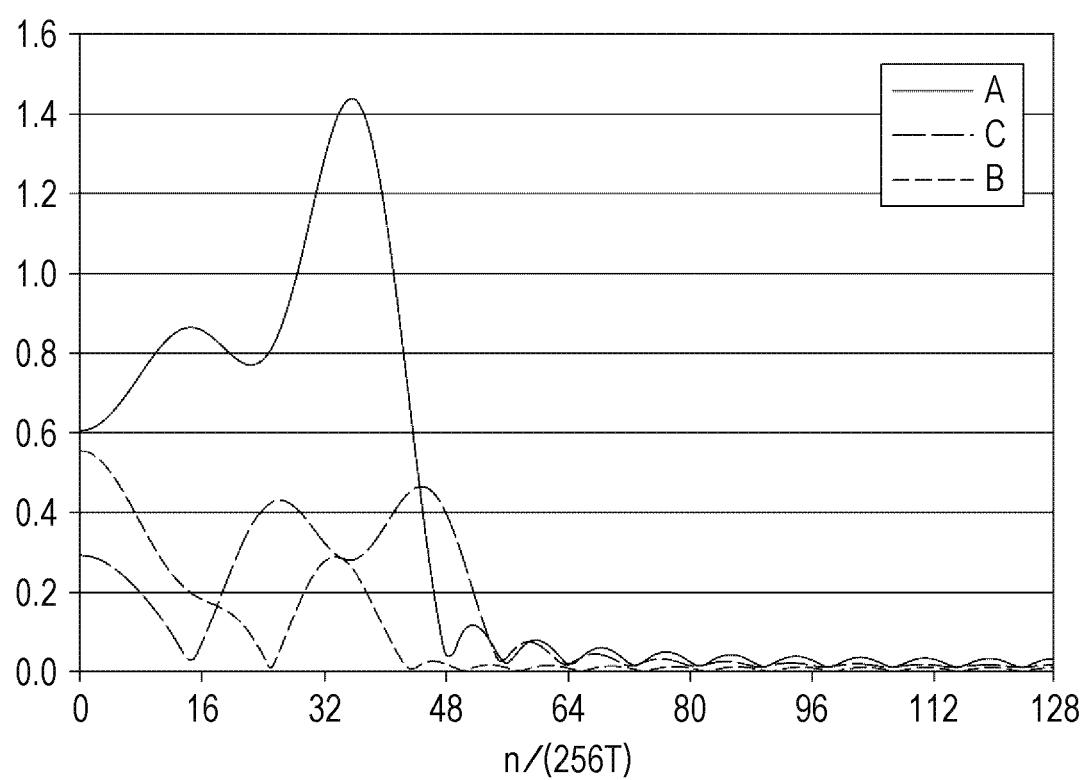

FIG. 133 is a graph illustrating another example of frequency characteristics of an electric filter according to another embodiment of the present disclosure.

DESCRIPTION OF EMBODIMENTS

Embodiments described hereafter are preferable concrete example of the present disclosure, and are provided with various restrictions that are technically desirable. However, the scope of the present disclosure is not restricted to these embodiments unless especially stated in the ensuing description that an embodiment restricts the present disclosure.

By the way, the present disclosure will be described in the following order.

<1. One Embodiment>
<2. Other Embodiments>
<3. Modification>

1. One Embodiment

"Optical Disc Device"

Figure 1:
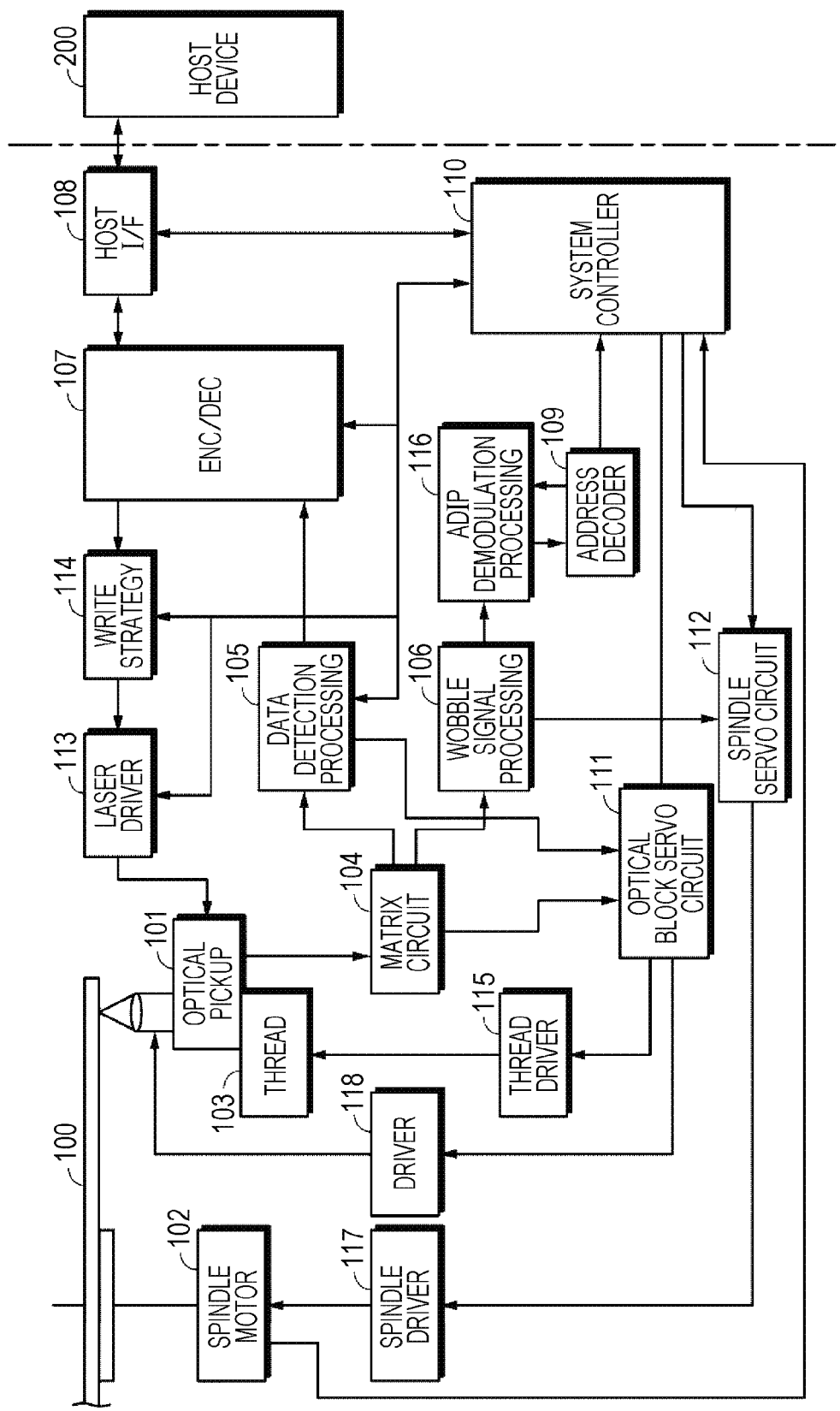
FIG. 1 is a block diagram illustrating a configuration of an optical disc apparatus according to an embodiment of the present disclosure.

An optical disc device according to an embodiment of the present disclosure includes an optical pickup 101 configured to record and reproduce information on an optical disc 100 functioning as an optical recording medium, and a spindle motor 102 configured to rotate the optical disc 100 as illustrated in FIG. 1. A thread (feed motor) 103 is provided to move the optical pickup 101 in a radial direction of the optical disc 100.

As the optical disc 100, a high density optical disc such as a BD (Blu-ray (registered trademark) Disc) can be used. The BD is a high density optical disc having a recording capacity of approximately 25 Gbytes on a single layer of one face and approximately 50 Gbytes on two layers of one face. According to BD standards, the light source wavelength is set equal to 405 nm and the NA (Numerical Aperture) of an object lens is made as large as 0.85 in order to make the beam spot diameter small. In CD standards, the light source wavelength is 780 nm, the NA is 0.45, and the spot diameter is 2.11 μm. In DVD standards, the light source wavelength is 650 nm, the NA is 0.6, and the spot diameter is 1.32 μm. In the BD standards, the spot diameter can be narrowed down to 0.58 μm.

In addition, in recent years, BDXL (registered trademark) in which a larger capacity of 100 GB in three layers and 128 GB in four layers is implemented by shortening the channel bit length, i.e., the mark length of the BD (Blu-ray (registered trademark) Disc) and making the density high in the line density direction, has been put to practical use.

In addition, for further increasing the recording capacity, an optical disc adopting a method of recording data on both a groove track and a land track (referred to as land/groove recording scheme as occasion demands) is desirable. By the way, "mizo" in Japanese is referred to as groove, and a track formed of a groove is referred to as groove track. The groove is defined as a part irradiated with laser light. An area sandwiched between adjacent grooves is referred to as land. A track formed of the land is referred to as land track. In addition, in a multi-layer optical disc formed by laminating a plurality of information recording layers, the recording capacity can be further increased.

If such an optical disc 100 capable of recording with a high density is mounted on an optical disc apparatus, the optical disc 100 is driven by the spindle motor 102 to rotate with a constant line velocity (CLV) or a constant angular velocity (CAV) at the time of recording/reproduction. For aligning phases of wobble grooves in the radial direction of the optical disc 100, the CAV or a zone CAV is desirable. At the time of reproduction, mark information recorded on a track on the optical disc 100 is read out by the optical pickup (optical head) 101. At the time of recording data on the optical disc 100, user data is recorded on a track on the optical disc 100 as a phase change mark or a coloring matter change mark by the optical pickup 101.

In the case of a recordable type disc, recording marks using phase change marks are recorded on a track formed by a wobbling groove. The phase change marks are recorded by using an RLL (1, 7) PP modulation scheme (RLL; Run Length Limited, PP: Parity preserve/Prohibit rmtr (repeated minimum transition runlength) or the like. In the case of a BD having 23.3 GB per layer, the phase change marks are recorded with a line density of 0.12 μm/bit and 0.08 μm/channel bit. In the same way, in the case of a BD having 25 GB/layer, the phase change marks are recorded with a line density of 0.0745 μm/channel bit. In the case of the BDXL (registered trademark) of 32 GB/layer, the phase change marks are recorded with a line density of 0.05826 μm/channel bit. In the case of the BDXL (registered trademark) of 33.4 GB/layer, the phase change marks are recorded with a line density of 0.05587 μm/channel bit. In this way, recording is conducted with a density corresponding to the channel bit length in accordance with a disc classification. Supposing that the channel clock period is "T", the mark length is in the range of 2T to 8T. In the case of a disc dedicated only for reproduction, grooves are not formed, data modulated by using the RLL (1, 7) PP modulation scheme in the same way are recorded as emboss pit train.

On an inner circumference area or the like of the optical disc 100, for example, physical information or the like of the disc are recorded as management information dedicated only for reproduction by an emboss pit or a wobbling groove. Readout of these kinds of information is also conducted by the optical pickup 101. In addition, readout of ADIP information embedded as wobbling of a groove track on the optical disc 100 is also conducted by the optical pickup 101.

In the optical pickup 101, a laser diode functioning as a laser light source, a photodetector for detecting a reflected beam, an object lens which becomes an output end of laser light, and an optical system which irradiates a recording face of a disc with laser light via the object lens and leads a reflected beam to the photodetector are provided. In the optical pickup 101, the object lens is held to movable in a tracking direction and a focus direction by a bi-axis mechanism. The whole of the optical pickup 101 is made movable in the disc radial direction by the thread mechanism 103. The laser diode in the optical pickup 101 is supplied with a drive current from a laser driver 113. The laser diode generates laser light.

A reflected beam from the optical disc 100 is detected by the photodetector, and a resultant electric signal depending upon the quantity of received light is supplied to a matrix circuit 104. The matrix circuit 104 includes current voltage conversion circuits and matrix computation/amplification circuits corresponding to output currents from a plurality of light sensing elements functioning as photodetectors. The matrix circuit 104 generates necessary signals by conducting matrix computing processing. Considering the signal transmission quality, the current voltage conversion circuit may be formed within the photodetector element. For example, the matrix circuit 104 generates a reproduced information signal (RF signal) corresponding to reproduced data, a focus error signal for servo control, a tracking error signal and the like. In addition, a push-pull signal is generated as a signal relating to wobbling of the groove, i.e., a signal for detecting the wobbling.

The reproduced information signal which is output from the matrix circuit 104 is supplied to a data detection processing unit 105. The focus error signal and the tracking error signal are supplied to an optical block servo circuit 111. The push-pull signal is supplied to a wobble signal processing circuit 106.

The data detection processing unit 105 conducts binarization processing of the reproduced information signal. For example, the data detection processing unit 105 conducts A/D conversion processing of the RF signal, reproduced clock generation processing using PLL, PR (Partial Response) equalization processing, Viterbi decoding (most likelihood decoding) and the like, and obtains a binary data train by using partial response most likelihood decoding processing (PRML detection scheme: Partial Response Maximum Likelihood detection scheme). The data detection processing unit 105 supplies the binary data train to an encode/decode unit 107 in a subsequent stage as information read out from the optical disc 100.

The encode/decode unit 107 conducts demodulation of reproduced data at the time of reproduction and modulation processing of recording data at the time of recording. In other words, the encode/decode unit 107 conducts data demodulation, deinterleave, ECC decode, address decode and the like at the time of reproduction, and conducts ECC encode, interleave, data modulation and the like at the time of recording.

At the time of reproduction, the binary data train decoded by the data detection processing unit 105 is supplied to the encode/decode unit 107. The encode/decode unit 107 conducts demodulation processing on the binary data train and obtains reproduced data from the optical disc 100. In other words, for example, the encode/decode unit 107 conducts demodulation processing on data subjected to runlength limited code modulation such as RLL (1, 7) PP modulation and recorded on the optical disc 100, and conducts ECC decode processing for conducting error correction, and obtains reproduced data from the optical disc 100.

Data decoded up to reproduced data by the encode/decode unit 107 is transferred to a host interface 108, and transferred to a host device 200 on the basis of an instruction from a system controller 110. The host device 200 is, for example, a computer device, or an AV (Audio-Visual) system device.

At the time of recording/reproduction on the optical disc 100, processing on the ADIP information is conducted. In other words, the push-pull signal which is output from the matrix circuit 104 as the signal relating to the wobbling of the groove is converted to digitized wobble data in the wobble signal processing circuit 106. A clock synchronized to the push-pull signal is generated by the PLL processing. The wobble data is demodulated to a data stream forming an ADIP address by an ADIP demodulation processing unit 116, and supplied to an address decoder 109. The address decoder 109 conducts decoding on the supplied data, obtains an address value, and supplies the address value to the system controller 110.

At the time of recording, recording data is transferred from the host device 200. The recording data is supplied to the encode/decode unit 107 via the host interface 108. The encode/decode unit 107 conducts error correction code addition (ECC encode), interleave, sub-code addition, and the like as encode processing of the recording data. The encode/decode unit 107 conducts runlength limited code modulation such as the RLL (1-7) PP scheme on data subjected to these kinds of processing.

The recording data processed by the encode/decode unit 107 is supplied to a write strategy unit 114. The write strategy unit 114 conducts laser drive pulse waveform adjustment on characteristics of recording layers, a spot shape of the laser light, a recording line velocity, and the like as recording compensation processing. Then the write strategy unit 114 outputs a laser drive pulse to the laser driver 113.

The laser driver 113 lets a current flow through the laser diode in the optical pickup 101 on the basis of the laser drive pulse subjected to the recording compensation processing, and conducts laser light emission. As a result, a mark depending upon recording data is formed on the optical disc 100.

The optical block servo circuit 111 generates various servo drive signals of focus, tracking and thread from the focus error signal and the tracking error signal supplied from the matrix circuit 104, and causes servo operation to be executed. In other words, the optical block servo circuit 111 generates a focus drive signal and a tracking drive signal according to the focus error signal and the tracking error signal, and drives a focus coil and a tracking coil in the bi-axis mechanism in the optical pickup 101 via a driver 118. As a result, a tracking servo loop and a focus servo loop are formed by the optical pickup 101, the matrix circuit 104, the optical block servo circuit 111, the driver 118, and the bi-axis mechanism.

In addition, the optical block servo circuit 111 turns the tracking servo loop off and outputs a jump drive signal in response to a track jump instruction from the system controller 110, and thereby causes a track jump operation to be executed. In addition, the optical block servo circuit 111 generates a thread drive signal on the basis of a thread error signal obtained as a low frequency component of the tracking error signal and an access execution control from the system controller 110, and drives the thread mechanism 103 via a thread driver 115.

A spindle servo circuit 112 exercises control to cause the spindle motor 102 to conduct CLV rotation or CAV rotation. The spindle servo circuit 112 obtains the clock generated by PLL for the wobble signal as current rotation velocity information of the spindle motor 102, and generates a spindle error signal by comparing the clock with predetermined reference velocity information. In addition, at the time of data reproduction, reproduced clock generated by the PLL in the data detection processing unit 105 becomes current rotation velocity information of the spindle motor 102. Therefore, the spindle error signal is generated by comparing the reproduced clock with predetermined reference velocity information. Then the spindle servo circuit 112 outputs a spindle drive signal generated according to the spindle error signal, and causes a spindle driver 117 to execute CLV rotation or CAV rotation of the spindle motor 102.

The spindle servo circuit 112 generates the spindle drive signal according to a spindle kick/brake control signal supplied from the system controller 110 and causes operations such as start, stop, acceleration, and deceleration of the spindle motor 102 to be also executed.

Various operations of the servo system and recording and reproduction system as described heretofore are controlled by the system controller 110 formed of a microcomputer. The system controller 110 executes various kinds of processing according to a command given by the host device 200 via the host interface 108. For example, if a write instruction (write command) is given by the host device 200, the system controller 110 first moves the optical pickup 101 to an address where data is to be written. Then the system controller 110 causes the encode/decode unit 107 to execute encode processing on data (for example, video data, audio data, or the like) transferred from the host device 200. Then the laser driver 113 drives laser light emission according to the encoded data. As a result, recording is executed.

In addition, in a case where a read command is supplied from, for example, the host device 200 to ask for transfer of certain data recorded on the optical disc 100, the system controller 110 first exercises seek operation control with an instructed address as a target. In other words, the system controller 110 issues an instruction to the optical block servo circuit 111 and causes an access operation of the optical pickup 101 to be executed with an address specified by the seek command set to be a target. Thereafter, the system controller 110 exercises operation control which is necessary to transfer data in an instructed data section to the host device 200. In other words, the system controller 110 conducts data readout from the optical disc 100, causes the data detection processing unit 105 and the encode/decode unit 107 to execute reproduction processing, and transfers requested data.

By the way, the example illustrated in FIG. 1 has been described as an optical disc apparatus connected to the host device 200. As for the optical disc apparatus, however, a form in which the optical disc apparatus is not connected to another device is also possible. In that case, an operation unit and a display unit are provided, and a configuration of an interface region of data input and output becomes different from that illustrated in FIG. 1. In other words, it is necessary to form a terminal unit to input and output various data besides to conduct recording and reproduction according to user's operation. As a matter of course, a large number of configuration examples of the optical disc apparatus are conceivable besides.

"Optical Pickup"

The optical pickup 101 used in the above-described optical disc apparatus will now be described with reference to FIG. 2. The optical pickup 101 records information onto the optical disc 100 and reproduces information from the optical disc 100 by using laser light (beam) having a wavelength $\lambda$ of, for example, 405 nm. Laser light is emitted from a semiconductor laser (LD: Laser Diode) 1.

Laser light passes through a collimator lens 2, a polarizing beam splitter (PBS) 3, and an object lens 4, and the optical disc 100 is irradiated with the laser light. The polarizing beam splitter 3 has a separation face which, for example, transmits p-polarized light approximately 100% and reflects s-polarized light approximately 100%. Reflected light from a recording layer in the optical disc 100 returns through the same optical path and is incident on the polarizing beam splitter 3. The incident laser light is reflected by the polarizing beam splitter 3 approximately 100% by interposing a $\lambda/4$ element which is not illustrated.

Laser light reflected by the polarizing beam splitter 3 is condensed on the light sensing face of a photodetector 6 via a lens 5. The photodetector 6 has a light sensing cell on the light sensing face to conduct photoelectric conversion on incident light. The light sensing cell is divided into a plurality of regions by division lines extending in the radial direction (disc radial direction) and/or tangential direction (track direction) of the optical disc 100. The photodetector 6 outputs electric signals of a plurality of channels according to light sensing quantities of respective regions of the light sensing cell. By the way, the method for dividing into regions will be described later.

Figure 2:
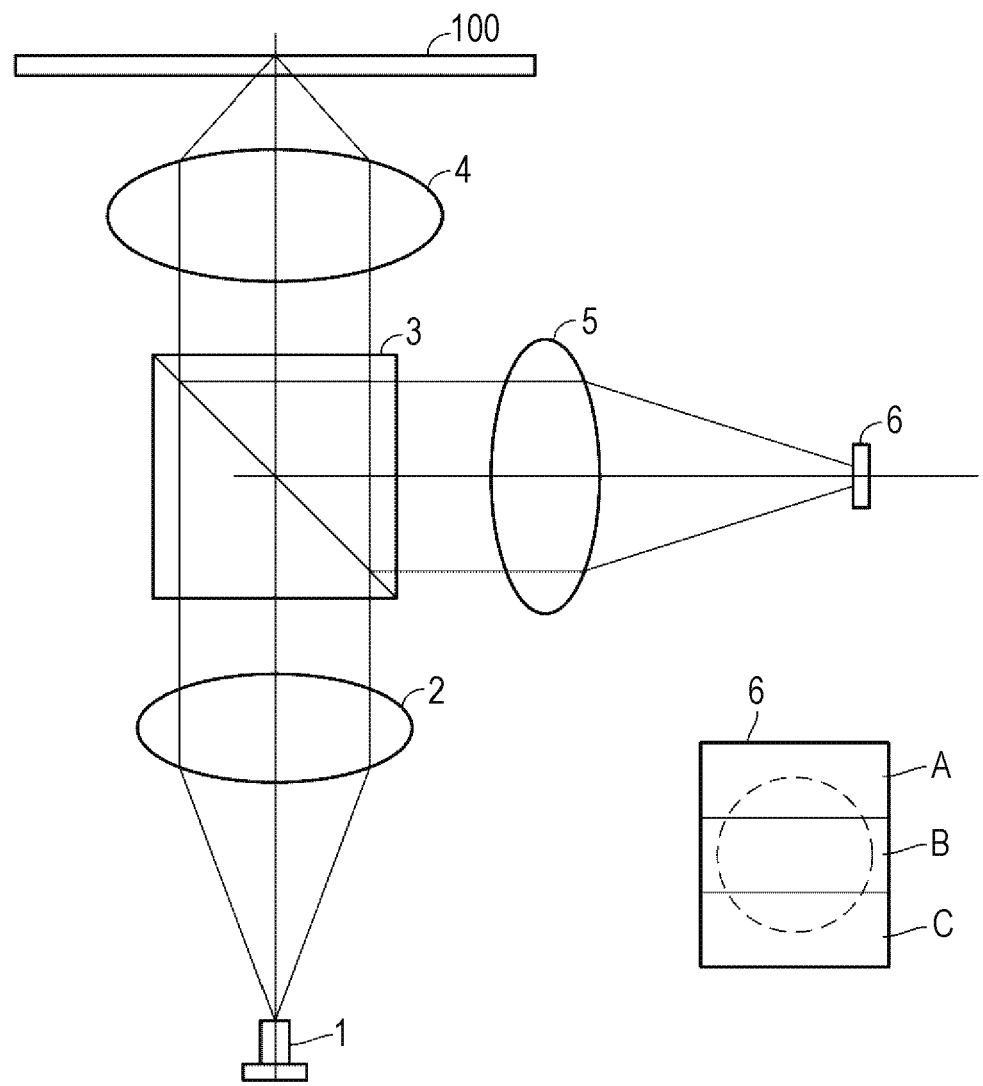
FIG. 2 is a schematic diagram illustrating a configuration of an optical pickup in an embodiment of the present disclosure.

By the way, the configuration of the optical pickup 101 in FIG. 2 illustrates minimum components for explaining the present disclosure. The focus error signal and the tracking error signal which are output to the optical block servo circuit 111 via the matrix circuit 104, and a signal for generating the push-pull signal which is output to the wobble signal processing circuit 106 via the matrix circuit 104 are omitted. Besides, various configurations other than the configuration illustrated in FIG. 2 are possible.

In the present disclosure, a section of a luminous flux of a return beam from the optical disc 100 is divided into a plurality of regions, and reproduced information signals of a plurality of channels corresponding to the respective regions are obtained. As for a method for obtaining a reproduced information signal of every region, a method other than the method of dividing the photodetector 6 can be used. For example, a method of disposing an optical path conversion element in an optical path passing through the object lens 4 and leading to the photodetector 6 to separate the plurality of regions and supplying the plurality of beams separated by the optical path conversion element to different photodetectors may be used. As the optical path conversion element, a diffraction element such as a holographic optical element or a refraction element such as a microlens array or a microprism can be used.

"Data Detection Processing Unit"

Figure 3:
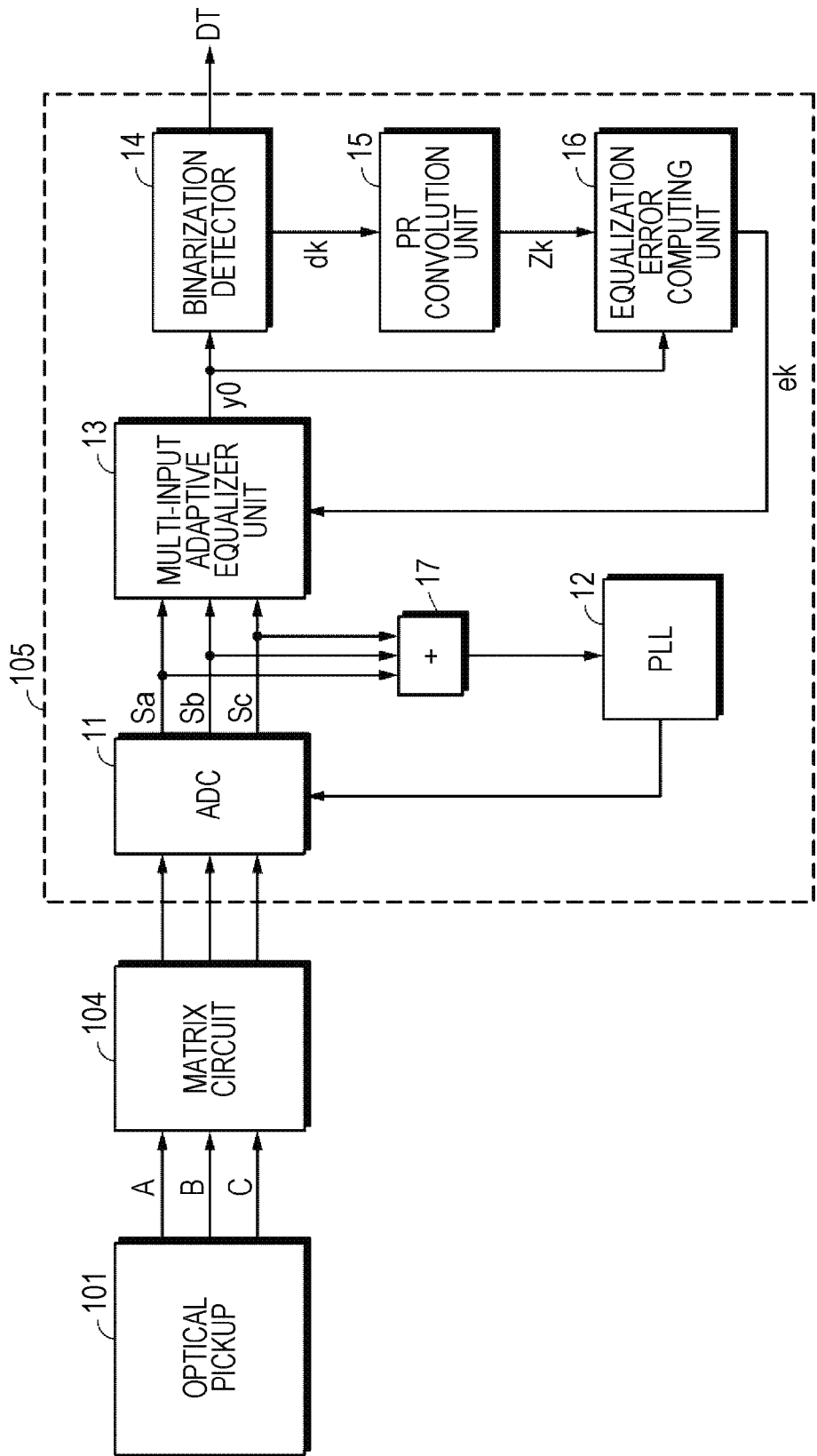
FIG. 3 is a block diagram of an example of a data detection processing unit in an embodiment.
Figure 4:
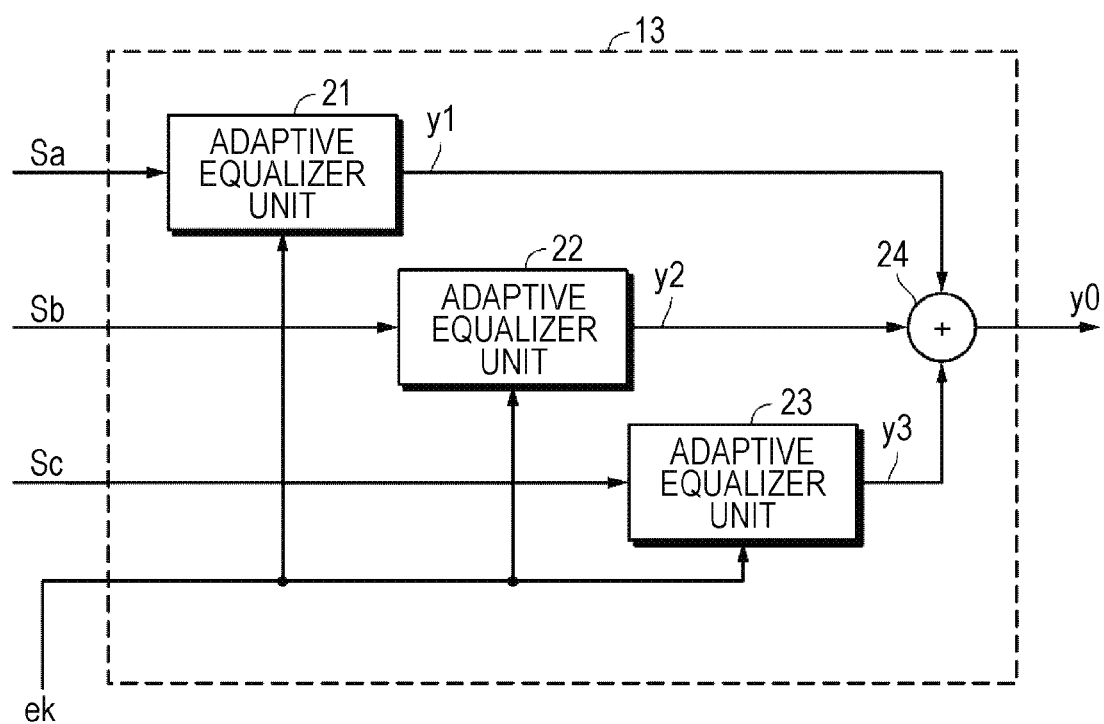
FIG. 4 is a block diagram of an example of a multi-input adaptive equalizer in the data detection processing unit.

As described above, reproduction from the optical disc 100 is conducted by the optical pickup 101, detected signals corresponding to respective regions are supplied to the matrix circuit 104, and reproduced information signals of a plurality of channels corresponding to the respective regions are obtained. As illustrated in FIG. 3, the data detection processing unit 105 includes an A/D converter 11 supplied with the reproduced information signals supplied from the matrix circuit 104. By the way, FIG. 3 and FIG. 4 illustrate an example in which, for example, the section of the luminous flux of the return beam from the optical disc 100 is divided into three regions and reproduced information signals of three channels are obtained from the matrix circuit 104.

A clock for the A/D converter 11 is formed by a PLL 12. Reproduced information signals supplied from the matrix circuit 104 are converted to digital data by the A/D converter 11. Digitized reproduced information signals of three channels from regions A to C are denoted by Sa to Sc. A signal obtained by adding up the reproduced information signals Sa to Sc in an addition circuit 17 is supplied to the PLL 12.

In addition, the data detection processing unit 105 includes a multi-input adaptive equalizer unit 13, a binarization detector 14, a PR convolution unit 15, and an equalization error computing unit 16. The multi-input adaptive equalizer unit 13 conducts PR adaptive equalization processing on each of the reproduced information signals Sa to Sc. In other words, the reproduced information signals Sa to Sc are equalized to approximate target PR waveforms. Equalized outputs are added up, and an equalized signal y0 is output.

By the way, as a signal input to the PLL 12, the output of the multi-input adaptive equalizer unit may be used. In this case, initial coefficients in the multi-input adaptive equalizer unit are set equal to predetermined values.

The binarization detector 14 is made to be, for example, a Viterbi decoder. The binarization detector 14 conducts most likelihood decoding processing on the equalized signal y0 subjected to the PR equalization, and obtains binarized data DT. The binarized data DT is supplied to the encode/decode unit 107 illustrated in FIG. 1, and reproduced data demodulation processing is conducted. As for the Viterbi decoding, a Viterbi detector including a plurality of states formed by taking consecutive bits having a predetermined length as unit and branches represented by transitions between the states is used. The Viterbi detector is configured to detect a desired bit string out of all possible bit strings with high efficiency.

In the actual circuit, for each state, two registers, i.e., a path metric register and a path memory register are prepared. The path metric register is a register that stores a partial response string and signal path metrics as far as the state. The path memory register is a register that stores a flow of bit string as far as the state. In addition, for each branch, a computing unit referred to as branch metric unit that calculates a partial response string at that bit and a signal path metric is prepared.

In this Viterbi decoder, various bit strings can be associated with paths passing through the state in one-to-one correspondence. Furthermore, a path metric between a partial response string passing through these paths and an actual signal (reproduced signal) is obtained by subsequently adding inter-state transitions included in the above-described path, i.e., the above-described branch metrics in branches.

In addition, selection of a path minimizing the path metric can be implemented by subsequently selecting a path having a smaller path metric while comparing magnitudes of path metrics two or less branches arriving at each state have. By transferring the selection information to the path memory register, information representing a path arriving at each state using a bit string is stored. The value in the path memory register finally converges to a bit string minimizing the path metric while being updated subsequently. Accordingly, the result is output.

The PR convolution unit 15 conducts convolution processing of a binarization result, and generates a target signal Zk as represented by the following equation. The target signal Zk is obtained by convolving binarization detection results. As a result, the target signal Zk is an ideal signal having no noise. For example, in a case of PR (1, 2, 2, 2, 1), the value P of every channel clock becomes (1, 2, 2, 2, 1). The constraint length is 5. In addition, in a case of PR (1, 2, 3, 3, 3, 2, 1), the value P of every channel clock becomes (1, 2, 3, 3, 3, 2, 1). The constraint length is 7. In a case where the recording density is made high to a degree that the capacity exceeds 35 GB when the wavelength of laser light λ=405 nm, NA of the object lens=0.85, and the track pitch is constant and 0.32 μm, detection becomes difficult unless the constraint length of the partial response is prolonged from 5 to 7 and the detection capability is made higher. By the way, d represents binarized data in the following equation.

$$Z_n = \sum_m P_m d_{n-m} \qquad \text{[Mathematical Formula 1]}$$

$$P = (1, 2, 3, 3, 3, 2, 1)$$

$$P = (1, 2, 2, 2, 1)$$

Figure 6:
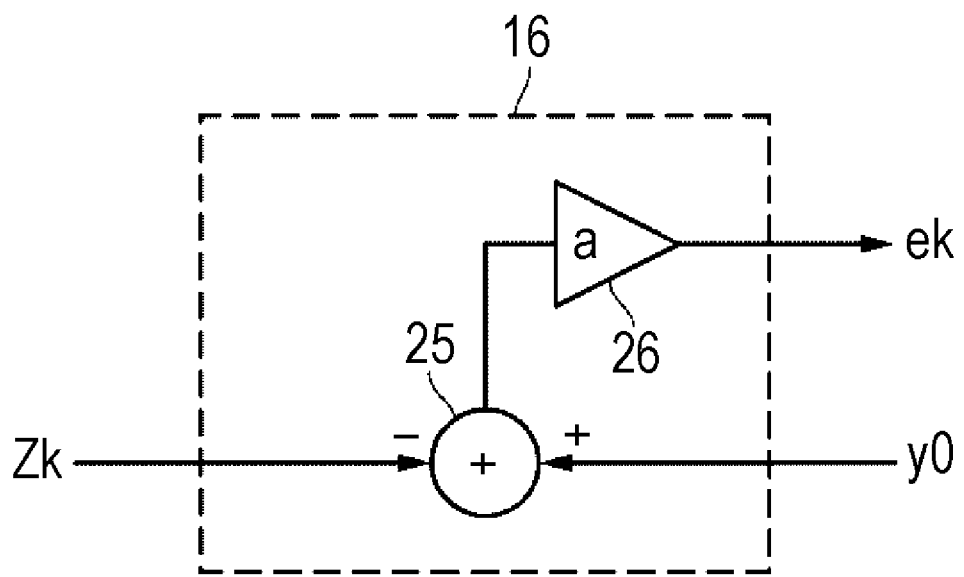
FIG. 6 is a block diagram of an example of an equalization error computing unit.

The equalization error computing unit 16 obtains an equalization error ek from the equalized signal y0 supplied from the multi-input adaptive equalizer unit 13 and the target signal Zk, and supplies the equalization error ek to the multi-input adaptive equalizer unit 13 to control the tap coefficients. As illustrated in FIG. 6, the equalization error computing unit 16 includes a subtracter 25 and a coefficient multiplier 26. The subtracter 25 subtracts the target signal Zk from the equalized signal y0. The coefficient multiplier 26 multiplies a result of the subtraction by a predetermined coefficient "a". As a result, the equalization error ek is generated.

As illustrated in FIG. 4, the multi-input adaptive equalizer unit 13 includes adaptive equalizer units 21, 22 and 23, and an adder 24. The above-described reproduced information signal Sa is input to the adaptive equalizer unit 21. The reproduced information signal Sb is input to the adaptive equalizer unit 22. The reproduced information signal Sc is input to the adaptive equalizer unit 23. A configuration of the multi-input adaptive equalizer unit 13 in a case where the number of region divisions is three is illustrated. Adaptive equalizer units corresponding to the number of region divisions are provided.

Each of the adaptive equalizer units 21, 22 and 23 has parameters of the number of FIR (Finite Impulse Response) filter taps, a computation precision (bit resolution), and an update gain of adaptive computation. An optimum value is set for each of the parameters. Each of the adaptive equalizer units 21, 22 and 23 is supplied with the equalization error ek as a coefficient control value for adaptive control.

Outputs y1, y2 and y3 respectively of the adaptive equalizer units 21, 22 and 23 are added up by the adder 24. A result is output as the equalized signal y0 of the multi-input adaptive equalizer unit 13. An output target of the multi-input adaptive equalizer unit 13 becomes an ideal PR waveform obtained by convolving the binarization detection result into the PR (partial response).

Figure 5:
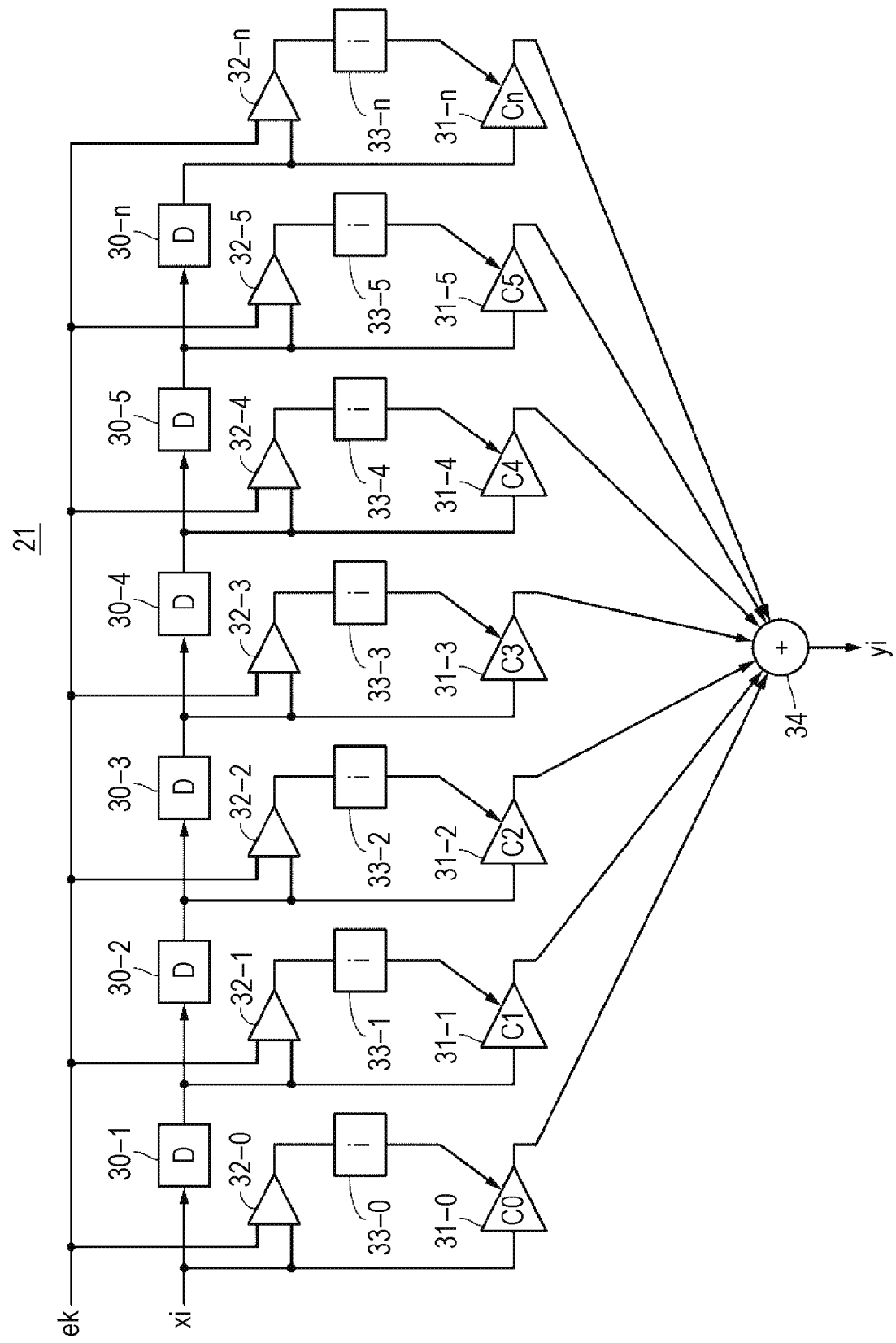
FIG. 5 is a block diagram of an example of the multi-input adaptive equalizer.

The adaptive equalizer unit 21 includes an FIR filter for example, as illustrated in FIG. 5. The adaptive equalizer unit 21 is a filter having taps of n+1 stages including delay elements 30-1 to 30-$n$, coefficient multipliers 31-0 to 31-$n$, and an adder 34. The coefficient multipliers 31-0 to 31-$n$ multiply inputs x at respective time points by tap coefficients C0 to Cn, respectively. Outputs of the coefficient multipliers 31-0 to 31-$n$ are added up by the adder 34 and taken out as output y.

In order to conduct equalization processing of adaptive type, control of the tap coefficients C0 to Cn is exercised. For this purpose, computing units 32-0 to 32-$n$ that are supplied with the equalization error ek and respective tap inputs and that conduct computation are provided. Furthermore, integrators 33-0 to 33-$n$ that integrate outputs of the respective computing units 32-0 to 32-$n$ are provided. In each of the computing units 32-0 to 32-$n$, for example, computation of $-1 \times ek \times x$ is conducted. Outputs of the computing units 32-0 to 32-$n$ are integrated by the integrators 33-0 to 33-$n$, respectively. On the basis of results of the integration, the tap coefficients C0 to Cn respectively of the coefficient multipliers 31-0 to 31-$n$ are controlled to be changed. By the way, integration in the integrators 33-0 to 33-$n$ is conducted to adjust responsibility of adaptive coefficient control.

In the data detection processing unit 105 having the configuration described heretofore, unnecessary signals such as crosstalk are reduced, and then decoding of the binarized data is conducted.

Each of the adaptive equalizer units 22 and 23 also has a configuration similar to that of the adaptive equalizer unit 21. The common equalization error ek is supplied to the adaptive equalizer units 21, 22 and 23, and adaptive equalization is conducted. In other words, the adaptive equalizer units 21, 22 and 23 conduct optimization of errors and phase distortions of input signal frequency components of the reproduced information signals Sa, Sb and Sc, i.e., adaptive PR equalization. In other words, the tap coefficients C0 to Cn are adjusted according to the computation results of $-1 \times ek \times x$ in the computing units 32-0 to 32-$n$. This means that the tap coefficients C0 to Cn are adjusted in a direction in which the equalization error is dissolved.

In this way, in the adaptive equalizer units 21, 22 and 23, the tap coefficients C0 to Cn are subject to adaptive control using the equalization error ek in a direction of achieving target frequency characteristics. The equalized signal y0 of the multi-input adaptive equalizer unit 13 obtained by adding up the outputs y1, y2 and y3 respectively of the adaptive equalizer units 21, 22 and 23 in the adder 24 becomes a signal reduced in crosstalk and the like.

"Pattern of Region Division"

Figure 7:
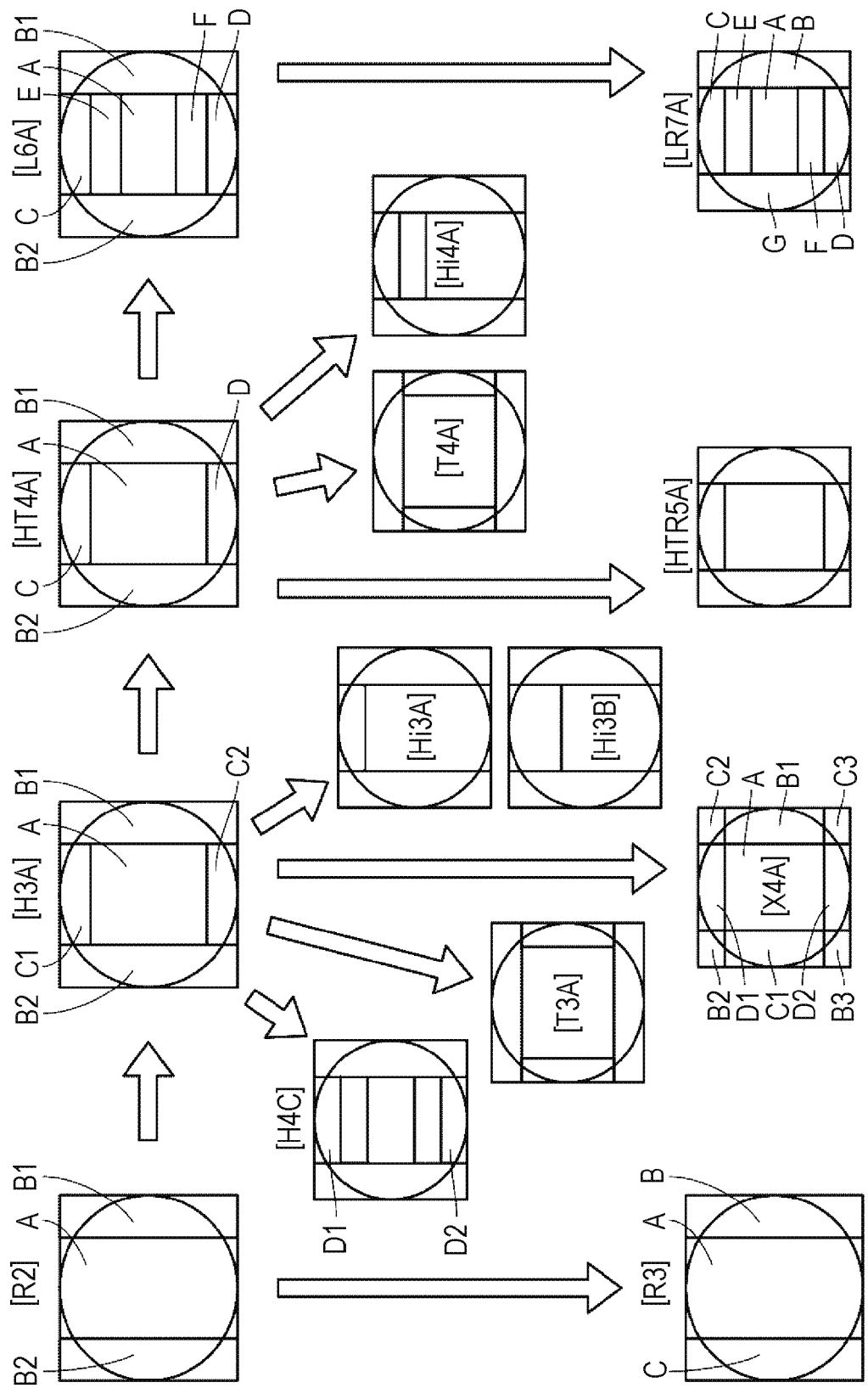
FIG. 7 is a schematic diagram for explaining a plurality of examples of a pattern of a region division.

First, examples of a pattern of region division in the present specification will be described. As illustrated in FIG. 7, there are a plurality of patterns for dividing a sectional region of luminous flux of the beam returning from the optical disc 100. Respective patterns will now be described.

By the way, an illustrated circle indicates a periphery of a section of a beam luminous flux. A square represents, for example, an area of a light sensing cell in a photodetector for detection. By the way, the up-down direction of the region division diagram corresponds to the tangential direction of the luminous flux. The lateral direction corresponds to the radial direction. In addition, the region division patterns illustrated in FIG. 7 are examples. Patterns other than those illustrated in FIG. 7 are also possible. For example, a division line is not restricted to a straight line, but may be a curved line such as a circular arc.

Pattern R2

The pattern R2 is an example in which the beam is divided into two regions: a region A and a region B (=B1+B2) in the radial direction by two division lines extending in the tangential direction. Electric signals depending upon light sensing signals in the regions B1 and B2 are added together to yield a signal of one channel. The example illustrated in FIG. 7 is an example in which there are two channels, i.e., an inside channel (region A) and an outside channel (region B1+B2). Such region division is referred to as pattern R2.

Pattern R3

In the pattern R2, the two outside regions are handled as regions of different channels B and C. Such a pattern of region division is referred to as R3. Signals of three channels corresponding to three regions are obtained.

Pattern H3A

In the pattern H3A, upper and lower parts of the region A in the pattern R2 are partitioned by division lines extending in the radial direction. Regions C1 and C2 are formed in the upper and lower parts in the tangential direction. A remaining center region is referred to as region A. In other words, the pattern H3A is a pattern that divides the beam section into three regions, i.e., the region A, a region (B 1+B2), and a region C (C1+C2). Signals of three channels corresponding to the three regions are obtained.

Pattern H4C

In the pattern H4C, each of the upper and lower regions C1 and C2 in the pattern H3A is divided into two regions in the tangential direction, and regions D1 and D2 are formed. In other words, the pattern H4C is a pattern that divides the beam into four regions, i.e., the region A, the region (B1+B2), a region C (=C1+C2), and a region D (=D1+D2). Signals of four channels corresponding to the four regions are obtained.

Pattern T3A

The pattern T3A is a pattern obtained by extending the upper and lower regions C1 and C2 in the pattern H3A to cover the regions B1 and B2, respectively. The pattern T3A is a pattern that divides the beam section into three regions, i.e., the region A, the region (B1+B2), and a region C (=C1+C2). Signals of three channels corresponding to the three regions are obtained.

Pattern X4A

In the pattern X4A, the division lines in the pattern H3A that divide the region A in the tangential direction are extended, and four regions B2, B3, C2 and C3 are formed. The pattern X4A is a pattern that divides the beam section into four regions, i.e., the region A, a region (B1+B2+B3), a region C (=C1+C2+C3), and a region D (D1+D2). Signals of four channels corresponding to the four regions are obtained.

Pattern Hi3A

The pattern Hi3A is a pattern in which the number of division lines in the tangential direction in the pattern H3A is set equal to one and the region C2 included in the upper and lower regions C1 and C2 is not provided. As a result, a center position of the center region A is shifted downward in the tangential direction from a center position of the beam section. Signals of three channels including two channels that are different in center position in the tangential direction are obtained.

Pattern Hi3B

Region division similar to that in the pattern Hi3A is conducted. However, a width of the upper region C1 is made wider as compared with that in the pattern Hi3A.

Pattern HT4A

The pattern HT4A is a pattern in which the region C2 in the pattern H3A is made a region D of a fourth channel. The pattern HT4A is a pattern that divides the beam section into four regions, i.e., the region A, the region (B1+B2), a region C, and a region D. Signals of four channels corresponding to the four regions and including three channels that are different in center position in the tangential direction are obtained.

Pattern HTR5A

The two regions B1 and B2 located outside in the radial direction in the pattern HT4A are handled as regions of different channels, and signals of five channels are obtained.

Pattern T4A

The pattern T4A is a pattern obtained by extending the upper and lower regions C and D in the pattern HT4A to cover the regions B1 and B2. The pattern T4A is a pattern that divides the beam section into four regions, i.e., the region A, the region (B1+B2), the region C, and the region D. Signals of four channels corresponding to the four regions and including three channels that are different in center position in the tangential direction are obtained.

Pattern Hi4A

The pattern Hi4A is a pattern in which a region D is provided below and adjacent to the region C in the pattern HT4A. As a result, the center position of the center region A is shifted downward in the tangential direction from the center position of the beam section. Signals of four channels including three channels that are different in center position in the tangential direction are obtained.

Pattern L6A

Regions E and F respectively adjacent to the upper and lower regions C and D in the pattern HT4A are provided below the region C and above the region D, respectively. Signals of six channels including five channels that are different in center position in the tangential direction are obtained from the regions A to F, respectively.

Pattern LR7A

In the pattern L6A, the region B1 is set to be a region B and the region B2 is set to be a region G. Signals of seven channels are obtained from the regions A to G, respectively.

Hereafter, respective patterns will be described on the basis of simulation results for the patterns. Simulation conditions are as follows.

Tp=0.225 µm (for each of the land and groove)
NA=0.85
PR (1233321)
Evaluation index: e-MLSE (described later)
Mark width=Tp×0.7
Disc noise and amplifier noise are present Furthermore, the line density is represented by using a plane capacity at the time when the diameter of the disc is 120 mm and the track pitch Tp=0.32 µm.

Especially, in a case where "low line density" is expressed,

LD 35.18 (GB) 0.053 µm/channel bit, and when Tp=0.32 µm, the plane capacity becomes 35.18 GB.

In a case where Tp=0.225 µm (in each of the land and groove), the plane capacity becomes 50.0 GB including the LD 35.18 GB.

Furthermore, in a case where "high line density" is expressed,

LD 41 (GB) 0.04547 µm/channel bit, and when Tp=0.32 µm, the plane capacity becomes 41 GB.

In a case where Tp=0.225 µm (in each of the land and groove), the plane capacity becomes 58.3 GB including the LD 41 GB.

"Adaptive Filter Characteristics in Pattern R2"

As a comparative example for the present disclosure, adaptive filter characteristics in a case of a low line density of the pattern R2 will now be described. Here, the region division position in the radial direction is set equal to ±0.55 where the pupil radius is 1.0. As described above, reproduced information signals of a plurality of channels are processed in the multi-input adaptive equalizer unit 13. The multi-input adaptive equalizer unit 13 has as many adaptive equalizer units as the number of channels. The adaptive equalize unit has a configuration of the FIR filter, and respective tap coefficients are controlled adaptively.

Figure 8:
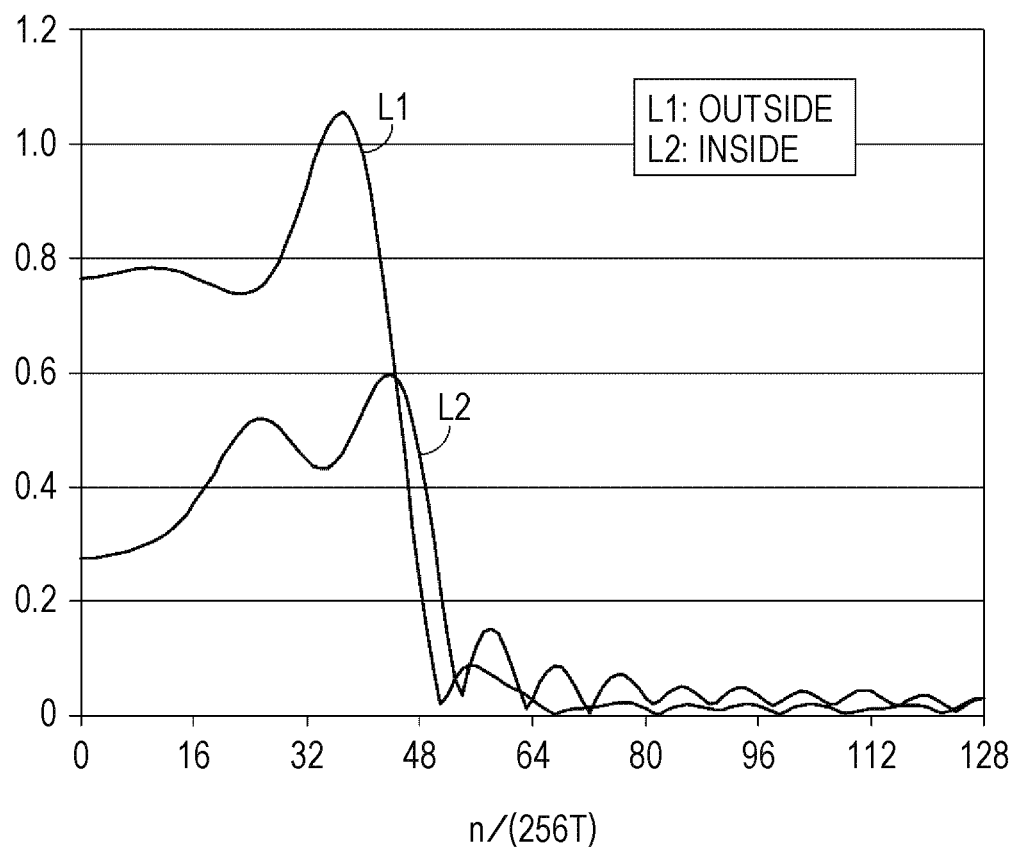
FIG. 8 is a graph representing frequency amplitude characteristics concerning a pattern R2.

As regards the pattern R2, frequency amplitude characteristics of a simulation result are illustrated in FIG. 8. Characteristics L1 are frequency amplitude characteristics of a channel corresponding to the outside region B. Characteristics L2 are frequency amplitude characteristics of a channel corresponding to the inside region A. By the way, the characteristics are exemplary characteristics at the perturbation origin. Here, the perturbation origin means a state in which all of the defocus, disc skew, and the like are located at the origin and the best result is basically obtained in general in a case where adaptive control is exercised.

In the frequency amplitude characteristics, the abscissa axis indicates n/(256T) (n: value on the abscissa axis). For example, in a case where (n=64), it follows that $(^{64}/_{256}T) = (^{1}/_{4}T)$. For example, in a case where the RLL (1, 7) PP modulation scheme is used, the mark length is in the range of 2T to 8T, where "T" is the channel clock period. ($^{1}/_{4}T$) is a frequency in a case where the mark of 2T is repeated. In the characteristics illustrated in FIG. 8, the mark of 2T is in a frequency region in which reproduction may not be conducted. The mark of 3T can be reproduced.

Figure 9A:
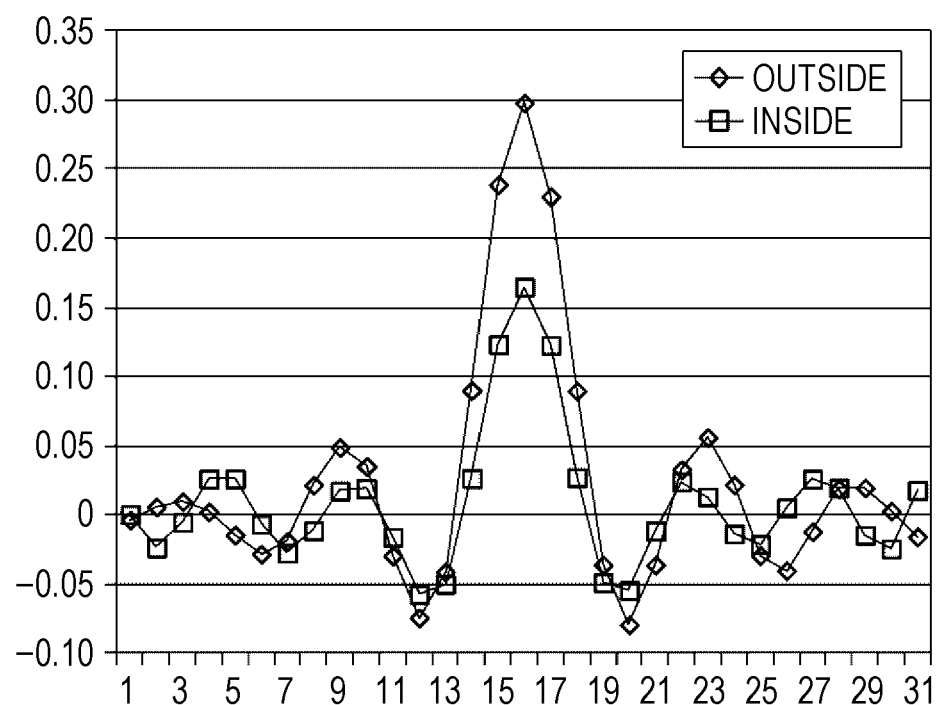
FIGS. 9A and 9B are graphs representing tap coefficients and frequency phase characteristics concerning the pattern R2.
Figure 9B:
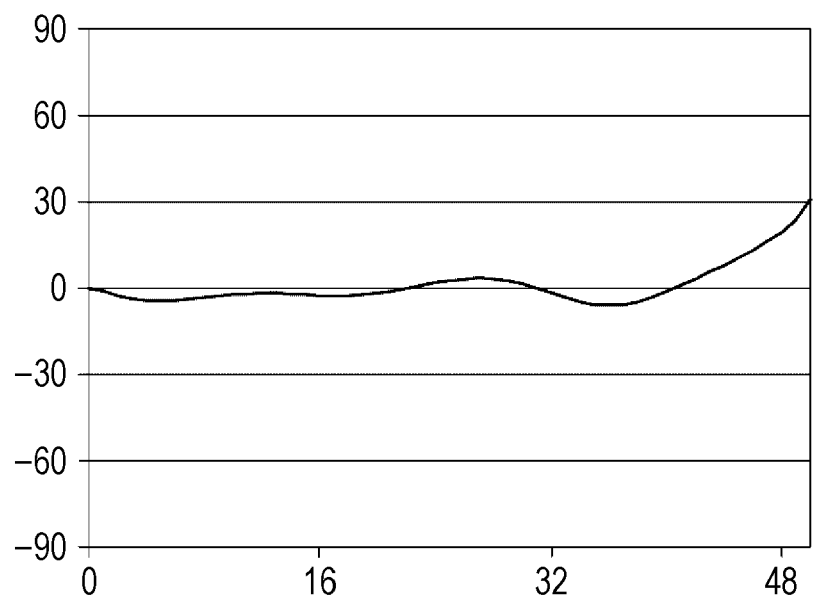

FIG. 9A illustrates tap coefficients of respective channels in the pattern R2. For example, the number of taps in the FIR filter is set equal to 31. FIG. 9B illustrates frequency phase characteristics of respective channels. The frequency phase characteristics represent a phase difference between two channels. As illustrated in FIG. 9B, the phase difference between two channels becomes small.

"Reproduction Performance"

Figure 10:
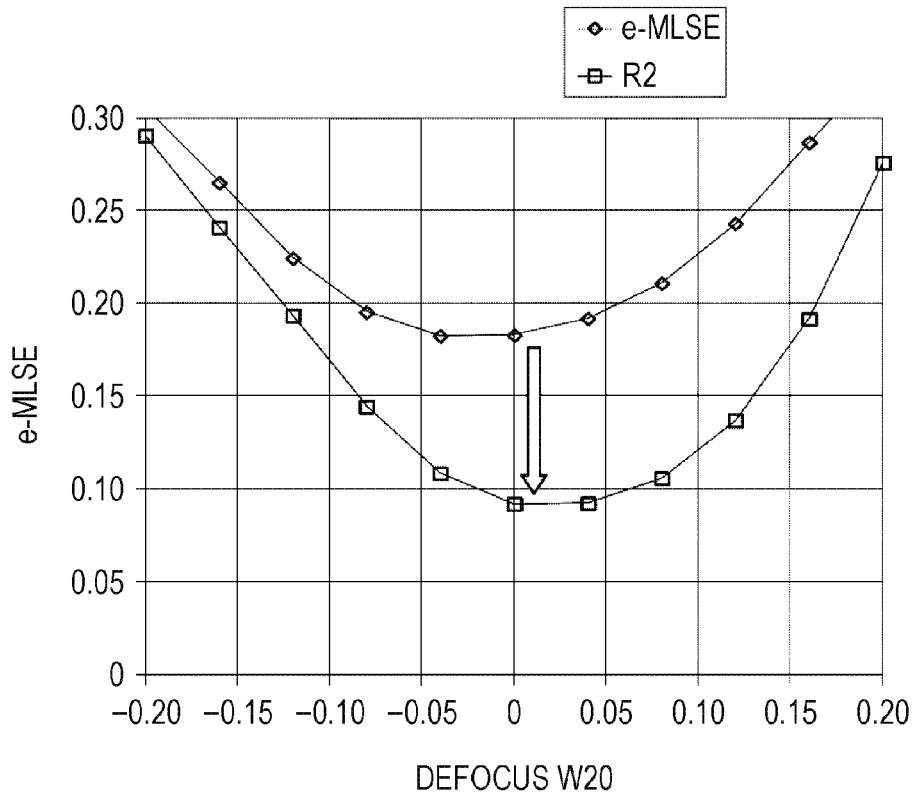
FIG. 10 is a graph for explaining a defocus margin concerning the pattern R2.
Figure 11:
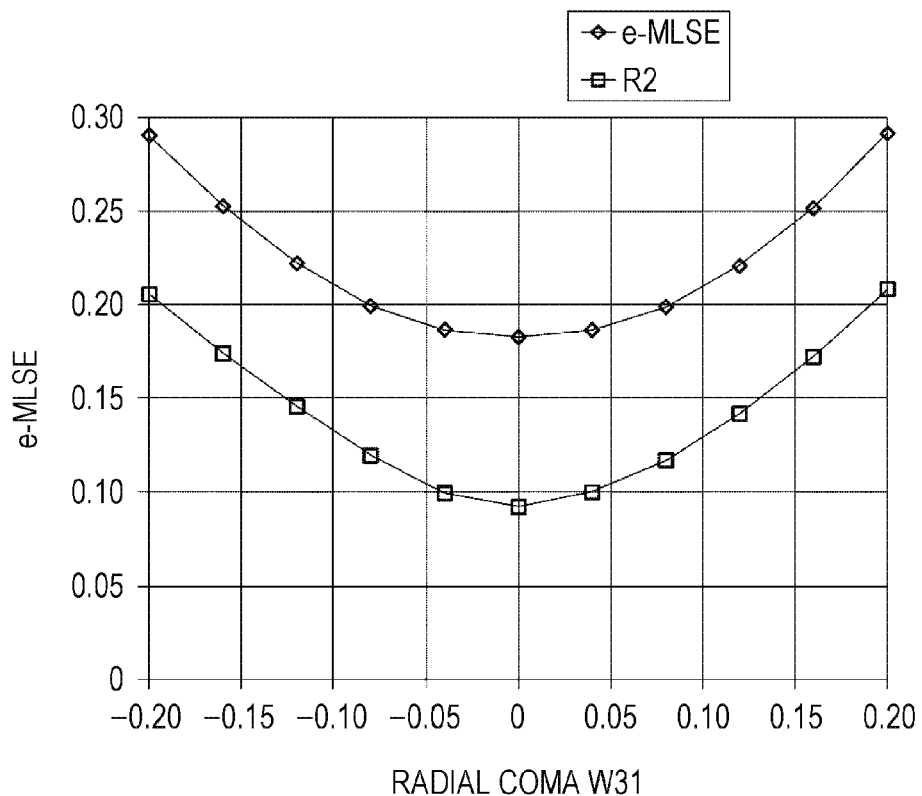
FIG. 11 is a graph for explaining a margin for coma aberration in a radial direction concerning the pattern R2.

Simulation results of reproduction performance concerning the pattern R2 are illustrated in FIG. 10 and FIG. 11. These diagrams illustrate effects of region division in the pattern R2 in the case of low line density.

The line density is represented by using a plane capacity at the time when the diameter of the disc is 120 mm and the track pitch Tp=0.32 µm.

LD 35.18 (GB) . . . 0.053 µm/channel bit, and when Tp=0.32 µm, the plane capacity becomes 35.18 GB.

In a case where Tp=0.225 µm (in each of the land and groove), the plane capacity becomes 50.0 GB including the LD 35.18 GB.

NA=0.85
PR (1233321)
Evaluation index: e-MLSE
Mark width=Tp×0.7
Disc noise and amplifier noise are present
The region division position in the radial direction is set equal to ±0.55 where the pupil radius is 1.0.

Under such conditions, the e-MLSE is improved.

The margin width satisfying e-MLSE ≤15% is nil in a case where there are no divisions (a graph denoted by e-MLSE). On the other hand, as illustrated in FIG. 10, the defocus margin W20 becomes a total width 0.21 (corresponding to ±0.18 µm). As illustrated in FIG. 11, the radial coma aberration margin W31 becomes a total width 0.25 (corresponding to ±0.44 deg.).

The abscissa axis of the graph illustrated in FIG. 10 is a defocus quantity normalized by the wavelength. A value 0 means that the defocus quantity is 0. At the time of actual reproduction, defocus is generated. Therefore, it is necessary to have a margin for the defocus.

In the graph of (normalized defocus quantity versus index), the smaller the value of e-MLSE is, the higher the reproduction performance becomes. As an example, it is desirable that the value of e-MLSE is approximately 0.15 or less. Therefore, the defocus margin corresponds to a width of a range in which the value of e-MLSE becomes approximately 0.15 or less. The larger the width is, the larger the defocus margin becomes.

As for the margin, the margin for the skew of the disc is also important besides the defocus margin. FIG. 11 illustrates the margin for the third order coma aberration W31 (aberration coefficient normalized by the wavelength) corresponding to the skew in the radial direction of the disc. As an example, it is desirable that the value of e-MLSE is approximately 0.15 or less. Therefore, the coma aberration margin corresponds to a width of a range in which the value of e-MLSE becomes approximately 0.15 or less. The larger the width is, the larger the radial disc skew margin becomes.

The ordinate axis of the graphs illustrated in FIG. 10 and FIG. 11 is an index for representing the reproduction performance. For example, as the index, the value of i-MLSE is known. The MLSE (Maximum Likelihood Sequence Error) is an index corresponding to an error probability calculated by using a difference between a target level which is set using Viterbi-detected data and a level of an actual signal. In the case of BDXL (registered trademark), using an i-MLSE method, some data patterns that are apt to cause an error are weighted and calculation is conducted.

By the way, in a case where the recording density is made higher as compared with the BDXL (registered trademark), the data patterns that are apt to cause an error become different. As a result, the error of the i-MLSE which is the signal index value in the past becomes a problem. In the present disclosure, therefore, a signal evaluation value different from the i-MLSE with new data patterns which are necessary to improve the precision of the signal index value at a higher line density added is used to explain the effects. Hereafter, a new index value improved in precision is referred to as e-MLSE.

Data patterns added in the e-MLSE are the following three kinds.

Bits represented as 1 in the pattern indicate places where bit inversion occurs in an erroneous pattern as compared with a detected pattern.

Added pattern (1): 10111101
Added pattern (2): 1011110111101
Added pattern (3): 10111100111101

By the way, at a line density equivalent to that in the BDXL (registered trademark) in the past for which the precision of the i-MLSE is sufficient, the e-MLSE and the i-MLSE nearly coincide with each other. At a higher line density, a difference corresponding to the precision improvement appears. The theoretical correlation of an index value to an error rate that becomes important in practical use becomes the same between the two. Although there are a difference on computation and a difference in the range of applied line density, therefore, evaluation values of signal quality indicated by the two may be grasped with same feeling. By the way, in the present disclosure, an index other than e-MLSE may also be used.

In the case of the pattern R2, the amplitude phase characteristics the crosstalk component originally has is used as it is. Signal characteristics are improved by using inter-channel balance of amplitude characteristics changing inter-channel phase difference little. In the pattern R2, the beam section is divided into the inside region and outside regions in the radial direction. There is an effect of suppressing crosstalk from adjacent tracks generated in the case where the track pitch is made narrow. In an example in which region division is conducted only in the radial direction as in the pattern R2, therefore, there is a problem that it is not possible to sufficiently cope with signal degradation caused by, for example, inter-symbol interference in the tangential direction. The present disclosure described hereafter takes such a point into consideration.

Figure 12:
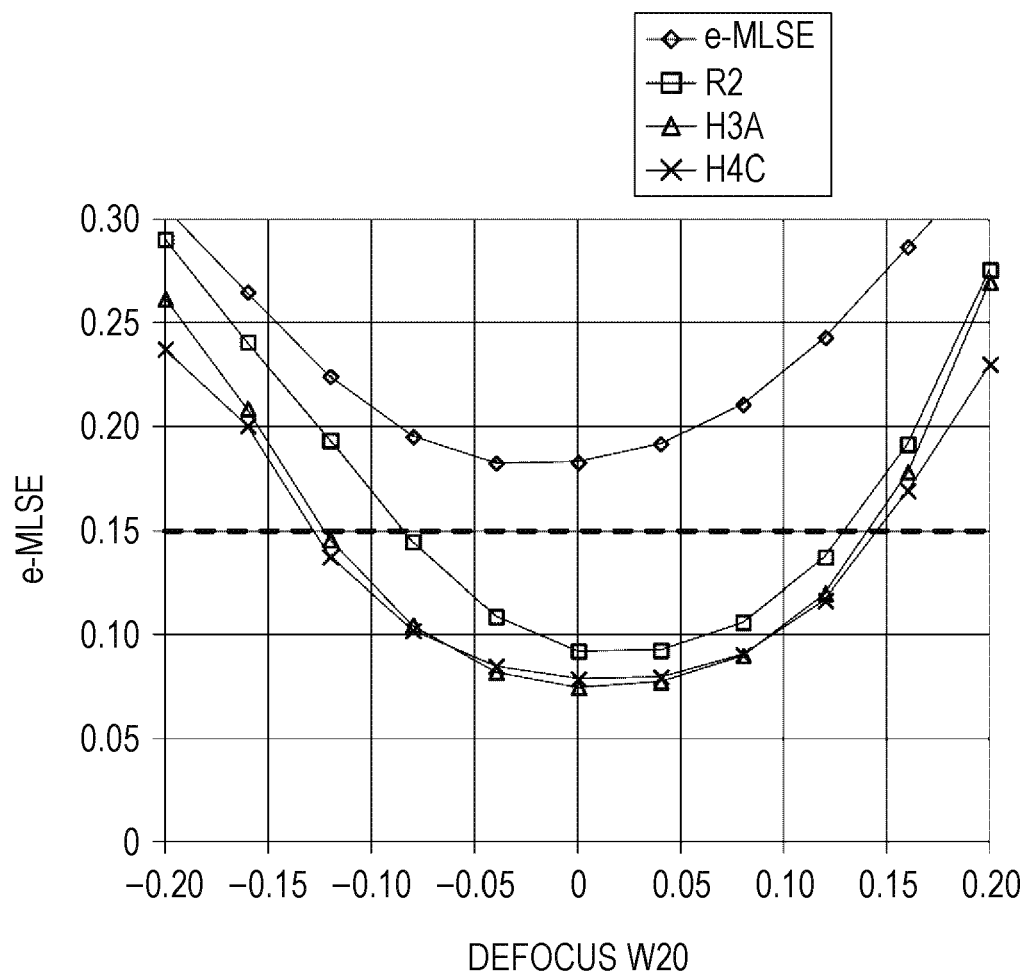
FIG. 12 is a graph for explaining a defocus margin concerning patterns H3A and H4C.
Figure 13:
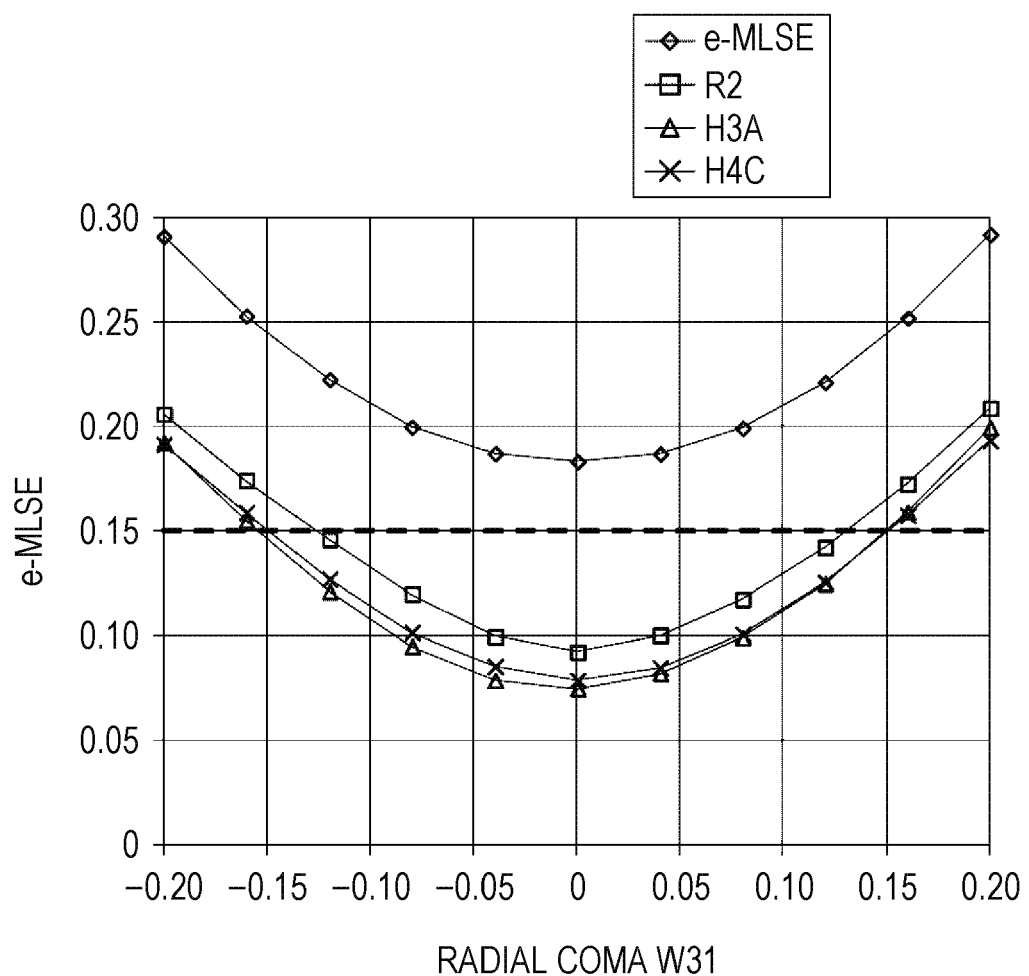
FIG. 13 is a graph for explaining a margin for coma aberration in a radial direction of a disc concerning the patterns H3A and H4C.
Figure 14:
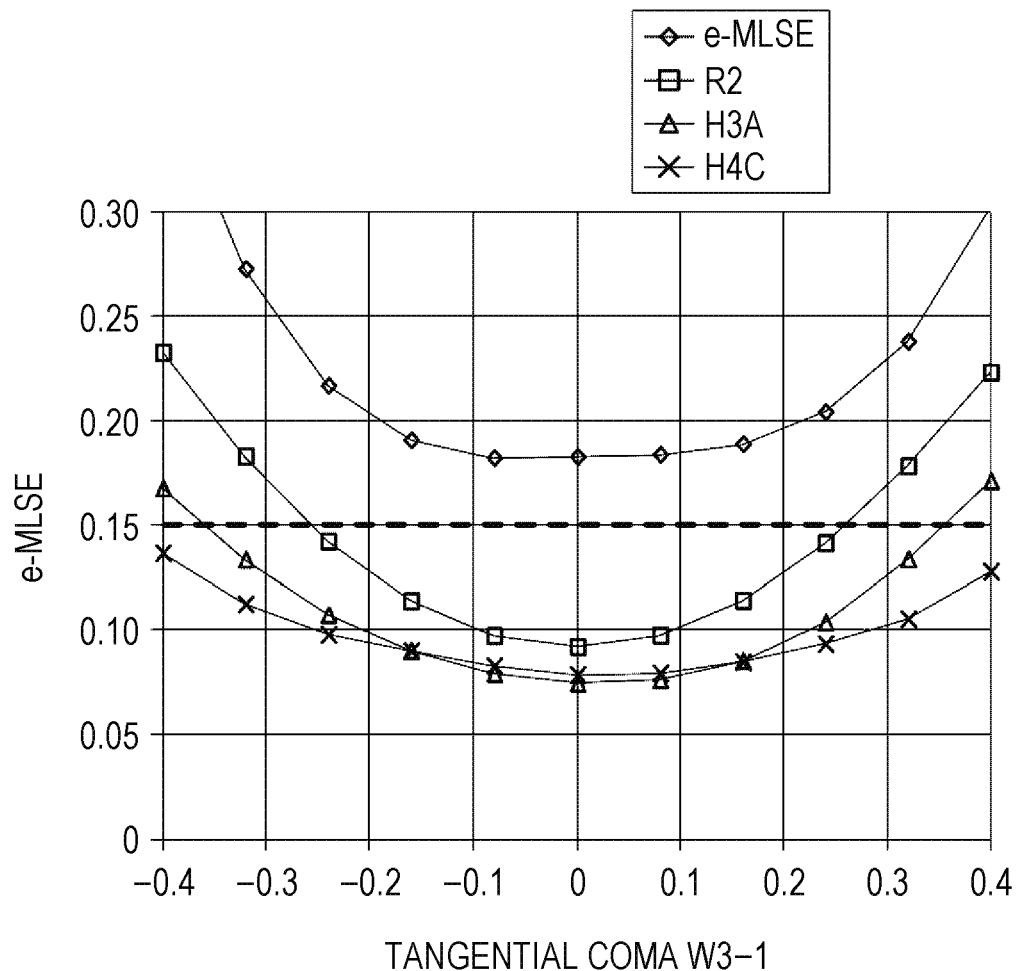
FIG. 14 is a graph for explaining a margin for coma aberration in a tangential direction of a disc concerning the patterns H3A and H4C.

"Region Division is Further Conducted in the Tangential Direction (Patterns H3A and H4C)" As examples in which region division is further conducted in the tangential direction, reproduction performance in patterns H3A and H4C (see FIG. 7) is illustrated in FIGS. 12, 13 and 14. FIG. 12 is a graph of (normalized defocus quantity versus index). FIG. 13 is a graph of (normalized skew quantity in the radial direction versus index). FIG. 14 is a graph of (normalized skew quantity in the tangential direction versus index).

These diagrams illustrate effects of the division in the tangential direction in the case of low line density.

Simulation was conducted under the following conditions.

LD 35.18 (GB) . . . 0.053 µm/channel bit
Tp=0.225 µm (in each of the land and groove), the plane capacity becomes 50.0 GB.
NA=0.85
PR (1233321)
Evaluation index: e-MLSE
Mark width=Tp×0.7
Disc noise and amplifier noise are present The region division position in the radial direction is set equal to ±0.55 in common where the pupil radius is 1.0. The region division positions in the tangential direction are set equal to ±0.65 and ±0.30.

If the region division is further conducted in the tangential direction, the bottom of the graph further drops and the margin is spread as compared with the pattern R2 in which the region division is conducted only in the radial direction, as appreciated from FIGS. 12 to 14.

Under such a condition, the margin for the pattern H3A is improved as described below. The defocus margin W20 becomes a total width 0.27 (corresponding to ±0.23 µm). The radial coma aberration margin W31 becomes a total width 0.30 (corresponding to ±0.53 deg.).

Under such a condition, the margin for the pattern H4C is improved as described below. The defocus margin W20 becomes a total width 0.275 (corresponding to ±0.235 µm). The radial coma aberration margin W31 becomes a total width 0.30 (corresponding to ±0.53 deg.).

As described above, the reproduction performance can be further enhanced as compared with the division only in the radial direction by further conducting region division in the tangential direction in addition to the radial direction. By the way, in the description in the present specification, it is supposed that tap coefficients in the adaptive equalizer unit (FIR filter) are adaptively controlled. In a case where the best tap coefficients are found as a result of simulation, however, it is possible to use an equalizer unit having fixed tap coefficients. It is also possible to use an analog filter or a digital filter having equivalent characteristics other than the FIR filter. In performance, the adaptive type is excellent. Since it is not necessary to exercise the adaptive control of the tap coefficients, however, the processing and hardware can be simplified. Furthermore, it is also possible to use an equalizer unit of fixed type for partial channels and use an equalizer unit of adaptive type for other channels.

"Adaptive Electro-Optical Filter Characteristics in Pattern H3A"

Figure 15:
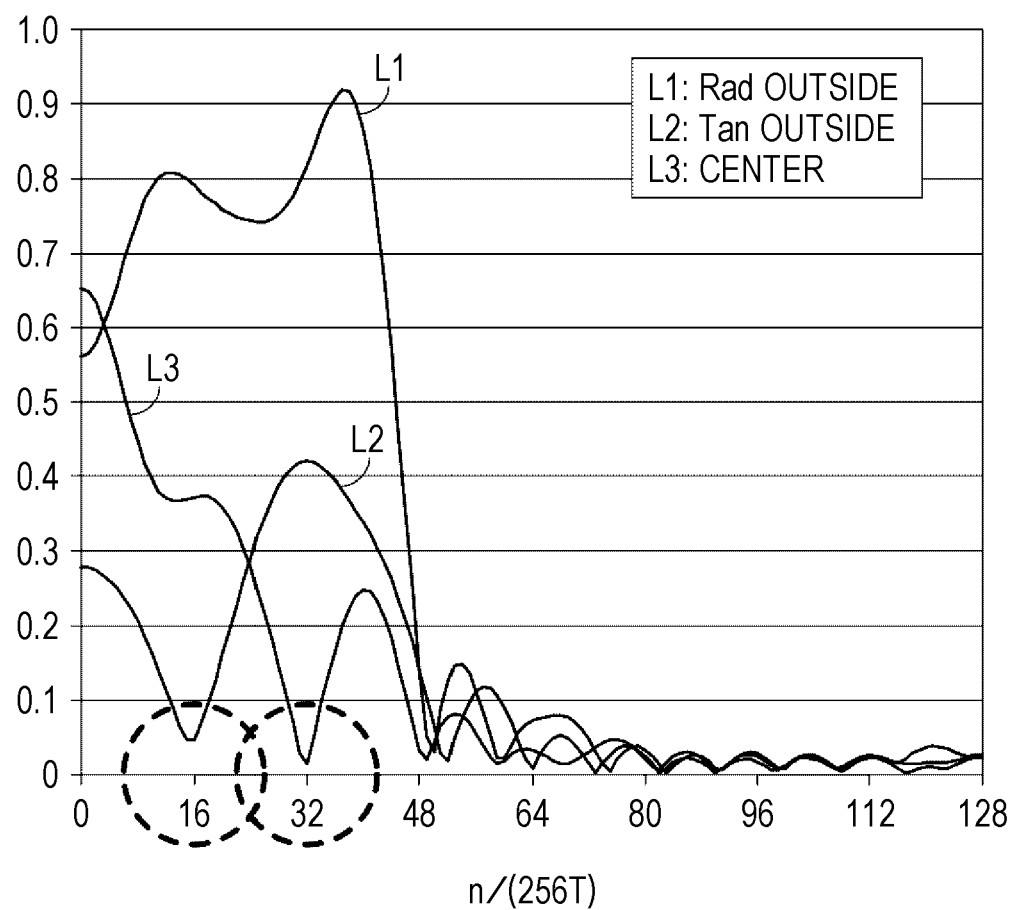
FIG. 15 is a graph representing frequency amplitude characteristics concerning the pattern H3A.

Adaptive electro-optical filter characteristics in pattern H3A in the case of a low line density will now be described. Frequency amplitude characteristics of a simulation result concerning the pattern H3A (see FIG. 7) are illustrated in FIG. 15. Characteristics L1 are frequency amplitude characteristics of a channel corresponding to the outside region B in the radial direction. Characteristics L2 are frequency amplitude characteristics of a channel corresponding to the outside region C in the tangential direction. Characteristics L3 are frequency amplitude characteristics of a channel corresponding to the center region A. By the way, the characteristics are exemplary characteristics at the perturbation origin.

Figure 16A:
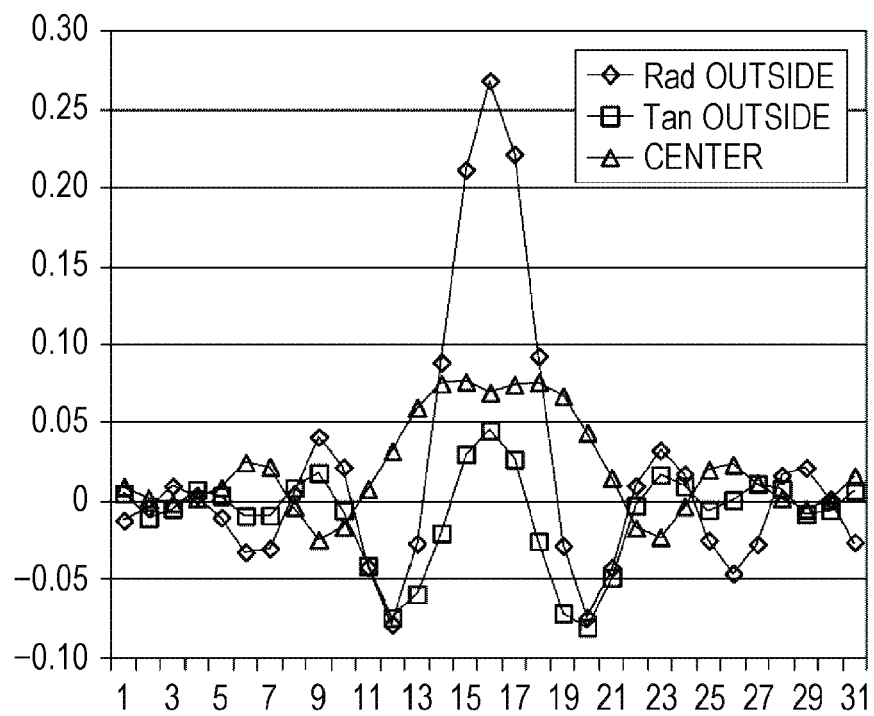
FIGS. 16A and 16B are graphs representing tap coefficients and frequency phase characteristics concerning the pattern H3A.
Figure 16B:
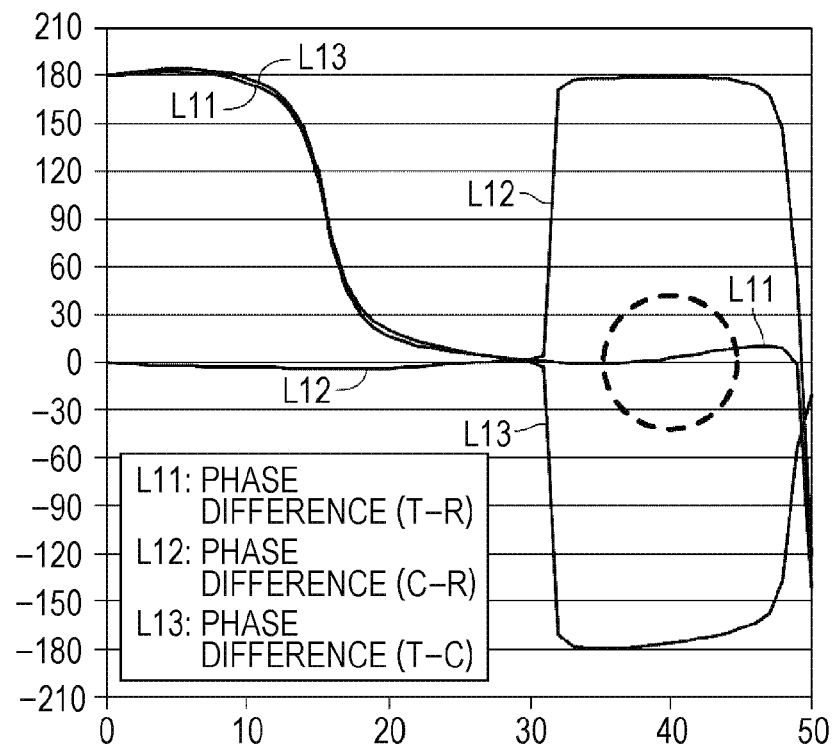

FIG. 16A illustrates tap coefficients of respective channels in the pattern H3A. For example, the number of taps in the FIR filter is set equal to 31. FIG. 16B illustrates frequency phase characteristics of respective channels. The frequency phase characteristics represent a phase difference between two channels in three channels. Characteristics L11 are a phase difference between reproduced information signals of channels respectively corresponding to the outside region C in the tangential direction and the outside region B in the radial direction. Characteristics L12 are a phase difference between reproduced information signals of channels respectively corresponding to the center region A and the outside region B in the radial direction. Characteristics L13 are a phase difference between reproduced information signals of channels respectively corresponding to the outside region C in the tangential direction and the center region A.

As described above, filter characteristics in H3A has features described below.

- It is possible to form filters having frequency characteristics largely different in both amplitude and phase every regions of three channels and implement favorable reproduced signal reproduction.
- In a frequency band corresponding to the 3T signal (in the vicinity of an abscissa value 43 surrounded by a dashed line), phases in the outside region C in the tangential direction and in the outside region B are shifted by 180 deg. as compared with the central region.
- The central region is provided with characteristics intercepting a frequency band corresponding to a 4T signal (in the vicinity of an abscissa value 32 surrounded by a dashed line), and a false signal by crosstalk is suppressed.
- Outside in the tangential direction should contribute to short mark reproduction, and intercepts a frequency band corresponding to an 8T signal (in the vicinity of an abscissa value 16 surrounded by a dashed line).

In this way, a high pass filter, a low pass filter, a band pass filter, a band stop (or notch) filter and the like are formed every region. Filter characteristics that may not be implemented only optically or only electrically are implemented.

Figure 17:
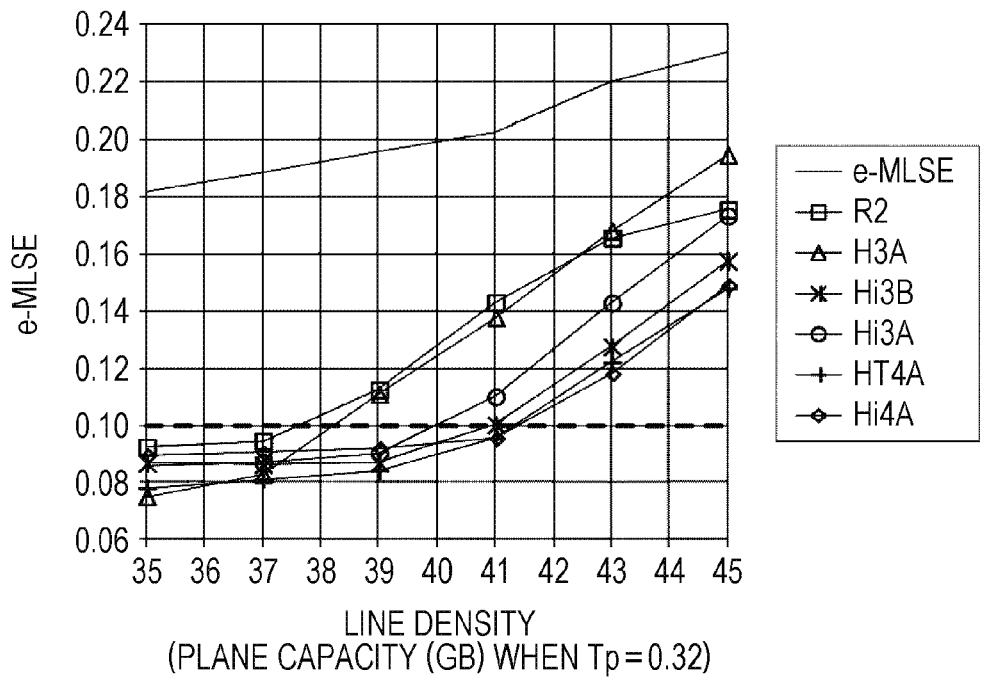
FIG. 17 is a graph indicating relationships between fixed line densities and indexes.

FIG. 17 illustrates relations between the line density and the index (NA=0.85, Tp=0.225 and PR (1233321)) are fixed.

If channels that differ in center position in the tangential direction are made, it becomes possible to reproduce a signal having a higher line density favorably even if the PR class is the same. The characteristics can also be improved by optimization of the division position in the tangential direction as in the pattern Hi3B. If e-MLSE ≤10% at the perturbation center is set, the patterns R2 and H3A can be used up to LD 38 GB. On the other hand, Hi3B, HT4A, and Hi4A can be used up to LD 41 GB.

"Higher Line Density Effect of Division in Tangential Direction"

Figure 18:
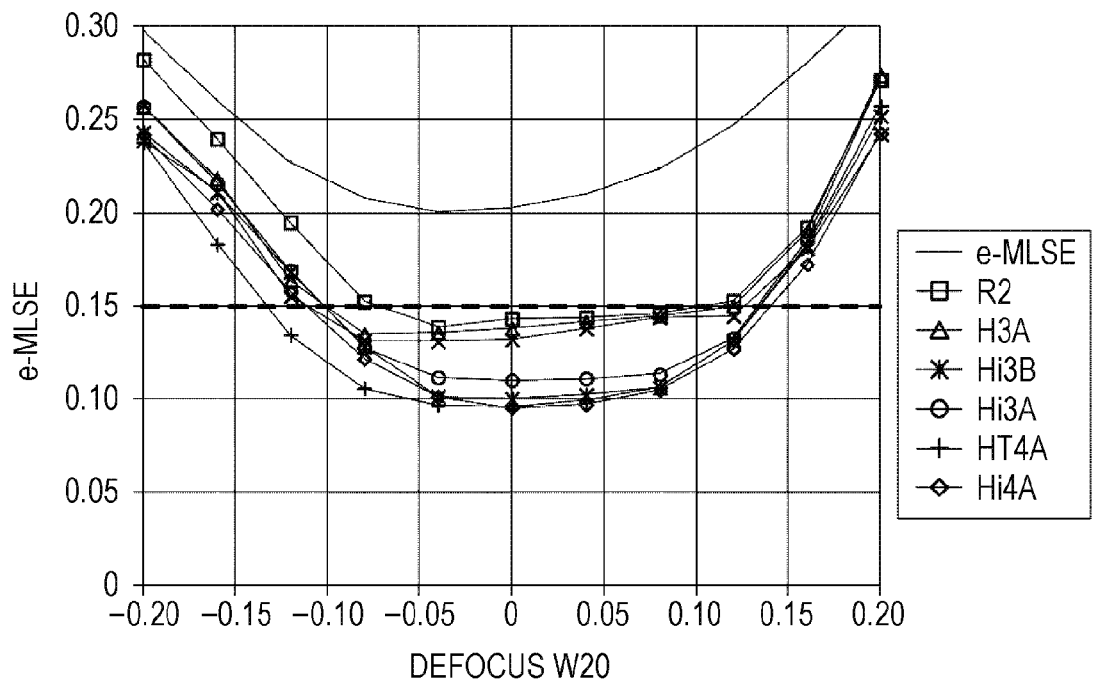
FIG. 18 is a graph used to explain a defocus margin.
Figure 19:
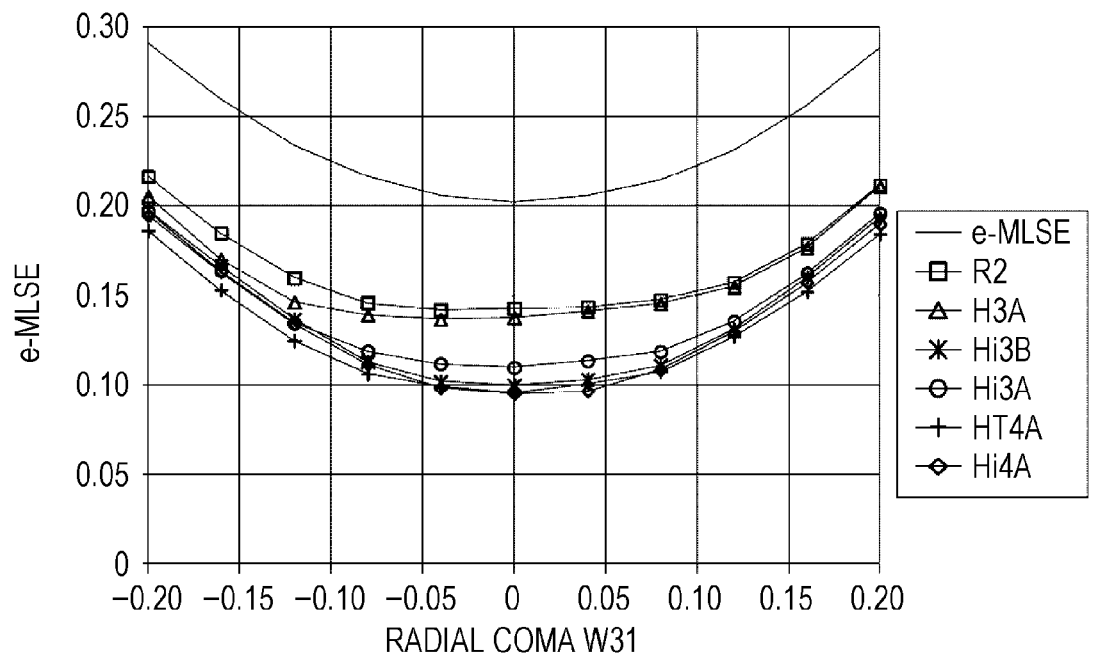
FIG. 19 is a graph used to explain a coma aberration margin in the radial direction.

Reproduction performance of the patterns H3A, Hi3A, Hi3B, HT4A and Hi4A and patterns R2 and H3A for comparison (see FIG. 7) is illustrated in FIG. 18 and FIG. 19. FIG. 18 is a graph of (normalized defocus quantity versus index). FIG. 19 is a graph of (normalized skew quantity in the radial direction versus index).

These diagrams indicate effects of division in the tangential direction in the case of high line density. Simulation was conducted under the following conditions.

LD 41 (GB) . . . 0.04547 pa/channel bit
Tp=0.225 μm (in each of the land and groove), the plane capacity becomes 58.3 GB including LD 41 (GB).
NA=0.85
PR (1233321)
Evaluation index: e-MLSE
Mark width=Tp×0.7
Disc noise and amplifier noise are present The region division position in the radial direction is set equal to ±0.55 in common where the pupil radius is 1.0. The region division positions in the tangential direction are set equal to ±0.30 and ±0.65.

As appreciated from FIG. 18 and FIG. 19, at a high density of LD 41 GB the e-MLSE progresses in the vicinity of 15% in the patterns R2 and H3A having no channels that are different in center position in the tangential direction. On the other hand, a margin width satisfying e-MLSE 15% can be ensured sufficiently in the patterns Hi3A, Hi3B, HT4A, and Hi4A having channels that are different in center position in the tangential direction. In particular, at LD 41 GB the pattern HT4A has a margin width equivalent to that in the pattern H3A at LD 35.18 GB.

"Adaptive Electro-Optical Filter Characteristics in Pattern HT4A"

Figure 20:
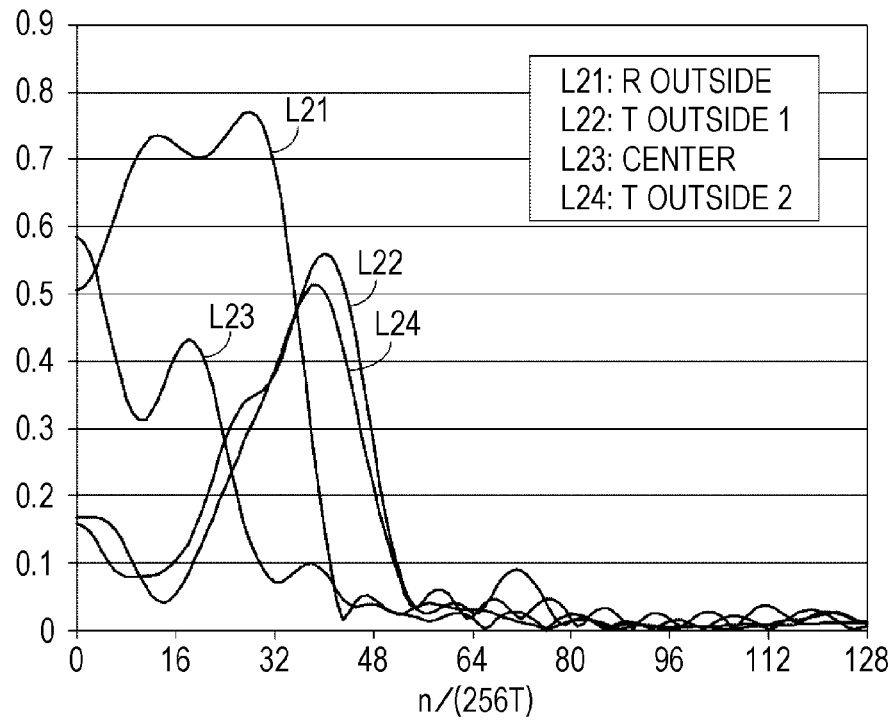
FIG. 20 is a graph representing frequency amplitude characteristics concerning a pattern HT4A.

Adaptive electro-optical filter characteristics in the pattern HT4A (see FIG. 7) in the case of a high line density will now be described. Frequency amplitude characteristics of a simulation result concerning the pattern HT4A are illustrated in FIG. 20. Characteristics L21 are frequency amplitude characteristics of a channel corresponding to the outside region B in the radial direction. Characteristics L22 are frequency amplitude characteristics of a channel corresponding to the outside region C in the tangential direction. Characteristics L23 are frequency amplitude characteristics of a channel corresponding to the center region A. Characteristics L24 are frequency amplitude characteristics of a channel corresponding to the outside region D in the tangential direction. By the way, the characteristics are exemplary characteristics at the perturbation origin.

Figure 21A:
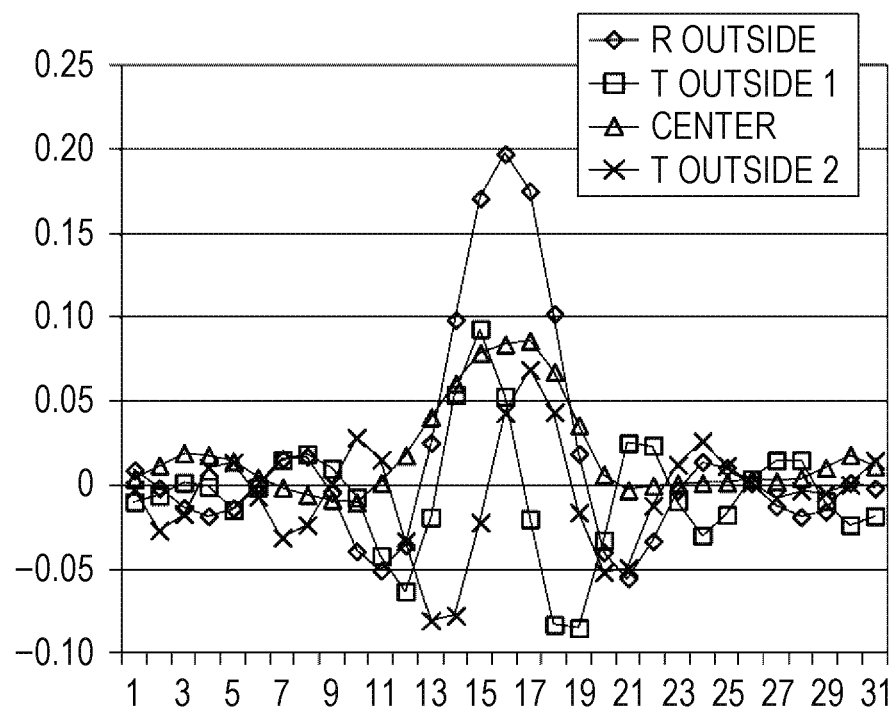
FIGS. 21A and 21B are graphs representing tap coefficients and frequency phase characteristics concerning the pattern HT4A.
Figure 21B:
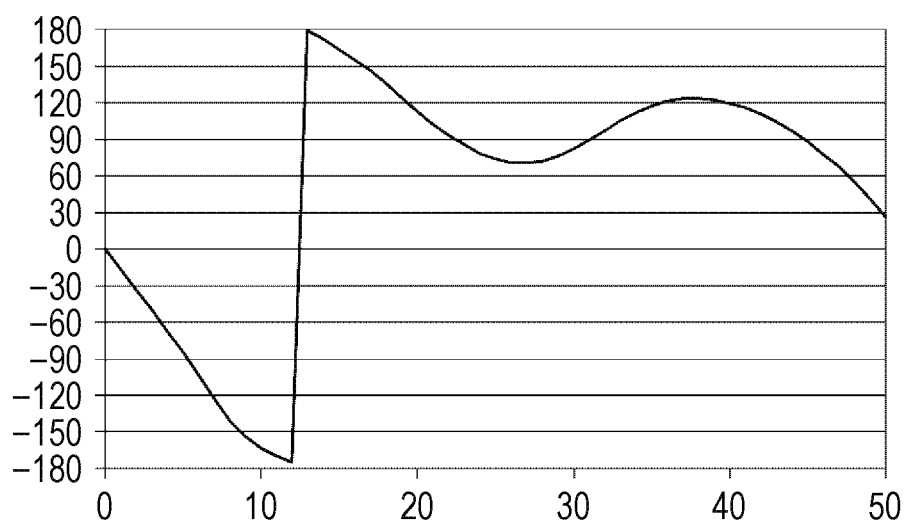

FIG. 21A illustrates tap coefficients of respective channels in the pattern HT4A. For example, the number of taps in the FIR filter is set equal to 31. FIG. 21B illustrates frequency phase characteristics of respective channels. The frequency phase characteristics represent a phase difference between a channel corresponding to the outside region C in the tangential direction and a channel corresponding to the outside region D in the tangential direction.

Filter characteristics in HT4A has features described below.

In the same way as the pattern H3A, the central region exhibits low-pass like characteristics and the outside region in the tangential direction exhibits high-pass like characteristics. (Here, band-pass characteristics that pass a band corresponding to shorter marks included in a frequency band contributing to signal reproduction are relatively referred to as high-pass like).

In addition, in the pattern HT4A, outside regions in the tangential direction become independently two channels. The two regions form a filter having a phase difference in the range of approximately 120 to 90 deg. in frequency bands corresponding to 3T and 4T (in the vicinities of abscissa values 43 and 32) (as appreciated from the tap coefficients, it corresponds to two clocks). As a result, detection of a short mark with a higher sensitivity as compared with reproduced amplitude using a simple total sum signal becomes possible. Favorable reproduced signal characteristics in a high line density region is implemented by using the phase difference between regions as well for short mark reproduction.

Figure 22:
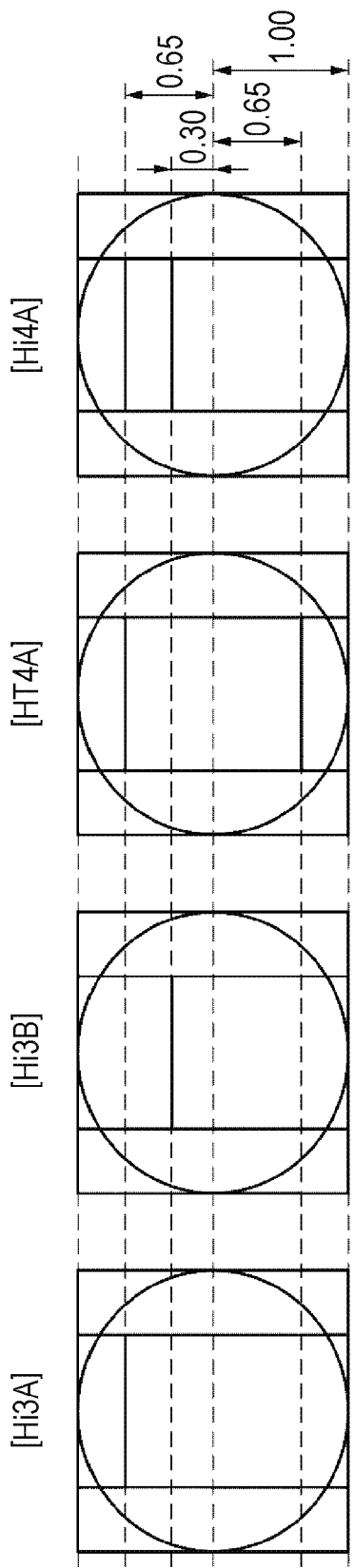
FIG. 22 is a schematic diagram illustrating a concrete example of region division.

As appreciated from the above-described graphs of line density dependence, the characteristics can be improved without dependence on the line density by changing the division position in some cases as in the case of the pattern Hi3B from the pattern Hi3A, and the characteristics are inverted depending on the line density in some case as in the case of HT4A and Hi4A. FIG. 22 illustrates several concrete examples of region division. In a case where a line density (plane capacity) laid more stress on as the system is determined, it is possible to optimize the division pattern therefor.

"Characteristics Optimization by Region Division"

Optimization of the division will now be described by taking the case of a low line density where the kinds of division pattern providing favorable characteristics as an example.

LD 35.18 (GB) . . . 0.053 µm/channel bit

Tp=0.225 µm (in each of the land and groove), the plane capacity becomes 50.0 GB.

NA=0.85

PR (1233321)

Evaluation index: e-MLSE

Mark width=Tp×0.7

Disc noise and amplifier noise are present

Figure 23:
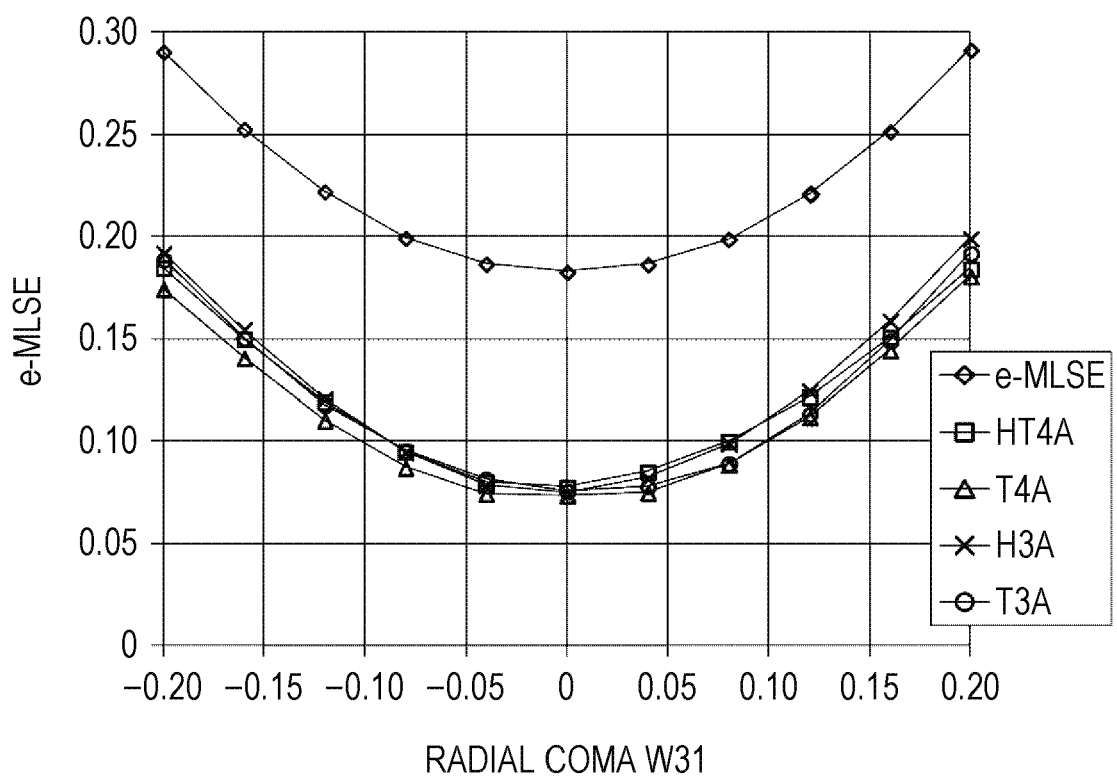
FIG. 23 is a graph indicating expansion of a margin of a radial coma aberration obtained by changing the division position.
Figure 24A:
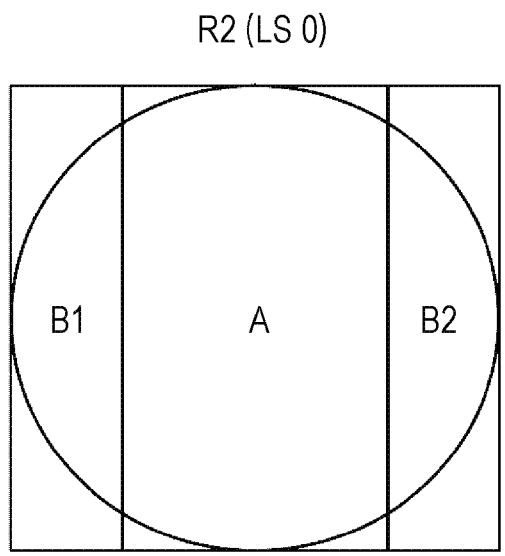
FIGS. 24A to 24D are schematic diagrams illustrating an example influenced by a lens shift.
Figure 24B:
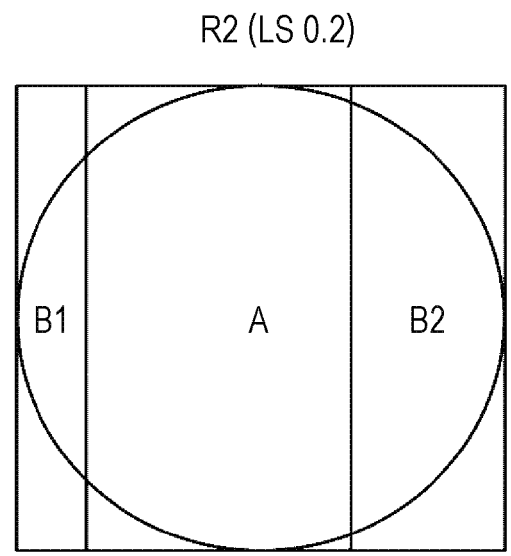
Figure 24C:
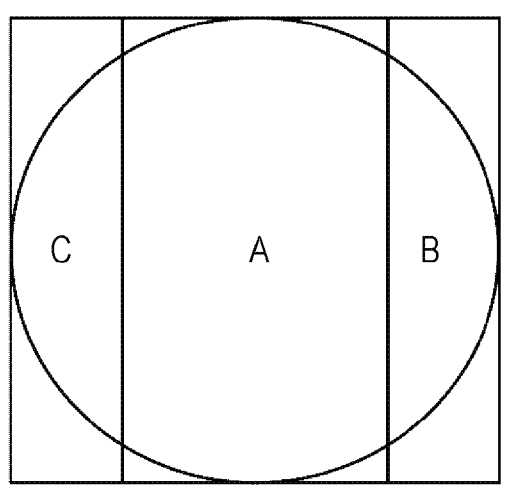
Figure 24D:
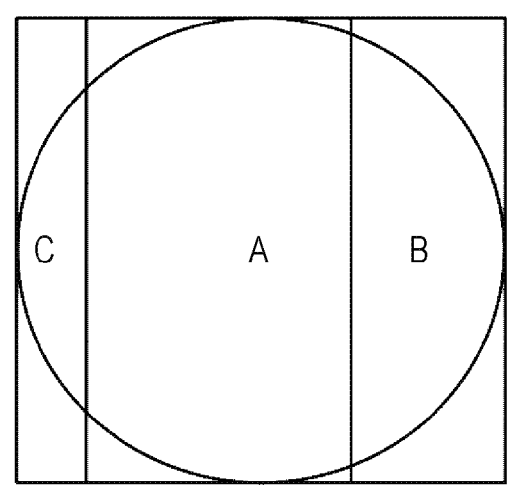

FIG. 23 illustrates expansion of the margin of radial coma aberration obtained by changing the division position. The division position is ±0.55 in the radial direction and ±0.65 in the tangential direction in the patterns HT4A and H3A. In the patterns T4A and T3A, The division position is ±0.7 in the radial direction and ±0.6 in the tangential direction. The division shape is also changed in four corners.

As appreciated from FIG. 23, the radial coma aberration W31 becomes a total width 0.32 (corresponding to ±0.56 deg.) in the pattern HT4A. In the pattern T4A, the radial coma aberration W31 becomes a total width 0.34 (corresponding to ±0.60 deg.). In the pattern H3A, the radial coma aberration W31 becomes a total width 0.30 (corresponding to ±0.53 deg.). In the pattern T3A, the radial coma aberration W31 becomes a total width 0.32 (corresponding to ±0.56 deg.).

"Effect Obtained by Making Outside Region Resultant from Division in Radial Direction Independent"

FIGS. 24A to 24D are patterns in which division is conducted only in the radial direction to form three regions. In a pseudo way, the case where the visual field has moved according to a lens shift (denoted by LS in FIGS. 24A to 24D) of an object lens is illustrated. As patterns, R2 (regions A, B1 and B2) and R3 (regions A, B and C) are supposed. It is supposed that a lens shift of 0.2 has occurred in the radial direction. (Since the diameter of the section of the beam luminous flux is supposed to be 2.0, 0.2 corresponds to 10%).

"Effect 1 Obtained by Making Outside Region Resultant from Division in Radial Direction Independent"

Figure 25:
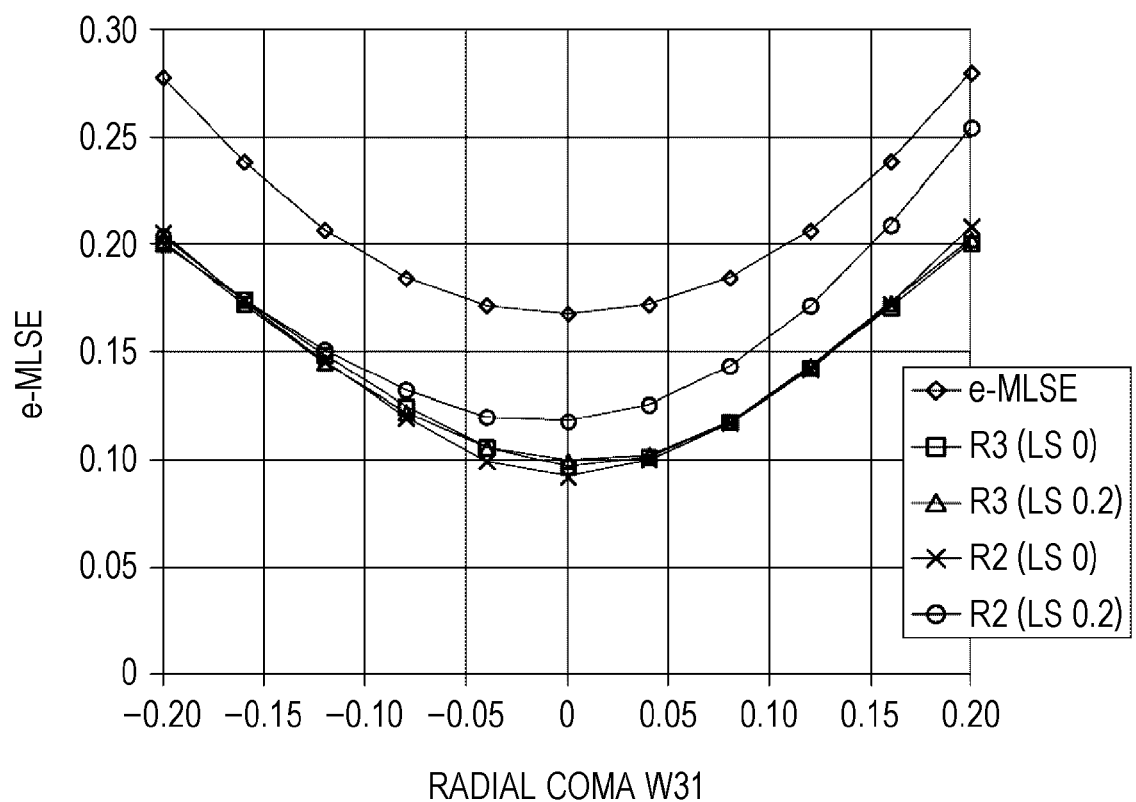
FIG. 25 is a graph indicating an influence of a lens shift upon the radial coma aberration.

Simulation results of the radial coma aberration margin concerning these patterns are illustrated by graphs in FIG. 25. As illustrated in FIG. 25, the coma aberration margin in the pattern of R2 (LS 0.2) is lowered. In other words, in the case where division in the radial direction is conducted, the influence of visual field movement can be reduced by making two outside regions independent. By the way, there is another technique for making strong against the visual field movement as described later.

"Margin Change of Radial Coma Aberration at the Time of Lens Shift"

A change of radial coma aberration characteristics caused by pseudo visual field movement (0.1 shift and 0.2 shift) concerning the pattern R3 is illustrated in FIG. 26A. FIG. 26B illustrates a 0.2 shift, and FIG. 26C illustrates no shift. As appreciated from FIG. 26A, the change of margin width of radial coma aberration caused by visual field movement can be suppressed if the division width is optimized.

A change of radial coma aberration characteristics caused by pseudo visual field movement (0.1 shift and 0.2 shift) concerning the pattern T4A is illustrated in FIG. 27A. FIG. 27B illustrates a 0.2 shift, and FIG. 27C illustrates no shift. As appreciated from FIG. 27A, the margin width caused by visual field movement can be ensured. However, the center slightly shifts.

A change of radial coma aberration characteristics caused by pseudo visual field movement (0.1 shift and 0.2 shift) concerning the pattern T3A is illustrated in FIG. 28A. FIG. 28B illustrates a 0.2 shift, and FIG. 28C illustrates no shift. As appreciated from FIG. 28A, the margin width caused by visual field movement becomes abruptly narrow. In the case of the pattern T3A, therefore, it is necessary to suppress the visual field movement quantity.

"Defocus Margin Change at the Time of Lens Shift"

Figure 29B:
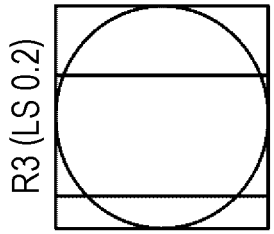
FIGS. 29A to 29C are graphs indicating an influence of a lens shift upon defocus characteristics.
Figure 29C:
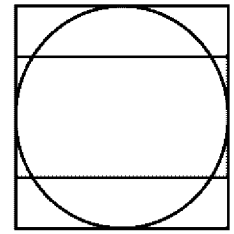
Figure 29A:
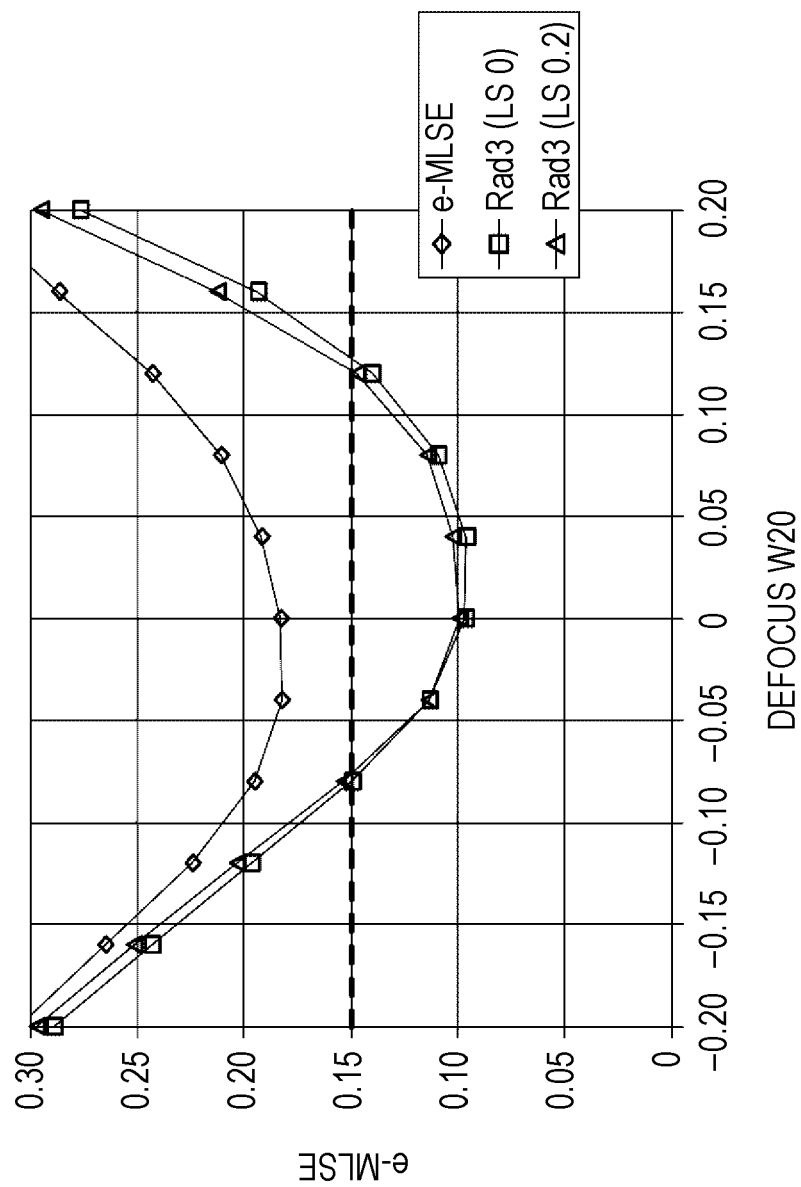

A change of defocus characteristics caused by pseudo visual field movement (0.1 shift and 0.2 shift) concerning the pattern R3 is illustrated in FIG. 29A. FIG. 29B illustrates a 0.2 shift, and FIG. 29C illustrates no shift. As appreciated from FIG. 29A, the change of defocus margin width caused by visual field movement can be suppressed if the division width is optimized.

Figure 30A:
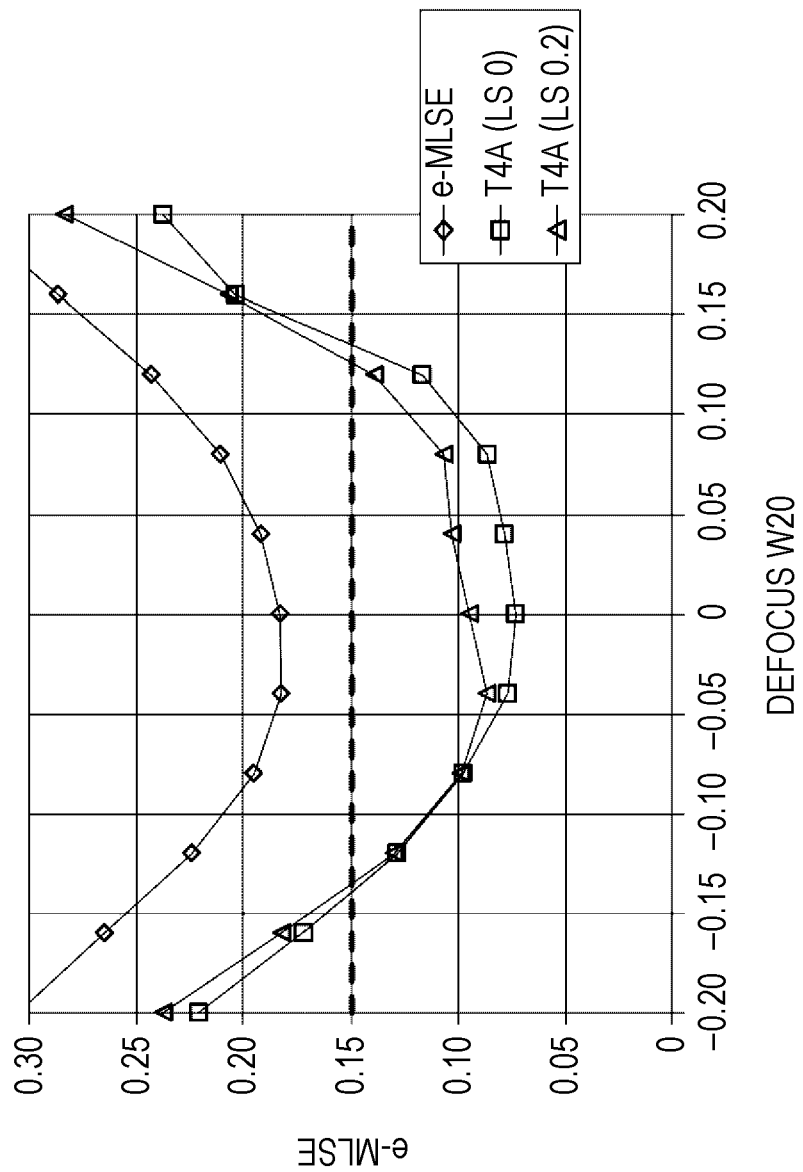
FIGS. 30A to 30C are graphs indicating an influence of a lens shift upon defocus characteristics.
Figure 30B:
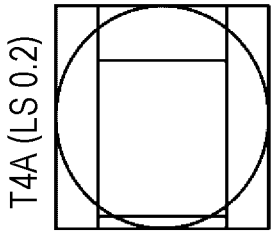
Figure 30C:
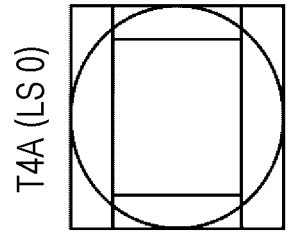

A change of defocus characteristics caused by pseudo visual field movement (0.1 shift and 0.2 shift) concerning the pattern T4A is illustrated in FIG. 30A. FIG. 30B illustrates a 0.2 shift, and FIG. 30C illustrates no shift. As appreciated from FIG. 30A, the focus margin width caused by visual field movement can be ensured.

Figure 31A:
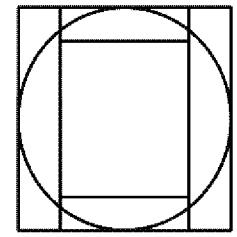
Figure 31A:
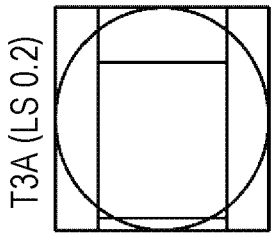
Figure 31A:
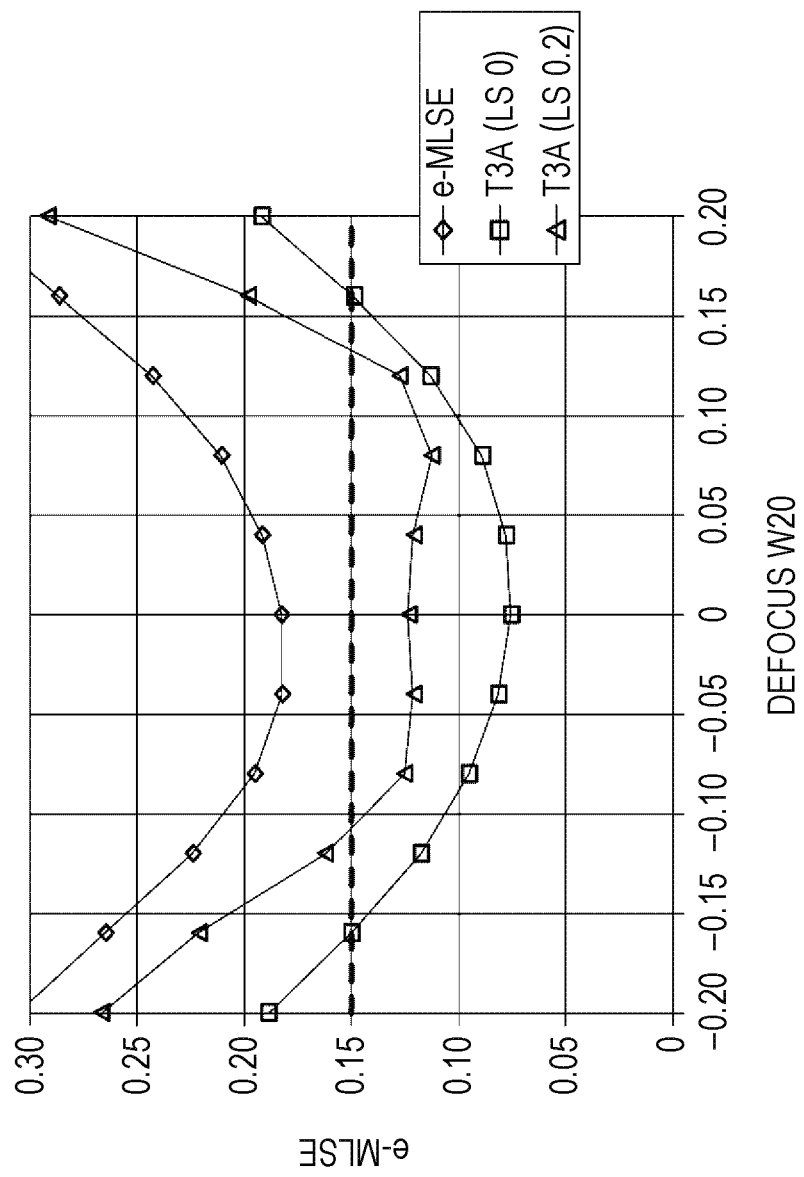

A change of defocus characteristics caused by pseudo visual field movement (0.1 shift and 0.2 shift) concerning the pattern T3A is illustrated in FIG. 31A. FIG. 31B illustrates a 0.2 shift, and FIG. 31C illustrates no shift. As appreciated from FIG. 31A, the defocus margin width caused by visual field movement becomes abruptly narrow. In the case of the pattern T3A, therefore, it is necessary to suppress the visual field movement quantity.

"Pattern of Three Channels that is Strong Against Lens Shift"

As appreciated from the characteristics illustrated in FIG. 26A, the pattern R3 is strong against the lens shift in three channels as compared with the pattern T3A. In other words, the radial coma aberration margin becomes ±0.125 (corresponding to ±0.44 deg.) without a lens shift, and becomes ±0.125 (corresponding to ±0.44 deg.) with a lens shift of 0.2.

Figure 32B:
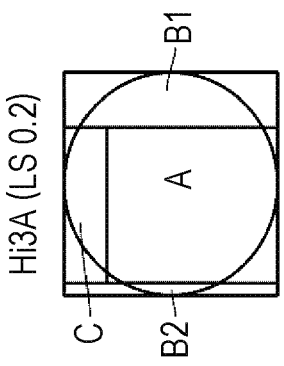
FIGS. 32A to 32C are graphs indicating an influence of a lens shift upon radial coma aberration characteristics.
Figure 32C:
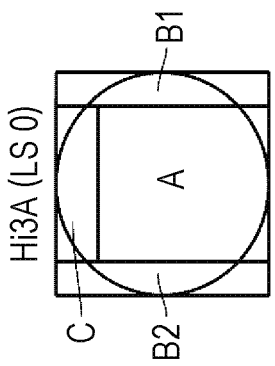
Figure 32A:
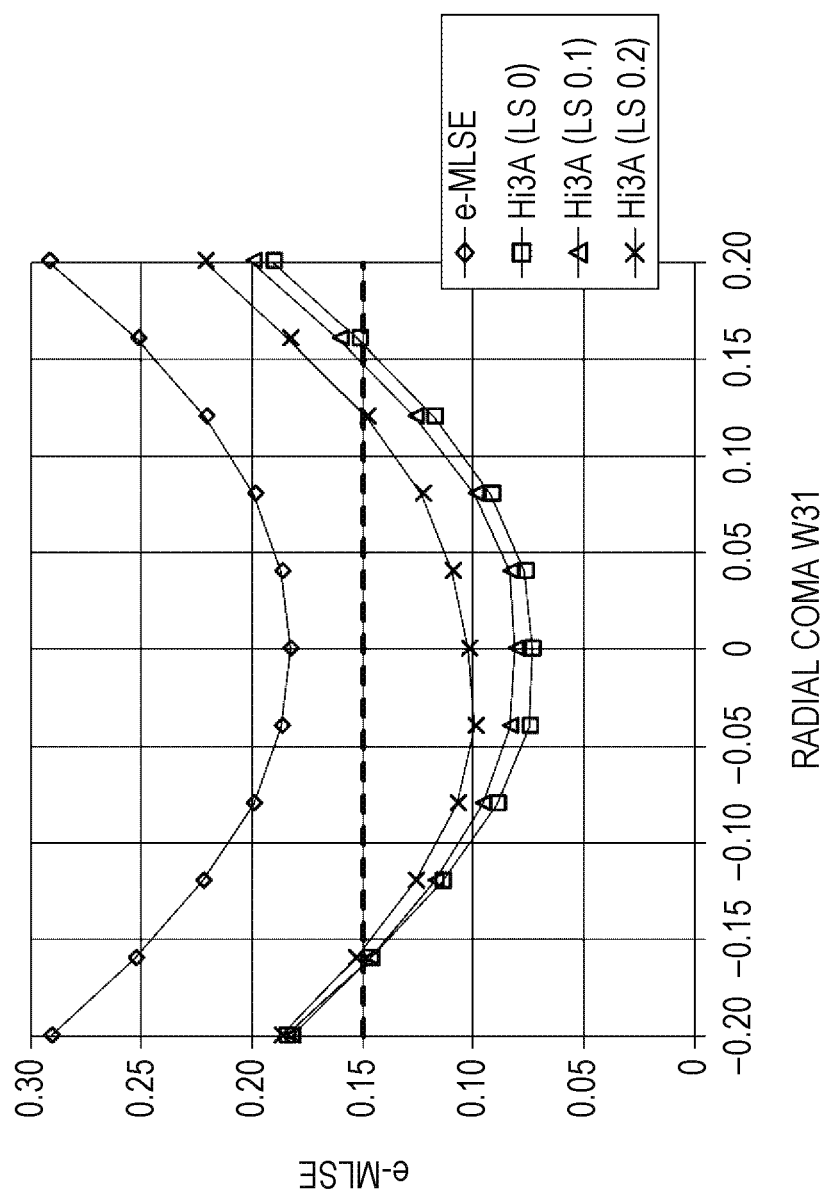

As a pattern of three channels that is strong against a lens shift, there is Hi3A. A change of radial coma aberration characteristics caused by pseudo visual field movement (0.1 shift and 0.2 shift) concerning the pattern Hi3A is illustrated in FIG. 32A. FIG. 32B illustrates a 0.2 shift, and FIG. 32C illustrates no shift. As appreciated from FIG. 32A, the margin width caused by visual field movement can be ensured to the same degree as the pattern T4A (see FIGS. 27A to 27C) in four channels. In other words, the radial coma aberration margin becomes ±0.16 (corresponding to ±0.56 deg.) without a lens shift, and becomes −0.155 to +0.12 (corresponding to −0.54 deg. to +0.42 deg.) with a lens shift of 0.2.

Figure 33A:
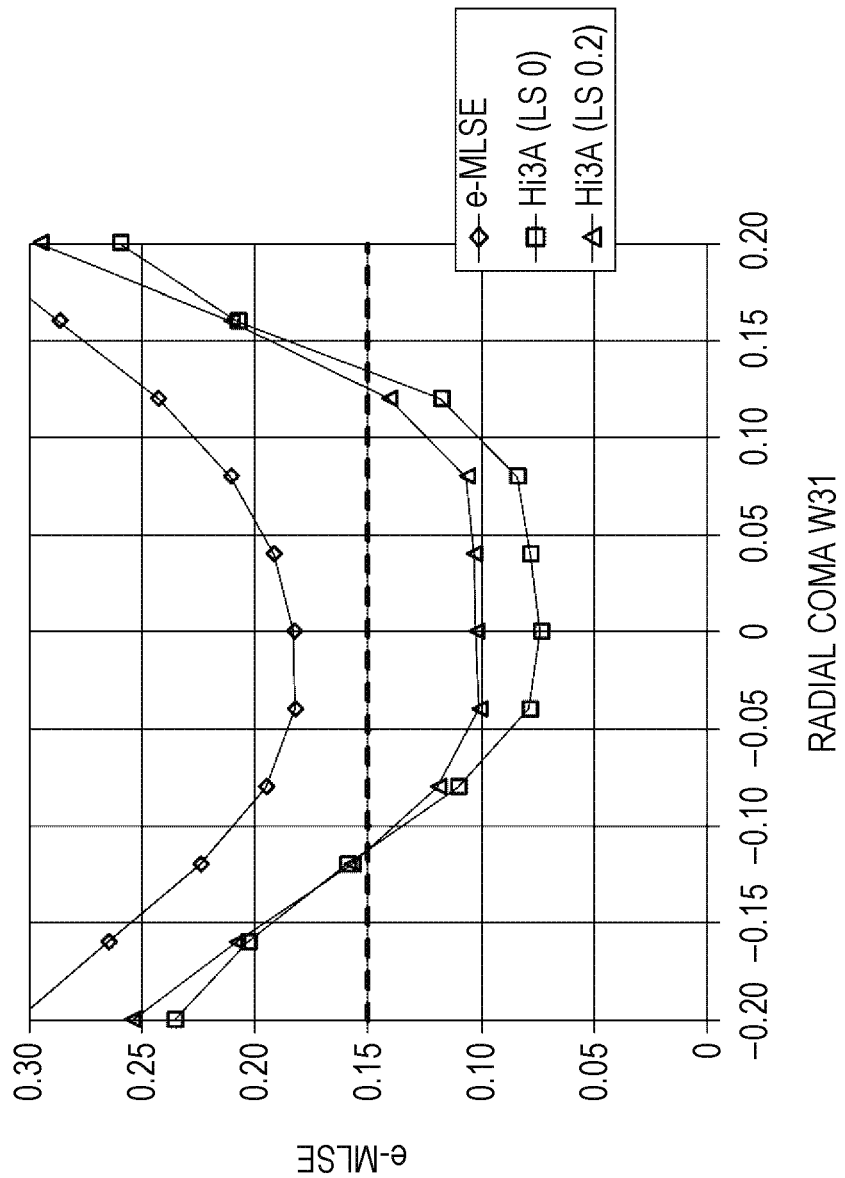
Figure 33A:
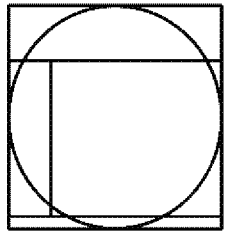
Figure 33A:
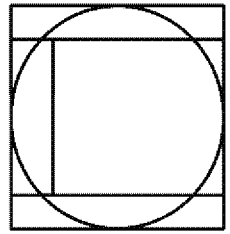

A change of defocus characteristics caused by pseudo visual field movement (0.1 shift and 0.2 shift) concerning the pattern Hi3A is illustrated in FIG. 33A. FIG. 33B illustrates a 0.2 shift, and FIG. 33C illustrates no shift. As appreciated from FIG. 33A, the margin width caused by visual field movement can be ensured to the same degree as the pattern T4A (see FIGS. 29A to 29C) in four channels. In other words, the defocus margin becomes 0.25 (corresponding to ±0.21 μm) without a lens shift, and becomes 0.24 (corresponding to ±0.20 μm) with a lens shift of 0.2.

"Pattern of Four Channels that is Strong Against Lens Shift"

As appreciated from the characteristics illustrated in FIG. 27A, the pattern T4A is strong against the lens shift in four channels as compared with the pattern T3A. In other words, the radial coma aberration margin becomes ±0.17 (corresponding to ±0.60 deg.) without a lens shift, and becomes −0.17 to +0.135 (corresponding to −0.60 deg. to +0.47 deg.) with a lens shift of 0.2.

As a pattern of four channels that is strong against a lens shift, there is X4A. A change of radial coma aberration characteristics caused by pseudo visual field movement (0.1 shift and 0.2 shift) concerning the pattern X4A is illustrated in FIG. 34A. FIG. 34B illustrates a 0.2 shift, and FIG. 34C illustrates no shift. As appreciated from FIG. 34A, there is little margin change of radial coma aberration caused by visual field movement. In other words, the radial coma aberration margin becomes ±0.17 (corresponding to ±0.60 deg.) without a lens shift, and becomes ±0.16 (corresponding to ±0.56 deg.) with a lens shift of 0.2.

Figure 35B:
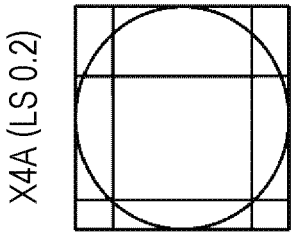
FIGS. 35A to 35C are graphs indicating an influence of a lens shift upon defocus characteristics.
Figure 35C:
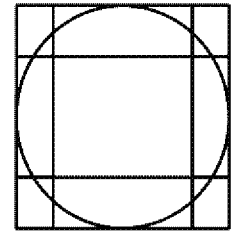
Figure 35A:
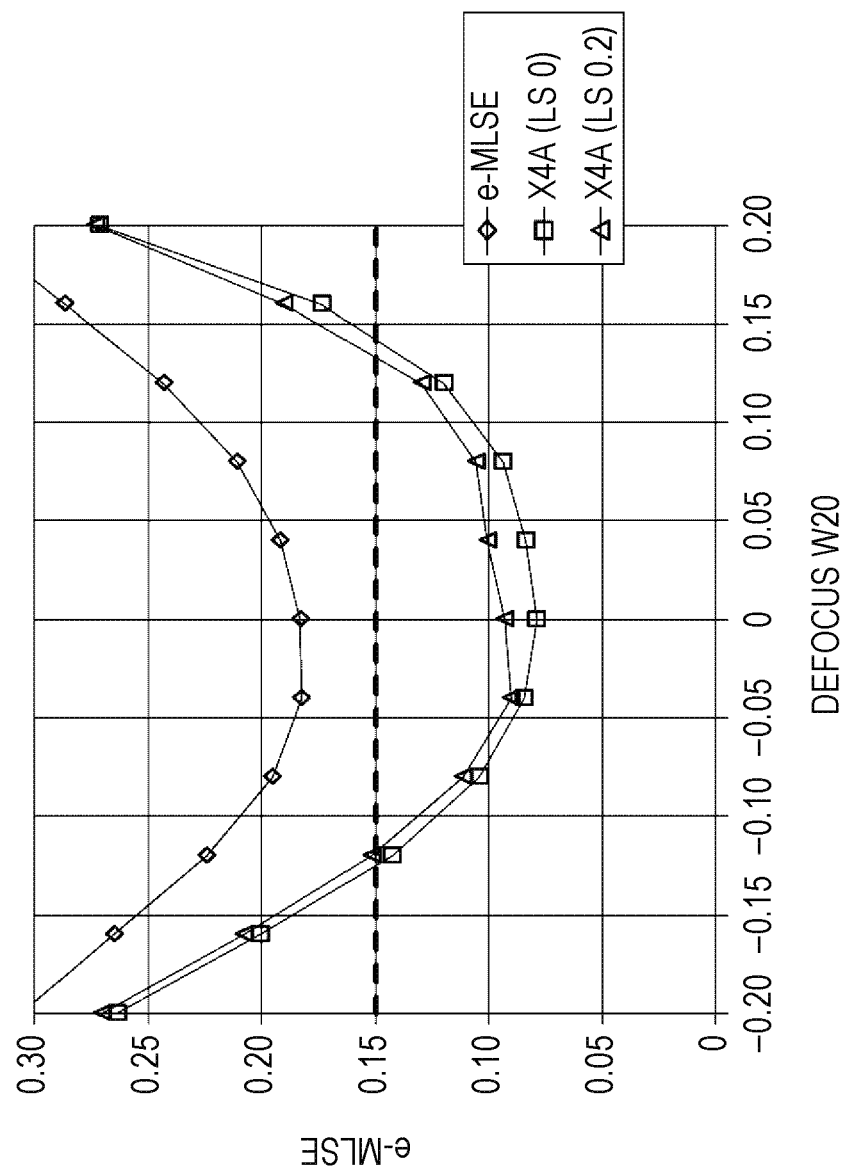

A change of defocus characteristics caused by pseudo visual field movement (0.1 shift and 0.2 shift) concerning the pattern X4A is illustrated in FIG. 35A. FIG. 35B illustrates a 0.2 shift, and FIG. 35C illustrates no shift. As appreciated from FIG. 35A, a change of the defocus margin width caused by visual field movement is small. In other words, the defocus margin becomes 0.265 (corresponding to ±0.225 μm) without a lens shift, and becomes 0.25 (corresponding to ±0.21 μm) with a lens shift of 0.2.

"Effect 2 Obtained by Making Outside Region Resultant from Division in Radial Direction Independent"

Figure 36:
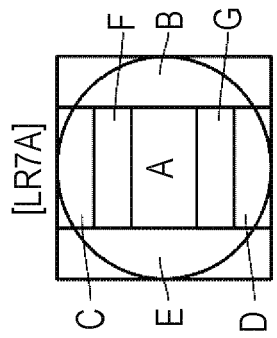
FIG. 36 is a schematic diagram illustrating concrete examples of a pattern of region division.
Figure 36:
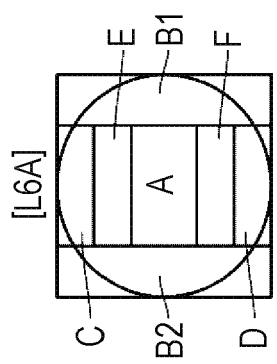
Figure 36:
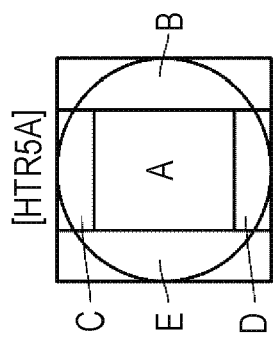
Figure 36:
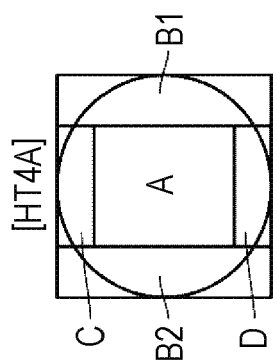
Figure 37:
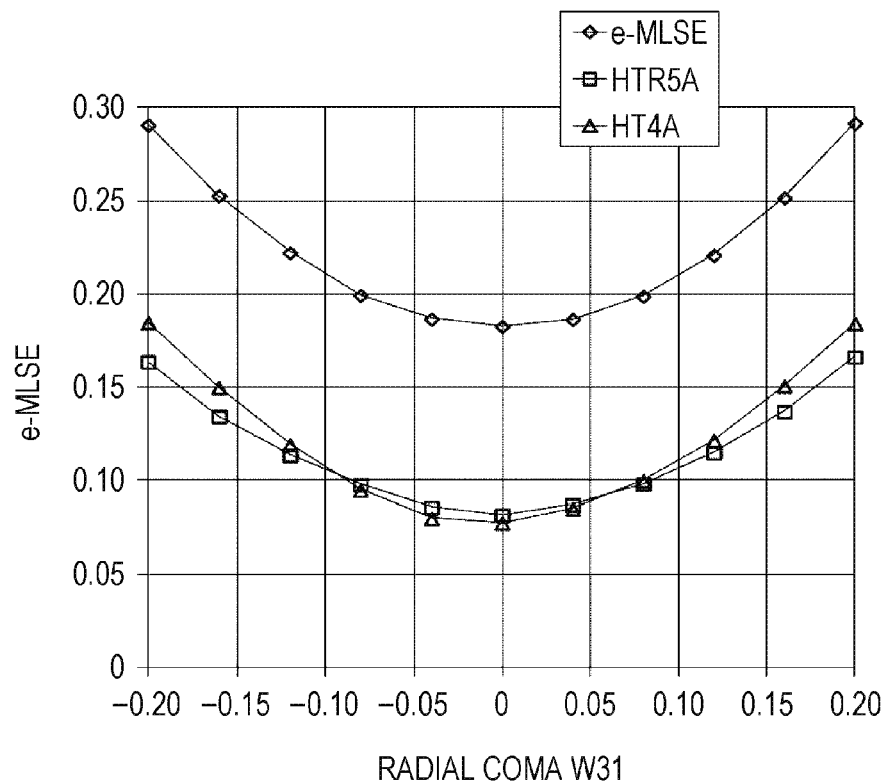
FIG. 37 is a graph used to explain a coma aberration margin in the radial direction.
Figure 38:
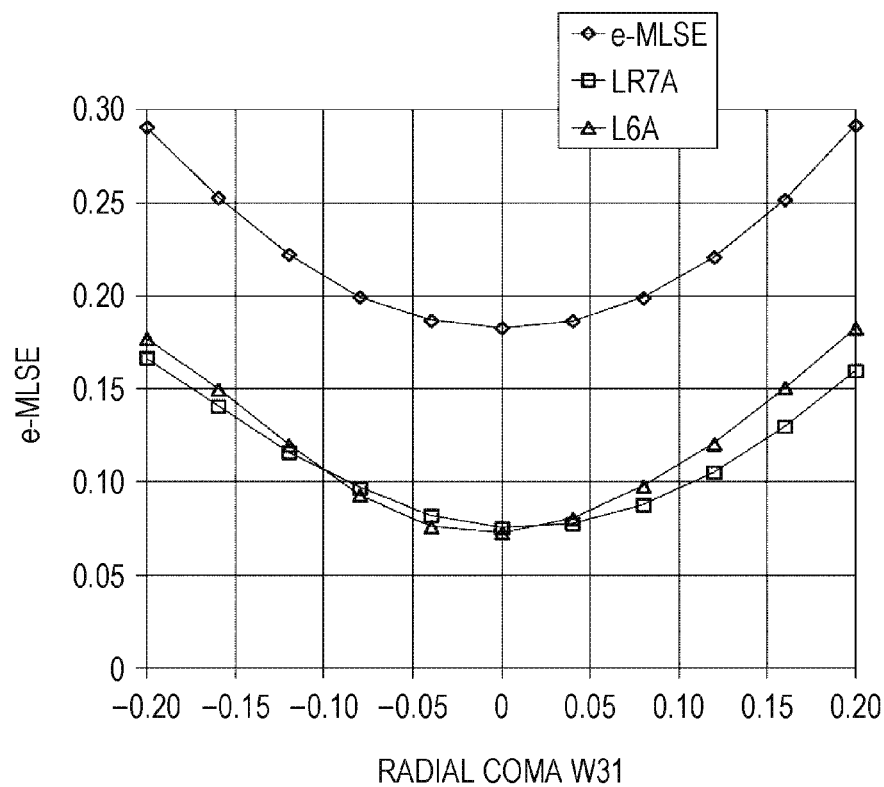
FIG. 38 is a graph used to explain a coma aberration margin in the radial direction.

FIG. 36 illustrates patterns HT4A, HTR5A, L6A and LR7A. Radial coma aberration characteristics of these patterns are illustrated in FIG. 37 and FIG. 38. FIG. 37 illustrates radial coma aberration characteristics in the case where region division is not conducted, in the pattern HT4A, and in the pattern HTR5A. FIG. 38 illustrates radial coma aberration characteristics in the case where region division is not conducted, in the pattern LR7A, and in the pattern L6A. As appreciated from FIG. 37 and FIG. 38, the radial coma aberration margin can be expanded by combining with the division in the tangential direction.

As described above, in a case of implementing a higher density on an optical disc by achieving a higher density in a line density direction by shortening the channel bit length, that is, the mark length and by achieving a higher density in a track density direction by narrowing the track pitch, recording marks are arranged two dimensionally on a signal recording surface.

Figure 39:
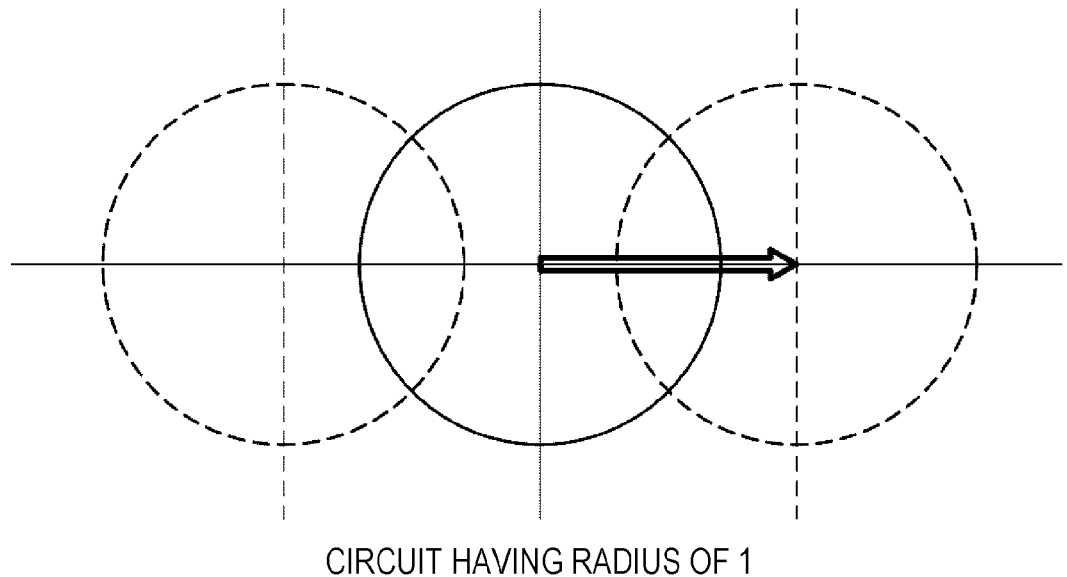
FIG. 39 is a schematic diagram used to explain an amount of shift of diffracted light.
Figure 40:
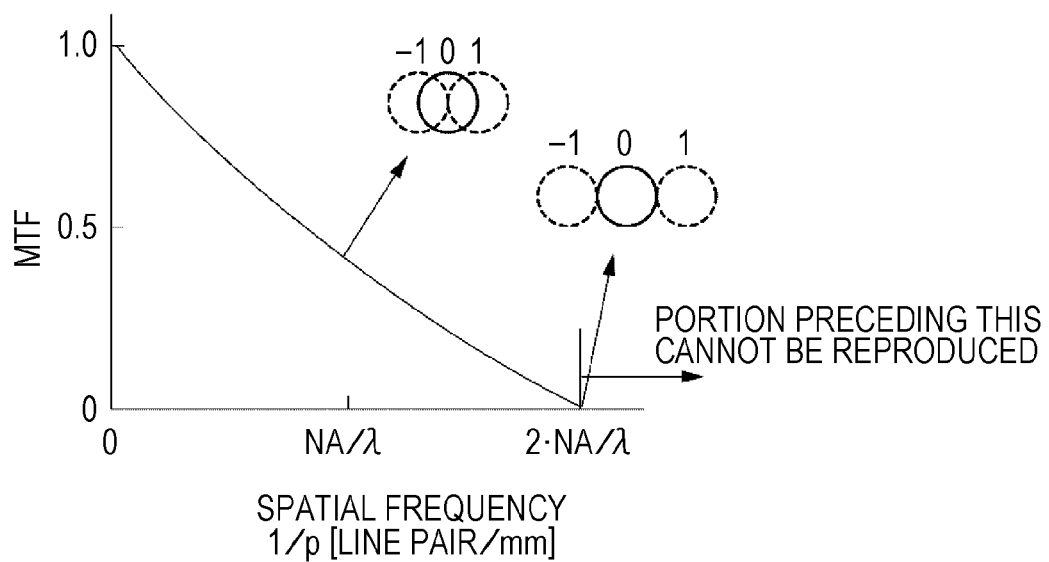
FIG. 40 is a graph illustrating spatial frequency characteristics of a modulation transfer function (MTF).

The reproduced signals in the optical disc are used for detecting a change in brightness caused by overlapping and interference of diffracted light beams generated by the periodic structure of recording marks, grooves, and the like. As illustrated in FIG. 39, when the pupil radius is set to 1, in the ±first order diffracted light beams according to the periodic structure of the period p, the shift amount of the center is represented by $\lambda/(NA \cdot p)$. In addition, as the overlap is increased, the amplitude of the reproduced signal is increased, and as the overlap is decreased, the amplitude is decreased. When there is no overlap, that is, when the shift amount becomes $\lambda/(NA \cdot p)=2$, the amplitude becomes zero. As a result, the spatial frequency characteristics of the MTF (Modulation Transfer Function) are the same as illustrated in FIG. 40. From $\lambda/(NA \cdot p)=2$, the cutoff spatial frequency becomes $1/p=2 NA/\lambda$, and in the case where the periodic structure having a smaller period is continuously arranged, the amplitude becomes zero.

Figure 41:
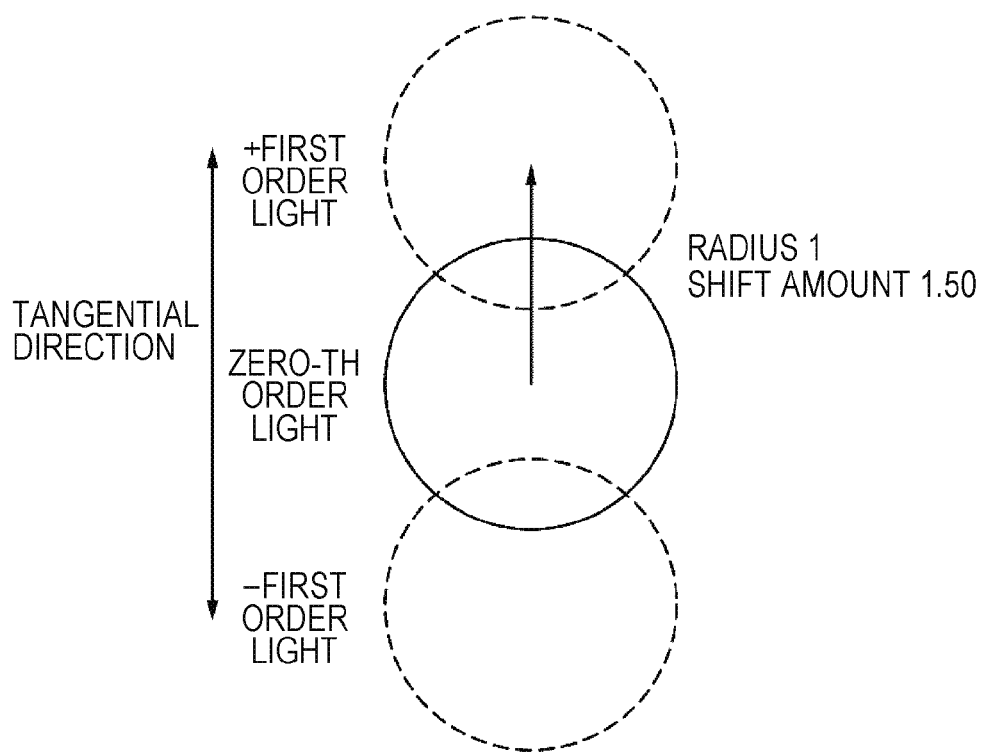
FIG. 41 is a schematic diagram used to explain shift of diffracted light.
Figure 42:
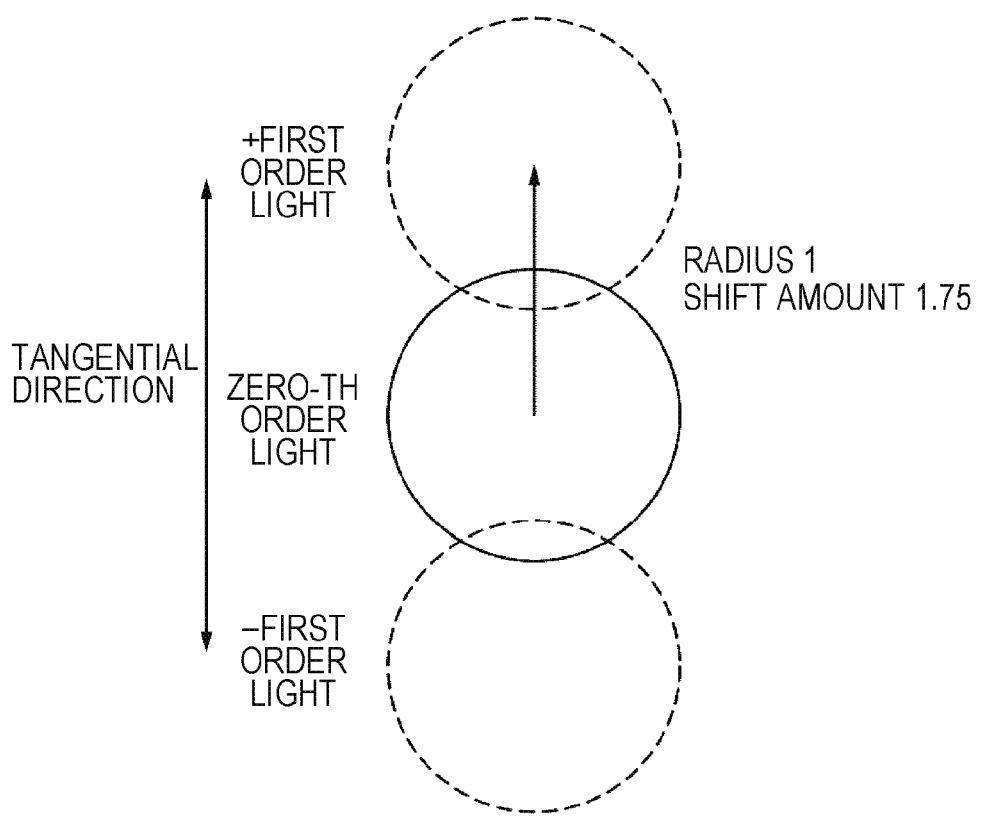
FIG. 42 is a schematic diagram used to explain shift of diffracted light.

If these are applied to the above-described system of wavelength 405 nm and NA=0.85, from $1/p=2 NA/\lambda$, the period becomes $p=\lambda/(2 NA)=238$ nm, and the minimum reproducible periodic structure having the period of 238 nm is formed. In other words, this denotes that in the system of 53 nm/channel bit at RLL (1, 7) PP given as an example of low line density, since the shortest 2T marks/space becomes 53 nm×2×2=212 nm, the frequency exceeds the cutoff spatial frequency, and the continuation of the 2T marks/space leads to the amplitude of zero. In the periodic structure corresponding to the 3T marks/space 53 nm×3×2=318 nm, since the shift amount becomes $\lambda/(NA \cdot p)=1.50$, the region where the zero-th order light and the ±first order light overlap with each other in FIG. 41 is contributed to the signal reproduction. Similarly, in the system of 45.47 nm/channel bit given as an example of high line density, since the shortest 2T marks/space becomes 45.47 nm×2×2=182 nm, the frequency exceeds the cutoff spatial frequency, and in the periodic structure corresponding to the 3T marks/space 45.47 nm×3×2=273 nm, since the shift amount becomes $\lambda/(NA \cdot p)=1.75$, the region where the zero-th order light and the ±first order light overlap with each other in FIG. 42 is contributed to the signal reproduction. In the density where the amplitude of the 2T marks/space becomes zero according to the PRML, although the signal processing does not fail, the quality of reproduction of the short marks is an important factor.

As described above, in the electric optical filter characteristics of the patterns H3A and HT4A, the outside region in the tangential direction becomes a filter which high-band-passes the frequency bands corresponding to the short marks such as 3T or 4T, and the central region becomes a low-pass like filter which passes a lot of the frequency bands corresponding to the long marks of 5T or more. As can be understood from the comparison of FIG. 41 with FIG. 42, this denotes that the region which is to be contributed to the reproduction of the bands corresponding to the short marks in a spatially optical manner and the region which is to be contributed to the reproduction of the bands corresponding to the long marks are efficiently split; and with respect to each region, the frequency component where the ratio of the reproduced signal component of a target track is to be increased is emphasized and the frequency component where the ratio of the reproduced signal component of adjacent tracks is to be increased is suppressed, blocked, or cancelled by balancing with other signals, so that the improvement of the quality of reproduced signals of the target track is implemented. Furthermore, it can be understood that, in the case of the pattern HT4A, the signals from the two outside regions in the tangential direction are allowed to have phase difference, so that detection of the short mark with a higher sensitivity as compared with reproduced amplitude using a simple total sum signal becomes possible. However, as can be understood from the comparison of FIG. 41 with FIG. 42, in the case of a high line density example, since the region which is contributed to reproduction of the 3T marks/space as well as 2T marks/space becomes small, in the region which is greatly disadvantageous to the reproduction using the simple total sum signal, the deterioration in characteristics is suppressed due to the high sensitivity according to the detection of the phase difference.

In this manner, in order to split the signal into a plurality of signals having different bands in the line density direction and/or the track density direction in a spatially optical manner, the regions are divided in the tangential direction and the radial direction; and electric filters having different optimal characteristics such as a high pass filter, a low pass filter, a band pass filter, and a band stop (or notch) filter are applied to the signals from the respective regions, and after that, these signals are combined, so that good reproduced signals where inter-symbol interference and leakage and insertion of signals from the adjacent tracks are decreased can be obtained.

Figure 43:
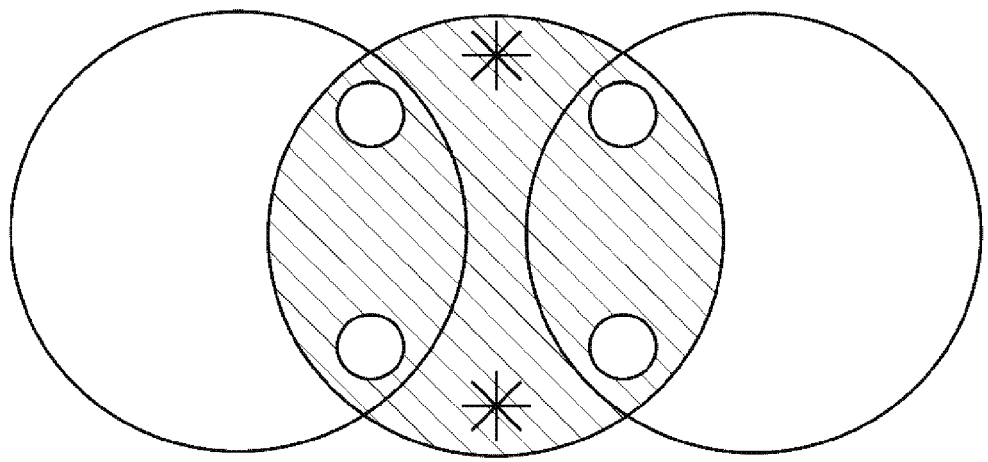
FIG. 43 is a schematic diagram used to explain optimization of an optical filter.

Heretofore, the case of simple region division in the tangential direction and the radial direction has been described. However, as the filter which effectively splits the signals of the regions having the bands in a spatially optical manner, as described heretofore, besides the signals of the region of the zero-th order light, which corresponds to the reproduction of the short marks as the diffracted light according to the track structure and is indicated by * in FIG. 43, the signal of the region (indicated by O) which interferes with the ±first order diffracted light according to the track structure is split, so that good e-MLSE can be maintained at the perturbation center position, and the radial coma aberration margin and various margins can be widened.

[Pattern IVT4]

Figure 44:
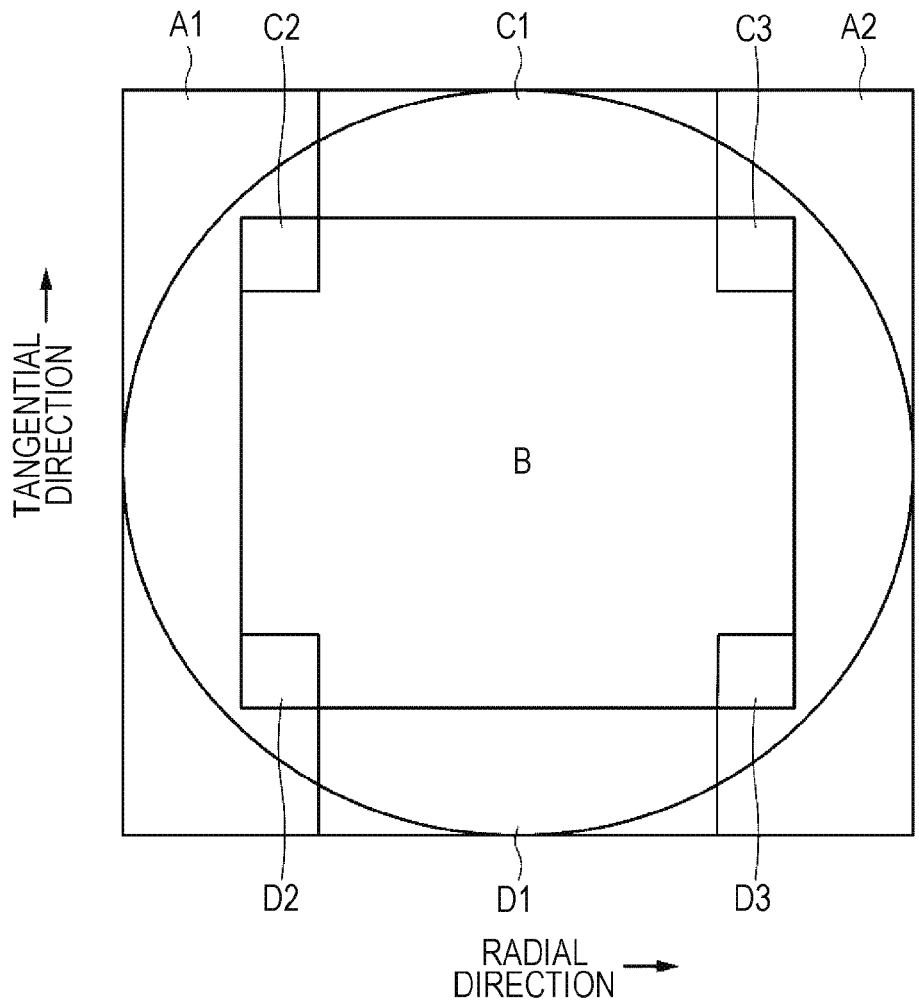
FIG. 44 is a schematic diagram illustrating a region division pattern IVT4.

A pattern IVT4 illustrated in FIG. 44 is an example in which there are 4 channels. In other words, a beam is divided into an outside region A (=A1+A2) in the radial direction, a central region B, an upper region C (C1+C2+C3) in the tangential direction, and a lower region D (D1+D2+D3). Signals of four channels corresponding to the respective regions are obtained. Here, the region division position in the radial direction is set to ±0.5 and ±0.7 where the pupil radius is 1.0. The region division position in the tangential direction is set to ±0.45 and ±0.65 where the pupil radius is 1.0.

The above-described pattern IVT4 will be described on the basis of simulation results for the pattern. Simulation conditions are the same as those of the above-described case of "low line density" and are as follows.

LD35.18 (GB) . . . 0.053 μm/channel bit, and when Tp=0.32 μm, the plane capacity becomes 35.18 GB.
Tp=0.225 μm (for each of the land and groove)
NA=0.85
PR (1233321)
Evaluation index: e-MLSE
Mark width=Tp×0.7
Disc noise and amplifier noise are present
"Reproduction Performance"

Simulation results of reproduction performance concerning the pattern IVT4 are illustrated in FIGS. 45 to 49. These diagrams illustrate effects of region division in the pattern IVT4 in the case of low line density. In each diagram, the e-MLSE represents characteristics in the case where region division is not conducted.

Figure 45:
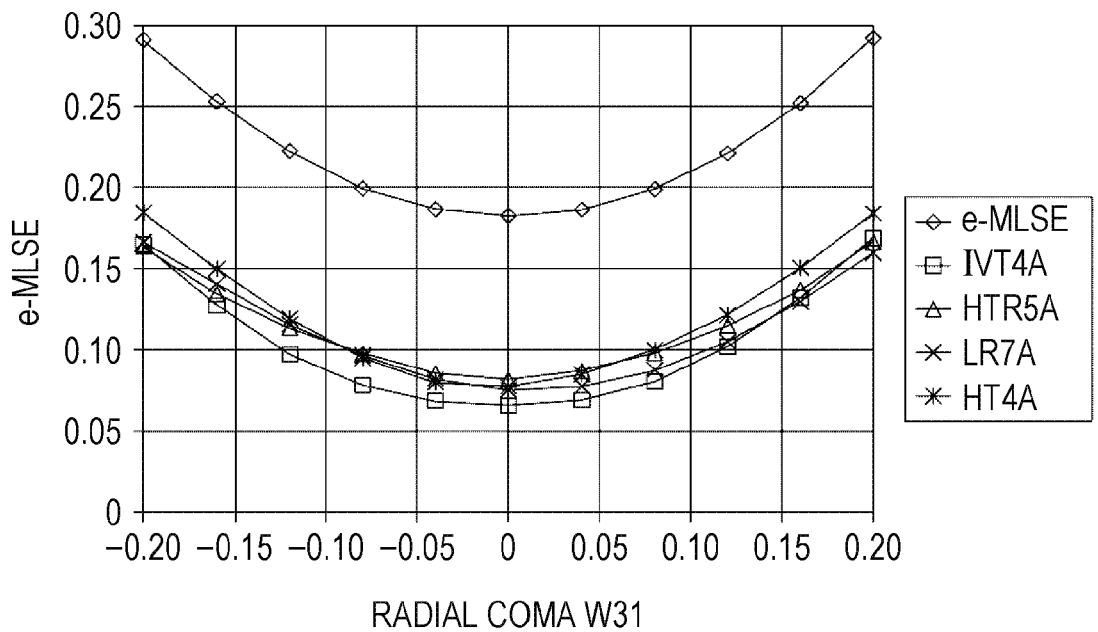
FIG. 45 is a graph for explaining a margin for coma aberration in a radial direction concerning the pattern IVT4.

FIG. 45 illustrates the radial coma aberration margin of the pattern IVT4 in comparison with a radial coma aberration margins W31 of the above-described other patterns HTR5A, LR7A, and HT4A. Similarly to the above-described other graphs, the ordinate axis indicates the index e-MLSE, and the abscissa axis indicates the normalized radial coma aberration. It is found out that the radial disc skew margin of the pattern IVT4 is better when compared with those of other patterns.

Figure 46:
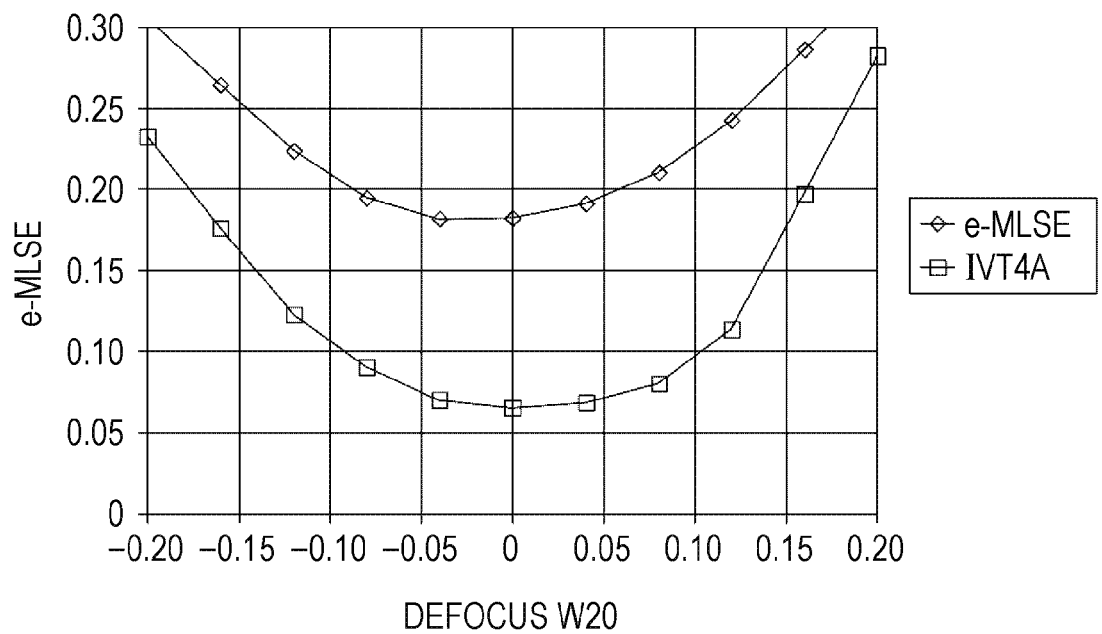
FIG. 46 is a graph for explaining a defocus margin concerning the pattern IVT4.

FIG. 46 illustrates the defocus margin, and the abscissa axis of the graph illustrated in FIG. 46 indicates a normalized defocus quantity W20 which is normalized by the wavelength. A value 0 means that the defocus quantity is 0. At the time of actual reproduction, defocus is generated. Therefore, it is necessary to have a margin for the defocus.

In the graph of (normalized defocus quantity versus index), the smaller the value of e-MLSE is, the higher the reproduction performance becomes. As an example, it is desirable that the value of e-MLSE be approximately 0.15 or less. Therefore, the defocus margin corresponds to a width of a range in which the value of e-MLSE becomes approximately 0.15 or less. The larger the width is, the larger the defocus margin becomes. The pattern IVT4 has a sufficient margin.

Figure 47:
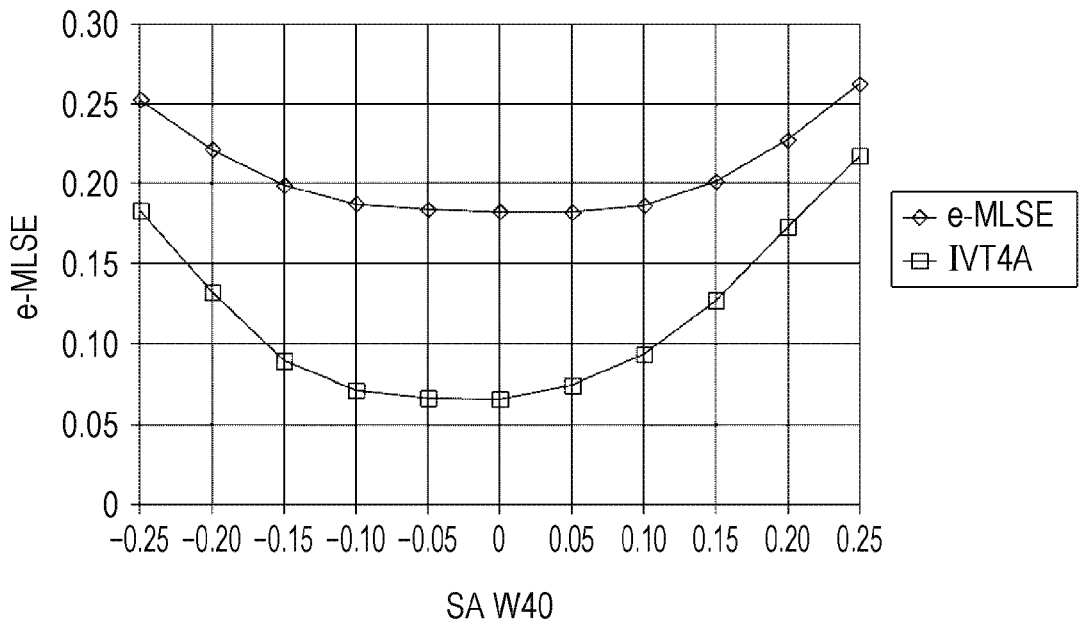
FIG. 47 is a graph for explaining a spherical aberration margin concerning the pattern IVT4.

FIG. 47 illustrates a margin for spherical aberration SA. The abscissa axis of the graph illustrated in FIG. 47 indicates a normalized spherical aberration amount W40. The pattern IVT4 has a sufficient spherical aberration margin.

Figure 48:
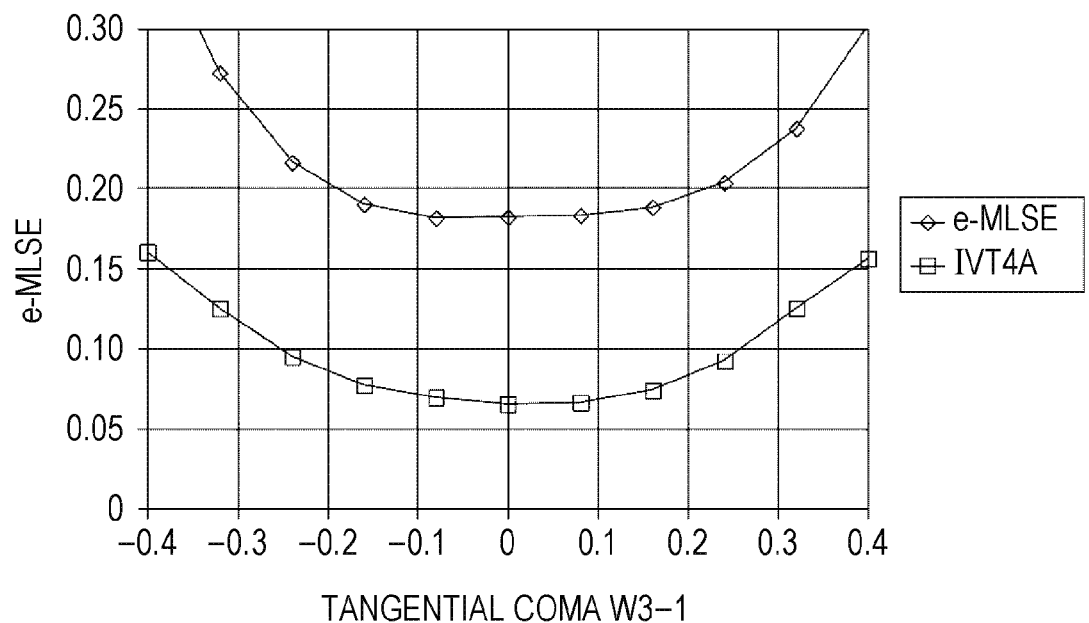
FIG. 48 is a graph for explaining a margin for coma aberration in a tangential direction concerning the pattern IVT4.

FIG. 48 illustrates a tangential coma aberration margin. The abscissa axis of the graph illustrated in FIG. 48 indicates the normalized tangential coma aberration amount W3-1. The pattern IVT4 has a sufficient tangential coma aberration margin.

Figure 49:
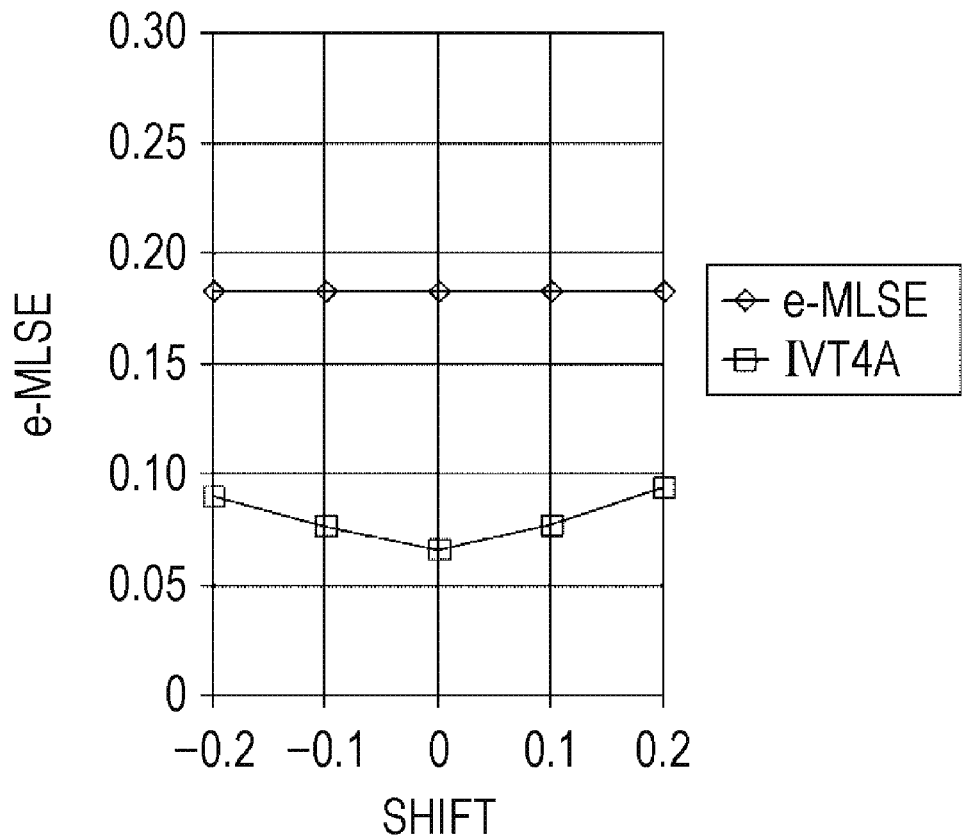
FIG. 49 is a graph for explaining a case where a pattern is shifted in a radial direction concerning the pattern IVT4.

FIG. 49 illustrates a margin in a case where the pattern is shifted in the radial direction. The abscissa axis of the graph illustrated in FIG. 49 indicates the normalized shift amount. As described above as a pseudo visual field movement, when the lens shift LS is conducted by only ±0.1 and ±0.2 including the direction, a change in e-MLSE in the case where other perturbations are zero is illustrated in the graph. As can be understood, the pattern IVT4 has a shift margin approximately equivalent to T4A.

"Electric Filter Optimized for Pattern IVT4"

Figure 50:
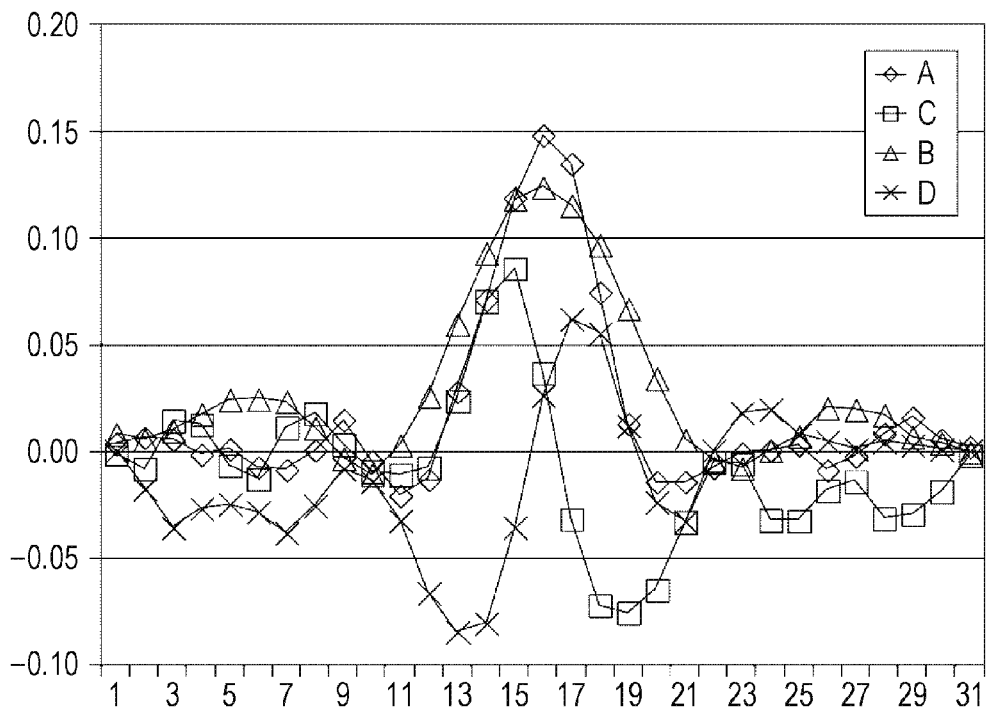
FIG. 50 is a graph illustrating an example of coefficients of taps of an electric filter optimized for the pattern IVT4.
Figure 51:
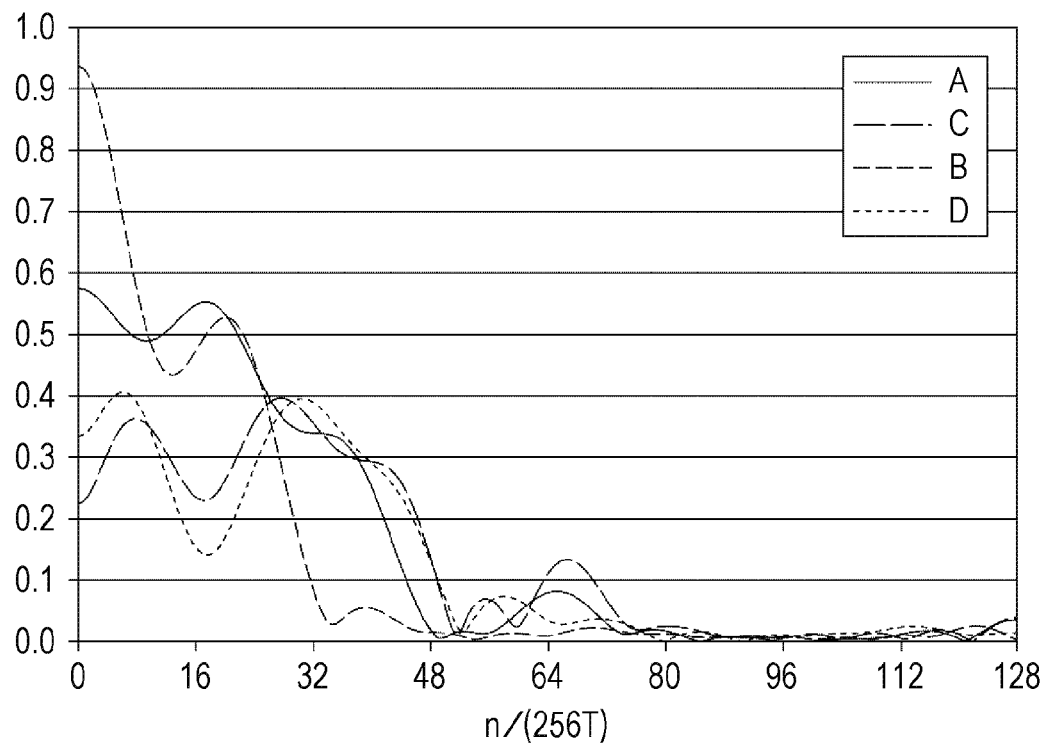
FIG. 51 is a graph illustrating frequency characteristics of an electric filter optimized for the pattern IVT4.
Figure 52:
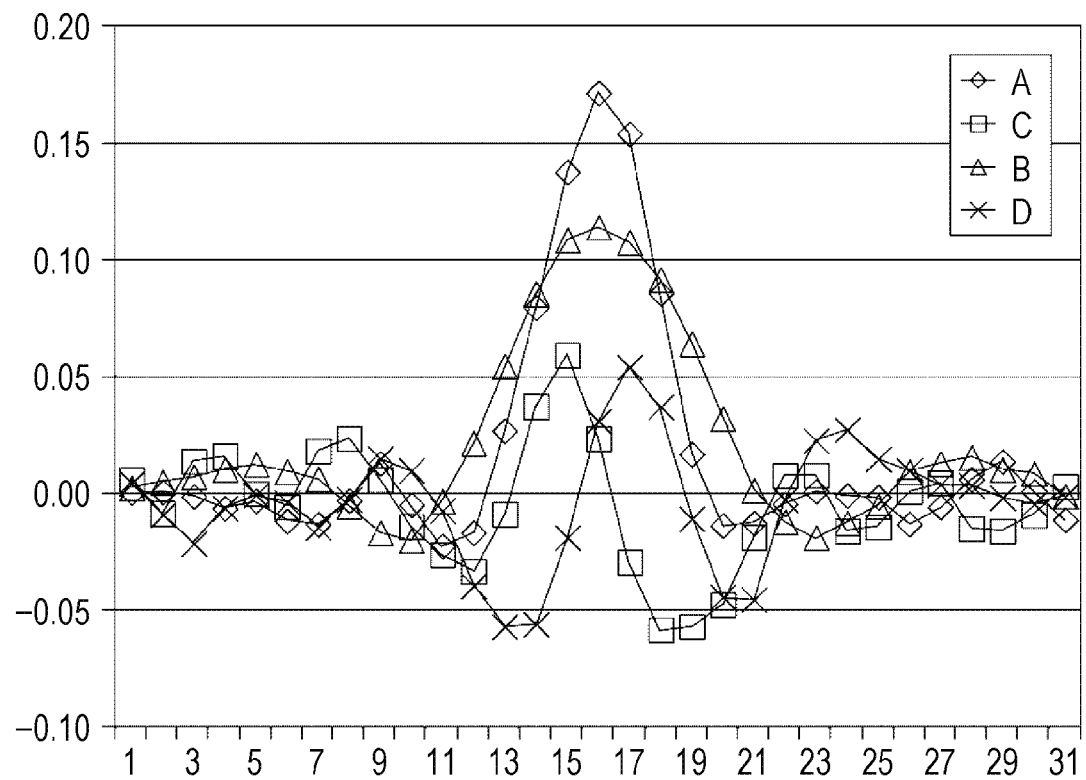
FIG. 52 is a graph illustrating an example of coefficients of taps of an electric filter optimized for the pattern IVT4.
Figure 53:
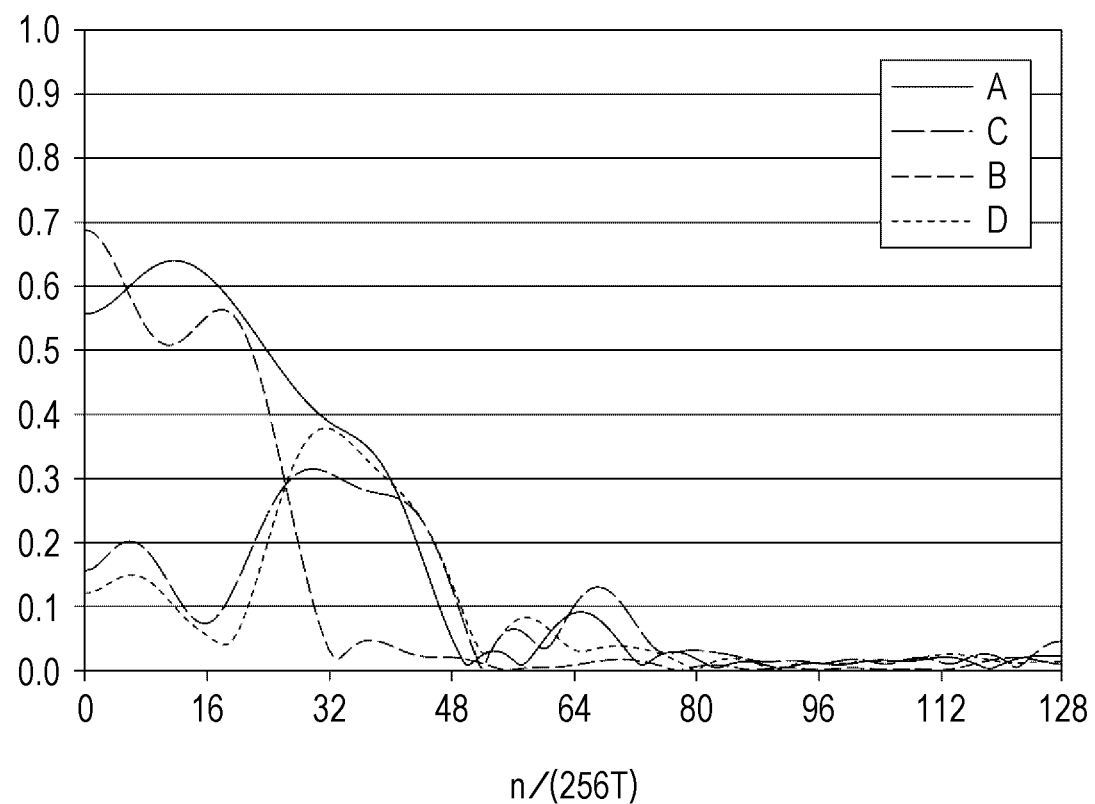
FIG. 53 is a graph illustrating frequency characteristics of an electric filter optimized for the pattern IVT4.

An electric filter optimized for the above-described pattern IVT4 will be described. An example of values of coefficients of 31 taps of the electric filter when W31=0, that is, at the perturbation origin in FIG. 45 is illustrated in FIG. 52. The electric filter is configured with an FIR filter. The frequency amplitude characteristics of the respective channels corresponding to the regions A to D in a case where such coefficients are set are illustrated in FIG. 53. In addition, an example of values of coefficients of 31 taps of the electric filter when W31=−0.16 is illustrated in FIG. 50. The frequency amplitude characteristics of the respective channels of A to D in a case where such coefficients are set are illustrated in FIG. 51.

In the frequency amplitude characteristics, the abscissa axis indicates n/(256T) (n: a value on the abscissa axis). For example, in a case where (n=64), it follows that ($^{64}/_{256}$T)= (¼T). For example, in a case where the RLL (1, 7) PP modulation scheme is used, the mark length is in the range of 2T to 8T, where "T" is the channel clock period. (¼T) is a frequency in a case where the mark of 2T is repeated. In the characteristics illustrated in FIGS. 51 and 53, in the bands corresponding to 4T (in the vicinity of a value 32 on the abscissa axis) and 3T (in the vicinity of a value 43 on the abscissa axis), the frequency amplitude characteristics of the channel C, D, and A are maintained almost in the same shapes irrespective of the existence of the radial coma aberration, so that desired electric optical filter characteristics are maintained. The pattern IVT4 leads to a radial disc skew margin which is better when compared with those of other patterns.

[Pattern NST6]

Figure 54:
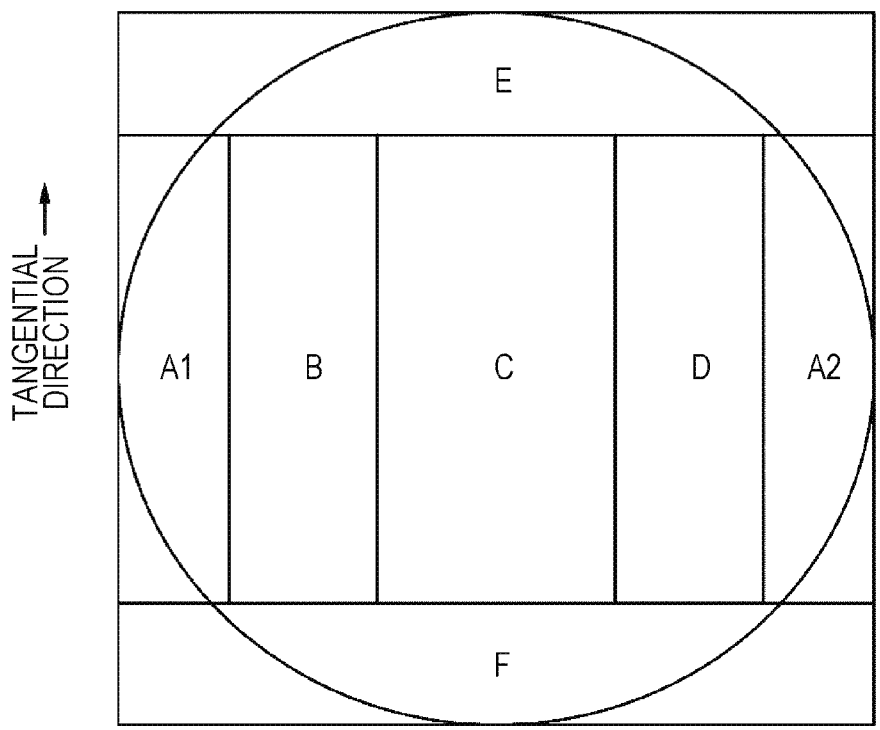
FIG. 54 is a schematic diagram illustrating a region division pattern NST6.

A pattern NST6 illustrated in FIG. 54 is an example in which there are 6 channels. The above pattern may be considered to be a pattern formed by further dividing the central region of the pattern T4A into three regions in the radial direction. In other words, a beam is divided into an outside region A (=A1+A2) in the radial direction, an upper region E in the tangential direction, a lower region F, and three center regions B, C, and D. Among the three regions in the central portion, the region closer to the region A1 becomes the region B, the region closer to the region A2 becomes the region D, and the most central region becomes the region C. Signals of six channels corresponding to the respective regions are obtained. Here, the region division position in the radial direction is set to ±0.3 and ±0.75 where the pupil radius is 1.0, and the region division position in the tangential direction is set to ±0.65 (the division position is finely adjusted by taking into consideration of changes in various characteristics due to the above-described region division of the pattern T4A, the division of the central region, and the like).

The above-described pattern NST6 will be described on the basis of simulation results for the pattern. Simulation conditions are the same as those of the above-described case of "low line density" and are as follows.

LD35.18 (GB) . . . 0.053 pa/channel bit
When Tp=0.225 μm (for each of the land and groove), the plane capacity becomes 50.0 GB.
NA=0.85
PR (1233321)
Evaluation index: e-MLSE
Mark width=Tp×0.7
Disc noise and amplifier noise are present As illustrated in FIG. 14, it can be understood that, as in the pattern H4C, if the division regions in the above-described pattern H3A having different bands in the tangential direction, that is, in the direction corresponding to the line density direction in a spatially optical manner are increased, the tangential coma aberration margin is expanded according to the number of division in the tangential direction. The application of this concept to the radial direction is the pattern NST6.

In the division pattern NST6, the number of division regions of which bands are different in the radial direction in a spatially optical manner is increased, and the signal corresponding to the region interfering with the ±first order diffracted light according to the track structure is also detected although the division pattern NST6 is different from the pattern IVT4. Accordingly, it is possible to maintain good e-MLSE at the perturbation center position and to widen the radial coma aberration margin and various margins.

"Reproduction Performance"

Simulation results of reproduction performance concerning the pattern NST6 are illustrated in FIGS. 55 to 59. These diagrams illustrate effects of region division in the pattern NST6 in the case of low line density. In each diagram, the e-MLSE represents characteristics in the case where region division is not conducted.

Figure 55:
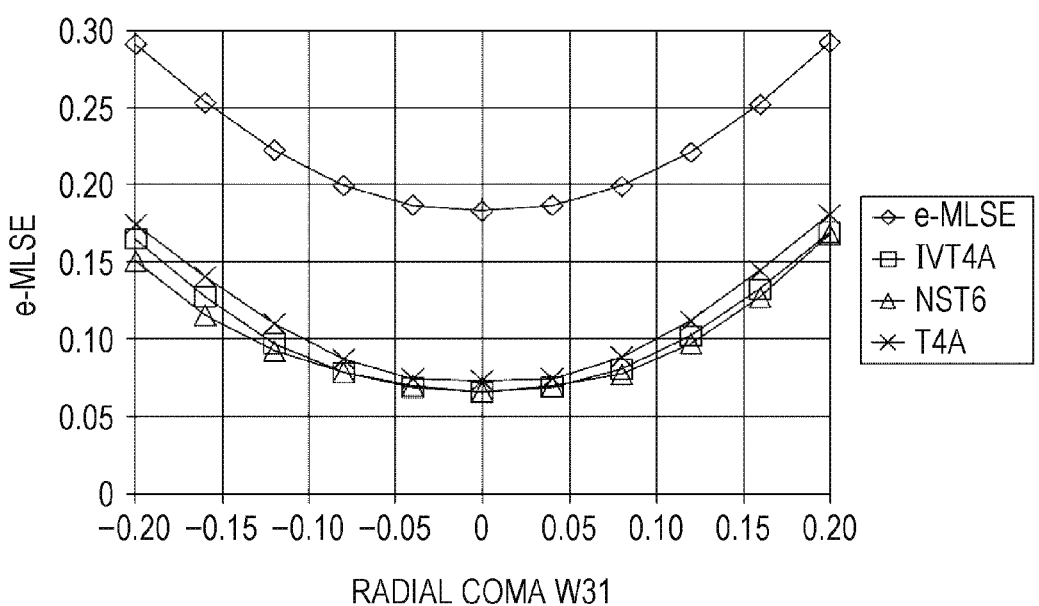
FIG. 55 is a graph for explaining a margin for coma aberration in a radial direction concerning the pattern NST6.

FIG. 55 illustrates the radial coma aberration margin of the pattern NST6, and the radial coma aberration margins of the above-described other patterns T4A and IVT4 for comparison. Similarly to the above-described other graphs, the ordinate axis indicates the index e-MLSE, and the abscissa axis indicates the normalized radial coma aberration W31. It is found out that, by increasing the number of division regions in T4A of which bands are different in the radial direction in a spatially optical manner and by detecting the signal corresponding to the region interfering with the ±first order diffracted light according to the track structure although the division pattern NST6 is different from the pattern IVT4, the radial disc skew margin of the pattern NST6 is better when compared with those of the patterns T4A and IVT4.

Figure 56:
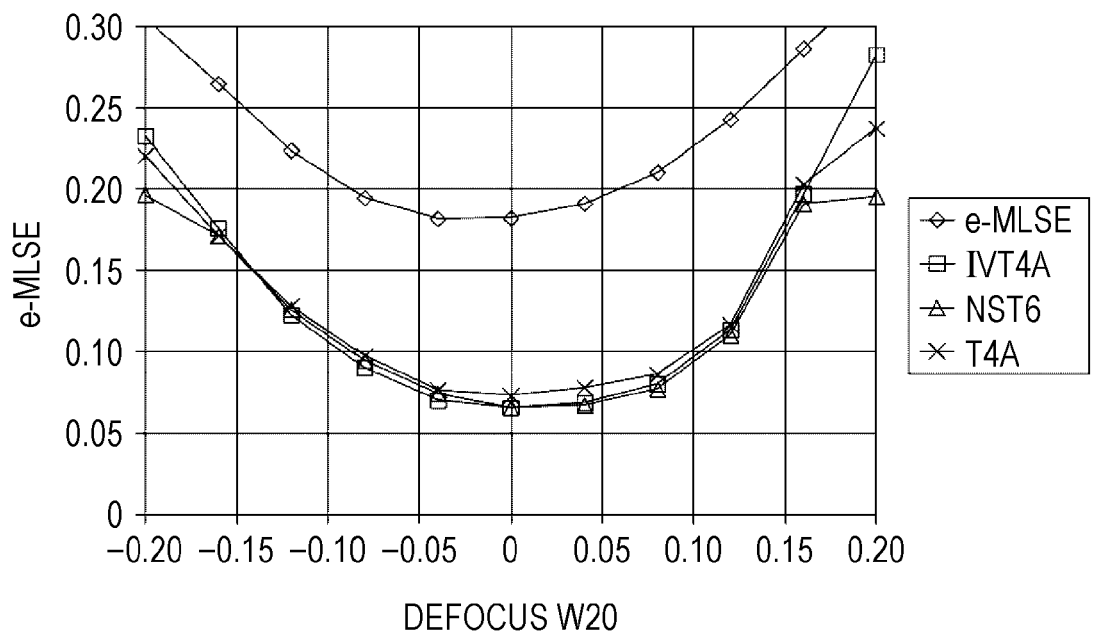
FIG. 56 is a graph for explaining a defocus margin concerning the pattern NST6.

FIG. 56 illustrates the defocus margin, and the abscissa axis of the graph illustrated in FIG. 56 indicates the normalized defocus quantity W20 which is normalized by the wavelength. The value 0 means that the defocus quantity is 0.

Figure 57:
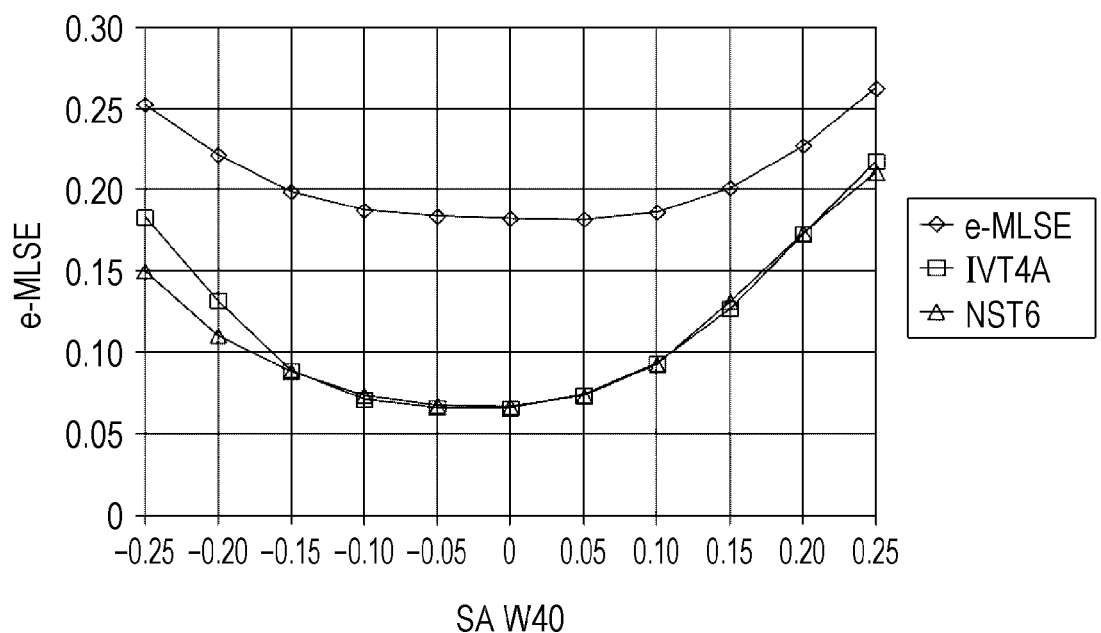
FIG. 57 is a graph for explaining a spherical aberration margin concerning the pattern NST6.

FIG. 57 illustrates a margin for spherical aberration SA. The abscissa axis of the graph illustrated in FIG. 57 indicates the normalized spherical aberration amount W40. It is found out that the spherical aberration margin of the pattern NST6 is better when compared with that of the pattern IVT4.

Figure 58:
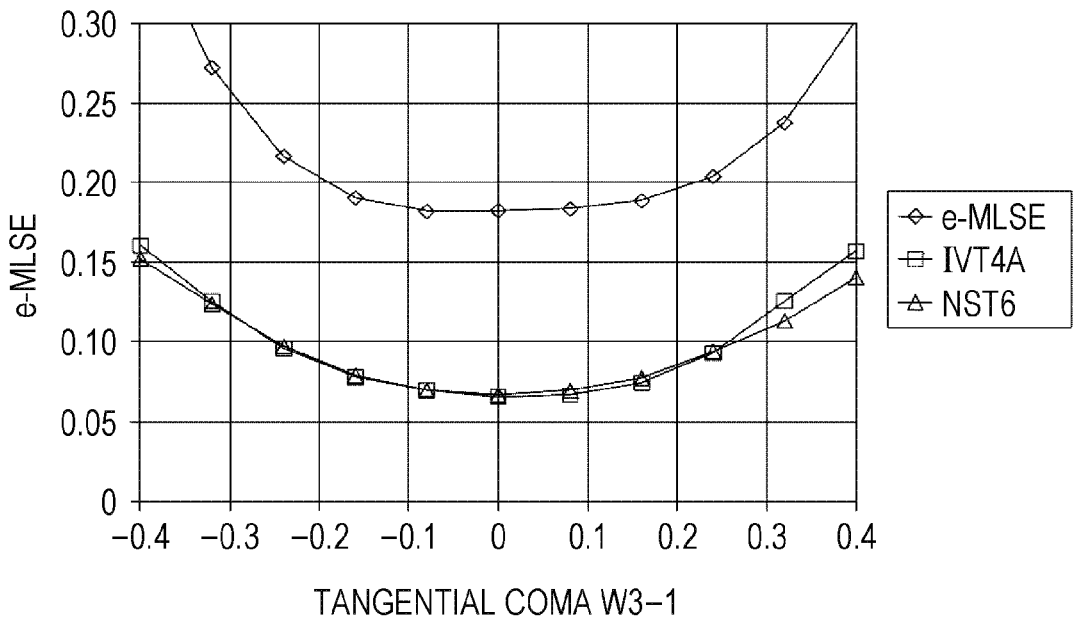
FIG. 58 is a graph for explaining a margin for coma aberration in a tangential direction concerning the pattern NST6.

FIG. 58 illustrates a tangential coma aberration margin. The abscissa axis of the graph illustrated in FIG. 58 indicates the normalized tangential coma aberration amount W3-1. It is found out that the tangential coma aberration margin of the pattern NST6 is better when compared with that of the pattern IVT4.

Figure 59:
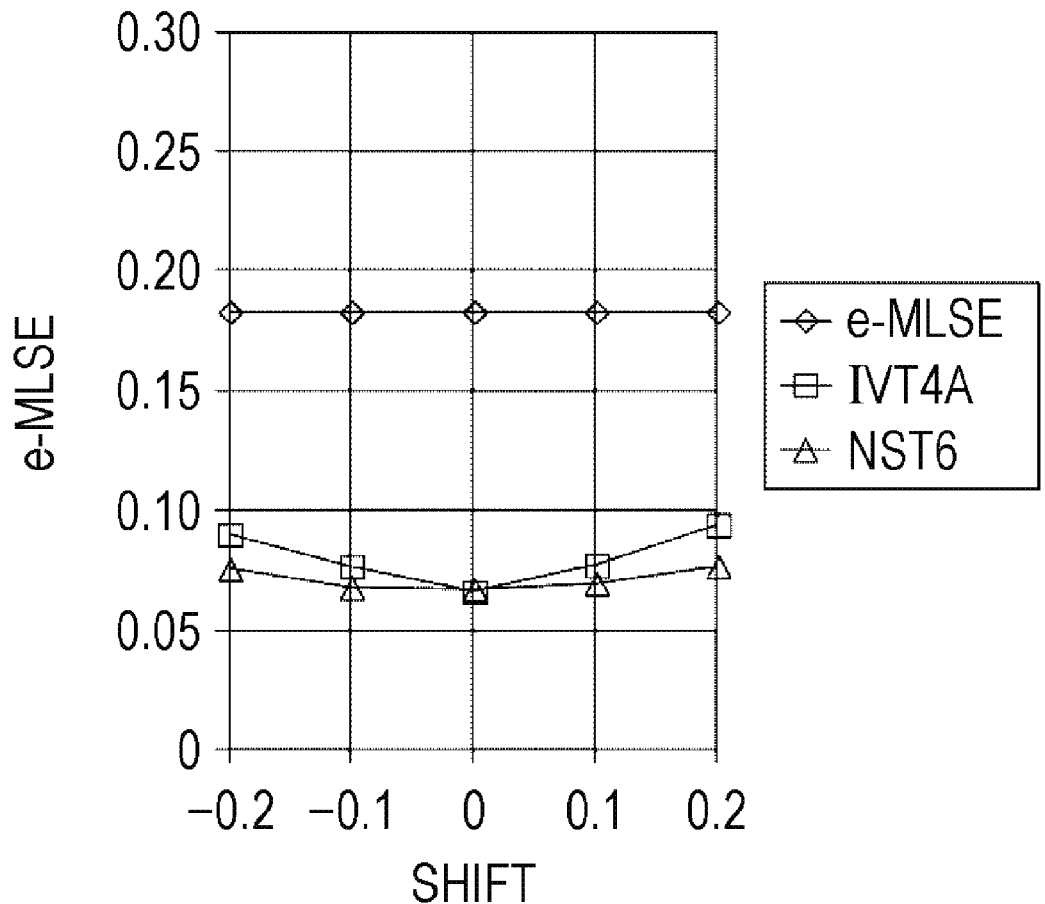
FIG. 59 is a graph for explaining a case where a pattern is shifted in a radial direction concerning the pattern NST6.

FIG. 59 illustrates a margin in a case where the pattern is shifted in the radial direction. The abscissa axis of the graph illustrated in FIG. 59 indicates the normalized shift amount. It is found out that the shift margin of the pattern NST6 is better when compared with that of the pattern IVT4.

[Pattern IVNST6]

Figure 60:
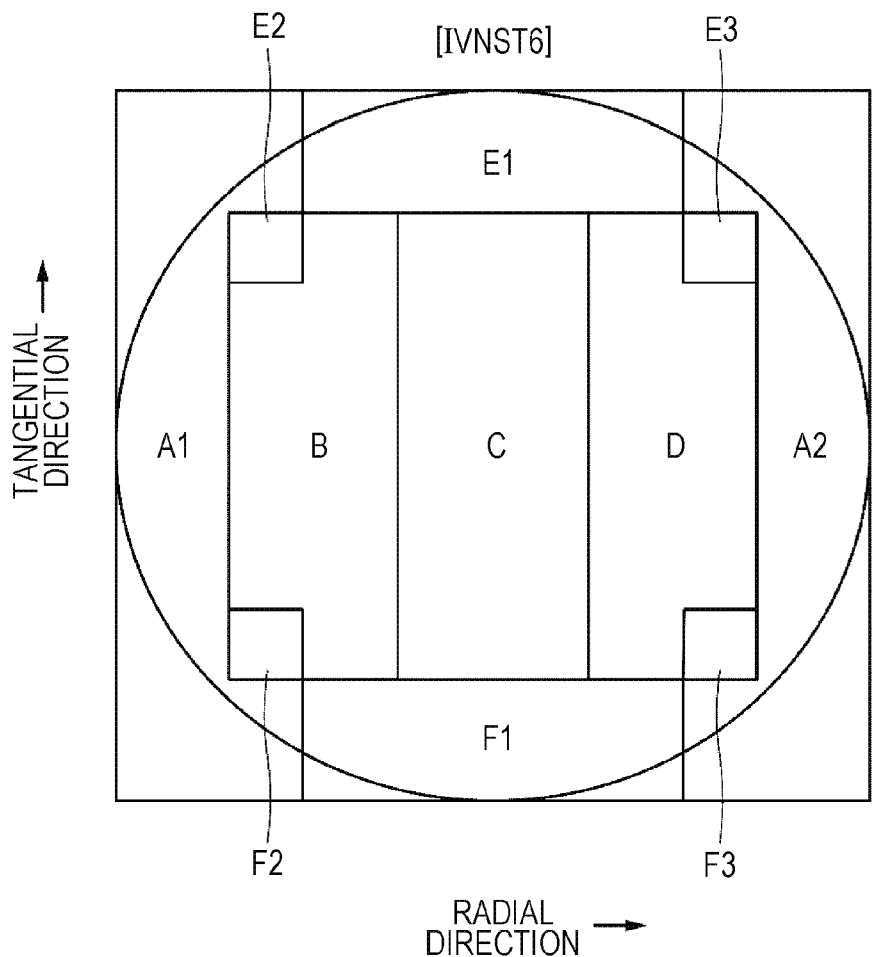
FIG. 60 is a schematic diagram illustrating a region division pattern IVNST6.

A pattern IVNST6 illustrated in FIG. 60 is an example in which there are 6 channels. The pattern IVNST6 is a combination of good configurations of the above-described division patterns IVT4 and NST6. In other words, in the consideration of the pattern IVT4 as a reference, similarly to the pattern NST6 for the pattern T4A, in order to increase the number of division regions of which bands are different in the radial direction in a spatially optical manner, the central region B in FIG. 44 is considered to be further divided into three regions in the radial direction. In addition, in the consideration of the pattern NST6 as a reference, the regions A1 and A2 may be extended to the regions E and F; and a portion (E2) of the region E and a portion (F2) of the region F may be considered to be inserted into the region B, and a portion (E3) of the region E and a portion (F3) of the region F may be considered to be inserted into the region B. Here, the region division position in the radial direction is set to ±0.25, ±0.5, and ±0.7 where the pupil radius is 1.0, and the region division position in the tangential direction is set to ±0.45 and, ±0.65. The deterioration in the pattern shift in the radial direction which is conspicuous in the pattern IVT4 is suppressed, and the best solutions for most of the characteristics are achieved.

The above-described pattern IVNST6 will be described on the basis of simulation results for the pattern. Simulation conditions are the same as those of the above-described case of "low line density" and are as follows.

LD35.18 (GB) . . . 0.053-μm/channel bit
When Tp=0.225 μm (for each of the land and groove), the plane capacity becomes 50.0 GB.
NA=0.85
PR (1233321)
Evaluation index: e-MLSE
Mark width=Tp×0.7
Disc noise and amplifier noise are present
"Reproduction Performance"

Simulation results of reproduction performance concerning the pattern IVNST6 are illustrated in FIGS. 61 to 65. These diagrams illustrate effects of region division in the pattern IVNST6 in the case of low line density. In each diagram, the e-MLSE represents characteristics in the case where region division is not conducted.

Figure 61:
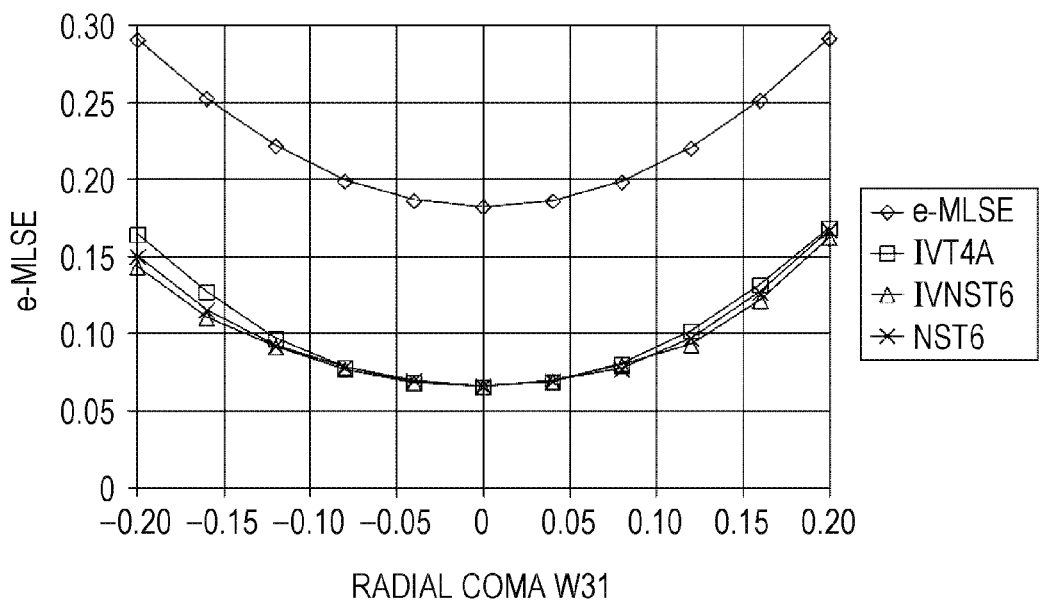
FIG. 61 is a graph for explaining a margin for coma aberration in a radial direction concerning the pattern IVNST6.

FIG. 61 illustrates a radial coma aberration margin concerning the pattern IVNST6, the above-described pattern NST6, and the pattern IVT4. Similarly to the above-described other graphs, the ordinate axis indicates the index e-MLSE, and the abscissa axis indicates the normalized radial coma aberration W31. It is found out that the radial disc skew margin of the pattern IVNST6 is the best.

Figure 62:
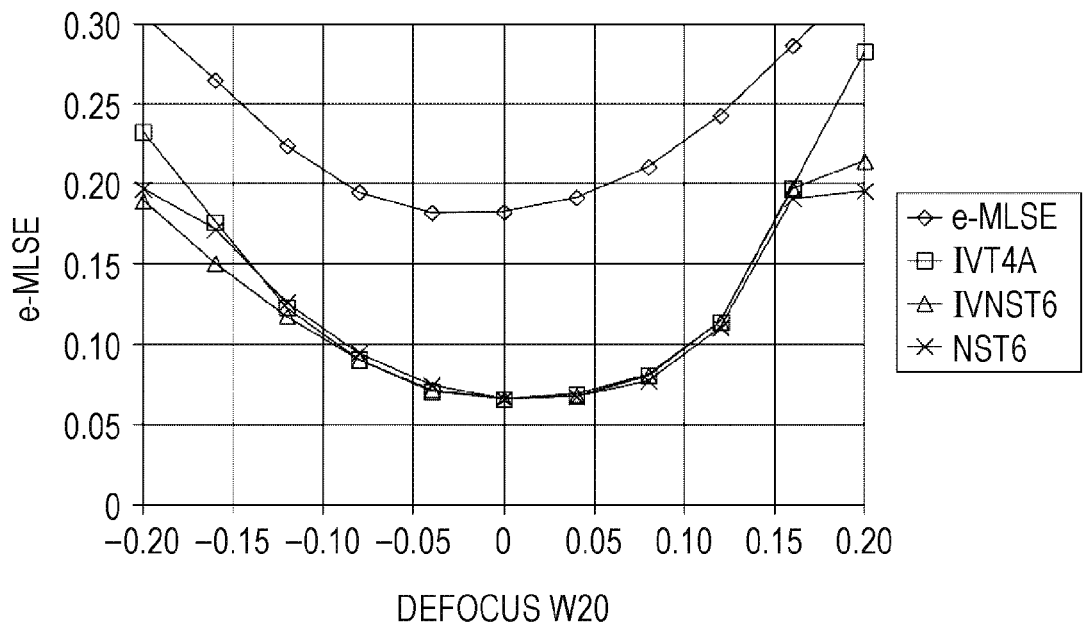
FIG. 62 is a graph for explaining a defocus margin concerning the pattern IVNST6.

FIG. 62 illustrates a defocus margin, and the abscissa axis of the graph illustrated in FIG. 62 indicates the normalized defocus quantity W20 which is normalized by the wavelength. It is found out that the defocus margin of the pattern IVNST6 is the best.

Figure 63:
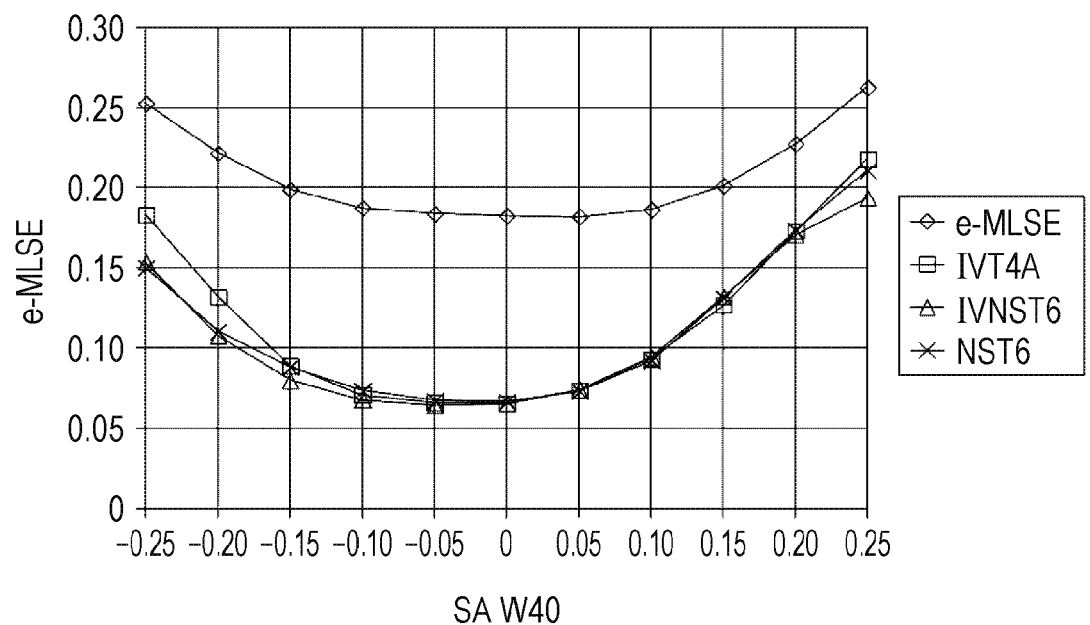
FIG. 63 is a graph for explaining a spherical aberration margin concerning the pattern IVNST6.

FIG. 63 illustrates a margin for spherical aberration SA. The abscissa axis of the graph illustrated in FIG. 63 indicates the normalized spherical aberration amount W40. It is found out that the spherical aberration margin of the pattern IVNST6 is the best similarly to the pattern NST6.

Figure 64:
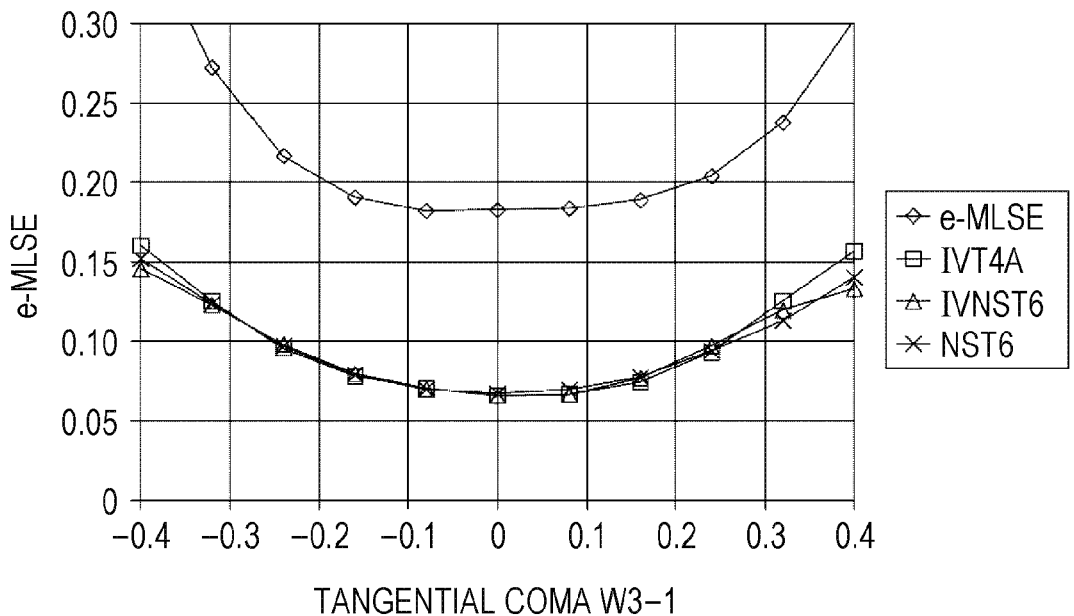
FIG. 64 is a graph for explaining a margin for coma aberration in a tangential direction concerning the pattern IVNST6.

FIG. 64 illustrates a tangential coma aberration margin. The abscissa axis of the graph illustrated in FIG. 64 indicates the normalized tangential coma aberration amount W3-1. It is found out that the tangential coma aberration margin of the pattern IVNST6 is the best.

Figure 65:
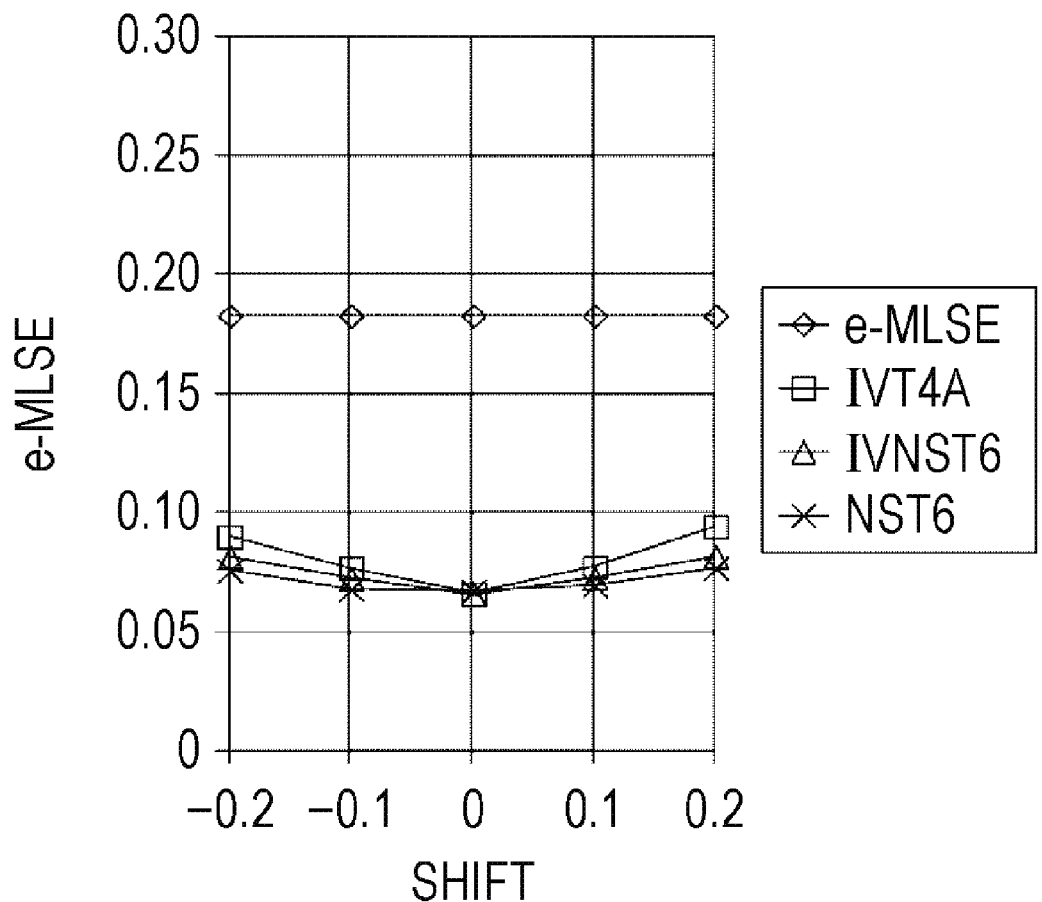
FIG. 65 is a graph for explaining a case where a pattern is shifted in a radial direction concerning the pattern IVNST6.

FIG. 65 illustrates a margin in a case where the pattern is shifted in the radial direction. The abscissa axis of the graph illustrated in FIG. 65 indicates the normalized shift amount. It is found out that the shift margin of the pattern IVNST6 is better when compared with that of the pattern IVT4.

"Electric Filter Optimized for Pattern IVNST6"

Figure 66:
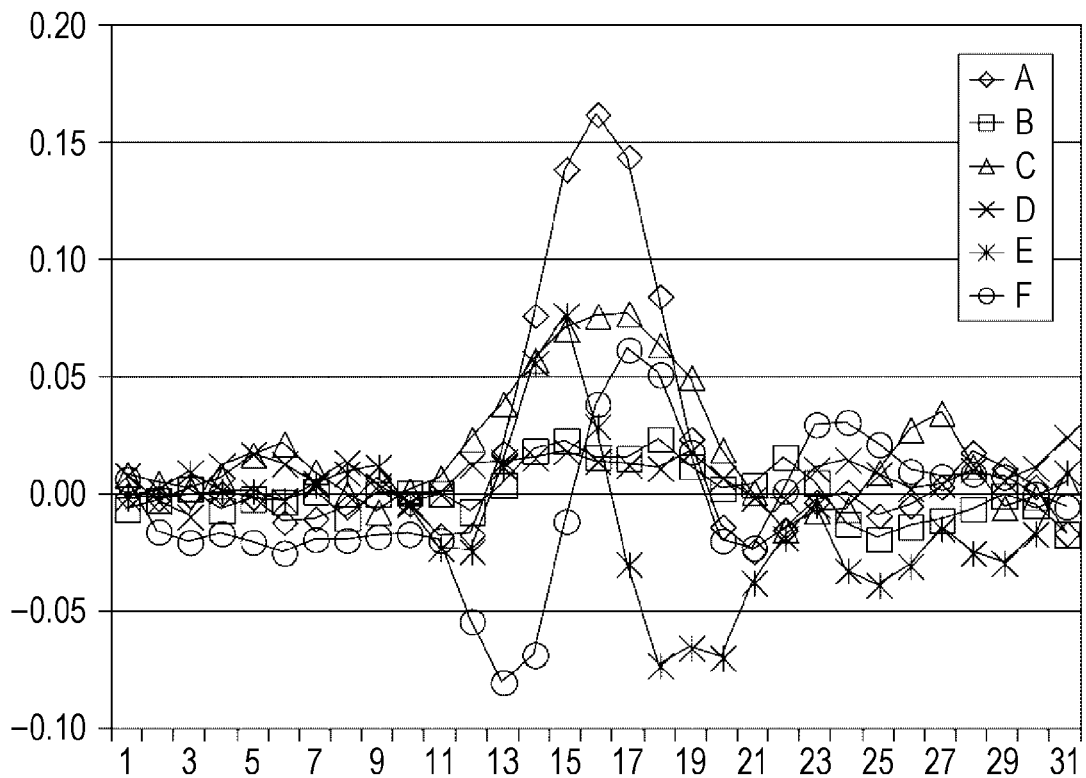
FIG. 66 is a graph illustrating an example of coefficients of taps of an electric filter optimized for the pattern IVNST6.
Figure 68:
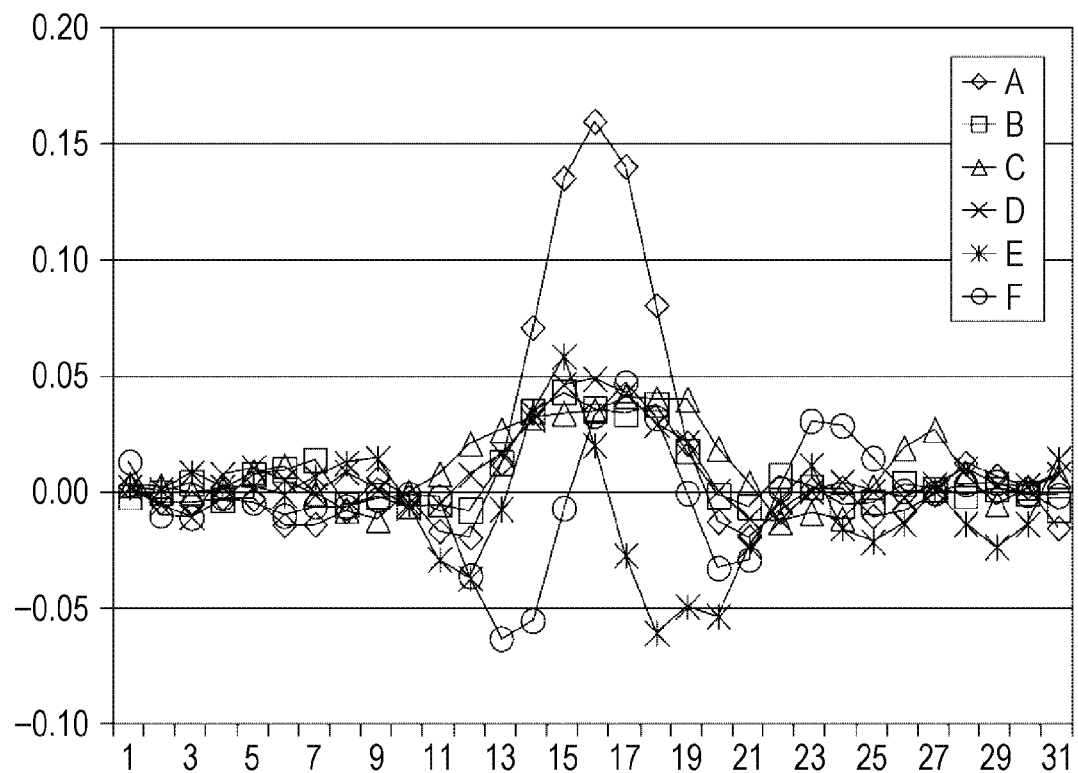
FIG. 68 is a graph illustrating an example of coefficients of taps of an electric filter optimized for the pattern IVNST6.
Figure 69:
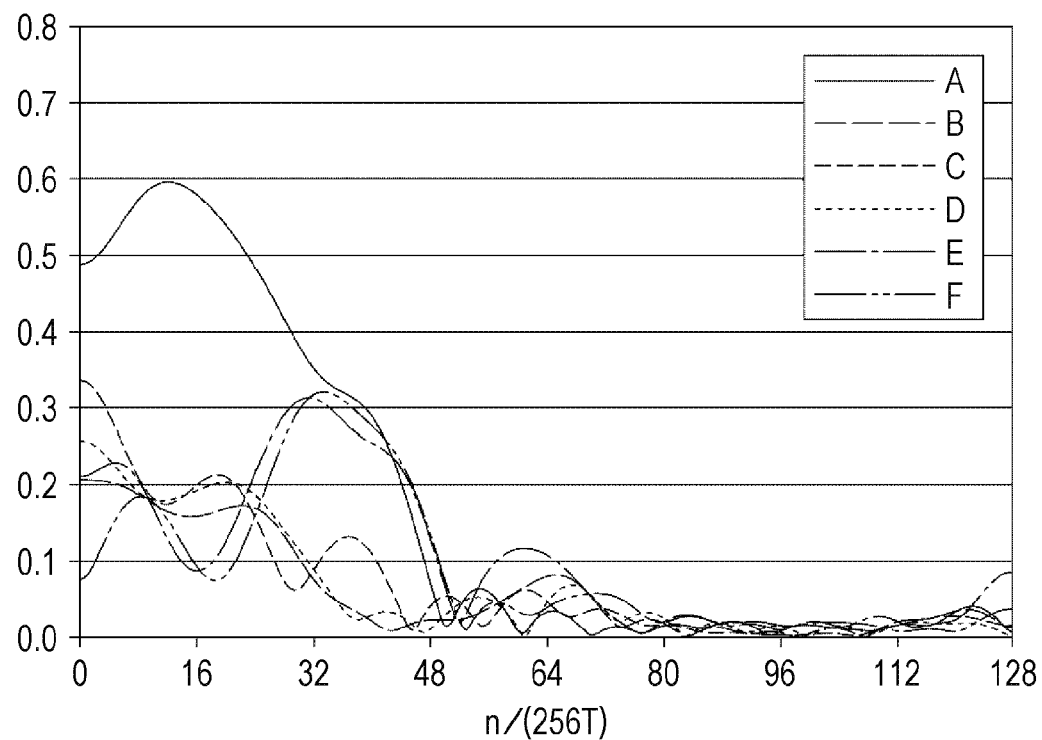
FIG. 69 is a graph illustrating frequency characteristics of an electric filter optimized for the pattern IVNST6.

An electric filter optimized for the above-described pattern IVNST6 will be described. An example of values of coefficients of 31 taps of the electric filter when W31=0, that is, at the perturbation origin in FIG. 61 is illustrated in FIG. 68. The electric filter is configured with an FIR filter. The frequency amplitude characteristics of the respective channels corresponding to the regions A to F in a case where such coefficients are set are illustrated in FIG. 69. In addition, an example of values of coefficients of 31 taps of the electric filter when W31=−0.16 is illustrated in FIG. 66. The frequency amplitude characteristics of the respective channels of A to F in a case where such coefficients are set are illustrated in FIG. 67.

Figure 67:
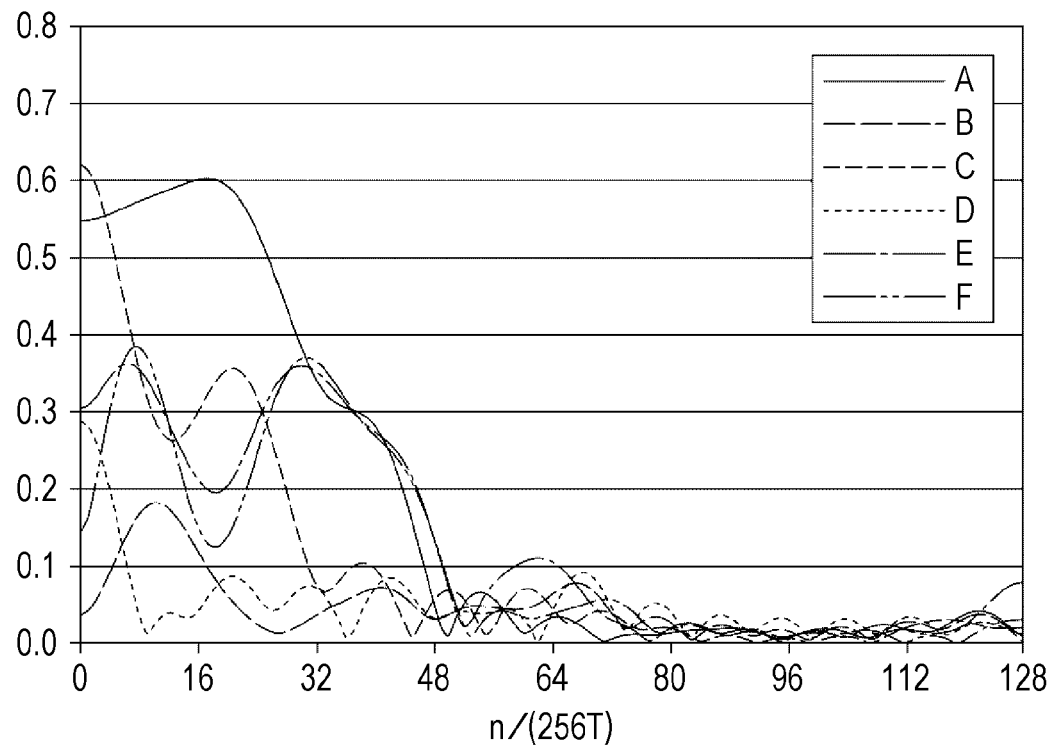
FIG. 67 is a graph illustrating frequency characteristics of an electric filter optimized for the pattern IVNST6.

As can be understood from the comparison of FIG. 69 illustrating the characteristics at the perturbation origin with FIG. 67 illustrating the characteristics in the state where the radial coma aberration occurs, when the radial coma aberration of W31=−0.16 occurs, the filter strengthens the channel C (the most central) among the three channels B, C, and D in the central portion and weakens the channels B and D. In addition, as can be understood from FIGS. 67 and 69, similarly to the pattern IVT4, in the bands corresponding to the 4T and 3T, the frequency amplitude characteristics of the channels E, F, and A are maintained almost in the same shapes irrespective of the existence of the radial coma aberration, so that desired electrical optical filter characteristics are maintained. Accordingly, it is possible to implement the best radial disc skew margin in the pattern IVNST6.

Figure 70:
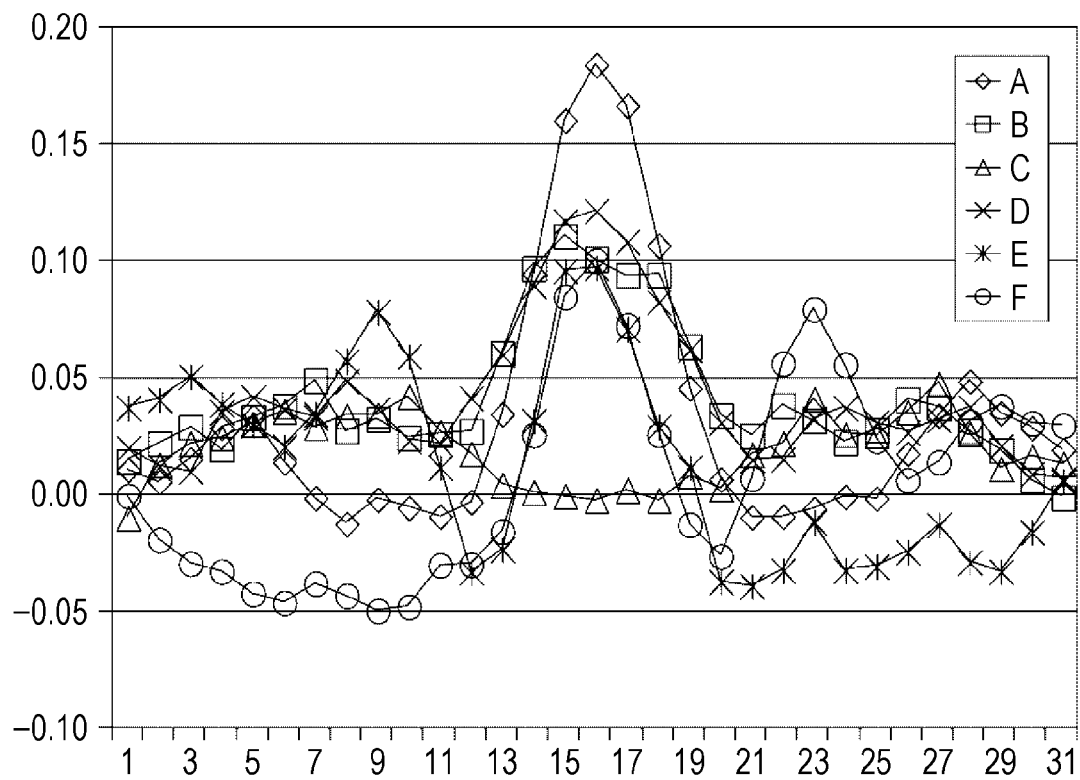
FIG. 70 is a graph illustrating an example of coefficients of taps of an electric filter optimized for the pattern IVNST6.

An example of values of coefficients of 31 taps of the electric filter when W20=−0.16 in the characteristics of defocus W20 in FIG. 62 is illustrated in FIG. 70. The electric filter is configured with an FIR filter. The frequency amplitude characteristics of the respective channels of A to F in a case where such coefficients are set are illustrated in FIG. 71.

Figure 71:
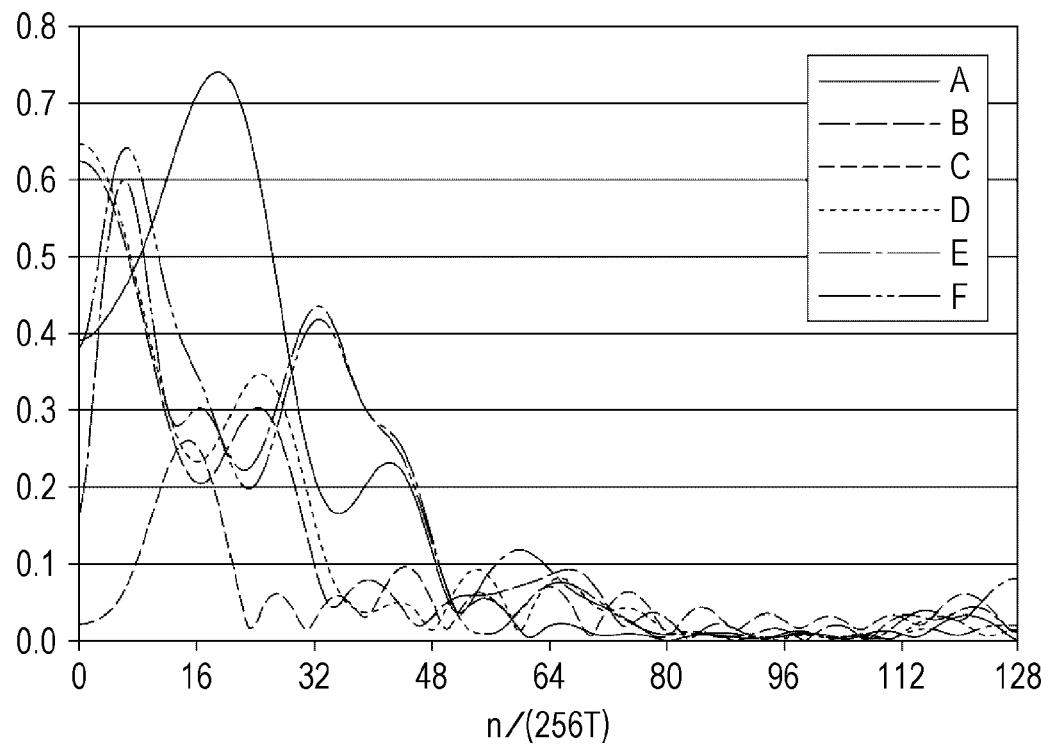
FIG. 71 is a graph illustrating frequency characteristics of an electric filter optimized for the pattern IVNST6.

As can be understood from the comparison of FIG. 69 illustrating the characteristics at the perturbation origin with FIG. 71 illustrating the characteristics in the state where the defocus occurs, when the defocus of W20=−0.16 occurs, the filter weakens the channel C (the most central) among the three channels B, C, and D in the central portion and conducts band pass by making the vicinity of 8T have a reciprocal phase (the reciprocal phase can be understood from the coefficients of taps in FIG. 70), and the filter strengthens the channels B and D.

Figure 72:
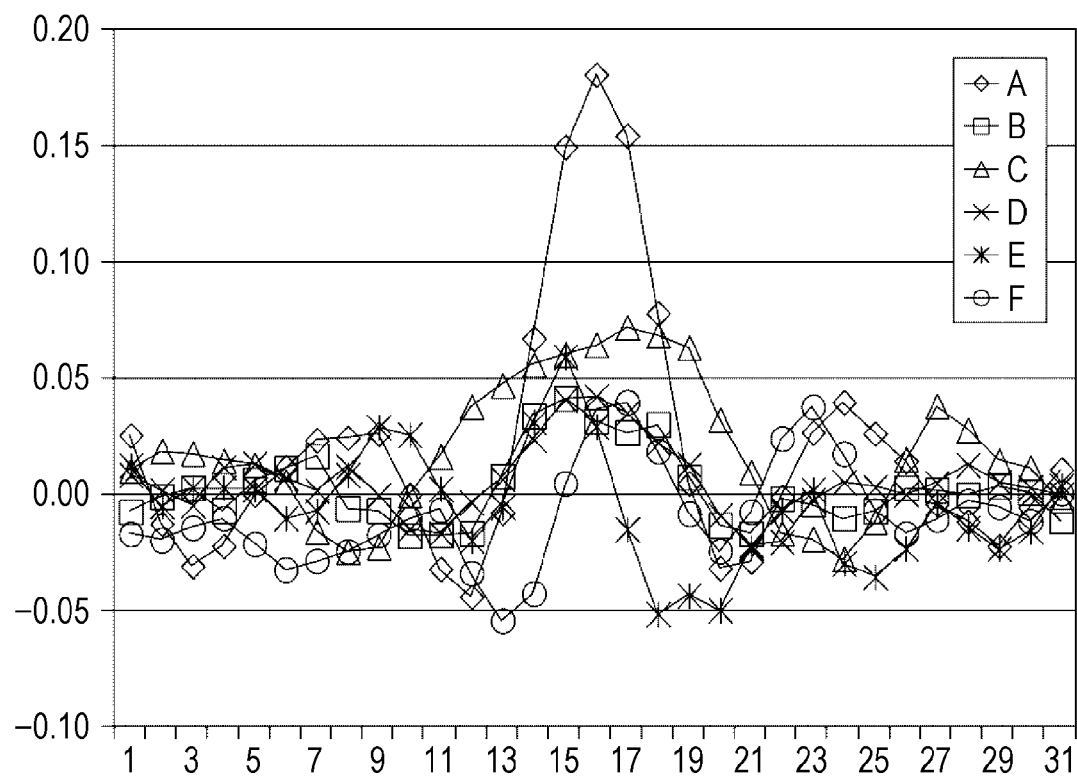
FIG. 72 is a graph illustrating an example of coefficients of taps of an electric filter optimized for the pattern IVNST6.

An example of values of coefficients of 31 taps of the electric filter when W40=−0.20 in the characteristics of spherical aberration SA in FIG. 63 is illustrated in FIG. 72. The electric filter is configured with an FIR filter. The frequency amplitude characteristics of the respective channels of A to F in a case where such coefficients are set are illustrated in FIG. 73.

Figure 73:
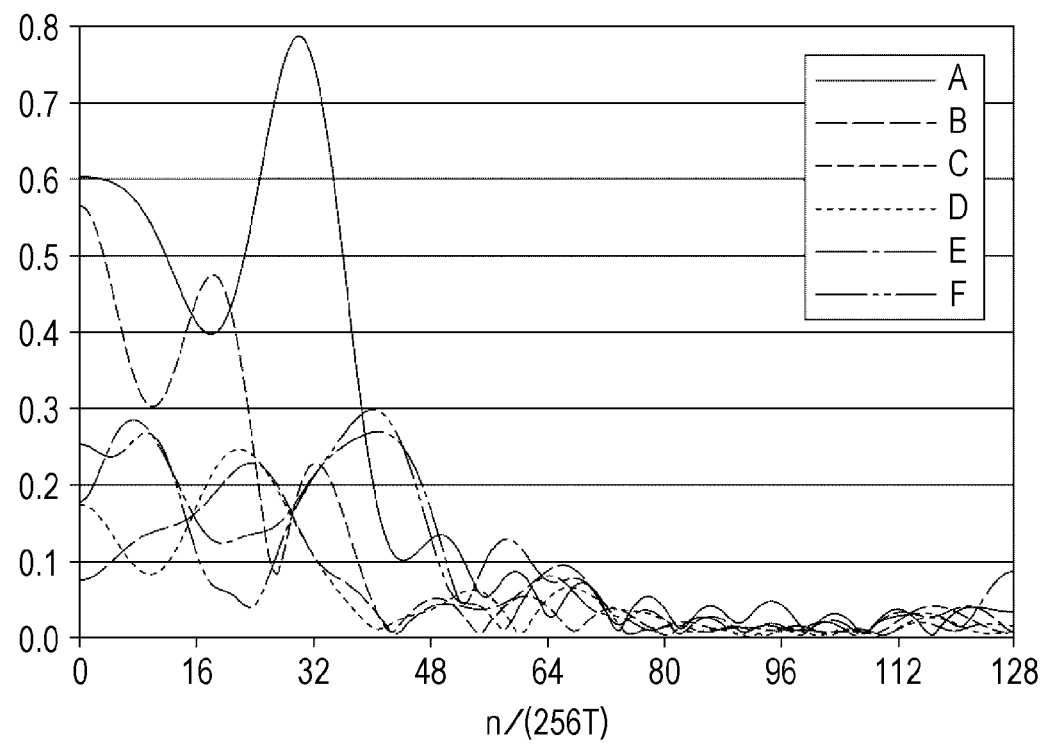
FIG. 73 is a graph illustrating frequency characteristics of an electric filter optimized for the pattern IVNST6.

As can be understood from the comparison of FIG. 69 illustrating the characteristics at the perturbation origin with FIG. 73 illustrating the characteristics in the state where the spherical aberration occurs, when the spherical aberration of W40=−0.20 occurs, the filter strengthens the channel C (the most central) among the three channels B, C, and D in the central portion.

In this manner, by independently changing the filter characteristics of the three regions B, C, and D in the central portion according to the type of perturbation, the expansion of various margins is implemented.

"Optimization of Electric Filter: Defocus Characteristics and Number of Taps"

Figure 74:
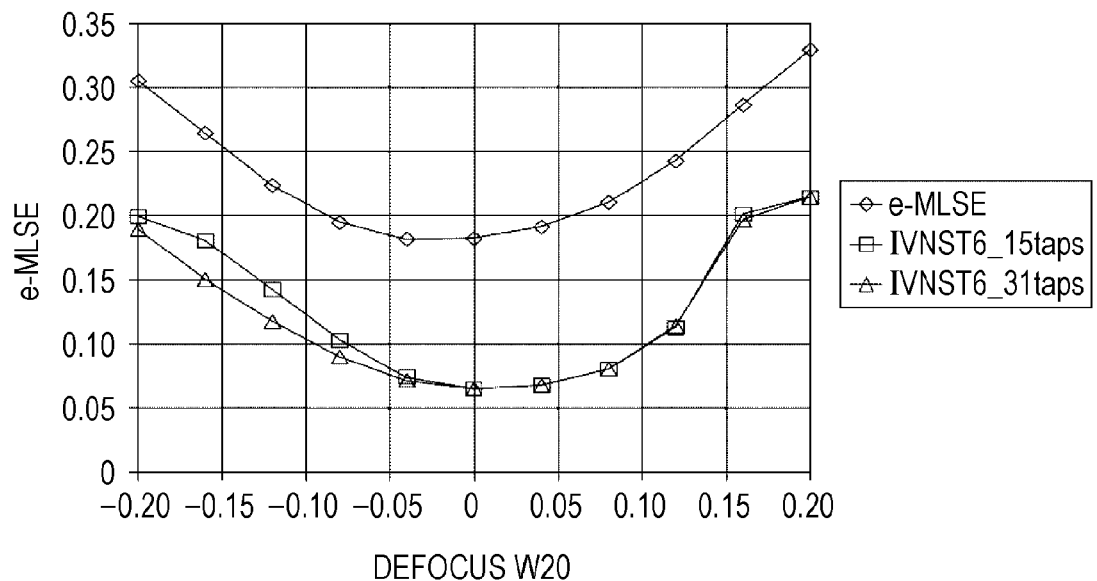
FIG. 74 is a graph for explaining a defocus margin in a case of changing the number of taps concerning the pattern IVNST6.

FIG. 74 illustrates simulation results of defocus characteristics of the above-described pattern IVNST6. The simulation conditions are the same as described above. FIG. 74 illustrates the case where the number of taps of the FIR filter is 31 as described above and the case where the number of taps is 15.

As described above, an example of values of coefficients of 31 taps of the electric filter when W20=−0.16 is illustrated in FIG. 70. The frequency amplitude characteristics of the respective channels of A to F are illustrated in FIG. 71. In the frequency characteristics, the filter weakens the channel C (the most central) among the three channels B, C, and D in the central portion and conducts band pass by making the vicinity of 8T have a reciprocal phase, and the filter strengthens the channels B and D.

Figure 75:
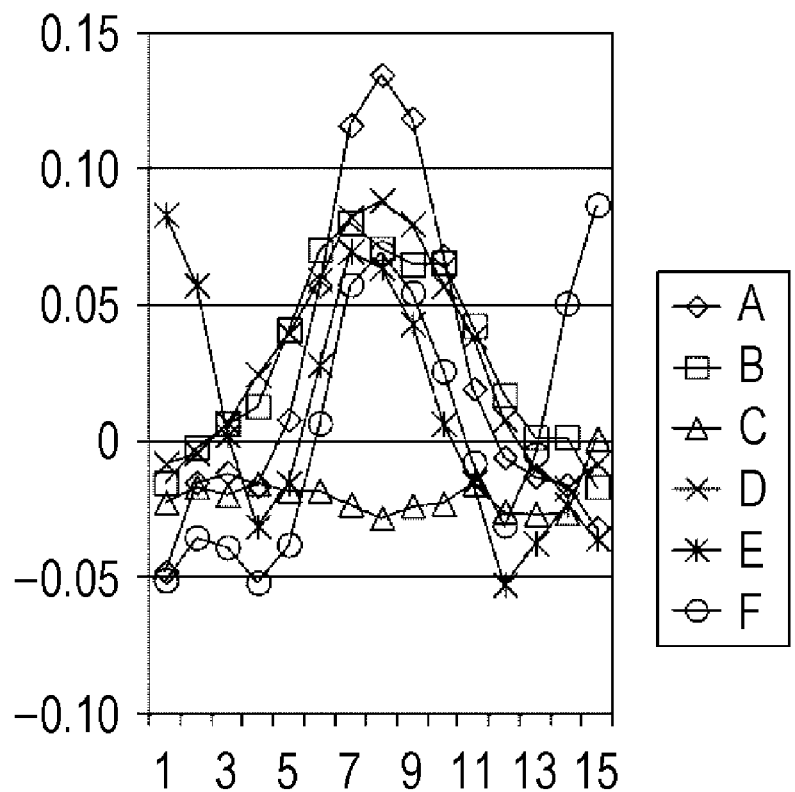
FIG. 75 is a graph illustrating an example of coefficients of taps in a case of changing the number of taps concerning the pattern IVNST6.
Figure 76:
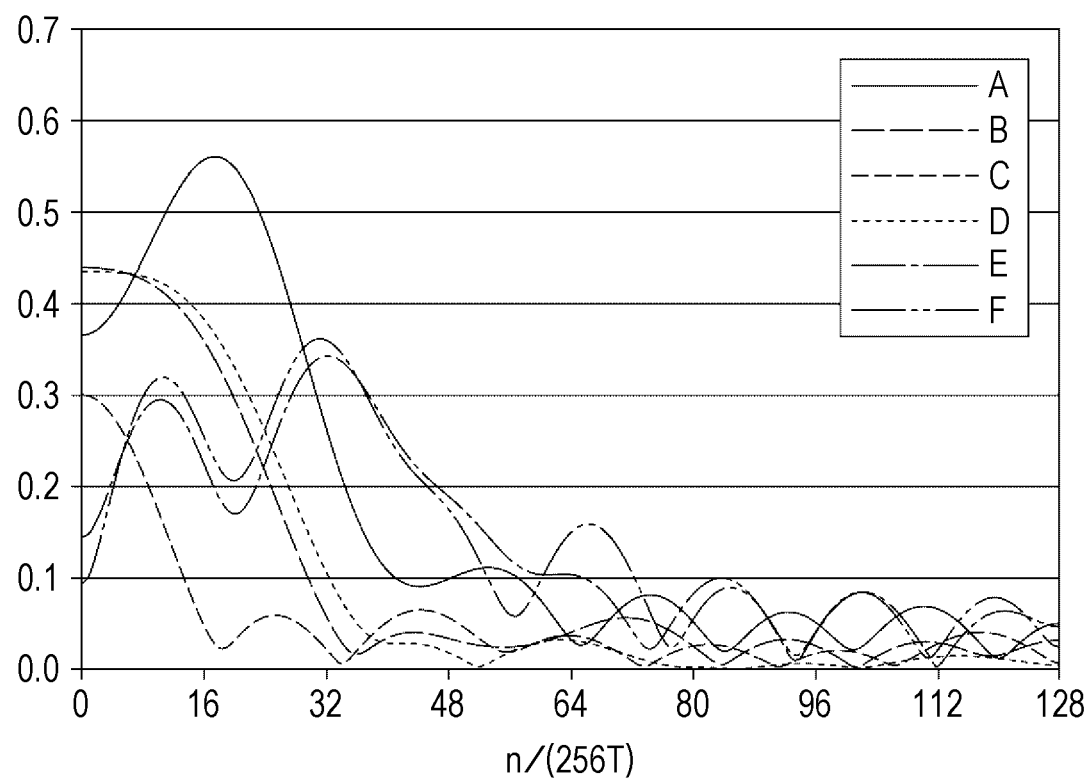
FIG. 76 is a graph illustrating frequency characteristics in a case of changing the number of taps concerning the pattern IVNST6.

On the other hand, an example of values of coefficients of 15 taps of the electric filter when W20=−0.16 is illustrated in FIG. 75. The frequency amplitude characteristics of the respective channels of A to F are illustrated in FIG. 76. The frequency characteristics are different from those of the case of 31 taps (FIG. 71), so that desired filter characteristics may not be implemented. With respect to the channel C, the filter becomes a low pass filter not a reciprocal-phase band pass filter. Therefore, when the defocus is conducted, a difference in margin according to the number of taps occurs.

Herein, although the difference in the defocus margin of the pattern IVNST6 according to the number of taps is represented as an example, the same configuration can be made in other patterns and other margins. In the case of RLL (1, 7) PP, since there are recording marks of 2T to 8T, in the case of the configuration using the FIR filter in order to implement desired characteristics for frequencies corresponding to 8T marks/space, the configuration having the coefficients of taps in a range of 16T widths or more is preferable.

[Pattern IVTSP5]

(Reducing Number of Channels by Maintaining Characteristics)

Figure 77:
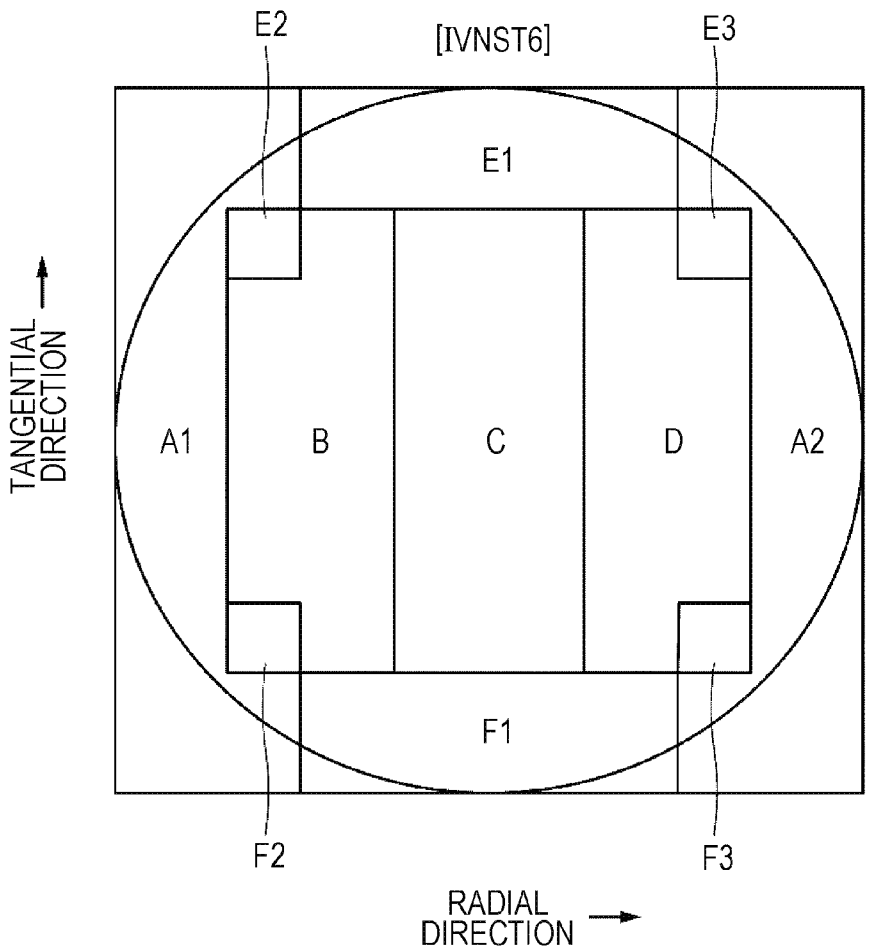
FIG. 77 is a schematic diagram illustrating a region division pattern IVTSP5.

As described above, the pattern IVNST6 illustrated in FIG. 60 (FIG. 77) achieves the best solutions in almost every characteristic. However, in some cases, it is preferable to reduce the number of channels due to restrictions such as power consumption, the number of input pins, and circuit size of a signal processing circuit. The pattern IVTSP5 is a pattern of reducing the number of channels from six to five by maintaining the characteristics. Here, the region division position in the radial direction is set to ±0.25, ±0.5, and ±0.7 where the pupil radius is 1.0, and the region division position in the tangential direction is set to ±0.45 and ±0.65.

As a method of reducing the number of channels, among the six channels A to F in the pattern IVNST6, the channels A, E, and F are used as they are, and the signal of the channel C is distributed to the channels B and D, so that the five channels are set. In other words, the signal of the channel B is set to be B+(Ks×C), and the signal of the channel D is set to be D+(Ks×C). The pattern where the number of channels is reduced in this manner is referred to as a pattern IVTSP5.

The above-described pattern IVTSP5 will be described on the basis of simulation results for the pattern. Simulation conditions are the same as those of the above-described case of "low line density" and are as follows.

LD35.18 (GB) . . . 0.053 μm/channel bit

When Tp=0.225 μm (for each of the land and groove), the plane capacity becomes 50.0 GB.

NA=0.85

PR (1233321)

Evaluation index: e-MLSE

Mark width=Tp×0.7

Disc noise and amplifier noise are present

"Reproduction Performance"

Simulation results of reproduction performance concerning the pattern IVTSP5 are illustrated in FIGS. 78 to 82. In each diagram, the e-MLSE represents characteristics in the case where region division is not conducted.

Figure 78:
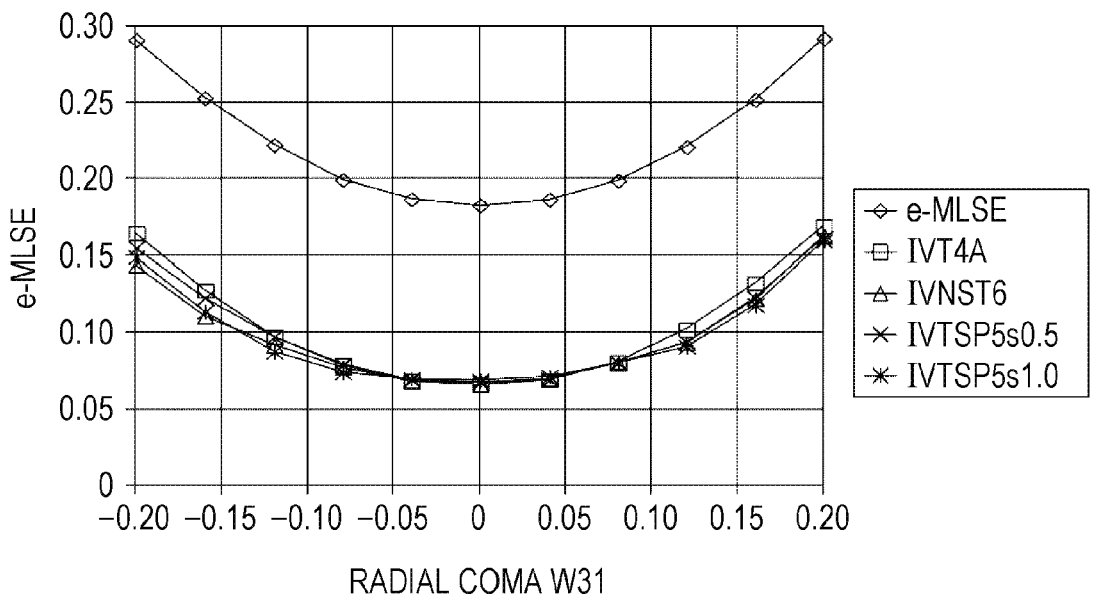
FIG. 78 is a graph for explaining a margin for coma aberration in a radial direction concerning the pattern IVTSP5.

FIG. 78 illustrates a radial coma aberration margin concerning the pattern IVTSP5s0.5, the pattern IVTSP5s1.0, the above-described pattern IVNST6, and the above-described pattern IVT4. Similarly to the above-described other graphs, the ordinate axis indicates the index e-MLSE, and the abscissa axis indicates the normalized radial coma aberration W31. The IVTSP5s0.5 denotes the pattern IVTSP5 when Ks=0.5. The IVTSP5s1.0 denotes the pattern IVTSP5 when Ks=1.0.

Figure 79:
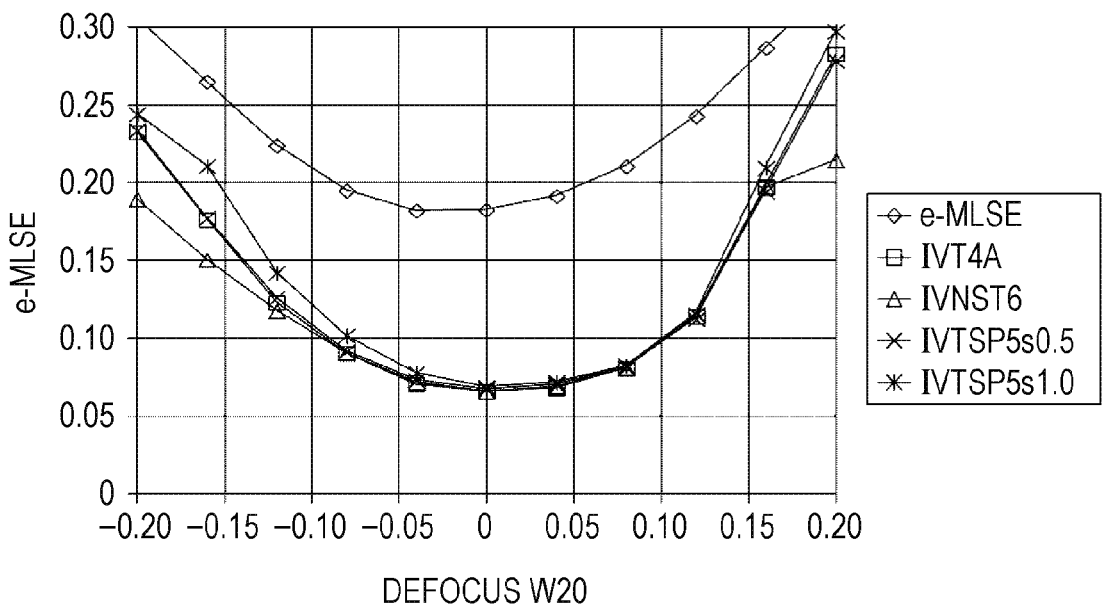
FIG. 79 is a graph for explaining a defocus margin concerning the pattern IVTSP5.

FIG. 79 illustrates a defocus margin concerning the pattern IVTSP5s0.5, the pattern IVTSP5s1.0, the pattern IVNST6, and the pattern IVT4. The abscissa axis of the graph illustrated in FIG. 79 indicates the normalized defocus quantity W20 which is normalized by the wavelength. A value 0 means that the defocus quantity is 0. At the time of actual reproduction, defocus is generated. Therefore, it is necessary to have a margin for the defocus.

In the graph of (normalized defocus quantity versus index), the smaller the value of e-MLSE is, the higher the reproduction performance becomes. As an example, it is desirable that the value of e-MLSE be approximately 0.15 or less. Therefore, the defocus margin corresponds to a width of a range in which the value of e-MLSE becomes approximately 0.15 or less. The larger the width is, the larger the defocus margin becomes.

Figure 80:
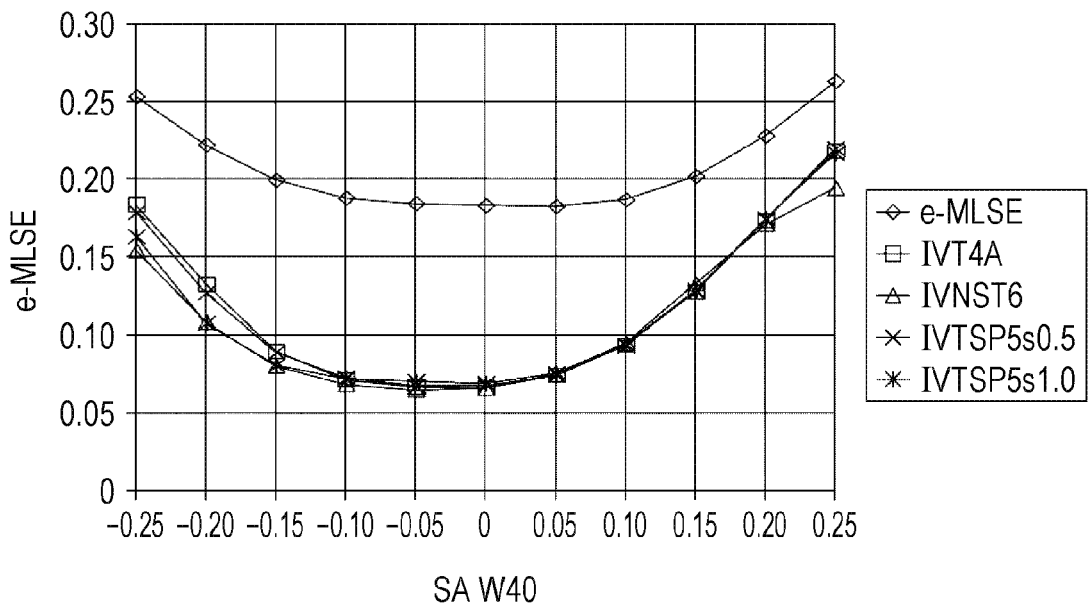
FIG. 80 is a graph for explaining a spherical aberration margin concerning the pattern IVTSP5.

FIG. 80 illustrates a margin for spherical aberration SA concerning the pattern IVTSP5s0.5, the pattern IVTSP5s1.0, the pattern IVNST6, and the pattern IVT4. The abscissa axis of the graph illustrated in FIG. 80 indicates the normalized spherical aberration amount W40.

Figure 81:
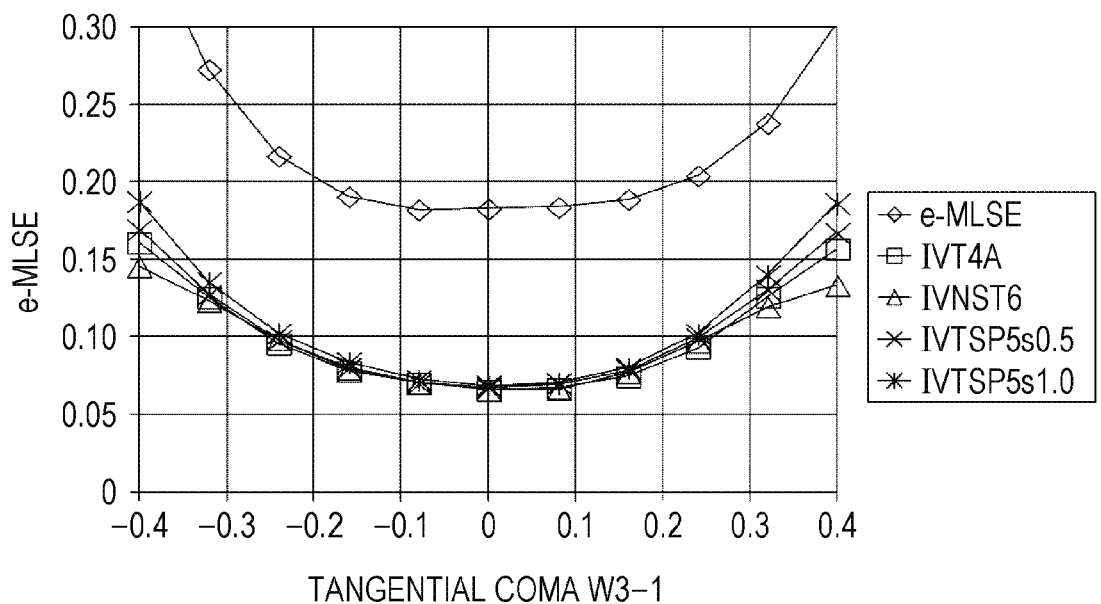
FIG. 81 is a graph for explaining a margin for coma aberration in a tangential direction concerning the pattern IVTSP5.

FIG. 81 illustrates a tangential coma aberration margin concerning the pattern IVTSP5s0.5, the pattern IVTSP5s1.0, the pattern IVNST6, and the pattern IVT4. The abscissa axis of the graph illustrated in FIG. 81 indicates the normalized tangential coma aberration amount W3-1.

Figure 82:
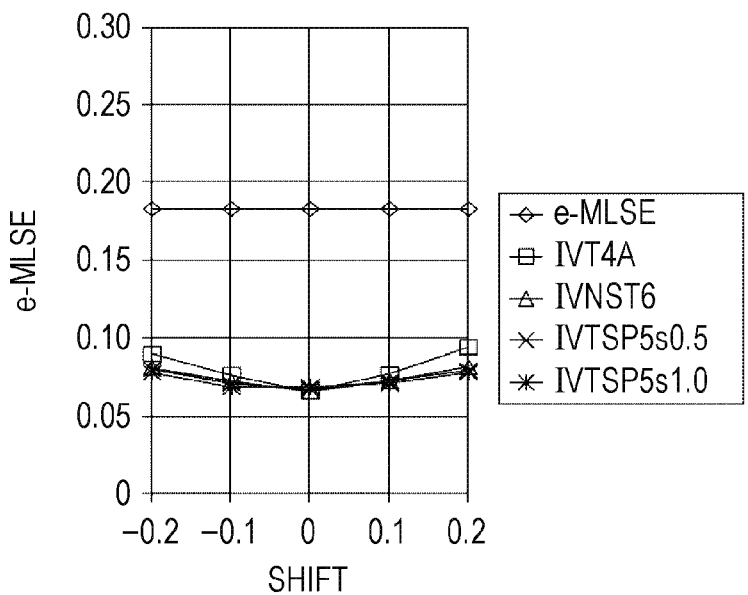
FIG. 82 is a graph for explaining a case where a pattern is shifted in a radial direction concerning the pattern IVTSP5.

FIG. 82 illustrates a margin in a case where a pattern is shifted in the radial direction concerning the pattern IVTSP5s0.5, the pattern IVTSP5s1.0, the pattern IVNST6, and the pattern IVT4. The abscissa axis of the graph illustrated in FIG. 82 indicates the normalized shift amount.

As can be understood from the characteristics, if the ratio Ks of signals between regions is changed, there is a trade-off relationship between the "defocus margin and tangential coma aberration margin" and the "radial coma aberration margin and spherical aberration margin". According to difference in media or the like, a plurality of coefficients Ks may be switched to be used.

In addition, in the pattern IVTSP5, the simple ratio of B, C, and D becomes B:C:D=1:2Ks:1. By taking into consideration of the above-described filter characteristics of the pattern IVNST6, the radial coma aberration margin or the spherical aberration margin is good when the C is relatively strong. Therefore, the configuration of Ks >0.5 is advantageous to the two margins. As can be understood from the graphs of Ks=0.5 and Ks=1.0, these are represented by the simulation results.

[Pattern IVTSM4]

(Reducing Number of Channels by Maintaining Characteristics)

Figure 83:
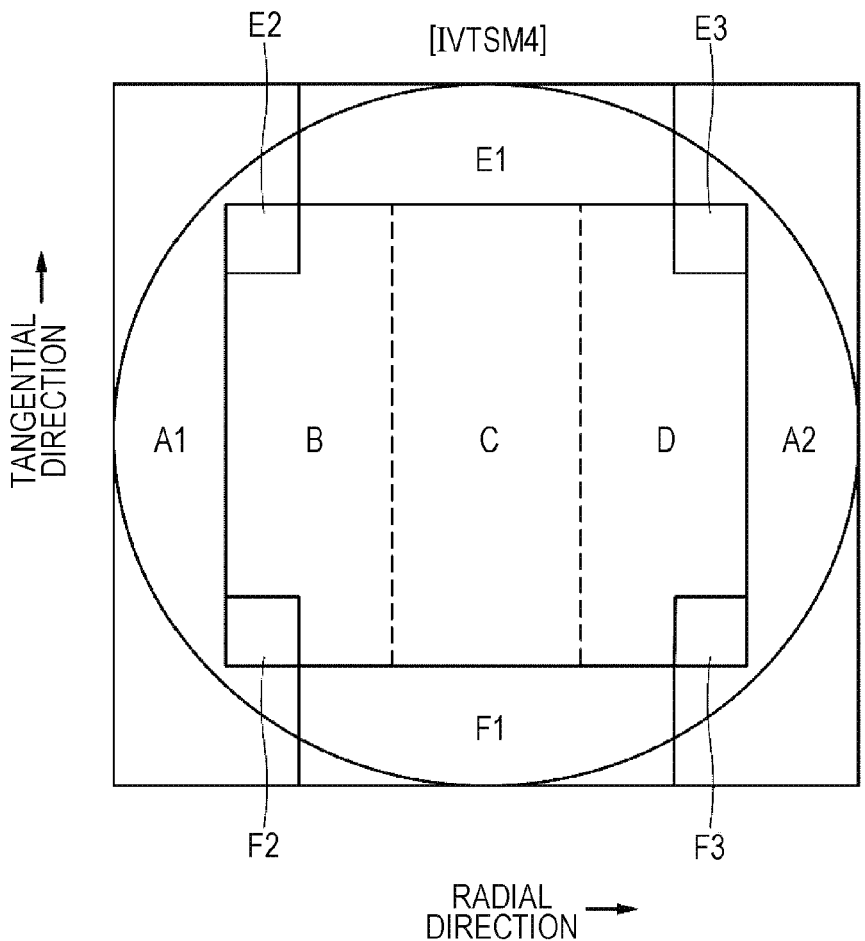
FIG. 83 is a schematic diagram used to explain a pattern IVTSM4 reducing the number of channels.

Although the pattern IVNST6 improves various characteristics in the pattern IVT4, the radial coma aberration margin and the spherical aberration margin can be improved by the same configuration as the above-described configuration of conversion from the pattern IVNST6 to the pattern IVTSP5. The pattern IVTSM4 of reducing the number of channels from six to four by maintaining the characteristics will be described. As illustrated in FIG. 83, it is effective to apply optical or electrical weighting factors to the center regions (B, C, and D). Here, the region division position in the radial direction is set to ±0.25, ±0.5, and ±0.7 where the pupil radius is 1.0, and the region division position in the tangential direction is set to ±0.45 and ±0.65.

As a method of reducing the number of channels, among the six channels A to F in the pattern IVNST6, the channels A, E, and F are used as they are, and the signal of the channel C is set to be C=Ksm×B+Ksm×D. The pattern where the number of channels is reduced in this manner is referred to as a pattern IVTSM4.

The above-described pattern IVTSM4 will be described on the basis of simulation results for the pattern. Simulation conditions are the same as those of the above-described case of "low line density" and are as follows. In each diagram, the e-MLSE represents characteristics in the case where region division is not conducted.

LD35.18 (GB) . . . 0.053 µm/channel bit
When Tp=0.225 µm (for each of the land and groove), the plane capacity becomes 50.0 GB.
NA=0.85
PR (1233321)
Evaluation index: e-MLSE
Mark width=Tp×0.7
Disc noise and amplifier noise are present
"Reproduction Performance"

Simulation results of reproduction performance concerning the pattern IVTSM4 are illustrated in FIGS. 84 to 88. In each diagram, the e-MLSE represents characteristics in the case where region division is not conducted.

Figure 84:
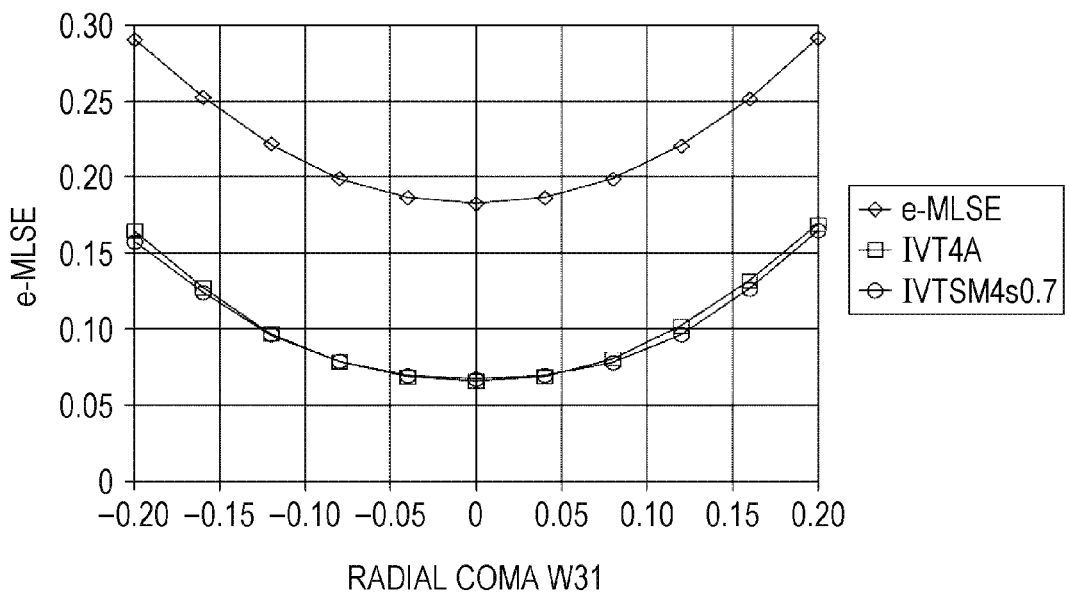
FIG. 84 is a graph for explaining a margin for coma aberration in a radial direction concerning the pattern IVTSM4.

FIG. 84 illustrates a radial coma aberration margin concerning the pattern IVTSM4s0.7 and the above-described pattern IVT4. Similarly to the above-described other graphs, the ordinate axis indicates the index e-MLSE, and the abscissa axis indicates the normalized radial coma aberration W31. The IVTSM4s0.7 denotes the pattern IVTSM4 when Ksm=0.7.

Figure 85:
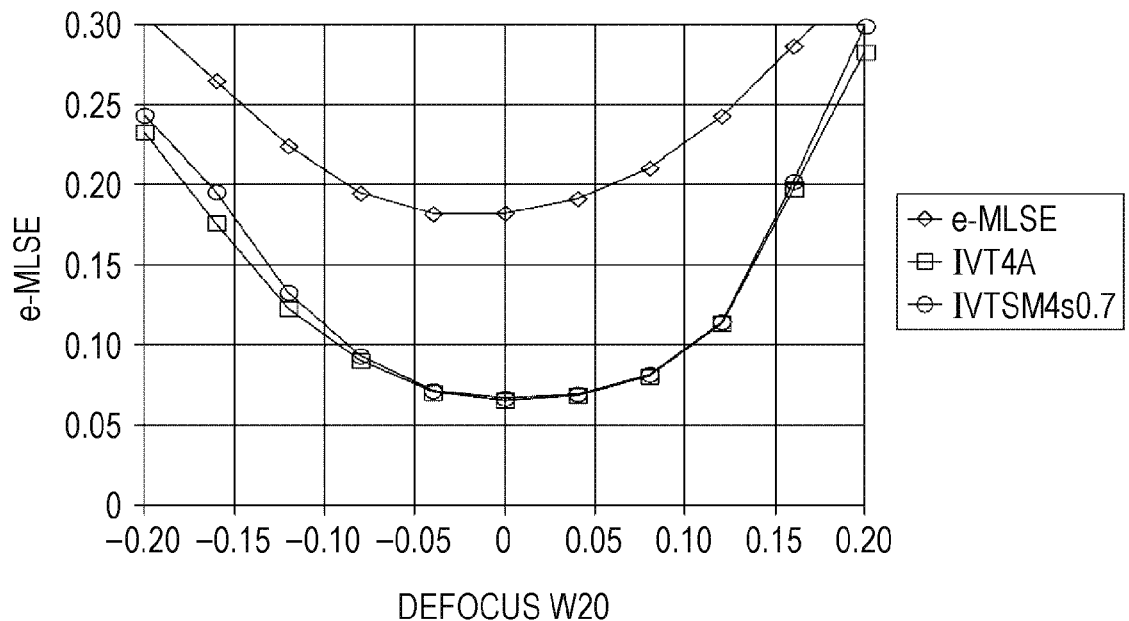
FIG. 85 is a graph for explaining a defocus margin concerning the pattern IVTSM4.

FIG. 85 illustrates a defocus margin concerning the pattern IVTSM4s0.7 and the pattern IVT4. The abscissa axis of the graph illustrated in FIG. 85 indicates the normalized defocus quantity W20 which is normalized by the wavelength.

Figure 86:
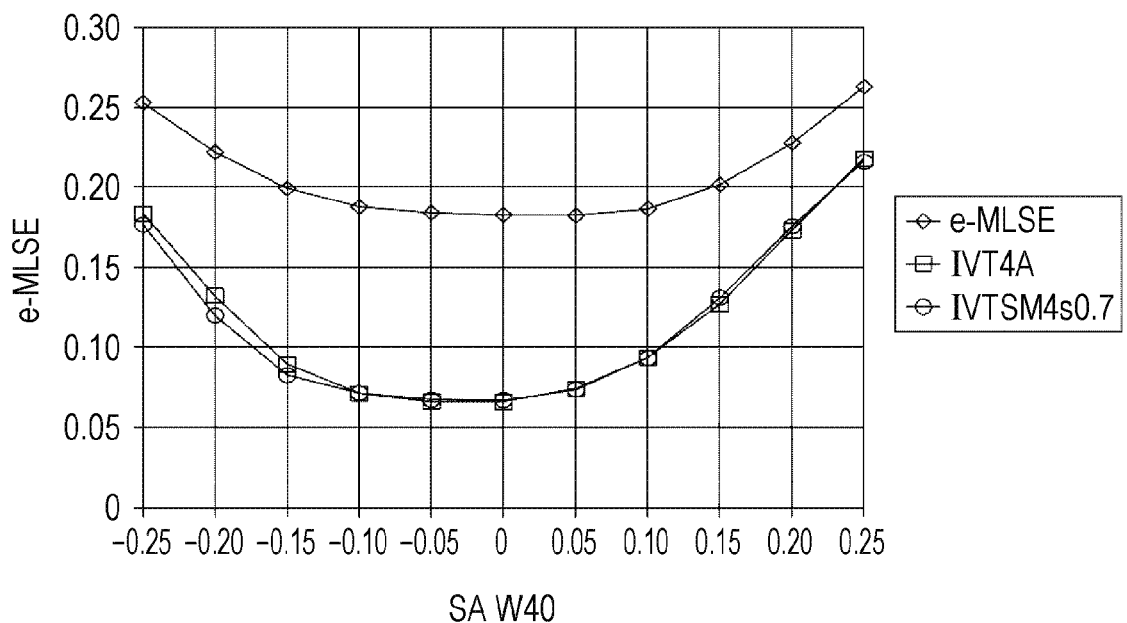
FIG. 86 is a graph for explaining a spherical aberration margin concerning the pattern IVTSM4.

FIG. 86 illustrates a margin for spherical aberration SA concerning the pattern IVTSM4s0.7 and the pattern IVT4. The abscissa axis of the graph illustrated in FIG. 86 indicates the normalized spherical aberration amount W40.

Figure 87:
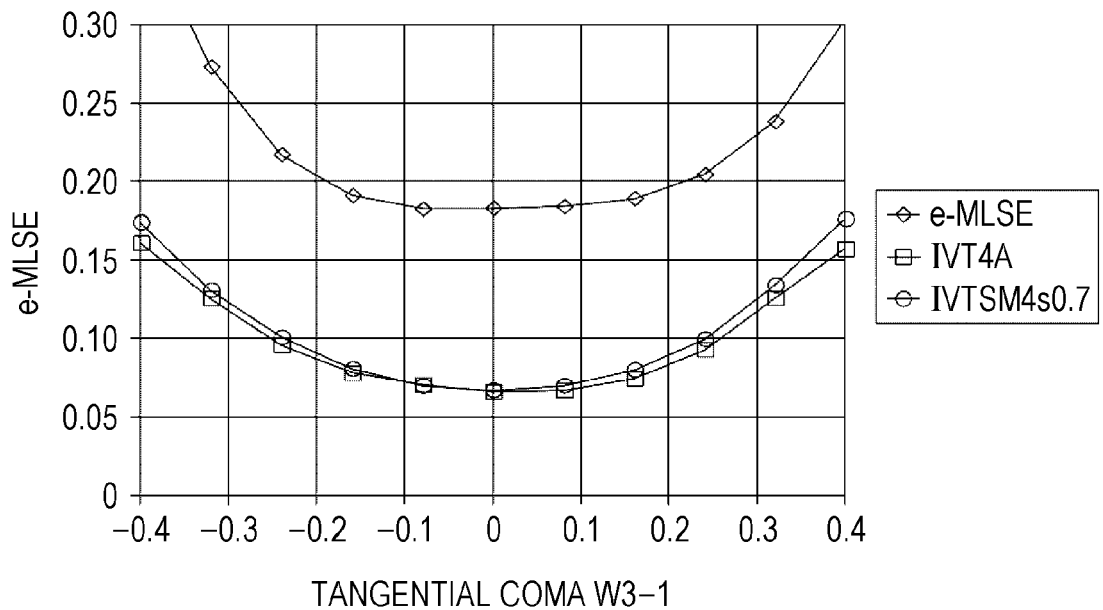
FIG. 87 is a graph for explaining a margin for coma aberration in a tangential direction concerning the pattern IVTSM4.

FIG. 87 illustrates a tangential coma aberration margin concerning the pattern IVTSM4s0.7 and the pattern IVT4. The abscissa axis of the graph illustrated in FIG. 87 indicates the normalized tangential coma aberration amount W3-1.

Figure 88:
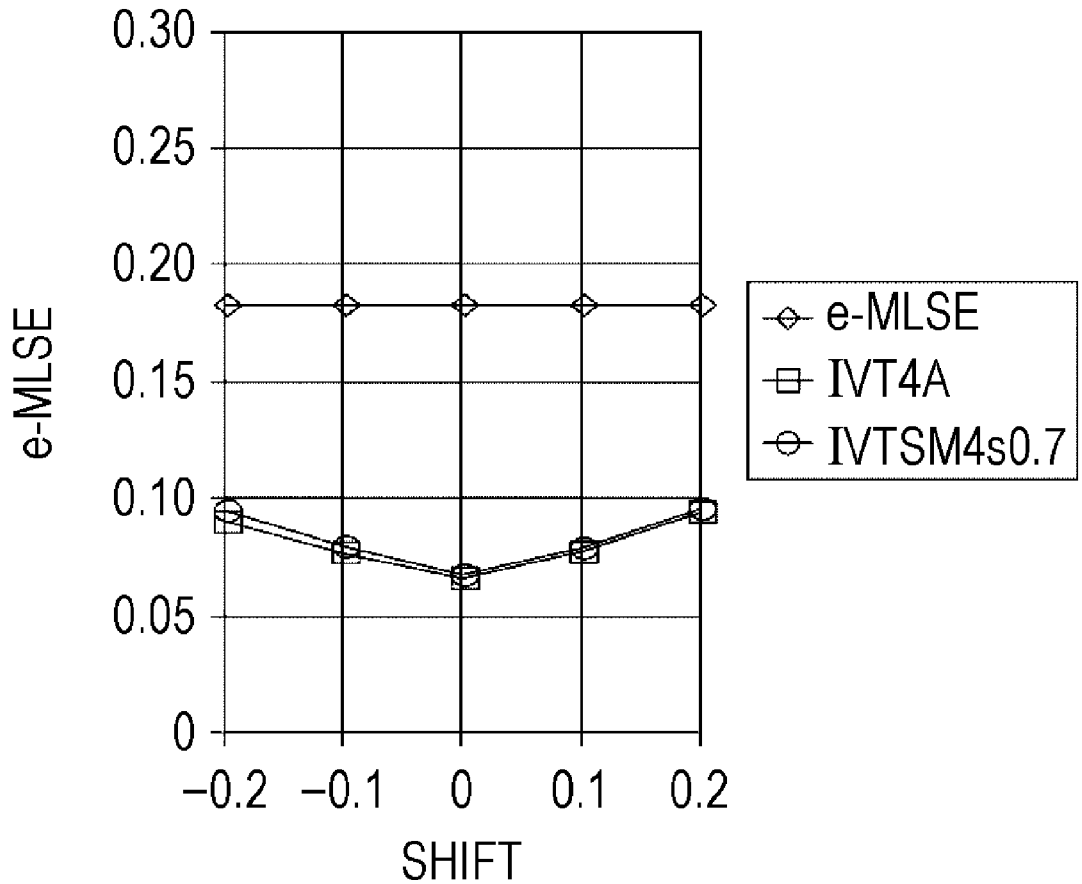
FIG. 88 is a graph for explaining a case where a pattern is shifted in a radial direction concerning the pattern IVTSM4.

FIG. 88 illustrates a margin in a case where a pattern is shifted in the radial direction concerning the pattern IVTSM4s0.7 and the pattern IVT4. The abscissa axis of the graph illustrated in FIG. 88 indicates the normalized shift amount.

As can be understood from the characteristics, although the radial coma aberration margin and the spherical aberration margin are improved, the defocus margin and the tangential coma aberration margin are slightly narrowed. However, the pattern shift in the radial direction of which deterioration is conspicuous in the pattern IVT4 is not improved. In this case, according to difference in media or the like, a plurality of coefficients Ksm may be switched to be used.

[Pattern IVNS5]
(Reducing Number of Channels by Maintaining Characteristics)

Figure 89:
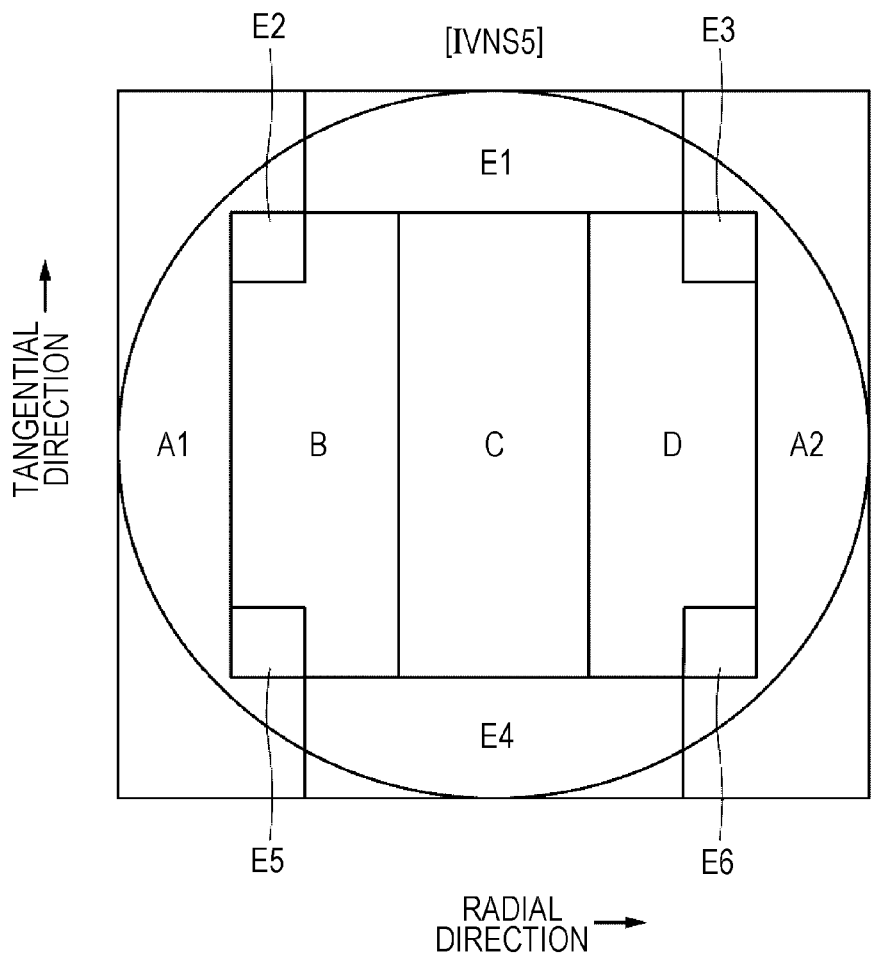
FIG. 89 is a schematic diagram illustrating a region division pattern IVNS5.

When the line density is not too high, even in the case of the channels of which center positions in the tangential direction are different, it is possible to obtain desirable characteristics. In other words, as illustrated in FIG. 89, two channels (E and F) of the pattern IVNST6 in the tangential direction are integrated into one channel (E). The regions F1, F2, and F3 of the channel F is set to the regions E4, E5, and E6 of the channel E. The pattern where the number of channels is reduced in this manner is referred to as a pattern IVNS5. Here, the region division position in the radial direction is set to ±0.25, ±0.5, and ±0.7 where the pupil radius is 1.0, and the region division position in the tangential direction is set to ±0.45 and ±0.65.

The above-described pattern IVNS5 will be described on the basis of simulation results for the pattern. Simulation conditions are the same as those of the above-described case of "low line density" and are as follows. In each diagram, the e-MLSE represents characteristics in the case where region division is not conducted.

LD35.18 (GB) . . . 0.053 µm/channel bit
When Tp=0.225 µm (for each of the land and groove), the plane capacity becomes 50.0 GB.
NA=0.85
PR (1233321)
Evaluation index: e-MLSE
Mark width=Tp×0.7
Disc noise and amplifier noise are present
"Reproduction Performance"

Simulation results of reproduction performance concerning the pattern IVNS5 are illustrated in FIGS. 90 to 94. In each diagram, the e-MLSE represents characteristics in the case where region division is not conducted.

Figure 90:
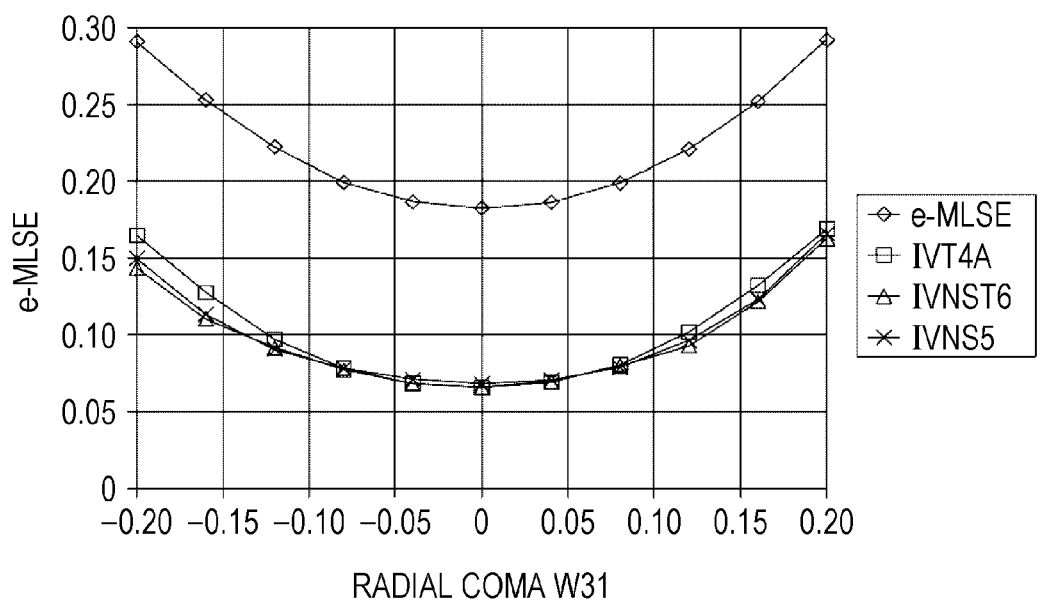
FIG. 90 is a graph for explaining a margin for coma aberration in a radial direction concerning the pattern IVNS5.

FIG. 90 illustrates a radial coma aberration margin concerning the pattern IVNS5, the above-described pattern IVT4, and the above-described pattern IVNST6. Similarly to the above-described other graphs, the ordinate axis indicates the index e-MLSE, and the abscissa axis indicates the normalized radial coma aberration W31.

Figure 91:
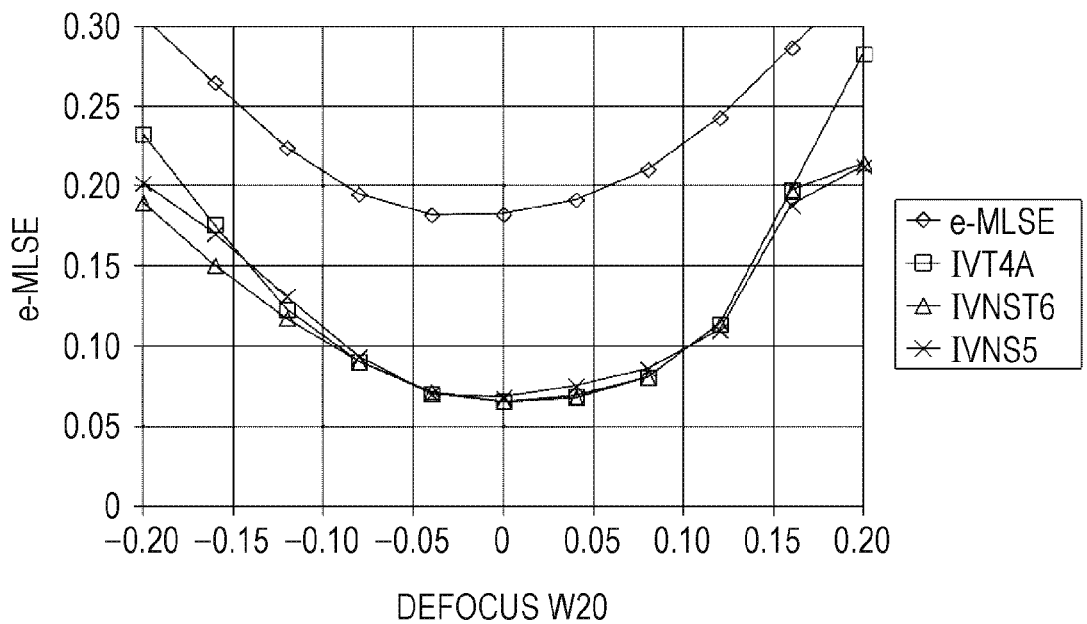
FIG. 91 is a graph for explaining a defocus margin concerning the pattern IVNS5.

FIG. 91 illustrates a defocus margin concerning the pattern IVNS5, the pattern IVT4, and the pattern IVNST6. The abscissa axis of the graph illustrated in FIG. 91 indicates the normalized defocus quantity W20 which is normalized by the wavelength.

Figure 92:
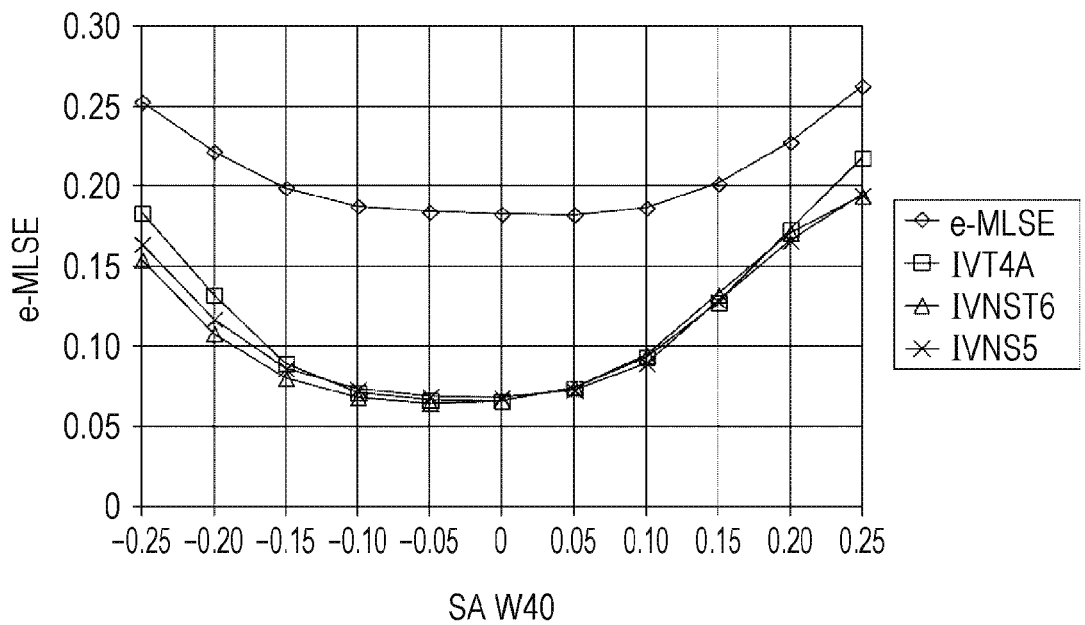
FIG. 92 is a graph for explaining a spherical aberration margin concerning the pattern IVNS5.

FIG. 92 illustrates a margin for spherical aberration SA concerning the pattern IVNS5, the pattern IVT4, and the pattern IVNST6. The abscissa axis of the graph illustrated in FIG. 92 indicates the normalized spherical aberration amount W40.

Figure 93:
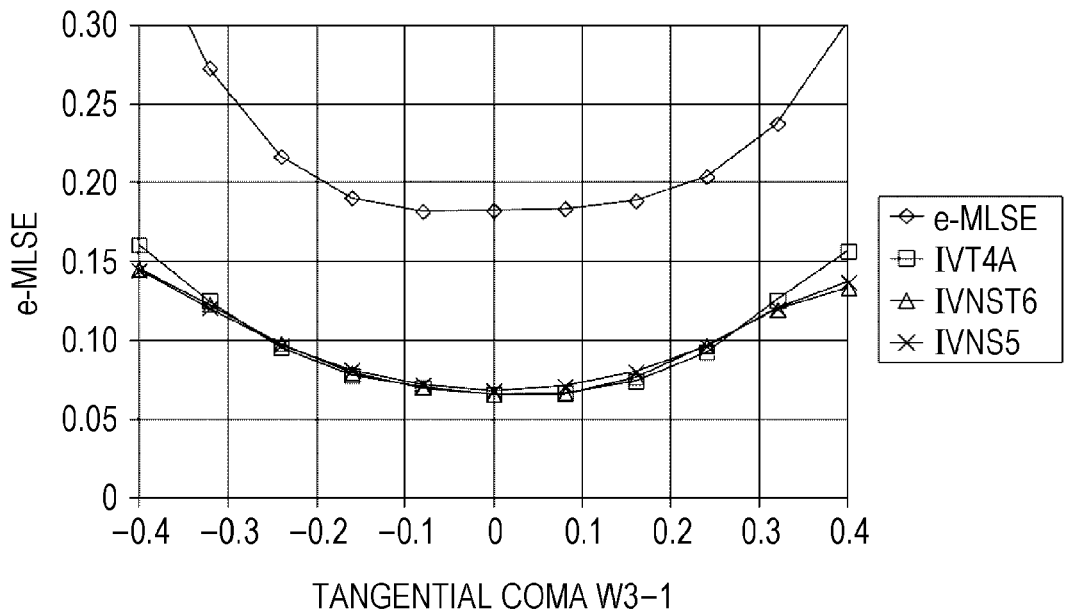
FIG. 93 is a graph for explaining a margin for coma aberration in a tangential direction concerning the pattern IVNS5.

FIG. 93 illustrates a tangential coma aberration margin concerning the pattern IVNS5, the pattern IVT4, and the pattern IVNST6. The abscissa axis of the graph illustrated in FIG. 87 indicates the normalized tangential coma aberration amount W3-1.

Figure 94:
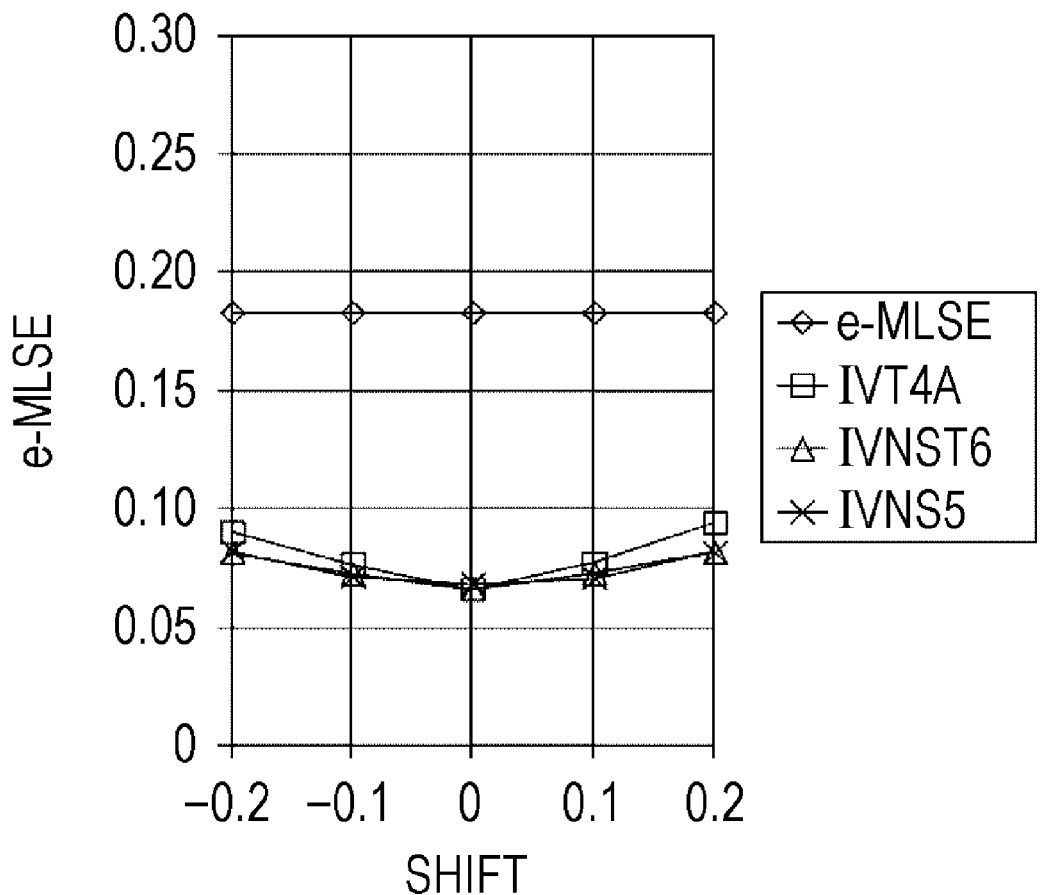
FIG. 94 is a graph for explaining a case where a pattern is shifted in a radial direction concerning the pattern IVNS5.

FIG. 94 illustrates a margin in a case where a pattern is shifted in the radial direction concerning the pattern IVNS5, the pattern IVT4, and the pattern IVNST6. The abscissa axis of the graph illustrated in FIG. 94 indicates the normalized shift amount.

As can be understood from the characteristics, when the line density is not too high, even in the case of having no channels of which center positions in the tangential direction are different, it is possible to obtain desirable characteristics.

"Electric Filter Optimized for Pattern IVNS5"

Figure 95:
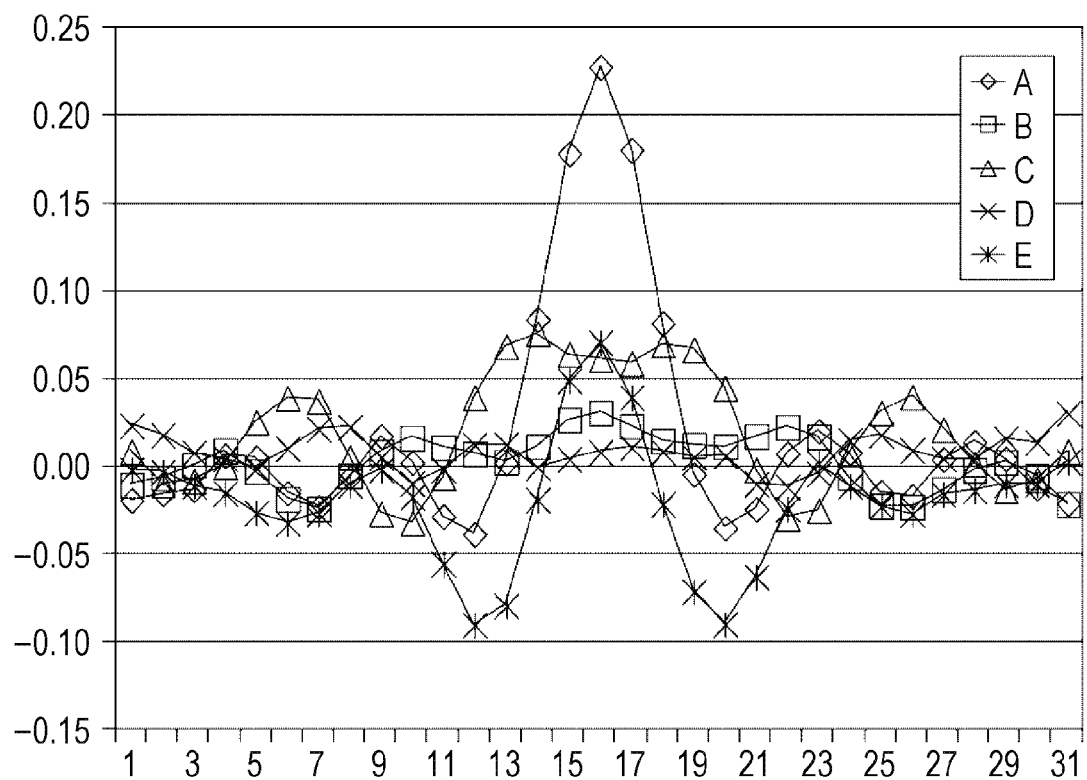
FIG. 95 is a graph illustrating an example of coefficients of taps of an electric filter optimized for the pattern IVNS5.
Figure 97:
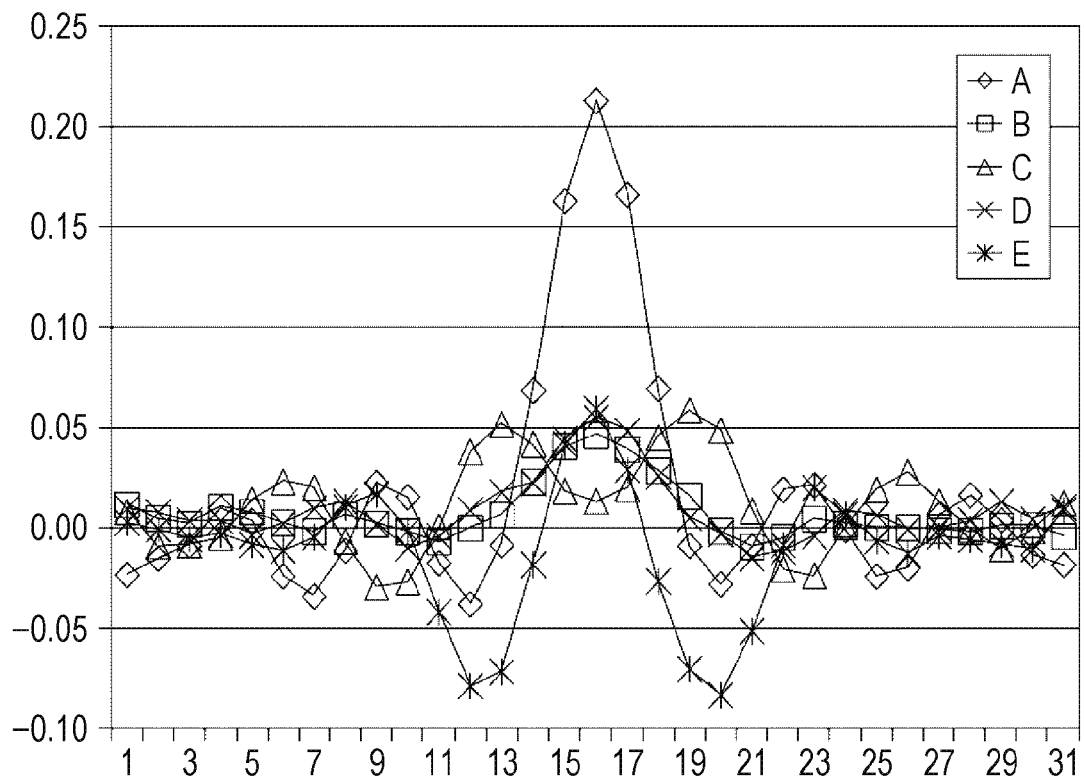
FIG. 97 is a graph illustrating an example of coefficients of taps of an electric filter optimized for the pattern IVNS5.
Figure 98:
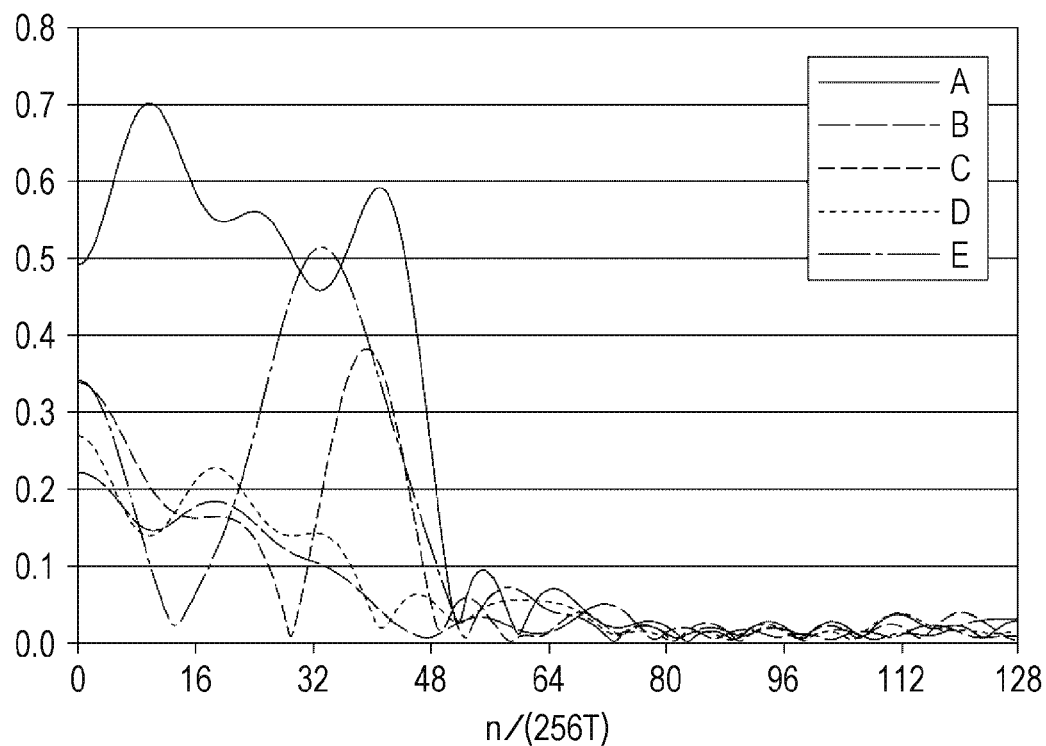
FIG. 98 is a graph illustrating frequency characteristics of an electric filter optimized for the pattern IVNS5.

An electric filter optimized for the above-described pattern IVNS5 will be described. An example of values of coefficients of 31 taps of the electric filter when W31=0, that is, at the perturbation origin in FIG. 90 is illustrated in FIG. 97. The electric filter is configured with an FIR filter. The frequency amplitude characteristics of the respective channels corresponding to the regions A to E in a case where such coefficients are set are illustrated in FIG. 98. In addition, an example of values of coefficients of 31 taps of the electric filter when W31=−0.16 is illustrated in FIG. 95. The frequency amplitude characteristics of the respective channels of A to E in a case where such coefficients are set are illustrated in FIG. 96.

Figure 99:
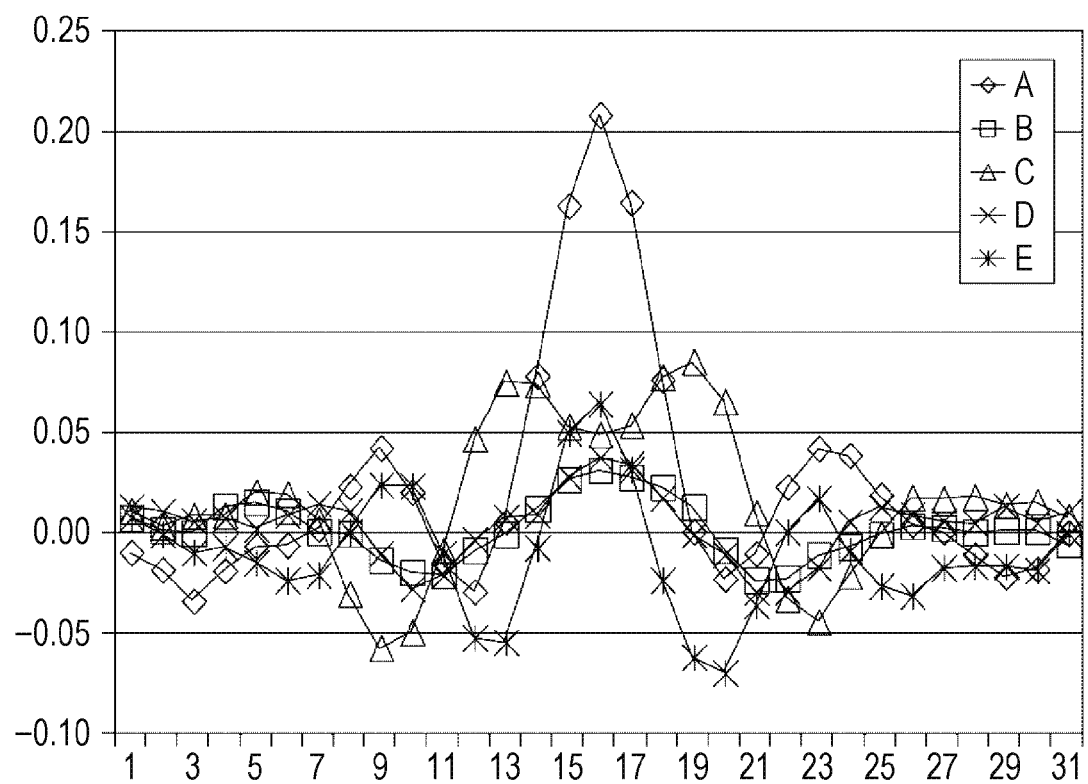
FIG. 99 is a graph illustrating an example of coefficients of taps of an electric filter optimized for the pattern IVNS5.

An example of values of coefficients of 31 taps of the electric filter when W40=−0.20 in the characteristics of spherical aberration SA in FIG. 92 is illustrated in FIG. 99. The electric filter is configured with an FIR filter. The frequency amplitude characteristics of the respective channels of A to E in a case where such coefficients are set are illustrated in FIG. 100.

Figure 96:
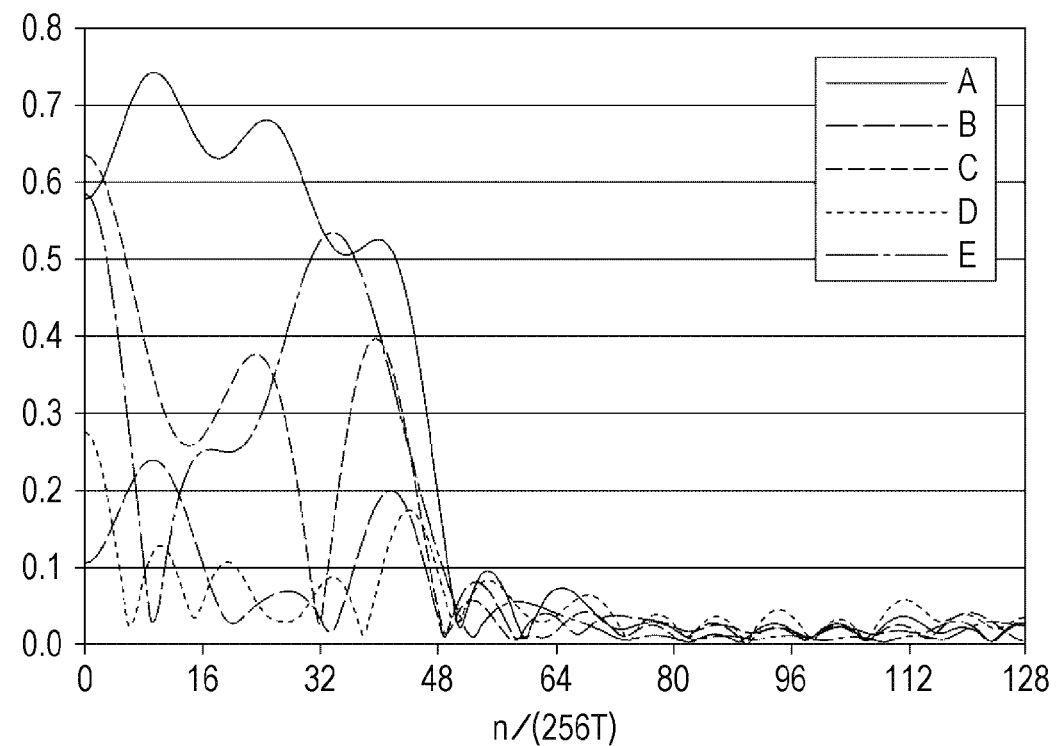
FIG. 96 is a graph illustrating frequency characteristics of an electric filter optimized for the pattern IVNS5.
Figure 100:
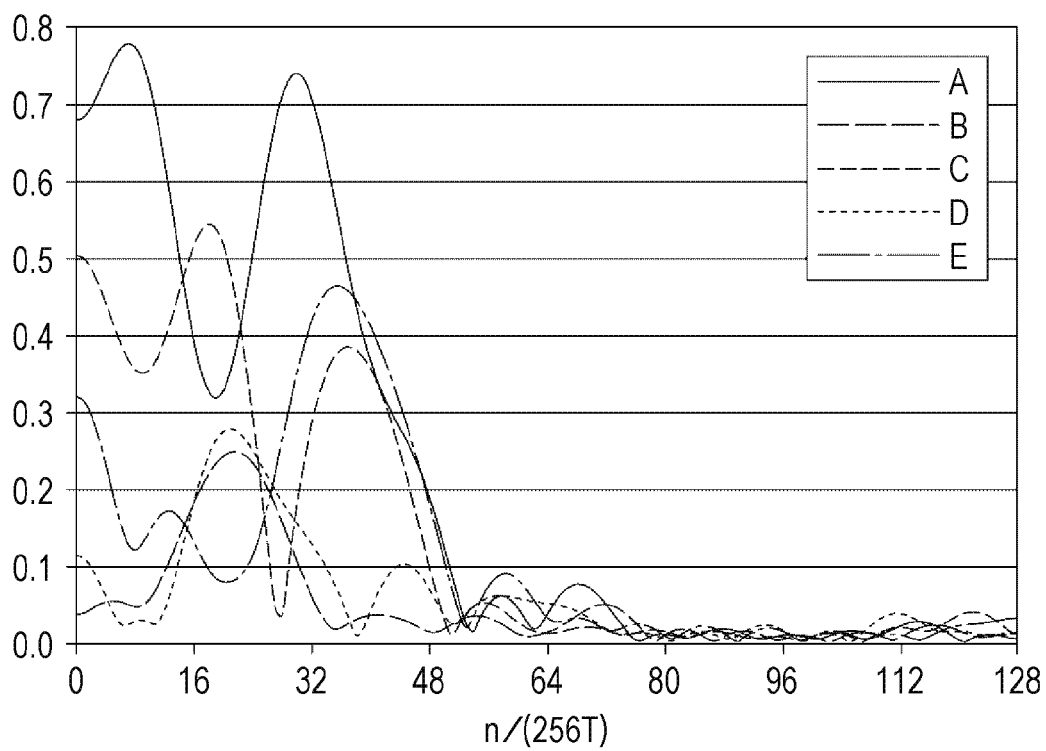
FIG. 100 is a graph illustrating frequency characteristics of an electric filter optimized for the pattern IVNS5.

As can be understood from the comparison of FIG. 98 illustrating the characteristics at the perturbation origin with FIG. 96 illustrating the characteristics in the state where the radial coma aberration occurs and the comparison of FIG. 98 with FIG. 100 illustrating the characteristics in the state where the spherical aberration occurs, in the case of the pattern IVNS5, similarly to the pattern IVNST6, the central portion is divided into three channels B, C, and D, so that the expansion of the margins for the radial coma aberration and the spherical aberration can be implemented. In the case of the pattern IVNS5, more clearly than the pattern IVNST6, the frequency characteristics of the filters at the C (the most central) and the B and D in the state of the perturbation center already become different. In addition, when the radial coma aberration is W31=−0.16 or when the spherical aberration is W40=−20, the frequency characteristics of the filters at the C (the most central) and the B and D are further changed.

[Pattern IVSP4]

(Reducing Number of Channels by Maintaining Characteristics)

Similarly to the configuration of the pattern IVTSP5 on the basis of the pattern IVNST6, the pattern IVSP4 can be configured on the basis of the pattern IVNS5. In other words, by the method of sharing the center region C in an optical or electrical manner, it is possible to reduce the number of channels due to restrictions such as power consumption, the number of input pins, and circuit size of a signal processing circuit.

As a method of reducing the number of channels, among the five channels A to E in the pattern IVNS5 (refer to FIG. 89), the channels A and E are used as they are, and the signal of the channel C is distributed to the channels B and D, so that the four channels are set. In other words, the signal of the channel B is set to be B+(Ks×C), and the signal of the channel D is set to be D+(Ks×C). The pattern where the number of channels is reduced in this manner is referred to as a pattern IVSP4.

The above-described pattern IVSP4 will be described on the basis of simulation results for the pattern. Simulation conditions are the same as those of the above-described case of "low line density" and are as follows.

LD35.18 (GB) . . . 0.053 μm/channel bit
When Tp=0.225 μm (for each of the land and groove), the plane capacity becomes 50.0 GB.
NA=0.85
PR (1233321)
Evaluation index: e-MLSE
Mark width=Tp×0.7
Disc noise and amplifier noise are present
"Reproduction Performance"

Simulation results of reproduction performance concerning the pattern IVSP4 are illustrated in FIGS. 101 to 109. In each diagram, the e-MLSE represents characteristics in the case where region division is not conducted.

Figure 101:
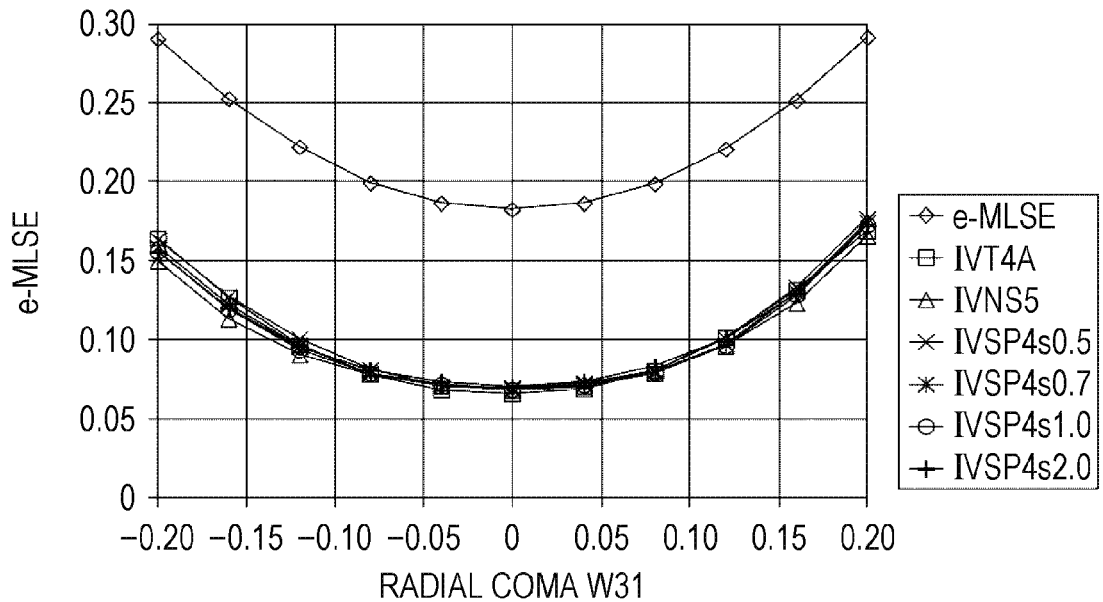
FIG. 101 is a graph for explaining a margin for coma aberration in a radial direction concerning a pattern IVSP4 reducing the number of channels.

FIG. 101 illustrates a radial coma aberration margin concerning the pattern IVSP4s0.5, the pattern IVSP4s0.7, the pattern IVSP4s1.0, the pattern IVSP4s2.0, the above-described pattern IVNS5, and the above-described pattern IVT4. Similarly to the above-described other graphs, the ordinate axis indicates the index e-MLSE, and the abscissa axis indicates the normalized radial coma aberration W31. The IVSP4s0.5 denotes the pattern IVSP4 when Ks=0.5. The IVSP4s0.7 denotes the pattern IVSP4 when Ks=0.7. The IVSP4s1.0 denotes the pattern IVSP4 when Ks=1.0. The IVSP4s2.0 denotes the pattern IVSP4 when Ks=2.0.

Figure 102:
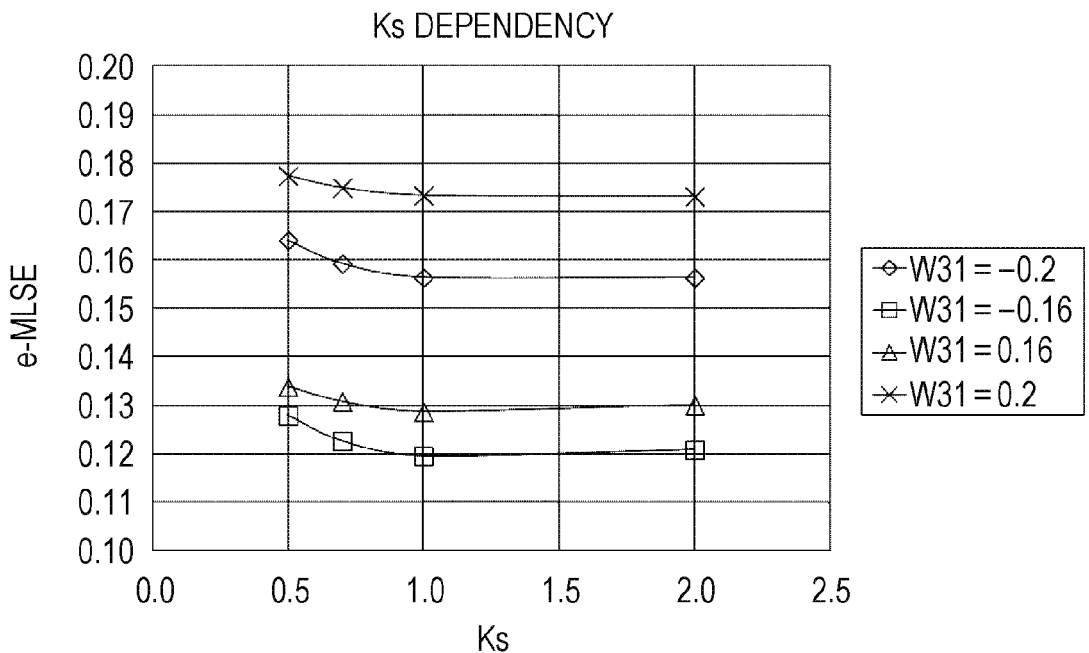
FIG. 102 is a graph illustrating coefficient dependency of a margin for coma aberration in a radial direction.

FIG. 102 illustrates a dependency of the radial coma aberration margin on the coefficient Ks. The radial coma aberration margin greatly deteriorates in the direction where the Ks is decreased. The radial coma aberration margin is the best in the vicinity of Ks=1.

Figure 103:
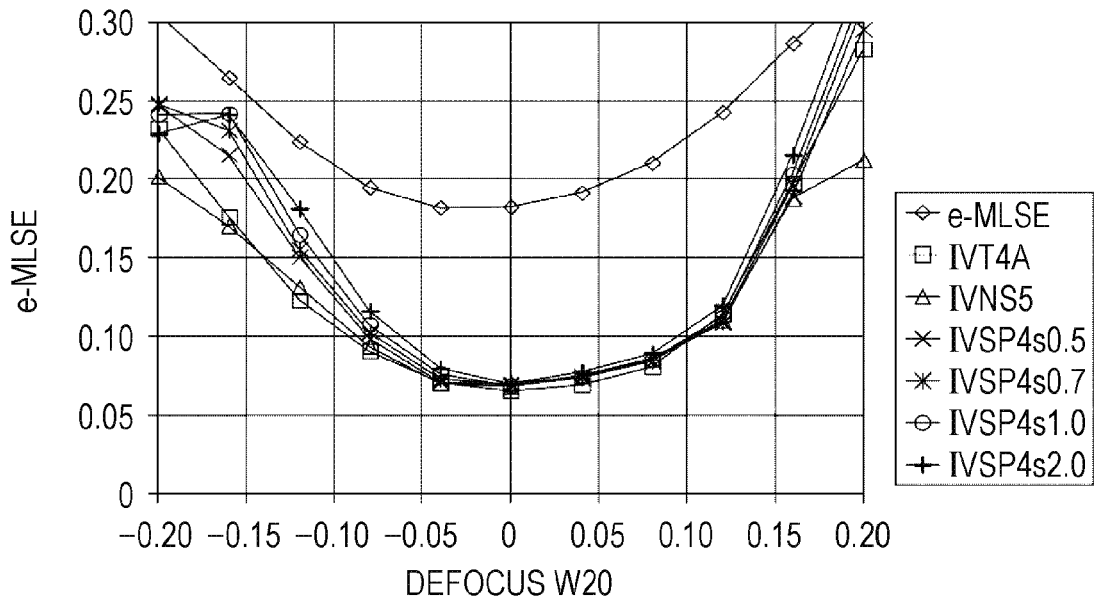
FIG. 103 is a graph for explaining a defocus margin concerning the pattern IVSP4.

FIG. 103 illustrates a defocus margin concerning the pattern IVSP4s0.5, the pattern IVSP4s0.7, the pattern IVSP4s1.0, the pattern IVSP4s2.0, the pattern IVNS5, and the pattern IVT4. The abscissa axis of the graph illustrated in FIG. 103 indicates the normalized defocus quantity W20 which is normalized by the wavelength.

Figure 104:
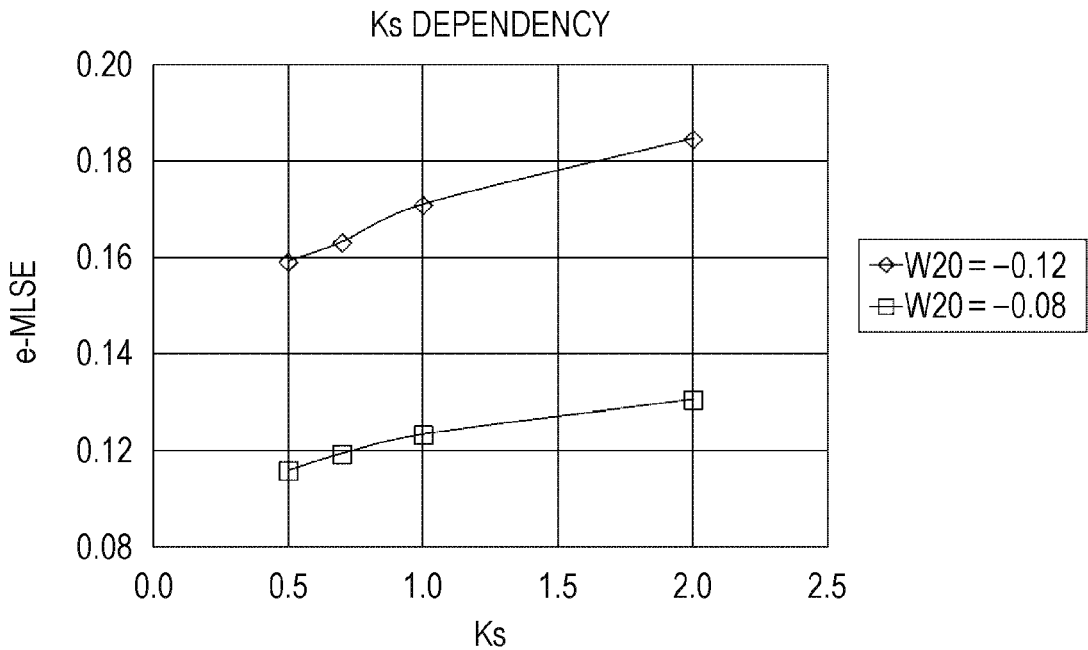
FIG. 104 is a graph illustrating coefficient dependency of a defocus margin.

FIG. 104 illustrates a dependency of the defocus margin on the coefficient Ks. The defocus margin is good when the Ks is small.

Figure 105:
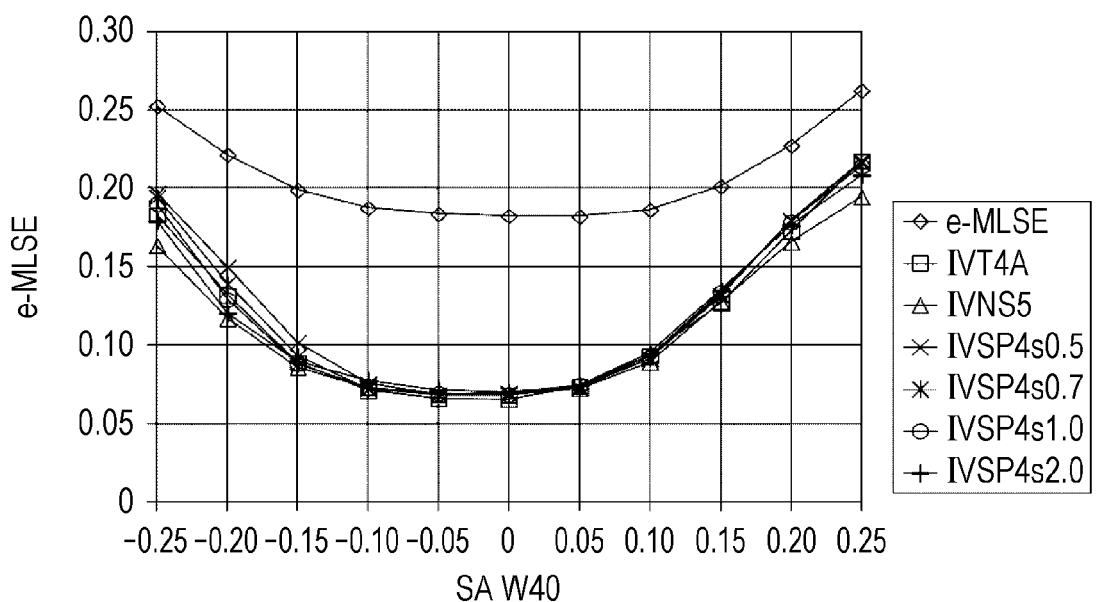
FIG. 105 is a graph for explaining a spherical aberration margin concerning the pattern IVSP4.

FIG. 105 illustrates a margin for spherical aberration SA concerning the pattern IVSP4s0.5, the pattern IVSP4s0.7, the pattern IVSP4s1.0, the pattern IVSP4s2.0, the pattern IVNS5, and the pattern IVT4. The abscissa axis of the graph illustrated in FIG. 105 indicates the normalized spherical aberration amount W40.

Figure 106:
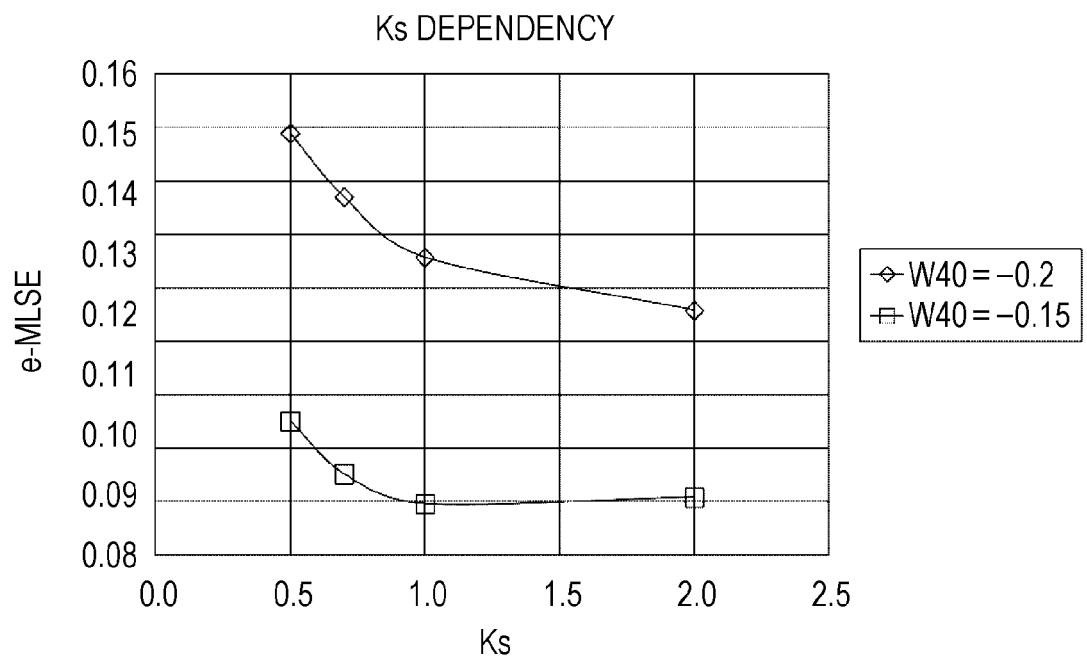
FIG. 106 is a graph illustrating coefficient dependency of a spherical aberration margin.

FIG. 106 illustrates a dependency of the spherical aberration margin on the coefficient Ks. The spherical aberration margin is good when the Ks is large.

Figure 107:
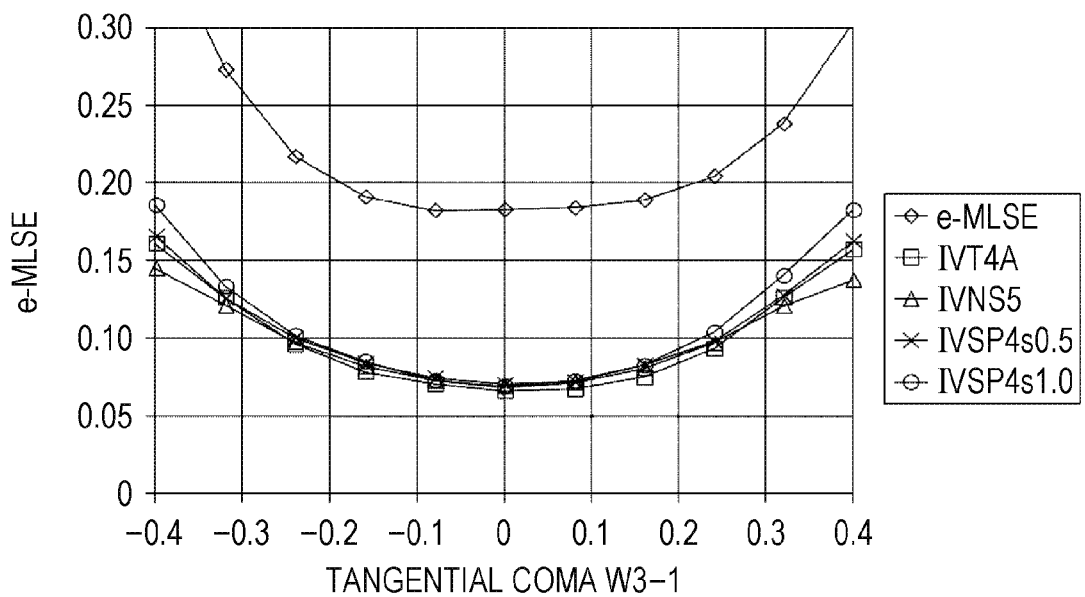
FIG. 107 is a graph for explaining a margin for coma aberration in a tangential direction concerning the pattern IVSP4.

FIG. 107 illustrates a tangential coma aberration margin concerning the pattern IVSP4s0.5, the pattern IVSP4s1.0, the pattern IVNS5, and the pattern IVT4. The abscissa axis of the graph illustrated in FIG. 107 indicates the normalized tangential coma aberration amount W3-1.

Figure 108:
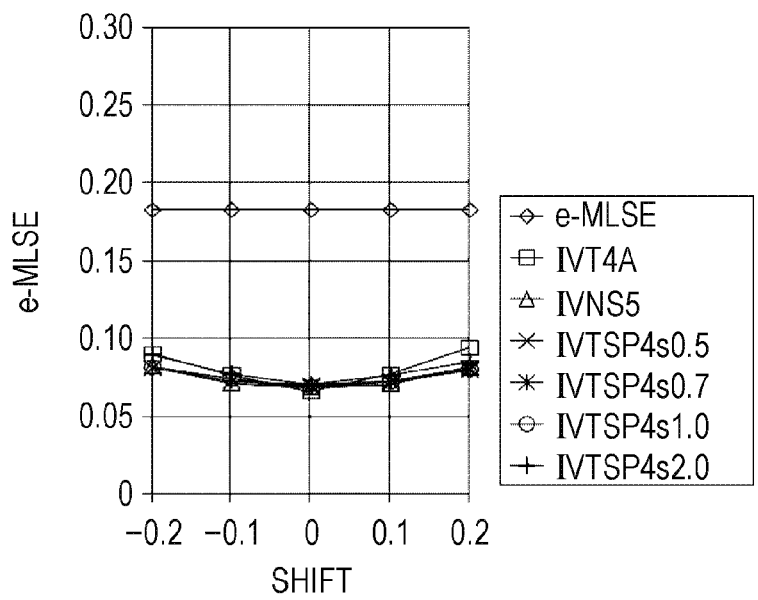
FIG. 108 is a graph for explaining a case where a pattern is shifted in a radial direction concerning the pattern IVSP4.
Figure 109:
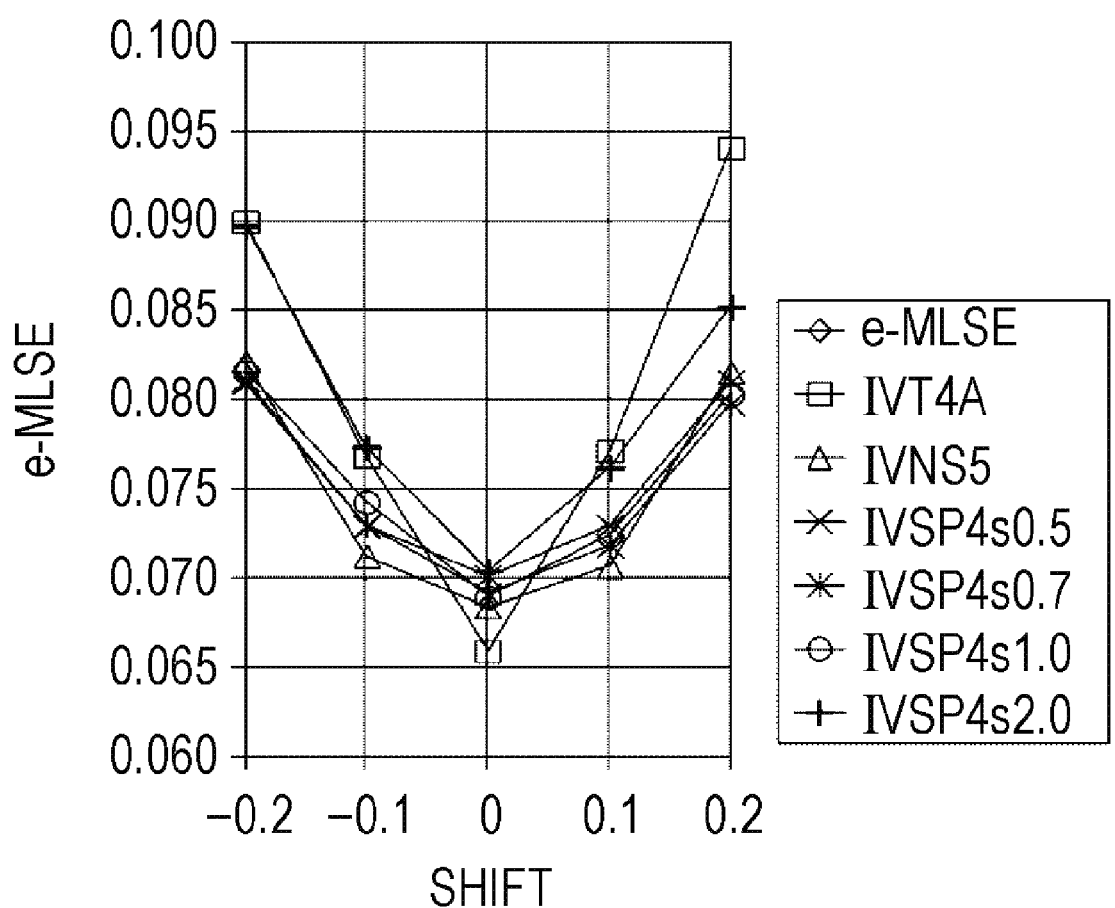
FIG. 109 is a graph for explaining a case where a pattern is shifted in a radial direction concerning the pattern IVSP4.

FIG. 108 illustrates a margin in a case where a pattern is shifted in the radial direction concerning the pattern IVSP4s0.5, the pattern IVSP4s0.7, the pattern IVSP4s1.0, the pattern IVSP4s2.0, the pattern IVNS5, and the pattern IVT4. The abscissa axis of the graph illustrated in FIG. 108 indicates the normalized shift amount. Similarly, FIG. 109 also illustrates a margin in a case where the pattern is shifted in the radial direction. As compared with FIG. 108, the ordinate axis (e-MLSE) is extended, so that the respective graphs can be easily identified.

As can be understood from the characteristics, if the ratio Ks of signals between regions is changed, there is a trade-off relationship between the "defocus margin and tangential coma aberration margin" and the "radial coma aberration margin and spherical aberration margin". According to difference in media or the like, a plurality of coefficients Ks may be switched to be used.

[Pattern IVos4]

(Reducing Number of Channels by Maintaining Characteristics)

Similarly to the pattern IVSP4, by the method of sharing the center region C in the pattern IVNS5 in an optical or electrical manner, it is possible to reduce the number of channels due to restrictions such as power consumption, the number of input pins, and circuit size of a signal processing circuit.

As a method of reducing the number of channels, among the five channels A to E in the pattern IVNS5 (refer to FIG.

Figure 110:
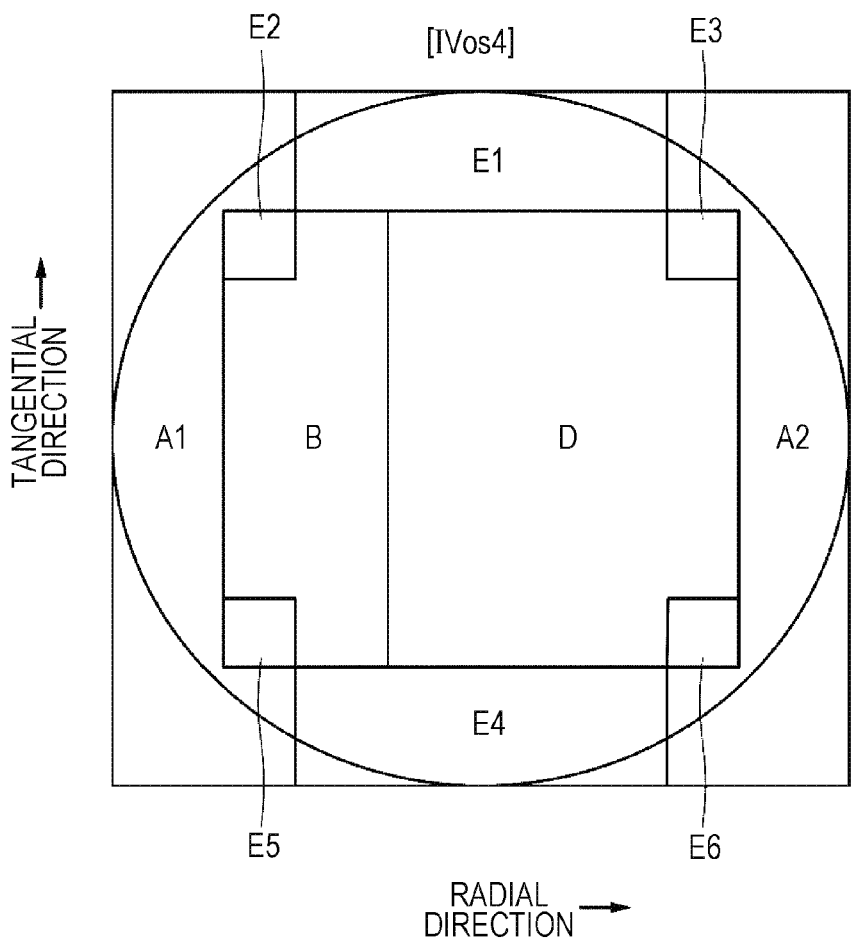
FIG. 110 is a schematic diagram used to explain a pattern IVos4 reducing the number of channels.

89), the channels A and E are used as they are, and the signal of the channel C is distributed to the channels B and D, so that the four channels are set. In other words, the signal of the channel B is set to be B+(Ks1×C), and the signal of the channel D is set to be D+(Ks2×C) (Ks1≠Ks2). In the case of (Ks1=0, Ks2=1), the pattern division is conducted as illustrated in FIG. 110. The pattern where the number of channels is reduced in this manner is referred to as a pattern IVos4. Here, the region division position in the radial direction is set to ±0.25, ±0.5, and ±0.7 where the pupil radius is 1.0, and the region division position in the tangential direction is set to ±0.45 and ±0.65.

The above-described pattern IVos4 will be described on the basis of simulation results for the pattern. Simulation conditions are the same as those of the above-described case of "low line density" and are as follows.

LD35.18 (GB) . . . 0.053 μm/channel bit
When Tp=0.225 μm (for each of the land and groove), the plane capacity becomes 50.0 GB.
NA=0.85
PR (1233321)
Evaluation index: e-MLSE
Mark width=Tp×0.7
Disc noise and amplifier noise are present
"Reproduction Performance"

Simulation results of reproduction performance concerning the pattern IVos4 are illustrated in FIGS. 111 to 116. In each diagram, the e-MLSE represents characteristics in the case where region division is not conducted.

Figure 111:
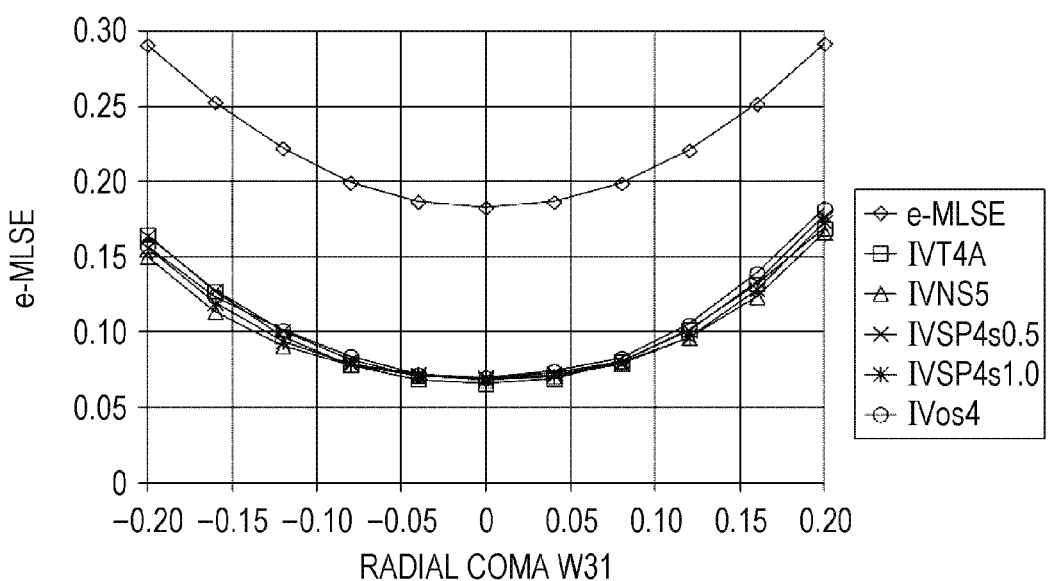
FIG. 111 is a graph for explaining a margin for coma aberration in a radial direction concerning the pattern IVos4.

FIG. 111 illustrates a radial coma aberration margin concerning the pattern IVos4, the pattern IVSP4s0.5, the pattern IVSP4s1.0, the pattern IVNS5, and the pattern IVT4. Similarly to the above-described other graphs, the ordinate axis indicates the index e-MLSE, and the abscissa axis indicates the normalized radial coma aberration W31. The IVos4 represents the characteristics of the case (Ks1=0, Ks2=1).

Figure 112:
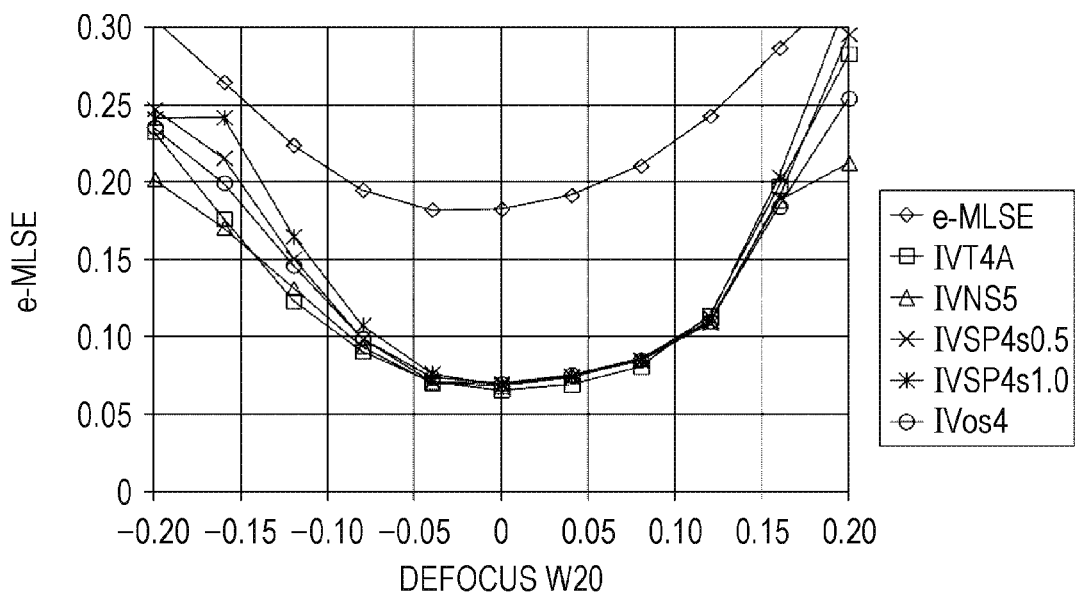
FIG. 112 is a graph for explaining a defocus margin concerning the pattern IVos4.

FIG. 112 illustrates a defocus margin concerning the pattern IVos4, the pattern IVSP4s0.5, the pattern IVSP4s1.0, the pattern IVNS5, and the pattern IVT4. The abscissa axis of the graph illustrated in FIG. 112 indicates the normalized defocus quantity W20 which is normalized by the wavelength.

Figure 113:
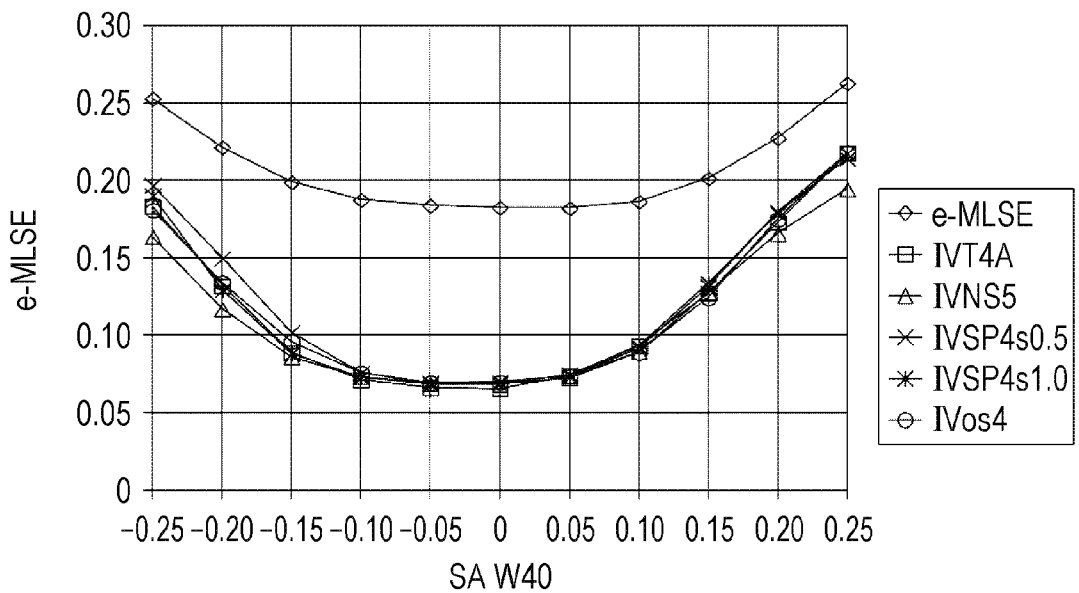
FIG. 113 is a graph for explaining a spherical aberration margin concerning the pattern IVos4.

FIG. 113 illustrates a margin for spherical aberration SA concerning the pattern IVos4, the pattern IVSP4s0.5, the pattern IVSP4s1.0, the pattern IVNS5, and the pattern IVT4. The abscissa axis of the graph illustrated in FIG. 113 indicates the normalized spherical aberration amount W40.

Figure 114:
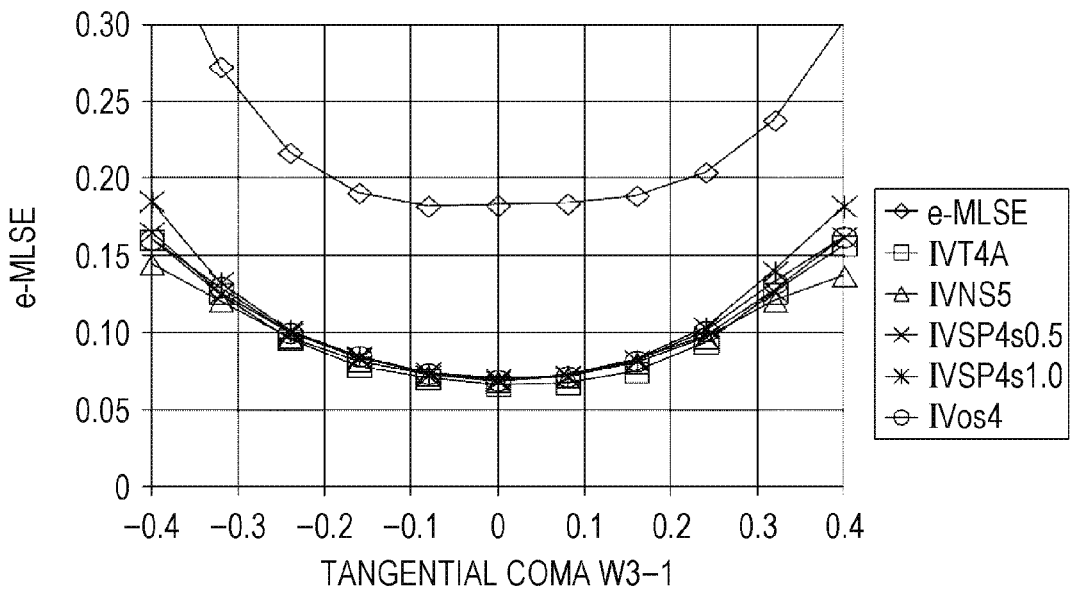
FIG. 114 is a graph for explaining a margin for coma aberration in a tangential direction concerning the pattern IVos4.

FIG. 114 illustrates a tangential coma aberration margin concerning the pattern IVos4, the pattern IVSP4s0.5, the pattern IVSP4s1.0, the pattern IVNS5, and the pattern IVT4. The abscissa axis of the graph illustrated in FIG. 114 indicates the normalized tangential coma aberration amount W3-1.

Figure 115:
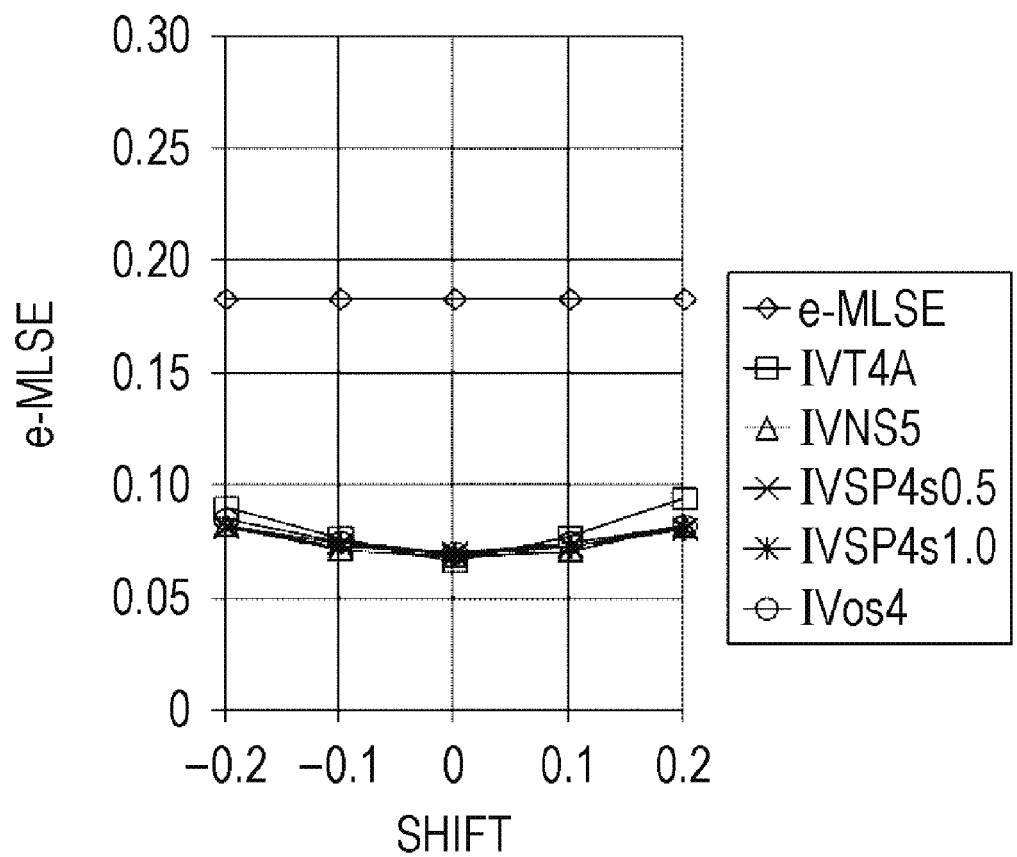
FIG. 115 is a graph for explaining a case where a pattern is shifted in a radial direction concerning the pattern IVos4.
Figure 116:
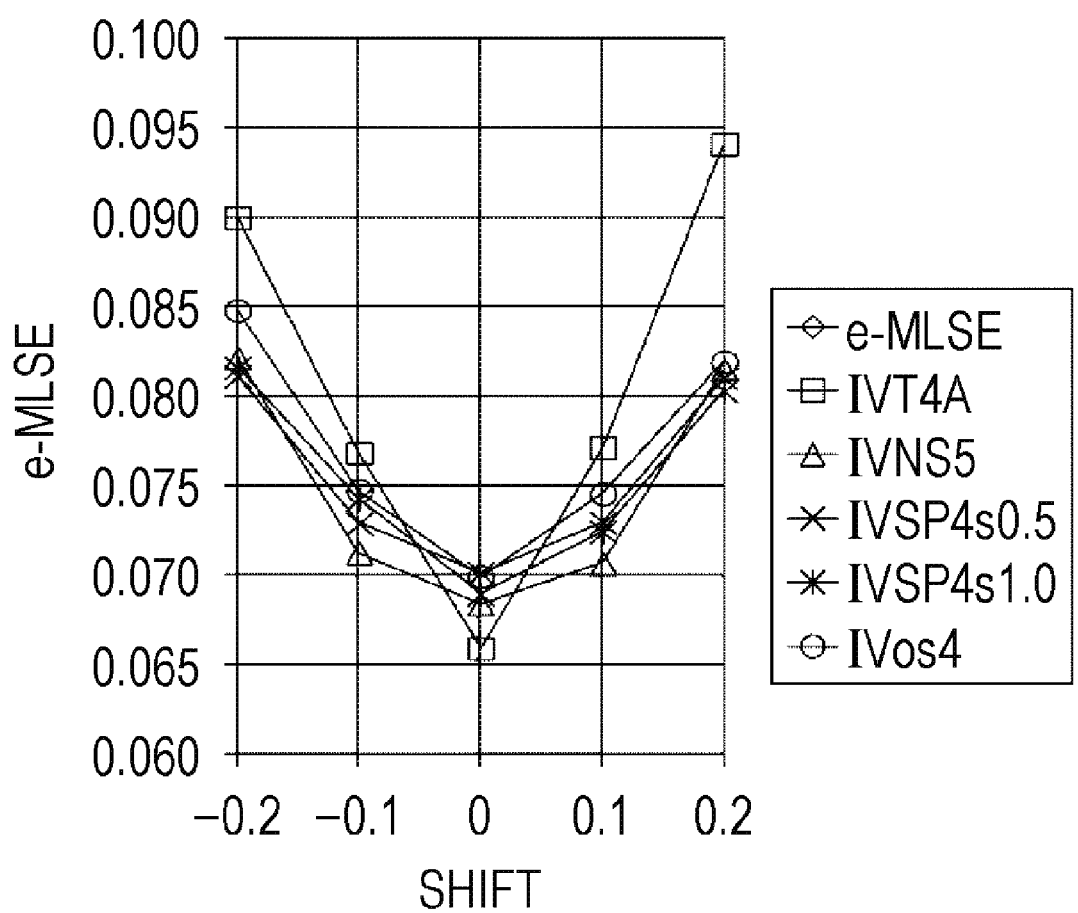
FIG. 116 is a graph for explaining a case where a pattern is shifted in a radial direction concerning the pattern IVos4.

FIG. 115 illustrates a margin in a case where a pattern is shifted in the radial direction concerning the pattern IVos4, the pattern IVSP4s0.5, the pattern IVSP4s1.0, the pattern IVNS5, and the pattern IVT4. The abscissa axis of the graph illustrated in FIG. 115 indicates the normalized shift amount. Similarly, FIG. 116 also illustrates a margin in a case where the pattern is shifted in the radial direction. As compared with FIG. 115, the ordinate axis (e-MLSE) is extended, so that the respective graphs can be easily identified.

As can be understood from the characteristics, the pattern IVos4 has some characteristics which are better than those of the pattern IVSP4s0.5. According to difference in media or the like, a plurality of coefficients Ks may be switched to be used or the balance of coefficients Ks1 and Ks2 may be changed.

Heretofore, the flow from the pattern IVNST6 where the central region of the pattern IVT4 is divided into three regions in the radial direction, through the pattern IVTSP5, the pattern IVTSM4, the pattern IVNS5, and the pattern IVSP4, to the pattern IVos4 has been described. These relationships can be summarized as listed in Table 1.

TABLE 1

|           | IVT4      | IVNST6 | IVTSP5     | IVTSM4              | IVNS5 | IVSP4      | IVos4        |
|-----------|-----------|--------|------------|---------------------|-------|------------|--------------|
| channel 1 | A         | A      | A          | A                   | A     | A          | A            |
| channel 2 | B + C + D | B      | B + Ks × C | C + Ksm × B + Ksm × D | B     | B + Ks × C | B + Ks1 × C  |
| channel 3 | E         | C      | D + Ks × C | E                   | C     | D + Ks × C | D + Ks2 × C  |
| channel 4 | F         | D      | E          | F                   | D     | E + F      | E + F        |
| channel 5 |           | E      | F          |                     | E + F |            |              |
| channel 6 |           | F      |            |                     |       |            |              |

In the respective channels, as expressed by the calculation equations in the table, the signals need not to be detected as independent signals, but the signals may be detected by the same light sensing units when the light beams are sensed by detection elements. Otherwise, after the signals are separately sensed, the signals may be electrically calculated.

Figure 117:
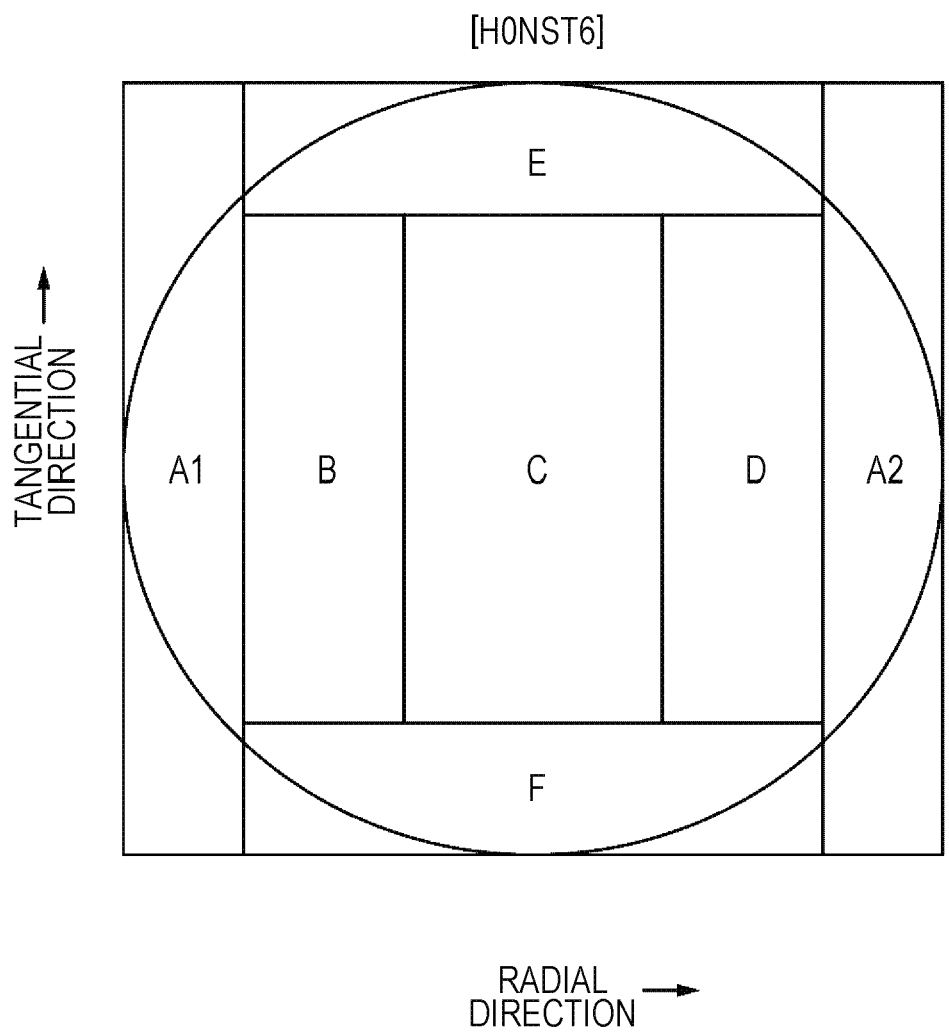
FIG. 117 is a schematic diagram illustrating a pattern HNST6.

According to the same consideration, a flow from the pattern NST6 where the central region of the T4 is divided into three regions in the radial direction, through the TSP5, the TSM4, the pattern NS5, and the SP4 to the os4 can be considered. In addition, similarly, a flow from the pattern HNST6 (FIG. 117) where the central region of the pattern HT4 is divided into three region in the radial direction, through the pattern HTSP5, the pattern HTSM4, the pattern HNS5, and the pattern HSP4 to the pattern Hos4 can be considered. These can be summarized as listed in Table 2. The basic division pattern is used as it is, and the division positions may be appropriately changed by taking into consideration of various characteristics.

TABLE 2

|  | T4<br>HT4 | NST6<br>HNST6 | TSP5<br>HTSP5 | TSM4<br>HTSM4 | NS5<br>HNS5 | SP4<br>HSP4 | os4<br>Hos4 |
|---|---|---|---|---|---|---|---|
| channel 1 | A | A | A | A | A | A | A |
| channel 2 | B + C + D | B | B + Ks × C | C + Ksm × B + Ksm × D | B | B + Ks × C | B + Ks1 × C |
| channel 3 | E | C | D + Ks × C | E | C | D + Ks × C | D + Ks2 × C |
| channel 4 | F | D | E | F | D | E + F | E + F |
| channel 5 |  | E | F |  | E + F |  |  |
| channel 6 |  | F |  |  |  |  |  |

Figure 118:
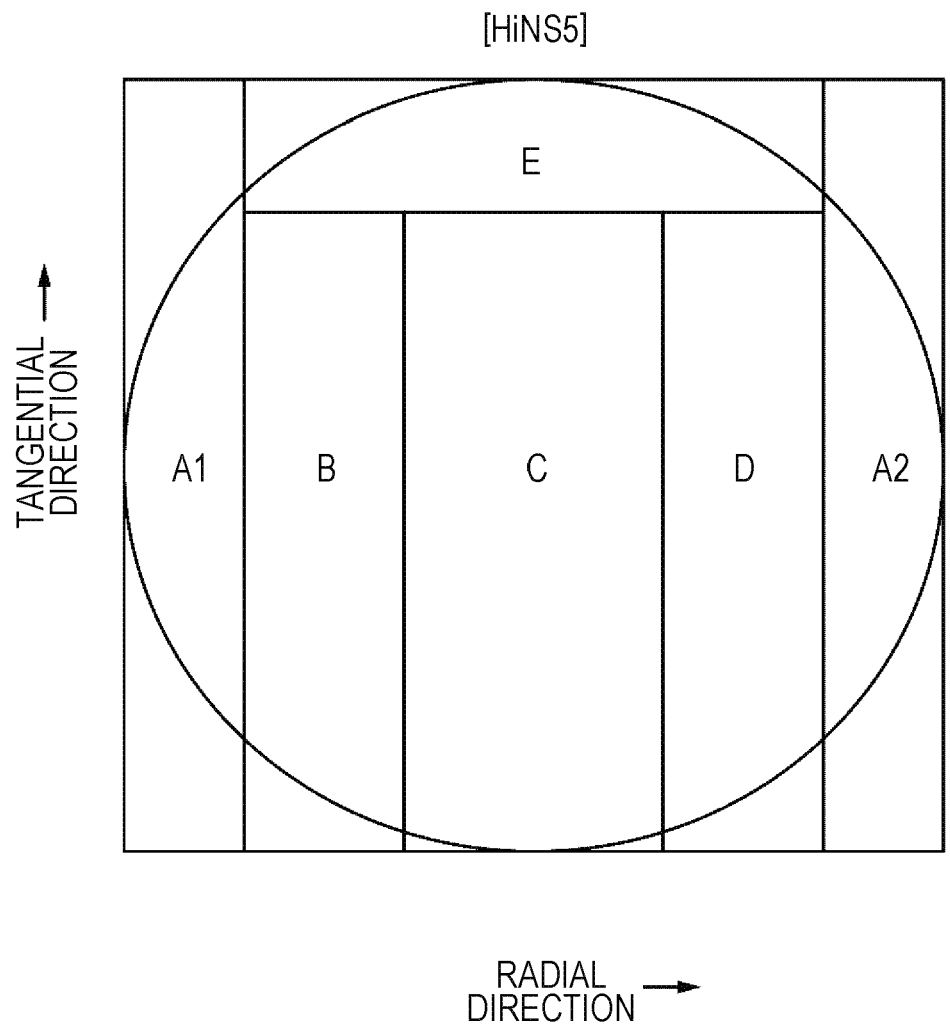
FIG. 118 is a schematic diagram illustrating a pattern HiNS5.

In addition, a flow from the pattern HiNS5 (FIG. 118) where the central region of the pattern Hi3 is divided into three regions in the radial direction through the pattern HiSP4 and the pattern HiSM3 to the pattern Hios4 may be considered. These can be summarized as listed in Table 3.

TABLE 3

|  | Hi3 | HiNS5 | HiSP4 | HiSM3 | Hios4 |
|---|---|---|---|---|---|
| channel 1 | A | A | A | A | A |
| channel 2 | B + C + D | B | B + Ks × C | C + Ksm × B + Ksm × D | B + Ks1 × C |
| channel 3 | E | C | D + Ks × C | E | D + Ks2 × C |
| channel 4 |  | D | E |  | E |
| channel 5 |  | E |  |  |  |

Figure 119:
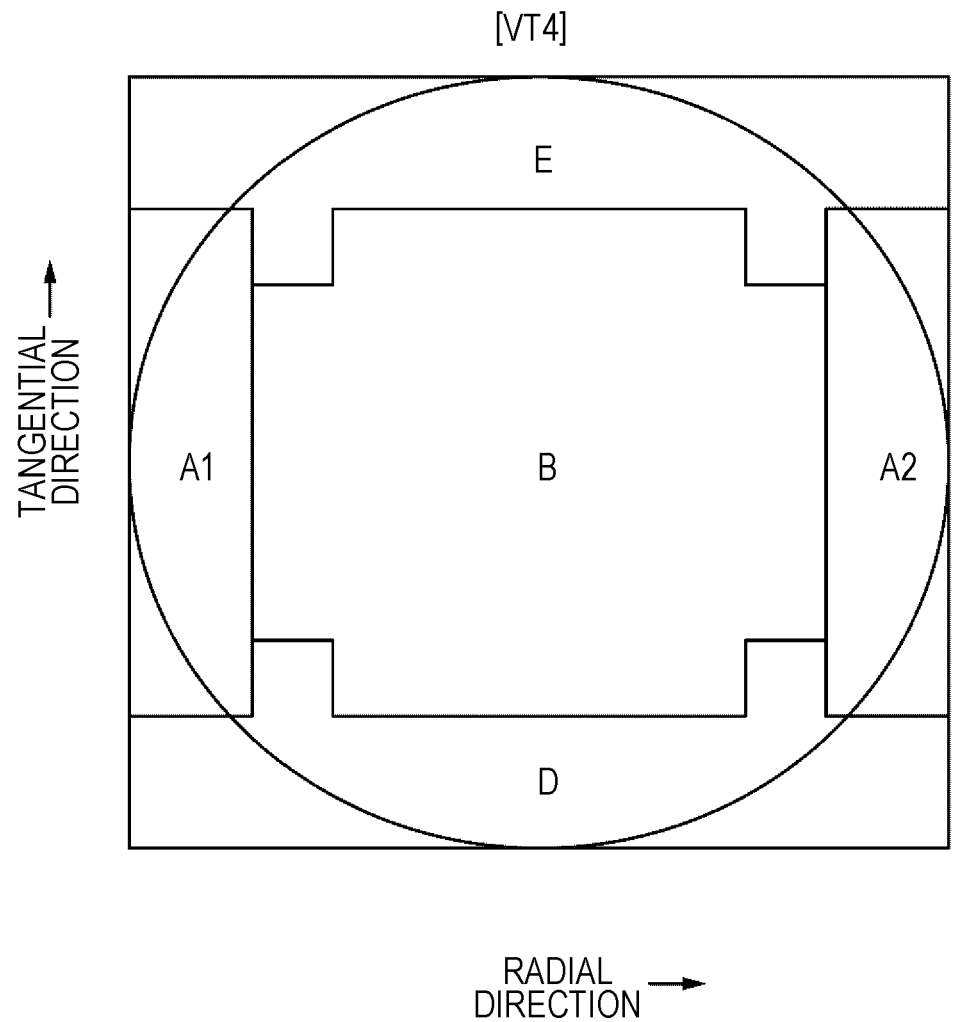
FIG. 119 is a schematic diagram illustrating a pattern VT4.
Figure 120:
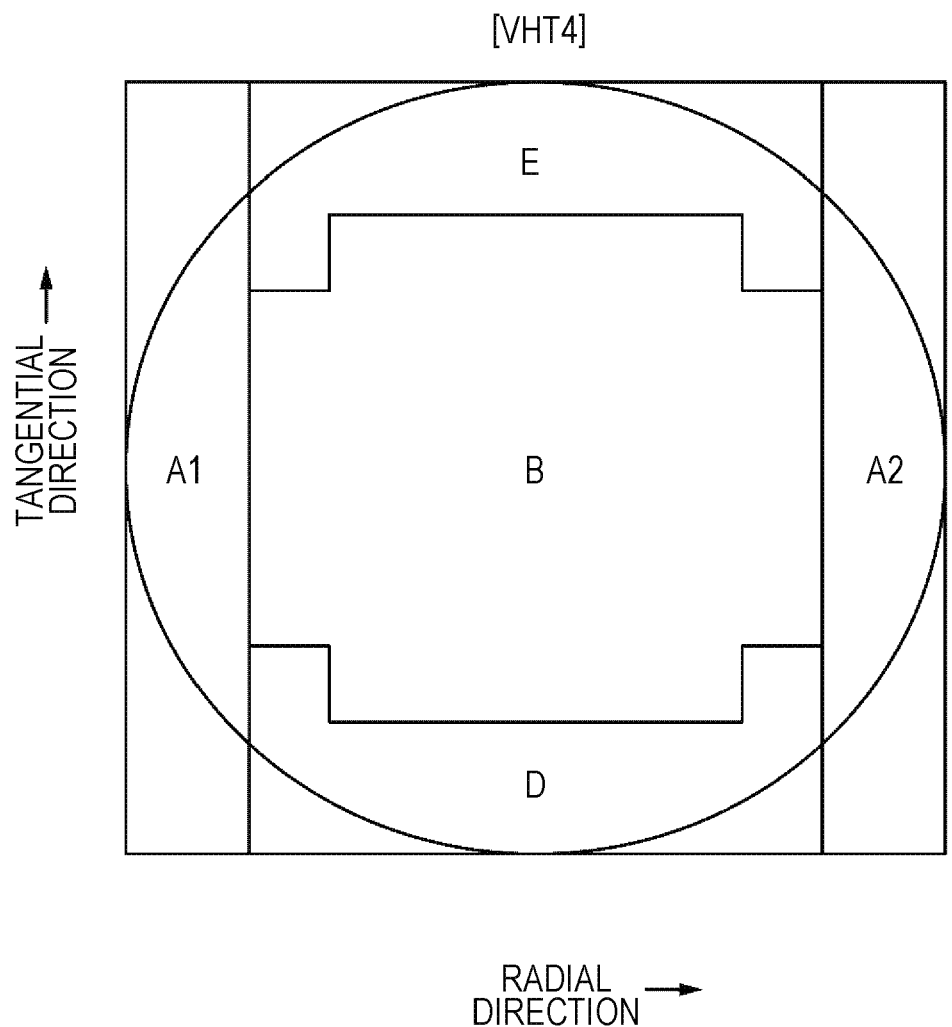
Figure 121:
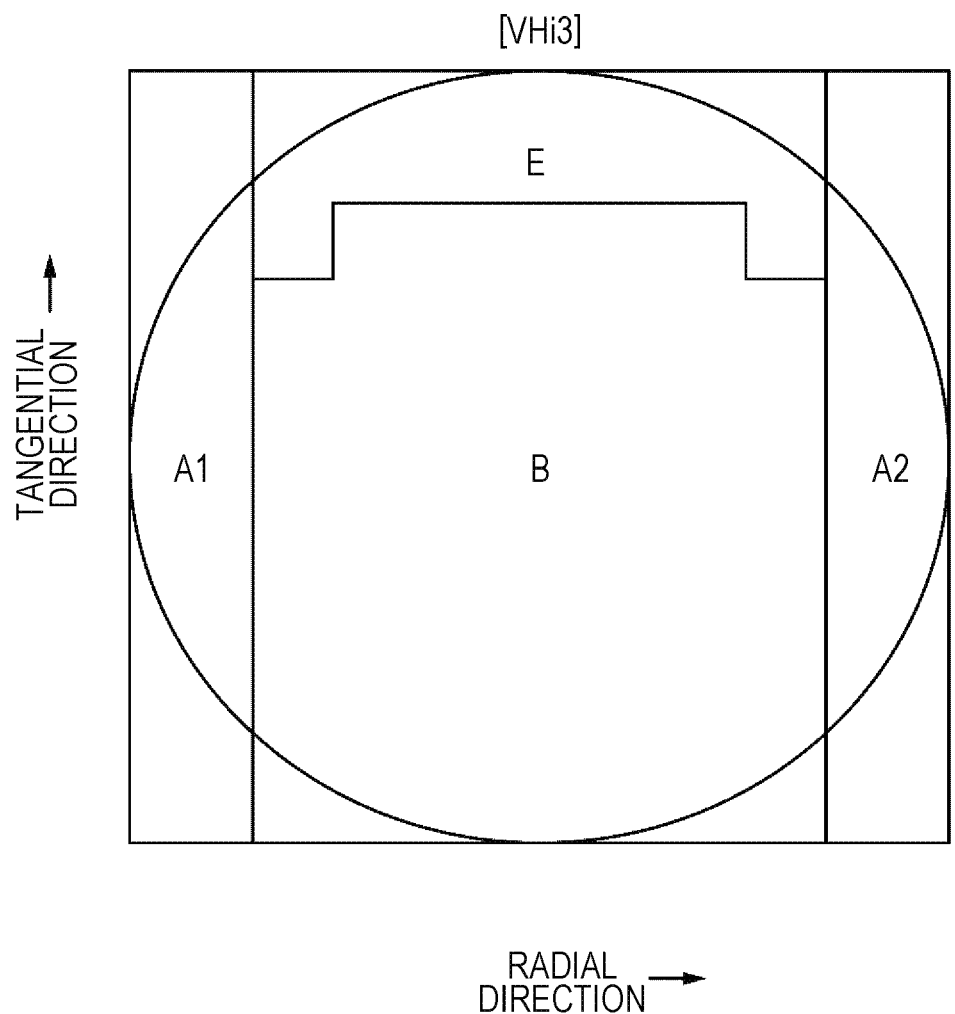

In addition, if the configuration of the pattern IVT4 is applied to the T4 system, the pattern HT4 system, and the pattern Hi3 system, the pattern VT4 (FIG. 119), the pattern VHT4 (FIG. 120) and the pattern VHi3 (FIG. 121) may be considered. In addition, increasing the number of division regions of which bands are different in the radial direction in a spatially optical manner may be considered on the basis of the above configuration.

[Pattern NST6]

(Case of Making Density Much Higher)

Figure 122:
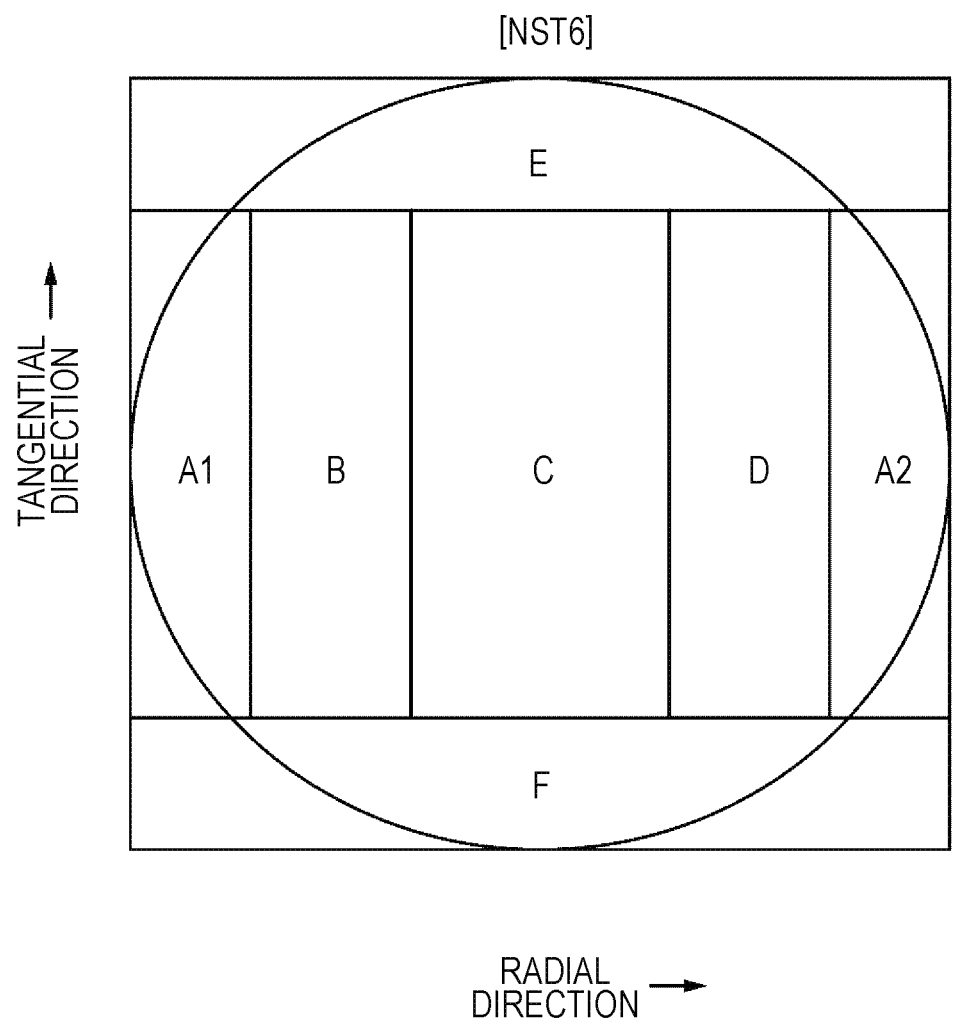

FIG. 122 illustrates a division pattern NST6 (similarly to FIG. 54). The case of making the density in the division pattern much higher will be described. In other words, the simulation conditions are as follows.

LD47 (GB) . . . 0.03967 μm/channel bit

When Tp=0.15 μm (for each of the land and groove), the plane capacity becomes 100.3 GB.

NA=0.91

PR (1233321)

Evaluation index: e-MLSE

Mark width=Tp×0.6

Figure 123:
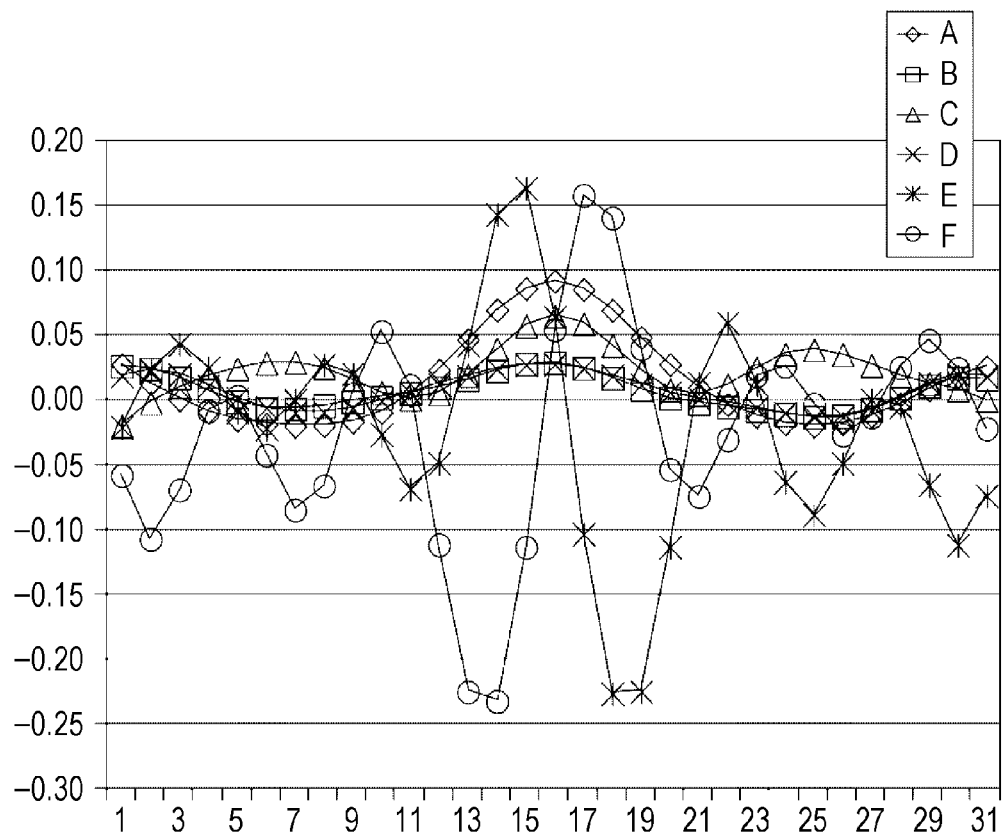
Figure 124:
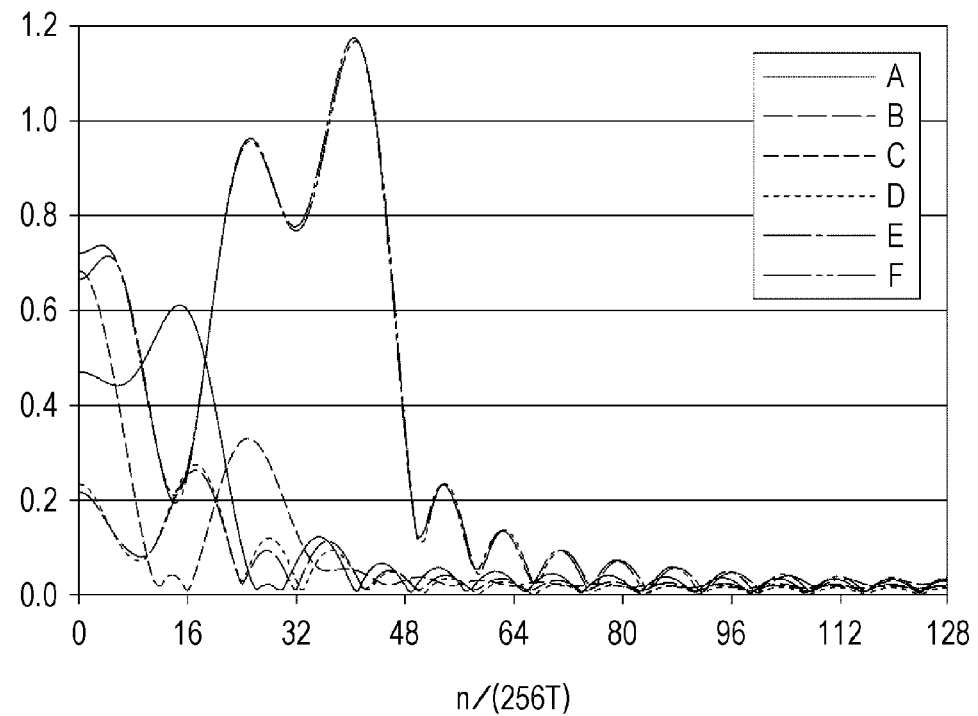

An example of values of coefficients of 31 taps of the electric filter in this case is illustrated in FIG. 123. The electric filter is configured with an FIR filter. The frequency amplitude characteristics of the respective channels of A to F in a case where such coefficients are set are illustrated in FIG. 124. In the case where no optical filter is used, the e-MLSE becomes 38.6%; and in the case where an optical filter (NST6) and an electric filter are used, the e-MLSE is improved by 8.6%.

2. Other Embodiments

The reproduced signals of the optical disc are greatly deviated from an ideal signal due to an increase of inter-symbol interference caused by making the density in the line direction higher and an increase of leakage and insertion of signals from the adjacent tracks caused by making the density in the track direction higher in the ideal signal. In the related art, the problem has been solved by using electric filters. For example, in BDXL (registered trade mark), 33.4 GB/L is implemented.

Figure 125:
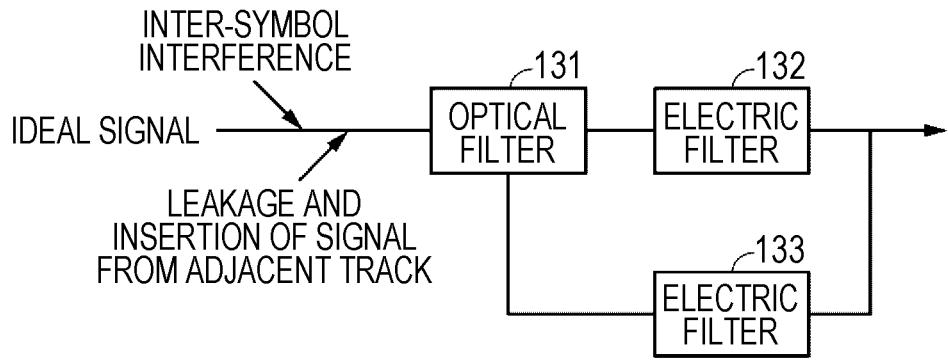

The configuration of reproducing signals recorded in a high density according to the present disclosure is illustrated in FIG. 125. In other words, the reproduced signal is supplied to the optical filter 131, and the signal is split into a plurality of signals having different bands in the line density direction and/or the track density direction in a spatially optical manner by the optical filter 131. A plurality of split signals, for example, two signals are respectively supplied to optimum electric filters 132 and 133, and an output signal is obtained by summing the outputs of the electric filters 132 and 133.

In the configuration of the above-described embodiment, the optical filter is divided into a plurality of regions, and the signals of a plurality of channels obtained from the respective division regions are respectively supplied to the electric filters. In another embodiment, there is an example where a beam splitter is used as the optical filter.

Figure 126:
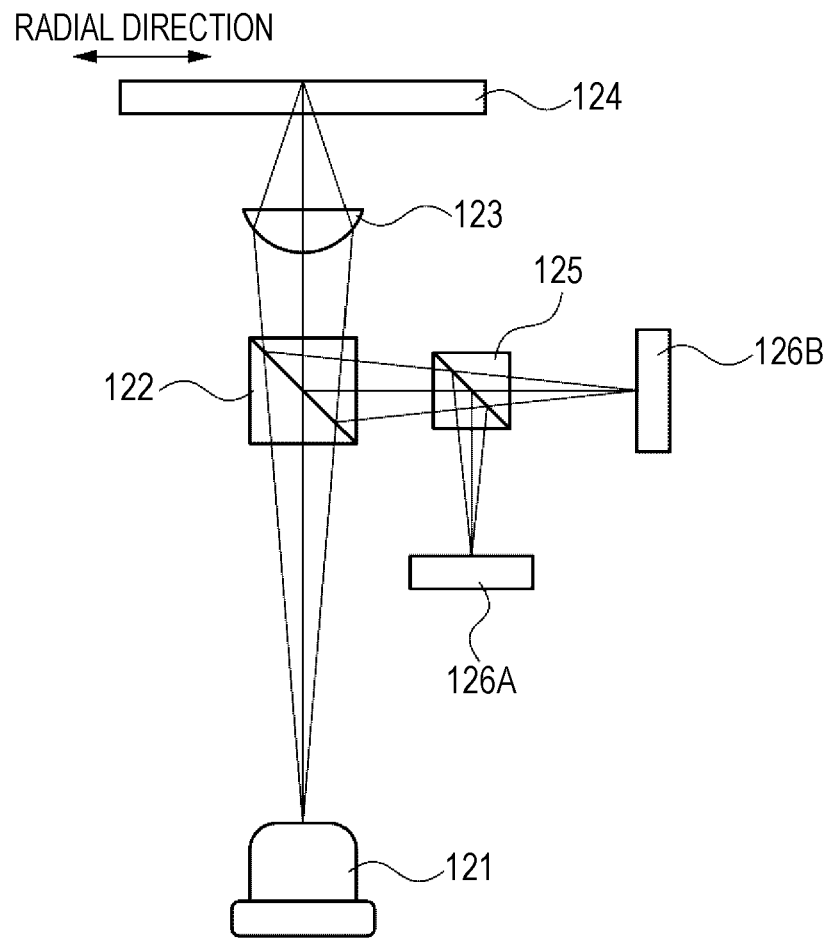

As illustrated in FIG. 126, a surface of a disc 124 is irradiated with a laser beam from a light source 121 through a beam splitter 122 for outgoing/returning path splitting and an object lens 123. The beam returning from the disc 124 is reflected in the beam splitter 122 to be incident on the beam splitter 125 for the optical filter. In addition, FIG. 126 illustrates the minimum optical elements which are necessary for the description.

Figure 127:
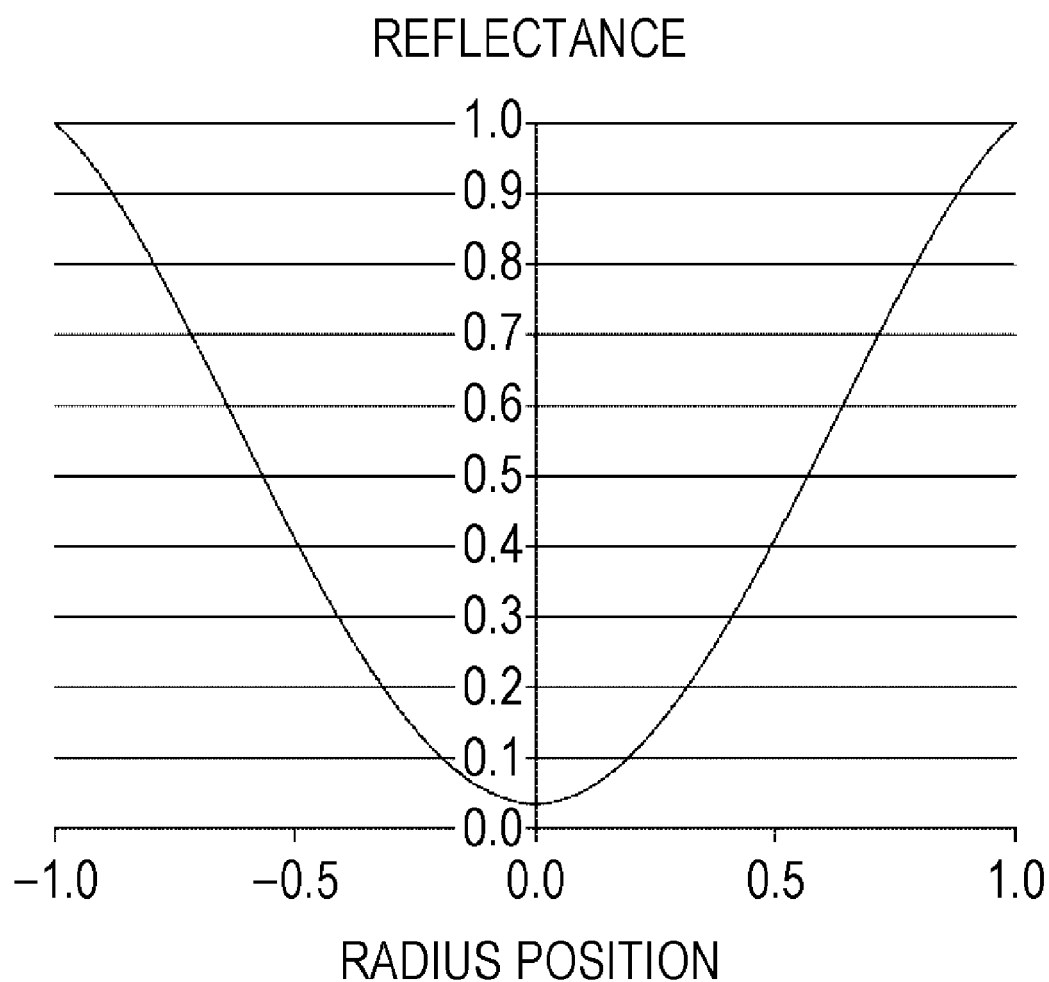

The beam reflected by the beam splitter 125 is converted into an electric signal by the light sensing element 126A, and the beam transmitting the beam splitter 125 is converted into an electric signal by the light sensing element 126B. The beam splitter 125 has incident angle dependency, so that the pupil is split in a spatially optical manner by using the incident angle dependency. FIG. 127 illustrates reflection characteristics of the beam splitter 125. In FIG. 127, the ordinate axis indicates reflectance, and the abscissa axis indicates the radius position. The radius position is a radius position in the radial direction when the pupil radius is set to 1.

Figure 128:
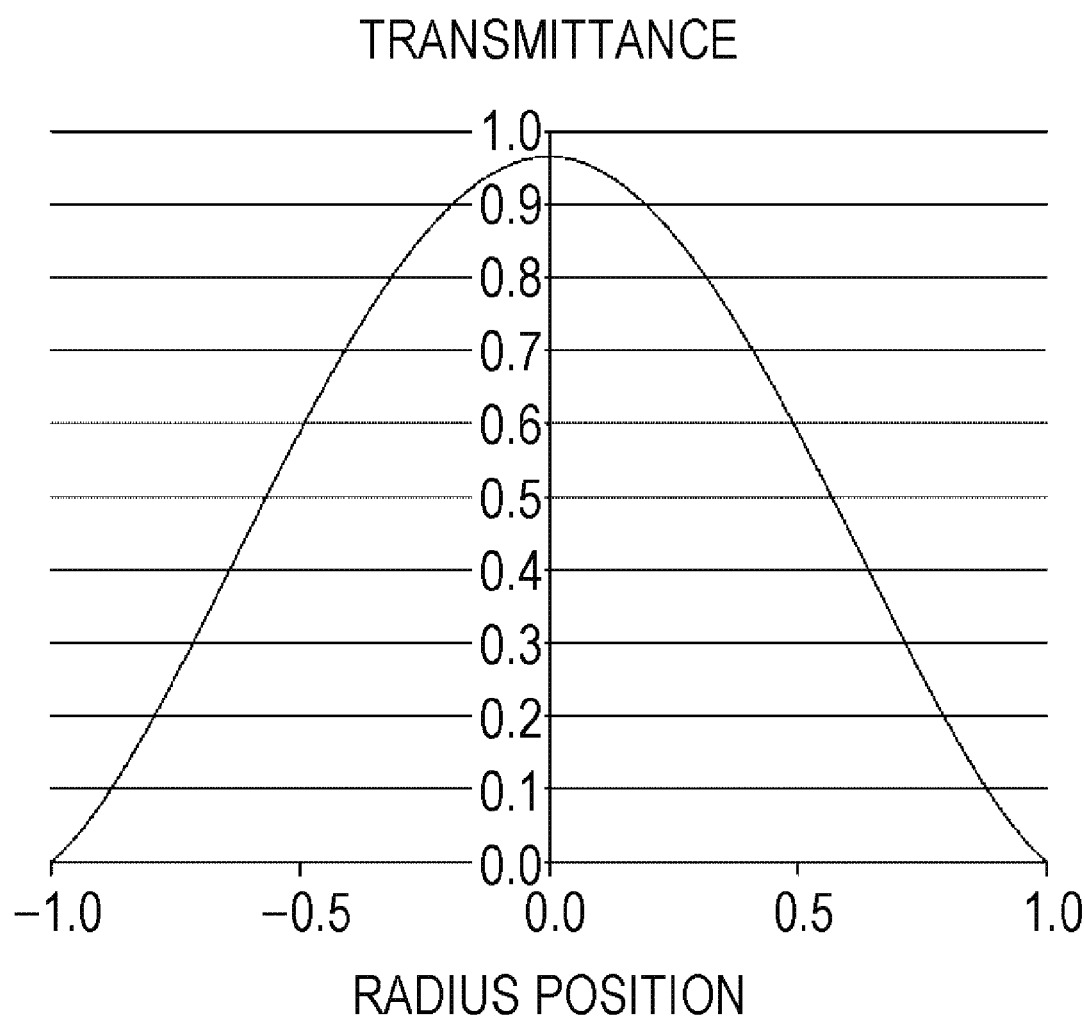

As can be seen from FIG. 127 and FIG. 128, most of the laser beam incident on the beam splitter 125 (radius position=0) transmits to be guided to the light sensing element 126B. Most of the laser beam incident on the radius position (=±1.0) is reflected to be guided to the light sensing element 126A. In this manner, although the beam is split, unlike the above-described embodiment, the beams guided by the light sensing elements 126A and 126B have an overlapping portion.

In addition, in the configuration of FIG. 126, a beam splitter 127 (refer to FIG. 129) may be arranged between the beam splitter 125 and the light sensing element 126B. The beam splitter 127 has incident angle dependency. The beam splitter 127 guides the beam at the angle which is different by 90° from the beam guided by the light sensing element 126A and the beam guided by the light sensing element 126B. In other words, in FIG. 126, the beam is guided in the direction from the rear surface to the front surface of the paper to be sensed by the light sensing element 126C.

"Characteristics of Electric Filter"

Figure 130:
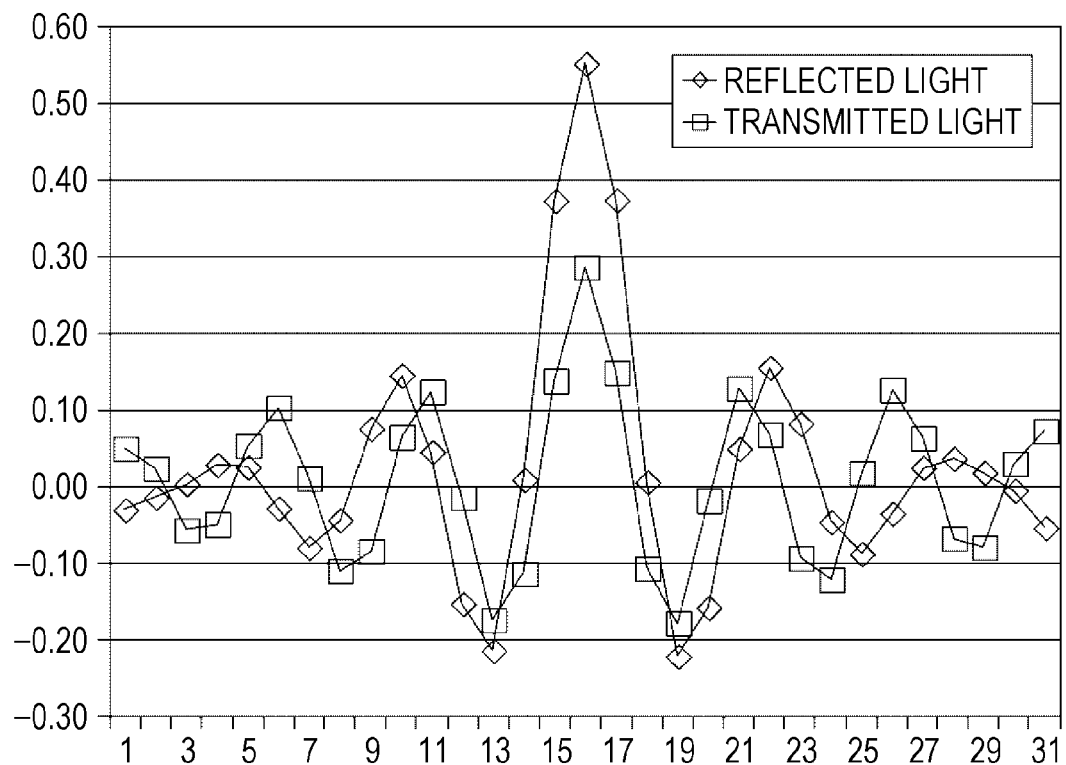
Figure 131:
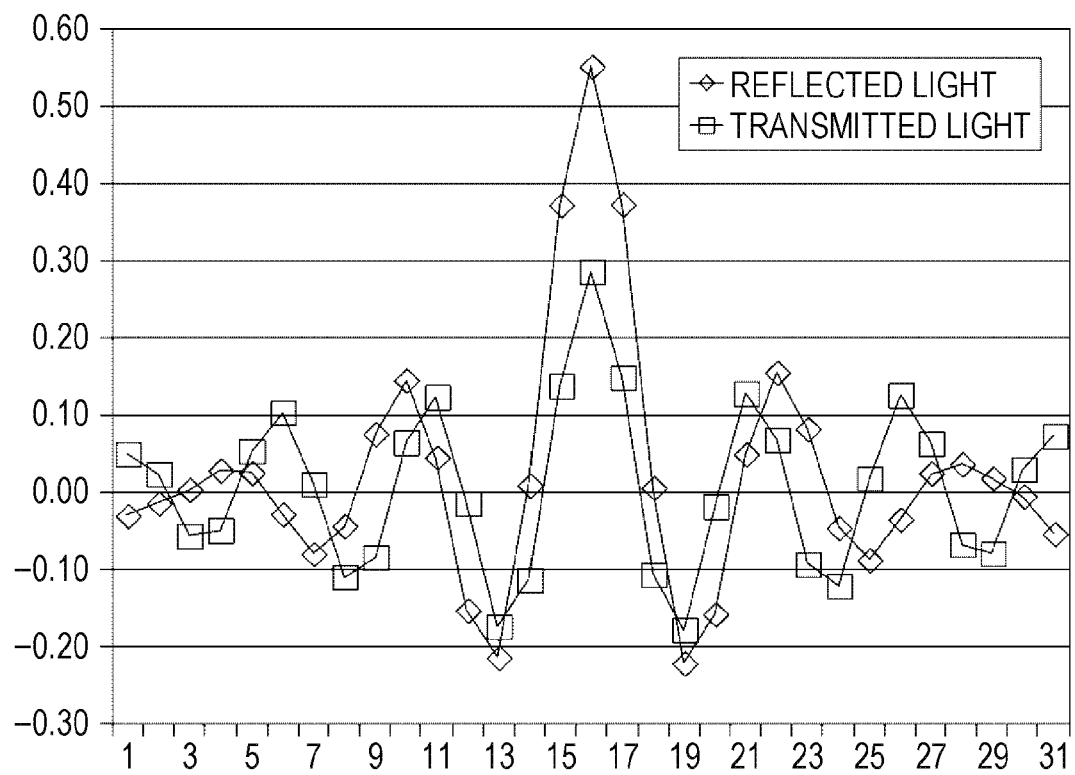

As illustrated in "Characteristics of Electric Filter" of FIG. 126, the characteristics of the electric filter which electric signals respectively converted by the light sensing elements 126A and 126B are supplied to are illustrated in FIGS. 130 and 131. FIG. 130 illustrates an example of values of coefficients of 31 taps of the electric filter. The electric filter is configured with an FIR filter. The frequency amplitude characteristics of a reflected-light-side filter and a transmitted-light-side filter in a case where such coefficients are set are illustrated in FIG. 131.

Figure 129:
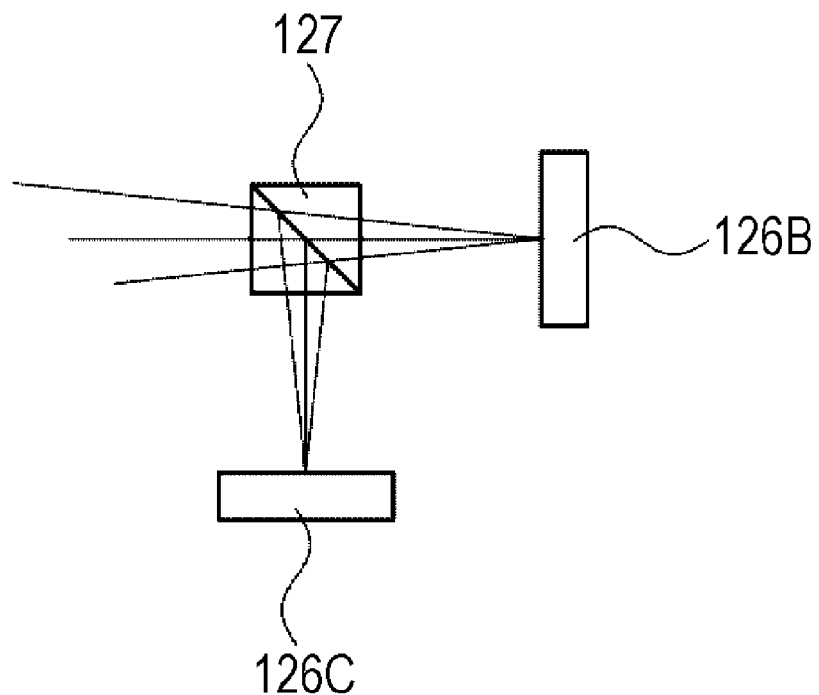

In addition, FIG. 132 illustrates an example of coefficients of 31 taps of an electric filter very suitable for the case of two-stage configuration of combining the beam splitter of FIG. 129 with the configuration of FIG. 126. A indicates the coefficient of the light sensing element 126A; B indicates the coefficient of the filter which the output of the light sensing element 126B is supplied to; and C indicates the coefficient of the filter which the output of the light sensing element 126C is supplied to. The frequency amplitude characteristics of the reflected-light-side filter and the transmitted-light-side filter in a case where such coefficients are set are illustrated in FIG. 133.

In addition, although the beam splitter having incident angle dependency is used as the optical filter in the above-described example, the configuration where a beam is incident on a half wavelength plate and an output light beam of the half wavelength plate is incident on a polarizing beam splitter may be employed. In this case, the orientations of the optical axes of the half wavelength plate have different distribution on the two-dimensional plane. As a result, polarization is differently conducted according to the incidence position of the half wavelength plate, and the input beam can be split into two beams by the polarizing beam splitter.

By the way, the present disclosure can also take configurations described hereafter.

(1) A reproduction apparatus comprising:

a detection unit configured to: divide a section of a beam returning from an optical medium into at least first and second regions corresponding, respectively, to first and second channels, wherein the first region includes an outer region in a radial direction of the beam, wherein the second region includes an outer region in a tangential direction of the beam, and form detected signals corresponding to the respective channels;

a multi-input equalizer component comprising equalizer units supplied with the respective detected signals corresponding to the channels, and configured to perform computing on outputs of the equalizer units and to output an equalized signal based on the computing; and a binarization unit configured to perform binarization processing on the equalized signal to obtain binary data.

(2) The reproduction apparatus according to (1), wherein the multi-input equalizer component comprises a multi-input adaptive equalizer component configured to output the equalized signal, and wherein the apparatus further comprises an equalization error computing unit configured to: obtain equalization error data based, at least in part, on an equalization target signal and on the equalized signal, wherein the equalization target signal is obtained based, at least in part, on the binary data, and supply the equalization error data to the adaptive equalizer unit to control adaptive equalization.

(3) The reproduction apparatus according to (2), wherein: the multi-input adaptive equalizer component is configured to perform partial response equalization processing on the detected signals corresponding to the respective channels, the binarization processing by which the binary data is obtained comprises maximum likelihood decoding processing, the equalization target signal is obtained by performing convolution with the binary data, and the equalization error computing unit is configured to obtain the equalization error data by computing using the equalization target signal and the equalized signal.

(4) The reproduction apparatus according to (1), wherein the detection unit includes photodetectors divided to correspond to the regions and configured to obtain the detected signals.

(5) The reproduction apparatus according to (4), further comprising an optical path conversion element configured to separate the beam returning from the optical medium into the regions, wherein the optical path conversion element is disposed in an optical path through an object lens and to the detectors, and wherein the regions of the beam separated by the optical path conversion element are input to respective detectors.

(6) The reproduction apparatus according to (1), wherein the optical medium includes alternating lands and grooves, and wherein information is recorded on both the lands and grooves.

(7) A method comprising: dividing a section of a beam returning from an optical medium into at least first and second regions corresponding, respectively, to first and second channels, wherein the first region includes an outer region in a radial direction of the beam, wherein the second region includes an outer region in a tangential direction of the beam; forming detected signals corresponding to the respective channels; supplying the detected signals corresponding to the channels to respective equalizer units; using a multi-input equalizer component comprising the equalizer units to perform computing on outputs of the equalizer units and to output an equalized signal based on the computing; and performing binarization processing on the equalized signal to obtain binary data.

(8) A reproduction apparatus comprising: an optical filter configured to provide electrical signals corresponding to regions of an optical beam returning from an optical medium, the optical beam being incident on the optical filter, the regions of the optical beam corresponding to different bands in a line density direction and/or a track density direction; and electric filters configured to provide outputs based, at least in part, on the electrical signals provided by the optical filter, wherein the reproduction apparatus is configured to obtain a reproduced signal by combining the outputs of the electric filters.

(9) The reproduction apparatus according to (8), wherein the optical filter includes a beam splitter having incident angle dependency.

(10) The reproduction apparatus according to (8), wherein the regions of the optical beam include a first region comprising one or more outer portions of the optical beam in the track density direction, a second region comprising one or more outer portions of the optical beam in the line density direction, and a third region comprising a central portion of the optical beam.

(11) The reproduction apparatus according to (10), wherein the one or more outer portions of the first region include first and second outer portions, and wherein the second region of the optical beam is between the first and second outer portions of the first region.

(12) The reproduction apparatus according to (10), wherein the one or more outer portions of the second region include first and second outer portions, and wherein the first region of the optical beam is between the first and second outer portions of the second region.

(13) The reproduction apparatus according to (10), wherein the regions of the optical beam further include a fourth region comprising one or more portions of the optical beam between the second and third regions of the optical beam in the line density direction.

(14) The reproduction apparatus according to (10), wherein the one or more outer portions of the second region include a first outer portion of the optical beam in the line density direction, and wherein the third region further includes a second outer portion of the optical beam in the line density direction.

(15) The reproduction apparatus according to (8), wherein the regions of the optical beam include a first region comprising one or more outer portions of the optical beam in the line density direction, a second region comprising a central portion of the optical beam, a third region comprising a first outer portion of the optical beam in a track density direction, and a fourth region comprising a second outer portion of the optical beam in the track density direction, wherein the third region further includes one or more portions of the optical beam adjacent to the first region and the second outer portion of the optical beam in the track density direction, and wherein the fourth region further includes one or more portions of the optical beam adjacent to the first region and the first outer portion of the optical beam in the track density direction.

(16) The reproduction apparatus according to (8), wherein the regions of the optical beam include a first region comprising one or more outer portions of the optical beam in a track density direction, a second region comprising a first outer portion of the optical beam in the line density direction, a third region comprising a central portion of the optical beam, and a fourth region comprising a second outer portion of the optical beam in the line density direction.

(17) The reproduction apparatus according to (16), wherein the one or more outer portions of the first region include first and second outer portions, and wherein the second and fourth regions of the optical beam are between the first and second outer portions of the first region.

(18) The reproduction apparatus according to (16), wherein the first region of the optical beam is between the second and fourth regions of the optical beam.

(19) The reproduction apparatus according to (16), wherein the regions of the optical beam further include a fifth region comprising a portion of the optical beam between the second and third regions in the line density direction, and a sixth region comprising a portion of the optical beam between the third and fourth regions in the line density direction.

(20) The reproduction apparatus according to (8), wherein the regions of the optical beam include a first region comprising a first outer portion of the optical beam in a track density direction, a second region comprising a first outer portion of the optical beam in the line density direction, a third region comprising a central portion of the optical beam, a fourth region comprising a second outer portion of the optical beam in the line density direction, and a fifth region comprising a second outer portion of the optical beam in the track density direction.

(21) The reproduction apparatus according to (8), wherein the regions of the optical beam include a first region comprising one or more outer portions of the optical beam in a track density direction, a second region comprising a first outer portion of the optical beam in the line density direction, a third region comprising a central portion of the optical beam, and a fourth region comprising a portion of the optical beam between the second and third regions in the line density direction.

(22) The reproduction apparatus according to claim 8, wherein the regions of the optical beam include a first region comprising one or more outer portions of the optical beam in a track density direction, and two or more second regions comprising one or more inner portions of the optical beam in the track density direction, wherein the two or more second regions are arranged asymmetrically with respect to a line passing through a center of the optical beam, the line being directed in the track density direction.

(23) The reproduction apparatus according to (8), wherein the regions of the optical beam include a first region comprising a first outer portion of the optical beam in a track density direction, a second region comprising a first outer portion of the optical beam in the line density direction, a third region comprising a central portion of the optical beam, a fourth region comprising a second outer portion of the optical beam in the track density direction, a fifth region comprising a second outer portion of the optical beam in the line density direction, a sixth region comprising a portion of the optical beam between the second and third regions in the line density direction, and a seventh region comprising a portion of the optical beam between the third and fifth regions in the line density direction.

3. Modification

Heretofore, embodiments of the present disclosure have been described specifically. However, the present disclosure is not restricted to the above-described embodiments, but various modifications based on the technical thoughts of the present disclosure are possible. For example, the above-described numerical values of the wavelength of the laser light source, the track pitch, and the recording line density are examples, and other numerical values may be used. In addition, as the index for evaluating the reproduction performance, an index other than the above-described index may be used. In addition, the present disclosure can be applied to an optical disc device that conducts only one of recording and reproduction on an optical disc.

Furthermore, configurations, methods, processes, shapes, materials and numerical values in the above-described embodiments can be combined with each other without departing from the spirit of the present disclosure. For example, the above-described first and second embodiments may be combined.

REFERENCE SIGNS LIST

13 Multi-input adaptive equalizer unit
14 Binarization detector
15 PR convolution unit
21 to 23 Adaptive equalizer units
100 Optical disc
101 Optical pickup
105 Data detection processing unit
125, 127 beam splitter
126A, 126B, 126C light sensing element

The invention claimed is:

1. A reproduction apparatus comprising:
a detection unit configured to:
divide a section of a beam returning from an optical medium into at least first and second outer regions exclusive of a center of the section of the beam and corresponding, respectively, to first and second channels, wherein the first region includes an outer region in a radial direction of the beam, and wherein the second region includes an outer region in a tangential direction of the beam, and
form detected signals corresponding to the respective channels;
a multi-input equalizer component comprising equalizer units supplied with the respective detected signals corresponding to the channels, and configured to perform computing on outputs of the equalizer units and to output an equalized signal based on the computing; and
a binarization unit configured to perform binarization processing on the equalized signal to obtain binary data.

2. The reproduction apparatus according to claim 1, wherein the multi-input equalizer component comprises a multi-input adaptive equalizer component configured to output the equalized signal, and wherein the apparatus further comprises an equalization error computing unit configured to:
obtain equalization error data based, at least in part, on an equalization target signal and on the equalized signal, wherein the equalization target signal is obtained based, at least in part, on the binary data, and supply the equalization error data to the adaptive equalizer unit to control adaptive equalization.

3. The reproduction apparatus according to claim 2, wherein:
the multi-input adaptive equalizer component is configured to perform partial response equalization processing on the detected signals corresponding to the respective channels, the binarization processing by which the binary data is obtained comprises maximum likelihood decoding processing, the equalization target signal is obtained by performing convolution with the binary data, and the equalization error computing unit is configured to obtain the equalization error data by computing using the equalization target signal and the equalized signal.

4. The reproduction apparatus according to claim 1, wherein the detection unit includes photodetectors divided to correspond to the regions and configured to obtain the detected signals.

5. The reproduction apparatus according to claim 4, further comprising an optical path conversion element configured to separate the beam returning from the optical medium into the regions, wherein the optical path conversion element is disposed in an optical path through an object lens and to the detectors, and wherein the regions of the beam separated by the optical path conversion element are input to respective detectors.

6. The reproduction apparatus according to claim 1, wherein the optical medium includes alternating lands and grooves, and wherein information is recorded on both the lands and grooves.

7. A method comprising:
dividing a section of a beam returning from an optical medium into at least first and second outer regions exclusive of a center of the section of the beam and corresponding, respectively, to first and second channels, wherein the first region includes an outer region in a radial direction of the beam, and wherein the second region includes an outer region in a tangential direction of the beam;
forming detected signals corresponding to the respective channels;
supplying the detected signals corresponding to the channels to respective equalizer units;
using a multi-input equalizer component comprising the equalizer units to perform computing on outputs of the equalizer units and to output an equalized signal based on the computing; and
performing binarization processing on the equalized signal to obtain binary data.

* * * * *